(12) United States Patent
Miller et al.

(10) Patent No.: US 11,790,454 B1
(45) Date of Patent: Oct. 17, 2023

(54) USE DETERMINATION RISK COVERAGE DATASTRUCTURE FOR ON-DEMAND AND INCREASED EFFICIENCY COVERAGE DETECTION AND REBALANCING APPARATUSES, METHODS AND SYSTEMS

(71) Applicant: Bind Benefits, Inc., Minneapolis, MN (US)

(72) Inventors: Anthony Miller, Minneapolis, MN (US); Henning Chiv, Castro Valley, CA (US); Matthew Chock, Apple Valley, MN (US); Glen Eiden, Forest Lake, MN (US); Trevor Fast, San Francisco, CA (US); Charley Hastings, Lindstrom, MN (US); Jason Haupt, Zimmerman, MN (US); Shawn Wagoner, Edina, MN (US); Matthew Wiandt, Edina, MN (US)

(73) Assignee: Bind Benefits, Inc., Minneapolis, MN (US)

( * ) Notice: Subject to any disclaimer, the term of this patent is extended or adjusted under 35 U.S.C. 154(b) by 180 days.

(21) Appl. No.: 16/659,429

(22) Filed: Oct. 21, 2019

Related U.S. Application Data

(63) Continuation-in-part of application No. 15/632,052, filed on Jun. 23, 2017, and a continuation of application No. 15/631,961, filed on Jun. 23, 2017.

(Continued)

(51) Int. Cl.
*G06Q 40/08* (2012.01)
*G06Q 10/06* (2012.01)
*G06Q 10/067* (2023.01)

(52) U.S. Cl.
CPC .......... *G06Q 40/08* (2013.01); *G06Q 10/067* (2013.01)

(58) Field of Classification Search
None
See application file for complete search history.

(56) References Cited

U.S. PATENT DOCUMENTS 5,301,105 A    4/1994  Cummings
5,523,942 A    6/1996  Tyler
(Continued)

FOREIGN PATENT DOCUMENTS

WO    2011123823    10/2011
WO    2014130392     8/2014
WO    2015191562    12/2015

OTHER PUBLICATIONS

Peter Diamond. "Organizing the Health Insurance Market". Econometrica, vol. 60, No. 6. (Nov. 1992), pp. 1233-1254. http://links.jstor.org/sici?sici=0012-9682%28199211%2960%3A6%3C1233%3AOTHIM%3E2.0.00%3B2-5 (Year: 1992).

(Continued)

*Primary Examiner* — Ayal I. Sharon
(74) *Attorney, Agent, or Firm* — Hanchuk Kheit LLP.; Walter G. Hanchuk

(57) ABSTRACT

The Use Determination Risk Coverage Datastructure for On-Demand and Increased Efficiency Coverage Detection and Rebalancing Apparatuses, Methods and Systems ("UDRCD") transforms coverage enrollment request, event signal, ACGG request, search request inputs via UDRCD components into coverage enrollment response, add-in recommendation, ACGG response, search response outputs. A set of clinical conditions is determined. A set of treatments is determined for each clinical condition. Treatment paths data that specifies a set of treatment paths, wherein each treatment path comprises an ordered subset of treatments, is determined for each clinical condition. Providers are determined for each treatment. Practice patterns data that specifies, for each clinical condition treated by each provider, (Continued)

how likely the respective provider is to utilize each of the treatment paths is determined. An atomized coverage graph data structure is generated that includes a set of clinical condition objects, a set of treatment objects, and a set of provider objects.

16 Claims, 82 Drawing Sheets

Related U.S. Application Data

(60) Provisional application No. 62/748,518, filed on Oct. 21, 2018, provisional application No. 62/807,711, filed on Feb. 19, 2019, provisional application No. 62/446,810, filed on Jan. 16, 2017, provisional application No. 62/510,215, filed on May 23, 2017, provisional application No. 62/524,188, filed on Jun. 23, 2017, provisional application No. 62/446,810, filed on Jan. 16, 2017, provisional application No. 62/510,215, filed on May 23, 2017, provisional application No. 62/524,188, filed on Jun. 23, 2017.

(56) References Cited

U.S. PATENT DOCUMENTS

| | | |
|---|---|---|
| 6,266,645 B1 | 7/2001 | Simpson |
| 7,392,201 B1 | 6/2008 | Binns |
| 7,493,264 B1 | 2/2009 | Kelly |
| 7,702,522 B1 | 4/2010 | Sholem |
| 7,702,527 B1 | 4/2010 | Kron |
| 7,805,318 B1 | 9/2010 | Kuhn |
| 8,005,687 B1 | 8/2011 | Pederson |
| 8,041,636 B1 | 10/2011 | Hunter |
| 8,352,286 B1 | 1/2013 | Bawa |
| 8,670,996 B1 | 3/2014 | Weiss |
| 10,521,864 B1 | 12/2019 | Davis |
| 2001/0034619 A1 | 10/2001 | Sherman |
| 2002/0065758 A1 | 5/2002 | Henley |
| 2003/0195838 A1 | 10/2003 | Henley |
| 2003/0204421 A1 | 10/2003 | Houle |
| 2004/0010426 A1 | 1/2004 | Berdou |
| 2004/0111363 A1 | 6/2004 | Trench |
| 2004/0143464 A1 | 7/2004 | Houle |
| 2004/0193456 A1 | 9/2004 | Kellington |
| 2005/0049497 A1* | 3/2005 | Krishnan ............... G16H 50/20 600/437 |
| 2005/0055251 A1 | 3/2005 | Ashley |
| 2005/0256745 A1* | 11/2005 | Dalton .................. G06Q 40/08 705/3 |
| 2006/0089862 A1 | 4/2006 | Anandarao |
| 2006/0200407 A1 | 9/2006 | Hartley |
| 2007/0021986 A1 | 1/2007 | Cheung |
| 2007/0118399 A1* | 5/2007 | Avinash ................. G16H 10/60 705/2 |
| 2007/0156455 A1 | 7/2007 | Tarino |
| 2007/0162308 A1 | 7/2007 | Peters |
| 2007/0238065 A1* | 10/2007 | Sherwood ............. G16H 50/50 433/24 |
| 2007/0271119 A1 | 11/2007 | Boeger |
| 2007/0276704 A1 | 11/2007 | Naumann |
| 2008/0109263 A1 | 5/2008 | Clark |
| 2008/0120143 A1 | 5/2008 | Beauregard |
| 2008/0183504 A1 | 7/2008 | Highley |
| 2008/0208640 A1 | 8/2008 | Thomas |
| 2008/0243547 A1 | 10/2008 | Brett |
| 2008/0275737 A1 | 11/2008 | Gentry |
| 2008/0288286 A1 | 11/2008 | Noreen |
| 2009/0076841 A1 | 3/2009 | Baker |
| 2009/0112632 A1 | 4/2009 | Belliveau |
| 2010/0030579 A1 | 2/2010 | Dhauvan |
| 2010/0088112 A1 | 4/2010 | Krasny |
| 2010/0241449 A1* | 9/2010 | Firminger ............. G16H 50/20 705/2 |
| 2010/0268057 A1* | 10/2010 | Firminger ............. G06Q 10/06 600/407 |
| 2010/0268108 A1* | 10/2010 | Firminger ............. G16H 40/20 600/544 |
| 2010/0274577 A1* | 10/2010 | Firminger ............. G06Q 30/06 705/2 |
| 2010/0274578 A1* | 10/2010 | Firminger ............. G16H 40/00 705/2 |
| 2010/0293002 A1* | 11/2010 | Firminger ............. G06Q 10/06 705/2 |
| 2010/0305962 A1* | 12/2010 | Firminger ............. G16H 20/30 705/2 |
| 2011/0035231 A1* | 2/2011 | Firminger ............. G16H 50/20 705/2 |
| 2011/0153369 A1 | 6/2011 | Feldman |
| 2011/0161117 A1 | 6/2011 | Busque |
| 2011/0161118 A1 | 6/2011 | Borden |
| 2011/0166895 A1 | 7/2011 | Kron |
| 2011/0282690 A1 | 11/2011 | Patel |
| 2012/0035975 A1 | 2/2012 | Sugimoto |
| 2012/0047105 A1 | 2/2012 | Saigal |
| 2012/0066662 A1 | 2/2012 | Chao |
| 2012/0129139 A1 | 5/2012 | Partovi |
| 2012/0239560 A1 | 9/2012 | Pourfallah |
| 2012/0284058 A1 | 11/2012 | Varanasi |
| 2012/0310679 A1 | 12/2012 | Olson |
| 2012/0330690 A1 | 12/2012 | Goslinga |
| 2013/0035956 A1 | 2/2013 | Carmeli |
| 2013/0124217 A1 | 5/2013 | Thesman |
| 2013/0166317 A1 | 6/2013 | Beardall |
| 2013/0185231 A1* | 7/2013 | Baras .................... G16H 50/50 706/12 |
| 2013/0191157 A1 | 7/2013 | Eiden |
| 2014/0006066 A1 | 1/2014 | Watts |
| 2014/0058738 A1* | 2/2014 | Yeskel ................... G16Z 99/00 705/2 |
| 2014/0142964 A1 | 5/2014 | Lang |
| 2014/0172470 A1 | 6/2014 | Watts |
| 2014/0180714 A1 | 6/2014 | Mun |
| 2014/0180949 A1 | 6/2014 | Ramasamy |
| 2014/0249851 A1 | 9/2014 | Christodouleas |
| 2014/0297297 A1* | 10/2014 | Head .................... G16H 50/20 705/2 |
| 2014/0304009 A1 | 10/2014 | Saxon |
| 2014/0372150 A1 | 12/2014 | Karie |
| 2015/0161622 A1 | 6/2015 | Hoffmann |
| 2015/0199493 A1 | 7/2015 | Glenn |
| 2015/0339602 A1 | 11/2015 | Schlosser |
| 2015/0356685 A1 | 12/2015 | Lindbberg |
| 2016/0042135 A1 | 2/2016 | Hogan |
| 2016/0092641 A1* | 3/2016 | Delaney ................ G16H 40/20 705/3 |
| 2016/0125362 A1 | 5/2016 | Dziuba |
| 2016/0140295 A1 | 5/2016 | Powell |
| 2016/0246941 A1 | 8/2016 | Miller |
| 2016/0292367 A1 | 10/2016 | Thorpe |
| 2016/0350495 A1* | 12/2016 | Pecora ............... G06Q 10/0637 |
| 2016/0358295 A1 | 12/2016 | Heffley |
| 2016/0378932 A1 | 12/2016 | Sperling |
| 2018/0166157 A1* | 6/2018 | Firminger ............. G16H 10/60 |
| 2018/0182475 A1* | 6/2018 | Gossler ................. G16H 50/50 |
| 2018/0197636 A1* | 7/2018 | Firminger ............. A61B 5/4836 |
| 2018/0260905 A1 | 9/2018 | Andreae |
| 2018/0301222 A1 | 10/2018 | Dew |
| 2020/0118691 A1* | 4/2020 | Kiljanek ............... G06N 20/20 |
| 2020/0303069 A1* | 9/2020 | Mulligan ............... G16H 50/20 |
| 2021/0043310 A1 | 2/2021 | Valuck |
| 2021/0090694 A1 | 3/2021 | Colley |
| 2021/0118577 A1* | 4/2021 | Bettencourt-Silva ...................... G16H 70/20 |
| 2021/0174963 A1* | 6/2021 | Hill, . .................... G16H 15/00 |
| 2021/0407672 A1 | 12/2021 | Zumbrun |
| 2021/0407682 A1 | 12/2021 | Crossen |

OTHER PUBLICATIONS

Karen Davis, Marilyn Moon, Barbara Cooper and Cathy Schoen. "Medicare Extra: A Comprehensive Benefit Option for Medicare Beneficiaries". Health Affairs, (2005). doi: 10.1377/hlthaffw5.442.

(56) References Cited

OTHER PUBLICATIONS http://content.healthaffairs.Org/content/early/2005/10/04/hlthaffw5.442.citation (Year: 2005).
Peter Diamond. "Organizing the Health Insurance Market". Econometrica, vol. 60, No. 6. (Nov. 1992), pp. 1233-1254. http://links.jstor.org/sici?sici=0012-9682%28199211%2960%3A6%3C1233%3AOTHIM%3E2.0.CO%3B2-5 (Year: 1992).
Adam Atherly. "The Effect of Medicare Supplemental Insurance on Medicare Expenditures". International Journal of Health Care Finance and Economics, 2, 137-162, 2002. (Year: 2002).
Mark V. Pauly, Patricia Danzon, Paul Feldstein, and John Hoff. "A Plan for 'Responsible National Health Insurance'" Health Affairs, pp. 5-25, Spring (1991). (Year: 1991).
Susan L. Ettner. "Adverse selection and the purchase of Medigap insurance by the elderly". Journal of Health Economics. vol. 16, Issue 5, Oct. 1997, pp. 543-562. https://doi.org/10.1016/S0167-6296(97)00011-8 (Year: 1997).
John H. Goddeeris and Andrew J. Hogan. "Improving Access to Health Care: What Can the States Do?" W.E. Upjohn Institute for Employment Research. (1992). ISBN 0-88099-117-8. (Year: 1992).
Dictionary.com. Definition of "Condition". Collins English Dictionary—Complete & Unabridged 2012 Digital Edition. Downloaded on Aug. 3, 2019. https://www.dictionary.com/browse/condition (Year: 2012).
Dictionary.com. Definition of "Atomize". Collins English Dictionary—Complete & Unabridged 2012 Digital Edition Downloaded on Aug. 3, 2019. https://www.dictionary.com/browse/atomize (Year: 2012).
D. C. Stahl, L. Rouse, D. Ko and J. C. Niland, "GDSI: a Web-based decision support system to facilitate the efficient and effective use of clinical practice guidelines," Proc. of 37th Annual Hawaii Int'l Conf, on System Sciences, 2004. pp. 10, doi: 10.1109/HICSS.2004.1265377. (Year: 2004).
V. Tresp, J. Marc Overhage, M. Bundschus, S. Rabizadeh, P. A. Fasching and S. Yu, "Going Digital: A Survey on Digitalization and Large-Scale Data Analytics in Healthcare," in Proc. of the IEEE, vol. 104, No. 11, pp. 2180-2206, Nov. 2016, doi: 10.1109/JPROC.2016.2615052. (Year: 2016).
Ongenae, Femke et al. "Towards computerizing intensive care sedation guidelines: design of a rule-based architecture for automated execution of clinical guidelines." BMC medical informatics and decision making vol. 10 3. Jan. 18, 2010, doi: 10.1186/1472-6947-10-3. (Year: 2010).
Geamsakul etal. "Analysis of Hepatitis Dataset by Decision Tree Based on Graph-Based Induction". Annual Conference of the Japanese Society for Artificial Intelligence. JSAI 2004: New Frontiers in Artificial Intelligence, pp. 5-28. https://link.springer.eom/chapter/10.1007/978-3-540-71009-7 2 (Year: 2004).
Geamsakul et al. "Constructing a Decision Tree for Graph-Structured Data and its Applications" Fundamenta Informaticae 66 (2005) 131-160 131. IOS Press. https://www.researchgate.net/publication/234785949_Constructing a Decision Tree for Graph-Structured Data and its Applications (Year: 2005).
Ling et al. "Decision trees with minimal costs". ICML '04: Proceedings of the twenty-first international conference on Machine learning. Jul. 2004 https://doi.org/10.1145/1015330.1015369 (Year: 2004).
Desarkaretal. "Med-Tree: A User Knowledge Graph Framework for Medical Applications". 13th IEEE International Conference on Bioinformatics and BioEngineering. Nov. 10-13, 2013. DOI: 10.1109/BIBE.2013.6701564 (Year: 2013)
U.S. Appl. No. 15/631,961.
U.S. Appl. No. 15/632,052.
U.S. Appl. No. 16/659,429.
U.S. Appl. No. 16/659,438.
U.S. Appl. No. 16/659,444.
U.S. Appl. No. 17/862,333.
U.S. Appl. No. 17/862,351.
U.S. Appl. No. 17/862,368.
U.S. Appl. No. 17/862,385.
U.S. Appl. No. 17/862,392.
U.S. Appl. No. 62/446,810.
U.S. Appl. No. 62/510,215.
U.S. Appl. No. 62/524,188.
U.S. Appl. No. 62/748,518.
U.S. Appl. No. 62/807,711.
U.S. Appl. No. 63//220,986.
U.S. Appl. No. 63/220,988.
U.S. Appl. No. 63/220,991.
U.S. Appl. No. 63/220,992.
U.S. Appl. No. 63/220,993.

\* cited by examiner

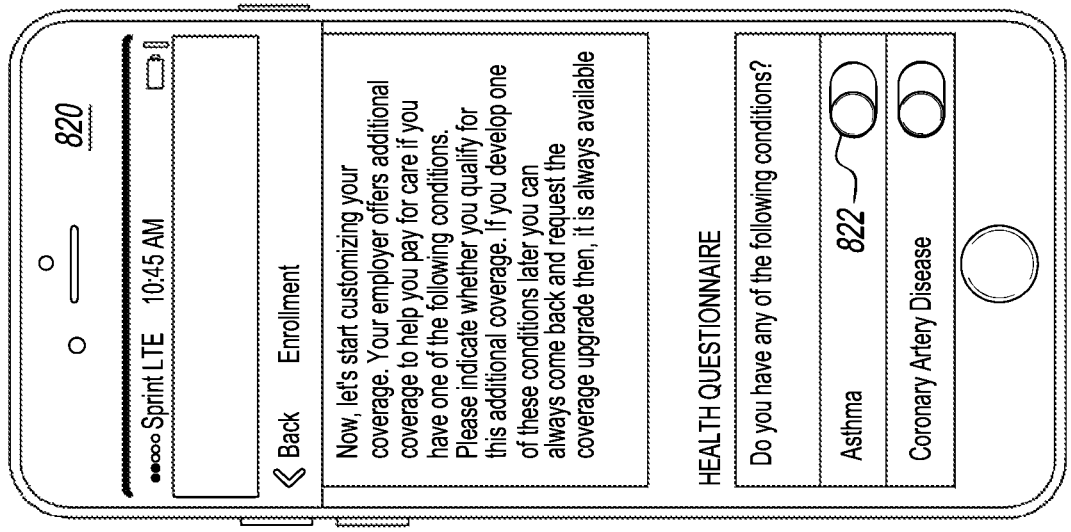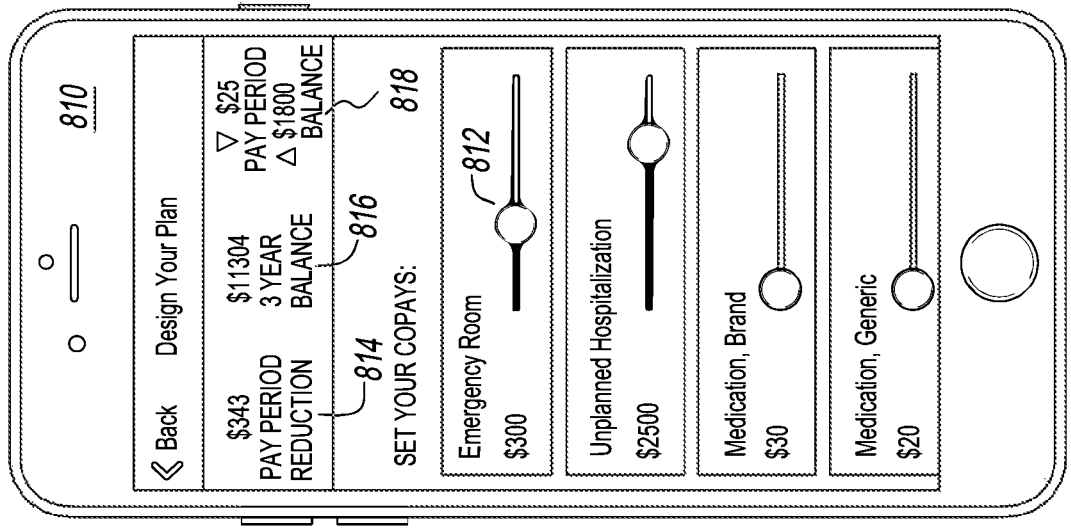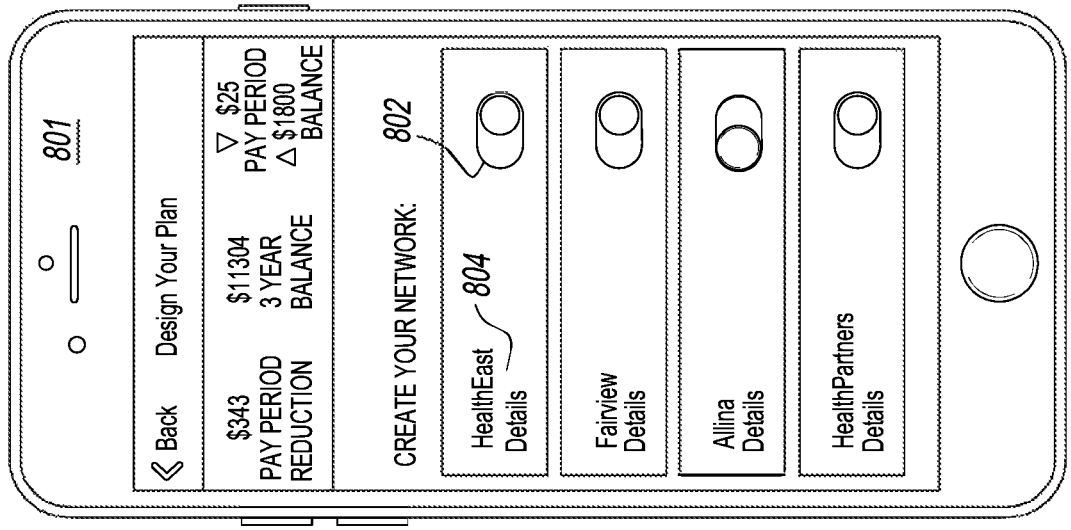
FIG. 8

FIG. 9

Knee Replacement Coverage Upgrade Options — 910

912 — Hospital A
Your Share:
$750 Now
$250 Monthly For 12 Months
★★★ QUALITY

OR

914 — Hospital B
Your Share:
$2,500 Now
$250 Monthly For 12 Months
★★ QUALITY

OR

916 — Hospital C
Your Share:
$10,000 Now
$250 Monthly For 12 Months
★ QUALITY

Sample Knee Pain Coverage Upgrade Options — 920

922 — Rehab Center A:
Up To 4 Rehab Visits
Total Cost = $500
- $500 employer funding
- $0 employee paycheck deduction

PLUS
FREE

100% Employer Subsidization

924 — Ortho Group A:
Pain Injection Series
Total Cost = $1500
- $1,200 employer funding
- $0 employee paycheck deduction PLUS
$300 copay 80% Employer Subsidization

926 — Surgery Center A:
ACL Repair
Total Cost = $15,000
- $12,500 employer funding
- $2000 employee paycheck deduction PLUS
$500 copay 83% Employer Subsidization

928 — Hospital A:
ACL Repair
Total Cost = $18,000
- $12,000 employer funding
- $4000 employee paycheck deduction PLUS
$2000 copay 66% Employer Subsidization

---

820 (phone display)

●●○○○ Sprint LTE    10:45 AM

‹ Back    Upgrade Options

UPGRADE YOUR PLAN NOW!

Hospital A
Your Share:
$750 Now
Plus $250 Payroll Deduction Next 12 Months
★★★ QUALITY

902
Knee Replacement Surgery Upgrade
Hospital A
$750 now
$250 payroll deduction for 12 months

904
Hospital A
Your Share:
$750 Now
Plus $250 Payroll Deduction Next 12 Months
★★★ QUALITY

|  | Core | Core + Add-Ins |
|---|---|---|
| Preventive | Free | Free |
| Virtual Office Visit | Free | Free |
| Primary Care Visit | $45 | $20 |
| Specialty Visit | $95 | $45 |
| Urgent Care | $200 | $100 |
| Emergency Room | $500 | $500 |
| Hospital | $3000 | $3000 |
| Prescription Drugs (Gen./Brand Pref./Brand NP/Specialty) | $8/30/50/350 | $5/15/25/175 |

LIKELY UPCOMING CARE

Virtual Second Opinion
Covered Service                                $0

Knee Replacement Surgery          $1,000 - $20,000
Upgrade Available
View Upgrade Options

 INSIDER TIP!

Depending on the specialist you see next your odds of having surgery vary. Additionally, some surgeons have better results than others. We have studied surgeons and arranged for special pricing with those that guarantee successful results for you by adhering to medical evidence.

Provider Control Panel 2501

◉ Provider Group A's Current Performance

| 2502 | Total Episodic Cost 2511 | | | Provider 2531 | Util. Factor | Price Factor 2532 | Member Add-in Cost 2540 Copay + Paycheck |
|---|---|---|---|---|---|---|---|
| | Low 2520 | Market 2512 | High 2513 | Average Allowed | | | |
| Ankle Surgery | $11,781 | | $35,342 | $27,143 | 1.20 | 0.96 | $3,500 + $200 for 24 pay periods |
| Back Surgery | $34,513 | ◉ | $103,540 | $56,823 | 0.84 | 0.98 | $3,500 + $300 for 26 pay periods |
| Back, Radio Frequency Ablation | $1,250 | ◉ | $3,750 | $2,235 | 1.09 | 0.82 | $700 + N/A |
| Back, Spinal Injections For Pain | $174 | | $522 | $450 | 1.22 | 1.06 | $200 + N/A |
| Bariatric Surgery/Weight Loss Surgery | $14,240 | ◉ | $42,721 | $21,435 | 1.06 | 0.71 | $3,500 + $100 for 26 pay periods |
| Benign Prostatic Hyperplasia Surgery | $1,037 | | $3,110 | $2,576 | 1.14 | 1.09 | $600 + $50 for 4 pay periods |
| Breast Reduction | $293 | | $880 | $491 | 0.94 | 0.89 | $200 + N/A |
| Bunionectomy | $7,465 | ◉ | $22,396 | $9,317 | 0.80 | 0.78 | $2,600 + $50 for 4 pay periods |
| Carotid Endarterectomy | $4,724 | | $14,173 | $10,522 | 0.87 | 1.28 | $3,000 + $50 for 4 pay periods |
| Carpal Tunnel Procedure | $3,829 | | $8,423 | $6,540 | 1.05 | 0.96 | $2,200 + $50 for 3 pay periods |
| Colonoscopy (Except Colorectal Cancer Screening) | $1,376 | | $4,127 | $2,496 | 1.12 | 0.81 | $600 + $50 for 3 pay periods |
| Coronary Angioplasty with our without Stents | $16,135 | ◉ | $48,406 | $20,088 | 0.75 | 0.83 | $3,500 + $100 for 26 pay periods |
| Coronary Artery Bypass Surgery | $43,010 | ◉ | $129,031 | $51,303 | 0.71 | 0.84 | $3,500 + $300 for 26 pay periods |
| Endometrial Ablation | $3,476 | | $10,427 | $7,319 | 0.94 | 1.12 | $3,500 + $50 for 4 pay periods |
| Functional Nasal Procedure/Sinus Surgery/Septoplasty | $13,927 | ◉ | $41,782 | $14,640 | 0.73 | 0.72 | $2,000 + $50 for 4 pay periods |
| Gallbladder Removal (Cholecystectomy) | $8,765 | ◉ | $26,294 | $15,997 | 1.17 | 0.78 | $3,500 + $50 for 18 pay periods |
| Ganglion Cyst Surgery | $375 | | $1,125 | $725 | 0.84 | 1.15 | $3,500 + $50 for 26 pay periods |
| Hammertoe Surgery | $6,645 | | $19,934 | $9,688 | 0.81 | 0.90 | $300 + N/A |
| Hernia Repairs | $6,627 | ◉ | $19,880 | $12,977 | 0.96 | 1.02 | $2,800 + $50 for 3 pay periods |
| Hip Arthroscopy | $14,545 | ◉ | $43,635 | $30,021 | 0.86 | 1.20 | $3,500 + $50 for 8 pay periods |
| Hip Replacement | $18,610 | ◉ | $55,830 | $27,870 | 0.72 | 1.04 | $3,500 + $200 for 26 pay periods |
| Hip Resurfacing | $1,144 | | $3,432 | $2,907 | 1.05 | 1.21 | $3,500 + $200 for 25 pay periods |
| Hysterectomy (Except in Cases of Cancer) | $10,963 | ◉ | $32,888 | $27,856 | 1.21 | 0.94 | $3,500 + $50 for 9 pay periods |
| Knee Surgery (Arthroscopic) | $7,145 | | $21,434 | $13,029 | 0.94 | 0.97 | $3,500 + $50 for 9 pay periods |
| Knee Surgery (Open)/Knee Replacement | $19,319 | ◉ | $57,957 | $40,786 | 0.91 | 1.16 | $3,500 + $300 for 26 pay periods |
| Morton's Neuroma | $292 | | $876 | $898 | 1.25 | 1.23 | $300 + N/A |
| Myringotomy/Tympanostomy (Ear Tubes) | $716 | ◉ | $2,149 | $774 | 0.72 | 0.75 | $300 + N/A |
| Nissan Fundoplication (Reflux Surgery) | $11,997 | ◉ | $35,995 | $26,332 | 0.93 | 1.18 | $3,500 + $150 for 26 pay periods |
| Plantar Fasciitis Surgery | $3,425 | ◉ | $10,275 | $3,696 | 0.76 | 0.71 | $1,000 + $50 for 3 pay periods |
| Tonsillectomy/Adenoidectomy | $8,015 | | $24,044 | $17,262 | 1.21 | 0.89 | $3,500 + $50 for 26 pay periods |
| Tubal Ligation | $3,560 | | $10,679 | $7,176 | 0.90 | 1.12 | $2,000 + $50 for 4 pay periods |
| Upper Q Endoscopy | $4,730 | | $14,191 | $9,177 | 0.97 | 1.00 | $2,600 + $50 for 4 pay periods |
| Urinary Incontinence Treatment | $7,549 | | $22,647 | $12,649 | 1.18 | 0.71 | $3,500 + $50 for 6 pay periods |
| Varicose Vein Stripping | $525 | | $1,576 | $969 | 0.94 | 0.98 | $300 + N/A |
| Vasectomy | $395 | | $1,185 | $877 | 1.00 | 1.11 | $300 + N/A |

FIG. 26A

Provider Control Panel 2601

Modify Add-In Pricing

| | Episodic 2610 | Provider Change | New Allowed 2620 | Total 2630 | Member Responsibility 2640 Copay + Paycheck | Low | Total Member Cost 2650 Market | High |
|---|---|---|---|---|---|---|---|---|
| Ankle Surgery | 0% | Codes | $27,143 | $8,300 | $3,500 + $200 for 24 pay periods | $3,550 | | $10,000 |
| Back Surgery | 0% | Codes | $56,823 | $11,300 | $3,500 + $300 for 26 pay periods | $10,000 | | $11,300 |
| Back, Radio Frequency Ablation | 0% | Codes | $2,235 | $2,235 | $700 + N/A | $400 | | $1,150 |
| Back, Spinal Injections For Pain | 0% | Codes | $450 | $200 | $200 + N/A | $100 | | $200 |
| Bariatric Surgery/Weight Loss Surgery | 0% | Codes | $21,435 | $6,100 | $3500 + $100 for 26 pay periods | $4,300 | | $11,300 |
| Benign Prostatic Hyperplasia Surgery | 0% | Codes | $2,576 | $800 | $600 + $50 for 4 pay periods | $400 | | $950 |
| Breast Reduction | 0% | Codes | $491 | $200 | $200 + N/A | $100 | | $300 |
| Bunionectomy | 0% | Codes | $9,317 | $2,800 | $2,600 + $50 for 4 pay periods | $2,250 | | $6,100 |
| Carotid Endarterectomy | 0% | Codes | $10,522 | $3,200 | $3,000 + $50 for 4 pay periods | $1,450 | | $4,300 |
| Carpal Tunnel Procedure | 0% | Codes | $6,540 | $2,000 | $1,800 + $50 for 4 pay periods | $1,150 | | $2,550 |
| Colonoscopy (Except Colorecteral Cancer Screening) | 0% | Codes | $2,496 | $750 | $600+ $50 for 3 pay periods | $500 | | $1,250 |
| Coronary Angioplasty with our without Stents | 0% | Codes | $20,088 | $6,100 | $3,500 + $100 for 26 pay periods | $4,800 | | $11,300 |
| Coronary Artery Bypass Surgery | 0% | Codes | $51,303 | $11,300 | $3,500 + $300 for 26 pay periods | $11,300 | | $11,300 |
| Endometrial Ablation | 0% | Codes | $7,319 | $2,200 | $2,000 + $50 for 4 pay periods | $1,050 | | $3,150 |
| Functional Nasal Procedure/Sinus Surgery/Septoplasty | 0% | Codes | $14,640 | $4,400 | $3,500 + $50 for 18 pay periods | $4,200 | | $11,300 |
| Gallbladder Removal (Cholecystectomy) | 0% | Codes | $15,997 | $4,800 | $3,500 + $50 for 26 pay periods | $2,650 | | $7,400 |
| Ganglion Cyst Surgery | 0% | Codes | $725 | $300 | $300 + N/A | $200 | | $400 |
| Hammertoe Surgery | 0% | Codes | $9,688 | $2,950 | $2,800 + $50 for 3 pay periods | $2,000 | | $6,000 |
| Hernia Repairs | 0% | Codes | $12,977 | $3,900 | $3,500 + $50 for 8 pay periods | $2,000 | | $6,000 |
| Hip Arthroscopy | 0% | Codes | $30,021 | $8,700 | $3,500 + $200 for 26 pay periods | $4,400 | | $11,300 |
| Hip Replacement | 0% | Codes | $27,870 | $8,500 | $3,500 + $200 for 25 pay periods | $5,600 | | $11,300 |
| Hip Resurfacing | 0% | Codes | $2,907 | $900 | $700 + $50 for 4 pay periods | $400 | | $1,050 |
| Hysterectomy (Except in Cases of Cancer) | 0% | Codes | $27,856 | $8,500 | $3,500 + $200 for 25 pay periods | $8,500 | | $10,000 |
| Knee Surgery (Arthroscopic) | 0% | Codes | $13,029 | $3,950 | $3,500 + $50 for 9 pay periods | $2,150 | | $6,100 |
| Knee Surgery (Open)/Knee Replacement | 0% | Codes | $40,786 | $11,300 | $3,500 + 300 for 26 pay periods | $5,800 | | $11,300 |
| Morton's Neuroma | 0% | Codes | $898 | $300 | $300 + N/A | $100 | | $300 |
| Myringotomy/Tympanostomy (Ear Tubes) | 0% | Codes | $774 | $300 | $300 + N/A | $300 | | $700 |
| Nissan Fundoplication (Reflux Surgery) | 0% | Codes | $26,332 | $7,400 | $3,500 + $150 for 26 pay periods | $3,600 | | $11,000 |
| Plantar Fasciitis Surgery | 0% | Codes | $3,696 | $1,150 | $1,000 + $50 for 3 pay periods | $1,050 | | $3,100 |
| Tonsillectomy/Adenoidectomy | 0% | Codes | $17,262 | $4,800 | $3,500 + $50 for 26 pay periods | $2,450 | | $7,250 |
| Tubal Ligation | 0% | Codes | $7,176 | $2,200 | $2,000 + $50 for 4 pay periods | $1,100 | | $3,250 |
| Upper-Q Endoscopy | 0% | Codes | $9,177 | $2,800 | $2,600 + $50 for 4 pay periods | $1,450 | | $4,300 |
| Urinary Incontinence Treatment | 0% | Codes | $12,649 | $3,800 | $3,500 + $50 for 6 pay periods | $2,300 | | $6,800 |
| Varicose Vein Stripping | 0% | Codes | $968 | $300 | $300 + N/A | $200 | | $500 |
| Vasectomy | 0% | Codes | $877 | $300 | $300 + N/A | $200 | | $400 |

| Carpal Tunnel Release | 2701 |
|---|---|
| Anchor Procedures | |

| Anchor Codes | |
|---|---|
| Proc Code | Description |
| 64721 | Neuroplasty &/transpos Median Nrvcarpal Tunne |
| 29848 | Ndsc Wrst Surgwrls Transvrs Carpl Ligm |
| Total Anchor Cost | |

| Anesthesiology | |
|---|---|
| Proc Code | Description |
| 01810 | Anes Nerve Muscle Tdnfascia&bursaforearm Wrist |
| 370 | Anesthesia General |
| 01830 | Anes Arths/endscpystl Radiusulna/wrist/hand |
| All Other | |
| Total Anesthesiology Cost | |

| Facility | |
|---|---|
| Rev Code | Description |
| 360 | Or Services, General |
| 490 | Ambulat Orysurgery, General |
| 250 | Pharmacy, General |
| 710 | Recoveryroom, General |
| 370 | Anesthesia General |
| 272 | Med/surg Supply/device Sterile |
| 636 | Pharmacy, Detail Coding Drugs |
| 270 | Med/surg Supply/device General |
| 258 | Pharmacy, Iv Solutions |
| 271 | Med/surg Supply/device, Nonsterile |
| 300 | Lab, General |
| 301 | Lab, Chemistry |
| 278 | Med/surg Supply/device, Otherimplants |
| 259 | Pharmacy, Other |
| All Other | |
| Total Facility Cost | |

| Other Procedure Codes | |
|---|---|
| Proc Code | Description |
| 64718 | Neuroplasty&/transposition Ulnar Nerve Elbow |
| 26055 | Tendon Sheath Incision |
| 29848 | Nsdc Wrst Surgwrls Transvrs Carp Ligm |
| 64415 | Single Nerve Block Injection Arm Nerve |
| 88304 | Level Iii Surg Pathology Grossµsccopic Exam |
| 64721 | Neuroplasty &/transpos Medi An Nrvcarpal Tunne |
| 25447 | Arthrpinterpositercarpal/met Acarpal Joints |
| 25115 | Rad Exc Bursa Synva Wrst/f/arm Tdn Sht Hs Flxrs |
| 25609 | Optx Dstl Radl I-artic Fx/epi Physl Sep 3 Frag |
| 25000 | Incision Extension Tendon Sheath Wrist |
| 64417 | Injection Anesthetic Agent Axillary Nerve |
| 88305 | Level Iv Surg Pathology Gross µscopic Exam |
| 25111 | Excision Ganglion Wrist Dorsal/volar Primary |
| 20526 | I Njection Therapeutic Carpal Tunnel |
| 64450 | Injection Anes Other Peripheral Nerve/branch |
| 20605 | Arthrocentesis Aspir &/inj Interm Jt/bus W/ous |
| All Other | |
| Total Other Procedure Cost | |

| Total Anchor Cost | |
|---|---|

| Standard | Provider Group A Current | | | Change To Current | | |
|---|---|---|---|---|---|---|
| Frequency | Frequency | Allowed Amount | Expected Cost | Change | Allowed Amount | Expected Cost |
| 0.77 | 0.65 | 790.02 | 513.51 | 0% | 790.02 | 513.51 |
| 0.23 | 0.35 | 948.28 | 331.90 | 0% | 948.28 | 331.90 |
| | | | 845.41 | | | 845.41 |

| Standard | Provider Group A Current | | | Change To Current | | |
|---|---|---|---|---|---|---|
| Frequency | Frequency | Allowed Amount | Expected Cost | Change | Allowed Amount | Expected Cost |
| 1.21 | 1.27 | 990.00 | 1,256.82 | 0% | 990.00 | 1,256.82 |
| 0.23 | 0.24 | 932.81 | 222.48 | 0% | 932.81 | 222.48 |
| 0.05 | 0.06 | 990.00 | 55.91 | 0% | 990.00 | 55.91 |
| | | | 43.89 | | | 43.89 |
| | | | 1,579.11 | | | 1,579.11 |

| Standard | Provider Group A Current | | | Change To Current | | |
|---|---|---|---|---|---|---|
| Frequency | Frequency | Allowed Amount | Expected Cost | Change | Allowed Amount | Expected Cost |
| 0.42 | 0.44 | 3,406.93 | 1,502.46 | 0% | 3,406.93 | 1,502.46 |
| 0.36 | 0.38 | 1,382.94 | 522.75 | 0% | 1,382.94 | 522.75 |
| 0.22 | 0.24 | 34.16 | 8.04 | 0% | 34.16 | 8.04 |
| 0.20 | 0.21 | 933.86 | 198.06 | 0% | 933.86 | 198.06 |
| 0.20 | 0.21 | 932.81 | 192.53 | 0% | 932.81 | 192.53 |
| 0.17 | 0.18 | 129.74 | 23.25 | 0% | 129.74 | 23.25 |
| 0.16 | 0.17 | 36.85 | 6.18 | 0% | 36.85 | 6.18 |
| 0.10 | 0.10 | 67.70 | 6.80 | 0% | 67.70 | 6.80 |
| 0.08 | 0.09 | 68.31 | 5.87 | 0% | 68.31 | 5.87 |
| 0.03 | 0.03 | 58.41 | 1.79 | 0% | 58.41 | 1.79 |
| 0.02 | 0.03 | 43.33 | 1.14 | 0% | 43.33 | 1.14 |
| 0.02 | 0.03 | 70.81 | 1.79 | 0% | 70.81 | 1.79 |
| 0.02 | 0.02 | 911.07 | 19.87 | 0% | 911.07 | 19.87 |
| 0.02 | 0.02 | 14.04 | 0.26 | 0% | 14.04 | 0.26 |
| | | | 342.32 | | | 342.32 |
| | | | 2,833.12 | | | 2,833.12 |

| Standard | Provider Group A Current | | | Change To Current | | |
|---|---|---|---|---|---|---|
| Frequency | Frequency | Allowed Amount | Expected Cost | Change | Allowed Amount | Expected Cost |
| 0.19 | 0.20 | 1,096.85 | 218.82 | 0% | 1,096.85 | 218.82 |
| 0.12 | 0.13 | 572.33 | 72.11 | 0% | 572.33 | 72.11 |
| 0.05 | 0.05 | 948.28 | 48.26 | 0% | 948.28 | 48.26 |
| 0.03 | 0.03 | 120.15 | 3.61 | 0% | 120.15 | 3.61 |
| 0.02 | 0.03 | 74.93 | 1.97 | 0% | 74.93 | 1.97 |
| 0.17 | 0.18 | 90.02 | 139.58 | 0% | 790.02 | 139.58 |
| 0.06 | 0.06 | 1,535.46 | 96.73 | 0% | 1,535.46 | 96.73 |
| 0.02 | 0.02 | 1,406.27 | 23.56 | 0% | 1,406.27 | 23.56 |
| 0.13 | 0.14 | 1,943.07 | 265.23 | 0% | 1,943.07 | 265.23 |
| 0.01 | 0.01 | 620.77 | 9.22 | 0% | 620.77 | 9.22 |
| 0.01 | 0.01 | 129.84 | 1.81 | 0% | 129.84 | 1.81 |
| 0.01 | 0.01 | 125.32 | 1.66 | 0% | 125.32 | 1.66 |
| 0.01 | 0.01 | 591.70 | 7.67 | 0% | 591.70 | 7.67 |
| 0.01 | 0.01 | 107.23 | 1.29 | 0% | 107.23 | 1.29 |
| 0.01 | 0.01 | 83.98 | 0.98 | 0% | 83.98 | 0.98 |
| 0.01 | 0.01 | 69.12 | 0.72 | 0% | 69.12 | 0.72 |
| | | | 167.87 | | | 167.87 |
| | | | 1,061.09 | | | 1,061.09 |
| | | | 6,318.73 | | | 6,318.73 |

Pre-Anchor: All Procedures and Revenue Codes With Frequency > 1%

| Proc Code | Description | Standard Frequency | Provider Group A Current | | | Change to Current | | |
|---|---|---|---|---|---|---|---|---|
| | | | Frequency | Allowed Amount | Expected Cost | Change | Allowed Amount | Expected Cost |
| 99213 | Office outpatient visit 15 minutes | 0.15 | 0.16 | 93.02 | 14.61 | 0% | 93.02 | 14.61 |
| 97110 | Therapeutic px 1/> areas each 15 min exercises | 0.14 | 0.14 | 59.43 | 8.57 | 0% | 59.43 | 8.57 |
| 99214 | Office outpatient visit 25 minutes | 0.13 | 0.14 | 143.40 | 19.49 | 0% | 143.40 | 19.49 |
| 97140 | Manual therapy tqs 1/> regions each 15 minutes | 0.09 | 0.10 | 54.91 | 5.29 | 0% | 54.91 | 5.29 |
| 99203 | Office outpatient new 30 minutes | 0.06 | 0.06 | 140.17 | 8.99 | 0% | 140.17 | 8.99 |
| 97014 | Appl modality 1/> areas elec stim unattended | 0.06 | 0.06 | 29.07 | 1.73 | 0% | 29.07 | 1.73 |
| 97012 | Appl modality 1/> areas traction mechanical | 0.04 | 0.04 | 29.71 | 1.30 | 0% | 29.71 | 1.30 |
| 99243 | Office consultation new/estab patient 40 min | 0.04 | 0.04 | 174.41 | 6.39 | 0% | 174.41 | 6.39 |
| 97035 | Appl modality 1/> areas ultrasound ea 15 min | 0.03 | 0.04 | 23.25 | 0.85 | 0% | 23.25 | 0.85 |
| 97032 | Appl modality 1/> areas elec stim ea 15 min | 0.03 | 0.03 | 34.88 | 0.89 | 0% | 34.88 | 0.89 |
| 99212 | Office outpatient visit 10 minutes | 0.02 | 0.02 | 46.51 | 1.12 | 0% | 46.51 | 1.12 |
| 99204 | Office outpatient new 45 minutes | 0.02 | 0.02 | 237.07 | 5.10 | 0% | 237.07 | 5.10 |
| 97010 | Application modality 1/>areas hot/cold packs | 0.02 | 0.02 | 10.98 | 0.24 | 0% | 10.98 | 0.24 |
| 99215 | Office outpatient visit 40 minutes | 0.02 | 0.02 | 202.83 | 4.17 | 0% | 202.83 | 4.17 |
| 99244 | Office consultation new/estab patient 60 min | 0.02 | 0.02 | 280.35 | 5.49 | 0% | 280.35 | 5.49 |
| 97530 | Therapeut activity direct pt contact act each 15 min | 0.02 | 0.02 | 63.95 | 1.23 | 0% | 63.95 | 1.23 |
| All Other | | | | | 27.33 | | | 27.33 |
| Total Pre-Anchor Cost | | | | | 112.79 | | | 112.79 |

Post-anchor: procedures and revenue codes with frequency > 1%

| Proc Code | Description | Standard Frequency | Provider Group A Current | | | Change to Current | | |
|---|---|---|---|---|---|---|---|---|
| | | | Frequency | Allowed Amount | Expected Cost | Change | Allowed Amount | Expected Cost |
| 97110 | Therapeutic px 1/> areas each 15 min exercises | 0.43 | 0.45 | 59.43 | 26.52 | 0% | 59.43 | 26.52 |
| 97140 | Manual therapy tqs 1/> regions each 15 minutes | 0.28 | 0.29 | 54.91 | 16.00 | 0% | 54.91 | 16.00 |
| 97035 | Appl modality 1/> areas ultrasound ea 15 min | 0.12 | 0.13 | 23.25 | 2.95 | 0% | 23.25 | 2.95 |
| 99213 | Office outpatient visit 15 minutes | 0.08 | 0.08 | 93.02 | 7.85 | 0% | 93.02 | 7.85 |
| 97014 | Appl modality 1/> areas elec stim unattended | 0.08 | 0.08 | 29.07 | 2.41 | 0% | 29.07 | 2.41 |
| 97530 | Therapeut activity direct pt cont act each 15 min | 0.07 | 0.07 | 63.95 | 4.57 | 0% | 63.95 | 4.57 |
| 97022 | Application modality 1/> areas whirlpool | 0.06 | 0.07 | 43.28 | 2.85 | 0% | 43.28 | 2.85 |
| 97012 | Appl modality 1/> areas traction mechanical | 0.06 | 0.06 | 29.71 | 1.93 | 0% | 29.71 | 1.93 |
| 97112 | Ther px 1/> areas each 15 min neuromusc reeduca | 0.05 | 0.06 | 62.01 | 3.45 | 0% | 62.01 | 3.45 |
| 99214 | Office outpatient visit 25 minutes | 0.04 | 0.04 | 143.40 | 5.35 | 0% | 143.40 | 5.35 |
| 97032 | Appl modality 1/> areas elec stim ea 15 min | 0.03 | 0.04 | 34.88 | 1.22 | 0% | 34.88 | 1.22 |
| 97003 | Occupational therapy evaluation | 0.03 | 0.03 | - | - | 0% | - | - |
| 97001 | Physical therapy evaluation | 0.02 | 0.02 | - | - | 0% | - | - |
| 97010 | Application modality 1/> areas hot/cold packs | 0.02 | 0.02 | 10.98 | 0.27 | 0% | 10.98 | 0.27 |
| 97124 | Ther px 1/> areas each 15 minutes massage | 0.02 | 0.02 | 47.80 | 0.80 | 0% | 47.80 | 0.80 |
| All Other | | | | | 32.14 | | | 32.14 |
| Total Post-Anchor Cost | | | | 2740 | 108.30 | | | 108.30 |

| Total- | 6,539.82 |
|---|---|
| Utilization Factor | 1.05 |
| Fee Factor | 0.96 |

FIG. 32

Treatment Pathway Analytic Engine

2112 unique Treatment Pathways generated

| pathway |
|---|
| meniscus_tear ‖ MRI_lower_extremity ‖ NFT |
| meniscus_tear ‖ MRI_lower_extremity ‖ knee_arthroscopy |
| meniscus_tear ‖ NFT |
| meniscus_tear ‖ MRI_lower_extremity ‖ physical_therapy ‖ NFT |
| meniscus_tear ‖ knee_arthropscopy |
| meniscus_tear ‖ physical_therapy ‖ NFT |
| meniscus_tear ‖ MRI_lower_extremity ‖ corticosteroid_medication knee_arthroscopy |
| meniscus_tear ‖ MRI_lower_extremity ‖ arthrocentesis_major_joint corticosteroid |
| meniscus_tear ‖ MRI_lower_extremity ‖ physical_therapy knee_arthroscopy |

26 high frequency Treatment Pathways account for >60% of members

---

Trigger Code Set 122 codes creates the Meniscus Tear Trigger Code Set

| code | Code ty | Code Description | condition |
|---|---|---|---|
| S83201S | ICD10 | Bucket-hndl tear of unsp mense, cmt injr, Meniscus tear | |
| S83204D | ICD10 | Oth tear of unspmeniscus, current injury, Meniscus tear | |
| S83207A | ICD10 | Unsp tear of unsp meniscus, current injury, Meniscus tear | |
| S83211S | ICD10 | Bucket-hndl tear of medial mensc, cmt inja Meniscus tear | |
| S83221D | ICD10 | Prph tear of medical meniscus, current inju Meniscus tear | |
| S83231A | ICD10 | Complx tear of medial meniscus, current injury Meniscus tear | |
| S83239S | ICD10 | Complx tear of medial mense, cmt injry, ur Meniscus tear | |
| S83201S | ICD10 | Bucket-hndl tear of unsp mense, current ir Meniscus tear | |
| S83203S | ICD10 | Unsp tear of unsp meniscus, current injury, Meniscus tear | |
| S83206D | ICD10 | Bucket-hndl tear of medial mensc, cmt injr, Meniscus tear | |
| S83211A | ICD10 | Bucket-hndl tear of medial mensc, cmt injr, Meniscus tear | |
| S83229D | ICD10 | Bucket-hndl tear of medial mensc, cmt injr, Meniscus tear | |

Relevant Procedure Code Set 322 codes categorized into 33 treatment concepts create the Relevant Procedure Code Set

| code | Code ty | Code Description | condition |
|---|---|---|---|
| 20550 | CPT | Injection(s); single tendon sheath, or ligament, a tendon_injection | |
| 20551 | CPT | Injection(s); single tendon origin/insertion tendon_injection | |
| 20552 | CPT | Injection(s); single or multiple trigger point(s), 1 tendom_injection | |
| 20553 | CPT | Injection(s); single or multiple trigger point(s), 3 tendon_injection | |
| 20610 | CPT | Arthrocentesis, aspiration and/or injection, maj arthrocentesis_major_joint | |
| 20611 | CPT | Arthrocentesis, aspiration and/or injection, maj arthrocentesis_major_joint | |
| 20902 | CPT | Bone graft, any donor area, major or large bone_graft major_joint | |
| 27125 | CPT | Hemiarthroplasty, hip, partial (eg, femoral stem, Hip replacement, total and partial | |
| 27130 | CPT | Arthroplasty, acetabular and proximal femoral, Hip replacement, total and partial | |
| 27132 | CPT | Conversion of previous hip surgery to total hip, Hip replacement, total and partial | |
| 27134 | CPT | Revision of total hip arthroplasty; both common Hip replacement, total and partial | |
| 27137 | CPT | Revision of total hip arthroplasty; acetabular co Hip replacement, total and partial | |
| 27138 | CPT | Revision of total hip arthroplasty; femoral comp Hip replacement, total and partial | |
| 27310 | CPT | Arthrotomy knee with canivation drainage and knee arthrotomy | |

Examples of High and Low vAlue Treatment Paths for Back Pain Episodes Used

| | Example Back Pain Episodes | | |
|---|---|---|---|
| | Enroll | Final Diagnosis | |
| Started & Ended with Conservative Treatments<br>Episode Cost: $1,380 | Member 1 | Non Specific Back Pain and Degenerative Disc Disease | Acupuncture<br>Back Brace<br>ER Visit<br>Intradiscal Electrothermal Therapy<br>Lumbar Spine CT<br>Lumbar Spine Decompression Add in<br>Lumbar Spine Fusion Add in<br>Lumbar Spine MRI<br>Lumbar Spine XRay<br>Office Or Outpatient Visit<br>Physical Therapy<br>Preventive Visit<br>Radiofrequency Denervation<br>Spinal Manipulation |
| Progress Through Course of Conservative Treatments<br>Episode Cost: $5,419 | Member 2 | Spinal Stenosis and Radiculopathy | Acupuncture<br>Back Brace<br>ER Visit<br>Intradiscal Electrothermal Therapy<br>Lumbar Spine CT<br>Lumbar Spine Decompression Add in<br>Lumbar Spine Fusion Add in<br>Lumbar Spine MRI<br>Lumbar Spine XRay<br>Office Or Outpatient Visit<br>Physical Therapy<br>Preventive Visit<br>Radiofrequency Denervation<br>Spinal Manipulation |
| No Conservative Treatment Attempted<br>Episode Cost: $120,193 | Member 3 | Spinal Stenosis and Radiculopathy | Acupuncture<br>Back Brace<br>ER Visit<br>Intradiscal Electrothermal Therapy<br>Lumbar Spine CT<br>Lumbar Spine Decompression Add in<br>Lumbar Spine Fusion Add in<br>Lumbar Spine MRI<br>Lumbar Spine XRay<br>Office Or Outpatient Visit<br>Physical Therapy<br>Preventive Visit<br>Radiofrequency Denervation<br>Spinal Manipulation |
| No Conservative Treatment Attempted After ER Visit for Back<br>Episode Cost: $503,075 | Member 4 | Spinal Stenosis and Radiculopathy | Acupuncture<br>Back Brace<br>ER Visit<br>Intradiscal Electrothermal Therapy<br>Lumbar Spine CT<br>Lumbar Spine Decompression Add in<br>Lumbar Spine Fusion Add in<br>Lumbar Spine MRI<br>Lumbar Spine XRay<br>Office Or Outpatient Visit<br>Physical Therapy<br>Preventive Visit<br>Radiofrequency Denervation<br>Spinal Manipulation |

Final Diagnosis
(Multiple values) ▼

Allowed Amount
$0 ⬅➡ $815,128

Enrolid
(Multiple values) ▼

Measure Names

☒ Acupuncture
☒ Back Brace
☒ ER Visit
☒ Intradiscal
☒ Electrothermal
☒ herapy
☒ Lumbar Spine CT
☒ Lumbar Spine Decompression Add in
☒ Lumbar Spine Fusion Add in
☒ Lumbar Spine MRI
☒ Lumbar Spine XRay
☒ Office Or Outpatient Visit
☒ Physical Therapy Preventive Visit
☒ Radiofrequency Denervation
☒ Spinal Manipulation

FIG. 34B

3901 — Add-In Details

Add-In Coverage Details Knee Arthroscopy

Twin Cities Orthopedics at Minnesota Orthopaedic Surgery Center Ambulatory Surgery Center 18 physicians designated for higher quality ▶

Distance: 15.2 miles
8290 University Ave NE #200, Fridley, MN 55432
763-786-0461

Package Copay: $0
Payroll Deduction: $800
($50 for 16 pay periods)
Total Cost: $800

3910 — Practitioners by Last Name

Add-In Coverage Details Knee Arthroscopy

- Charles Carodenuto, MD — Premium Care Physician
- Julie Farias, MD — Premium Care Physician
- Hilary Hammell, DO — Premium Care Physician
- Douglas Lowins, MD — Premium Care Physician
- Amanda Mayer, MD — Quality Care Physician
- Tina McLane, NP-F — Does Not Meet Premium Quality Criteria

3920 — Add-In Details

Knee Arthroscopy service

| Service covered by: | Core coverage* | This Add-In |
|---|---|---|
| Preoperative Visit | ● | |
| Anesthesia | | ● |
| Knee Arthroscopy Service | | ● |
| Treatment-date Facility Fees | | ● |
| Postoperative Visit | ● | |

*Copays apply

How it works
Your Add-In coverage becomes active three business days after the purchase, and remains

FIG. 39

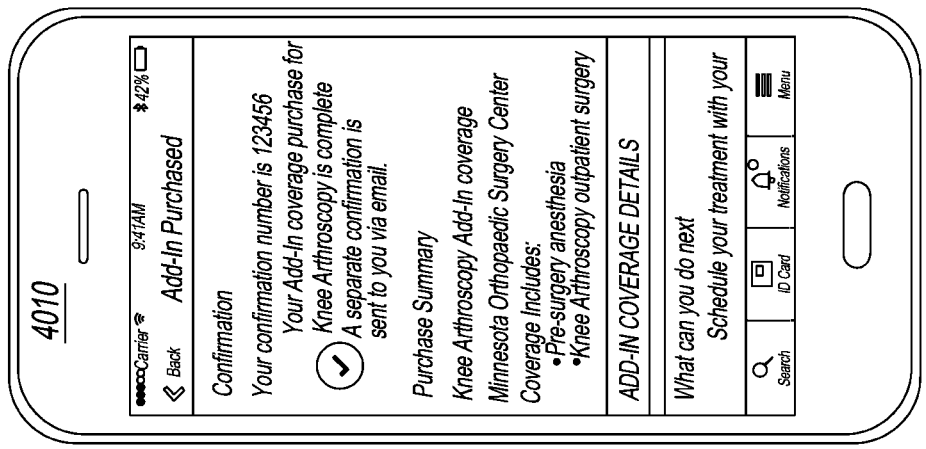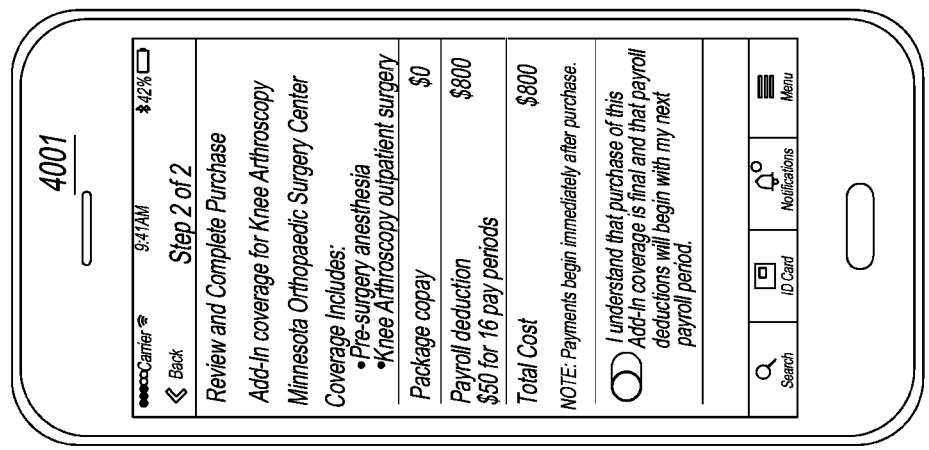
FIG. 40

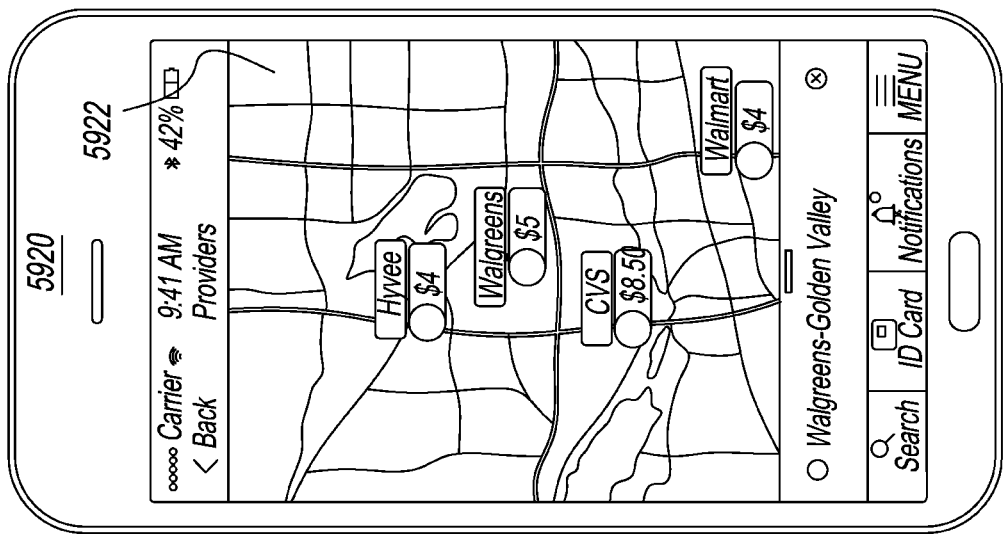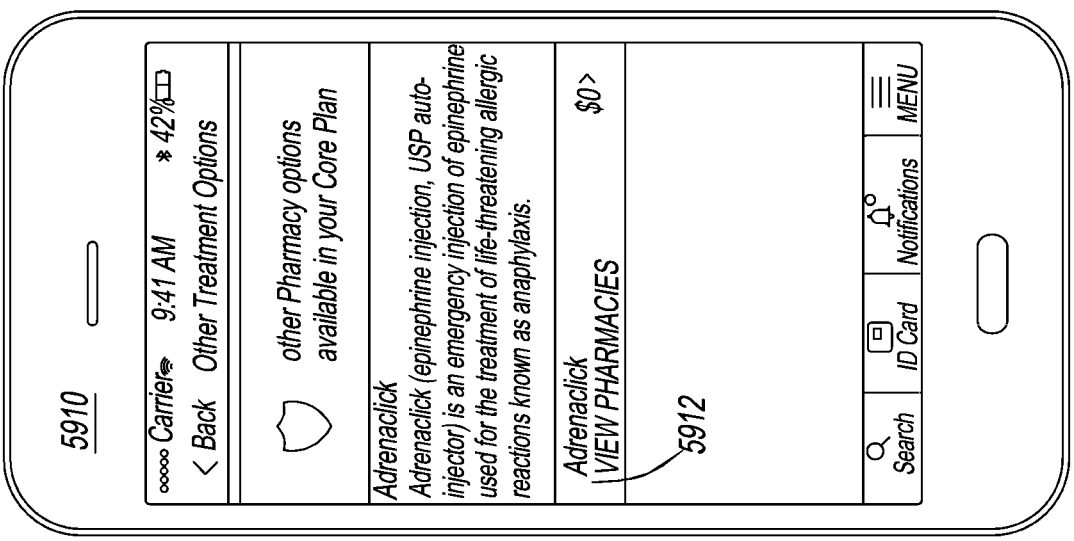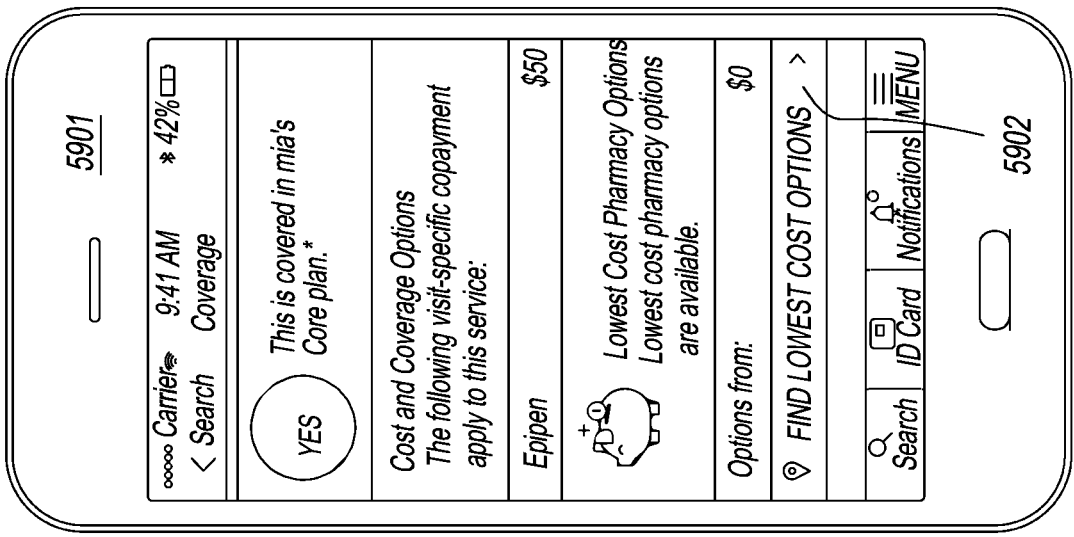
FIG. 59

Browser View _6101_

Browse Conditions    ○ Caption Original ✕

While everyone is unique, we've modeled some typical conditions and treatments to help you compare costs against your plan options.

| ALL | A-E | F-K | L-P | S-Z | ◁ |
|---|---|---|---|---|---|
| Anxiety | | | | ADD | › |
| Asthma | | | | ADD | › |
| Back pain | | | | ADD | › |
| Carpal Tunnel Syndrome | | | | ADD | › |
| Cold and Upper Respiratory Infections | | | | ADD | › |
| Colon Cancer | | | | ADD | › |
| Depression | | | | ADD | › |

Diabetes- Ongoing management
Management of diabetes including four primary care visits, one specialist visit, and recommended laboratory tests.
○ Copay (Core Coverage) ▣    $220
Costs may vary based on the provider. See all providers

---

_6110_

Do you have specific needs or conditions?
See how treating your specific needs or conditions compares to your other plan options ADD CONDITION    In Minneapolis, MN ○

Cost Summary

| Single Coverage | Bind | Traditional Plan › |
|---|---|---|
| Annual Premium | $642 | $1,021 |
| Diabetes- Ongoing Management<br>○ Copay (Core Coverage) ▣ | $220 | $950 |
| Remove | | |
| Add another condition | | |
| Annual Estimated Total | $863 | $1,971 |

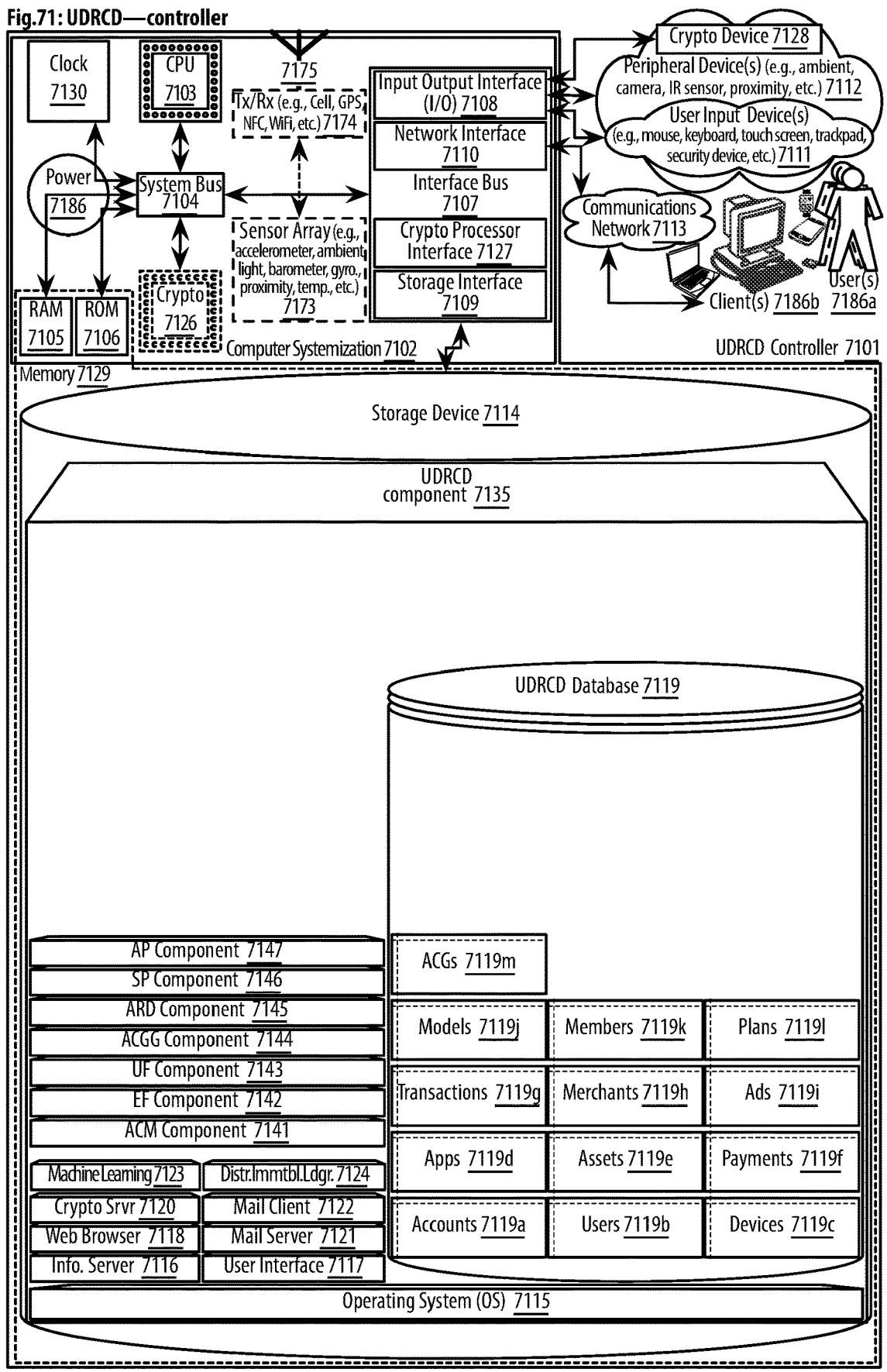
Fig.71: UDRCD—controller us 11,790,454 B1

USE DETERMINATION RISK COVERAGE DATASTRUCTURE FOR ON-DEMAND AND INCREASED EFFICIENCY COVERAGE DETECTION AND REBALANCING APPARATUSES, METHODS AND SYSTEMS

PRIORITY CLAIM

Applicant hereby claims benefit to priority under 35 USC § 119 as a non-provisional conversion of: U.S. provisional patent application Ser. No. 62/748,518, filed Oct. 21, 2018, entitled "Use Determination Risk Coverage Datastructure for On-Demand and Increased Efficiency Coverage Detection and Rebalancing Apparatuses, Methods and Systems". Applicant hereby also claims benefit to priority under 35 USC § 119 as a non-provisional patent application Ser. No. 62/807,711, filed Feb. 19, 2019, entitled "Use Determination Risk Coverage Datastructure for On-Demand and Increased Efficiency Coverage Detection and Rebalancing Apparatuses, Methods and Systems".

Applicant hereby claims benefit to priority under 35 USC § 120 as a continuation-in-part of: U.S. patent application Ser. No. 15/632,052, filed Jun. 23, 2017, entitled "Use Determination Risk Coverage Datastructure for On-Demand and Increased Efficiency Coverage Detection and Rebalancing Apparatuses, Methods and Systems"; and which in turn:
  claims benefit to priority under 35 USC § 119 as a non-provisional conversion of: U.S. provisional patent application Ser. No. 62/446,810, filed Jan. 16, 2017, entitled "Use Determination Risk Coverage Datastructure for On-Demand and Increased Efficiency Coverage Detection and Rebalancing Apparatuses, Methods and Systems"; U.S. provisional patent application Ser. No. 62/510,215, filed May 23, 2017, entitled "Use Determination Risk Coverage Datastructure for On-Demand and Increased Efficiency Coverage Detection and Rebalancing Apparatuses, Methods and Systems"; and U.S. provisional patent application Ser. No. 62/524,188, filed Jun. 23, 2017, entitled "Use Determination Risk Coverage Datastructure for On-Demand and Increased Efficiency Coverage Detection and Rebalancing Apparatuses, Methods and Systems".
  claims benefit to priority under 35 USC § 120 as a continuation of: U.S. patent application Ser. No. 15/631,961, filed Jun. 23, 2017, "Use Determination Risk Coverage Datastructure for On-Demand and Increased Efficiency Coverage Detection and Rebalancing Apparatuses, Methods and Systems," and which in turn: claims benefit to priority under 35 USC § 119 as a non-provisional conversion of: U.S. provisional patent application Ser. No. 62/446,810, filed Jan. 16, 2017, entitled "Use Determination Risk Coverage Datastructure for On-Demand and Increased Efficiency Coverage Detection and Rebalancing Apparatuses, Methods and Systems"; U.S. provisional patent application Ser. No. 62/510,215, filed May 23, 2017, entitled "Use Determination Risk Coverage Datastructure for On-Demand and Increased Efficiency Coverage Detection and Rebalancing Apparatuses, Methods and Systems,"; and U.S. provisional patent application Ser. No. 62/524,188, filed Jun. 23, 2017, entitled "Use Determination Risk Coverage Datastructure for On-Demand and Increased Efficiency Coverage Detection and Rebalancing Apparatuses, Methods and Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information technology analytics and processing for risk coverage, and more particularly, include Use Determination Risk Coverage Datastructure for On-Demand and Increased Efficiency Coverage Detection and Rebalancing Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Insurance companies offer products such as home and life insurance to cover risks against property and injury. Actuaries at the insurance companies analyze various risks in setting the costs of such products. Computer software such as Milliman's Arius and Triangles on Demand products are used by insurance actuaries to assess various risks.

BRIEF DESCRIPTION OF THE DRAWINGS

Appendices and/or drawings illustrating various, non-limiting, example, innovative aspects of the Use Determination Risk Coverage Datastructure for On-Demand and Increased Efficiency Coverage Detection and Rebalancing Apparatuses, Methods and Systems (hereinafter "UDRCD") disclosure, include:
FIG. 8 shows a screenshot diagram illustrating embodiments of the UDRCD;
FIG. 9 shows a screenshot diagram illustrating embodiments of the UDRCD;
FIG. 10 shows a screenshot diagram illustrating embodiments of the UDRCD.

FIG. 18 shows a screenshot diagram illustrating embodiments of the UDRCD;

FIG. 21 shows a screenshot diagram illustrating embodiments of the UDRCD;

FIG. 23 shows a screenshot diagram illustrating embodiments of the UDRCD;

FIG. 25 shows a screenshot diagram illustrating embodiments of the UDRCD;

FIG. 26A-C (hereinafter "FIG. 26") each show a screenshot diagram illustrating embodiments of the UDRCD;

FIGS. 27, 27A-27B (hereinafter "FIG. 27") each show a screenshot diagram illustrating embodiments of the UDRCD;

FIG. 32 shows a screenshot diagram illustrating embodiments of the UDRCD;

FIGS. 34A-C (hereinafter "FIG. 34") each show a screenshot diagram illustrating embodiments of the UDRCD;

FIG. 39 shows a screenshot diagram illustrating embodiments of the UDRCD;

FIG. 40 shows a screenshot diagram illustrating embodiments of the UDRCD;

FIG. 50 shows a screenshot diagram illustrating embodiments of the UDRCD;

FIG. 51 shows a screenshot diagram illustrating embodiments of the UDRCD;

FIG. 52 shows a screenshot diagram illustrating embodiments of the UDRCD;

FIG. 55 shows a screenshot diagram illustrating embodiments of the UDRCD;

FIG. 59 shows a screenshot diagram illustrating embodiments of the UDRCD;

FIG. 61 shows a screenshot diagram illustrating embodiments of the UDRCD;

FIG. 68 shows a screenshot diagram illustrating embodiments of the UDRCD;

FIG. 69 shows a screenshot diagram illustrating embodiments of the UDRCD;

FIG. 70 shows a screenshot diagram illustrating embodiments of the UDRCD;

FIG. 71 shows a block diagram illustrating embodiments of a UDRCD controller.

Figure 1:
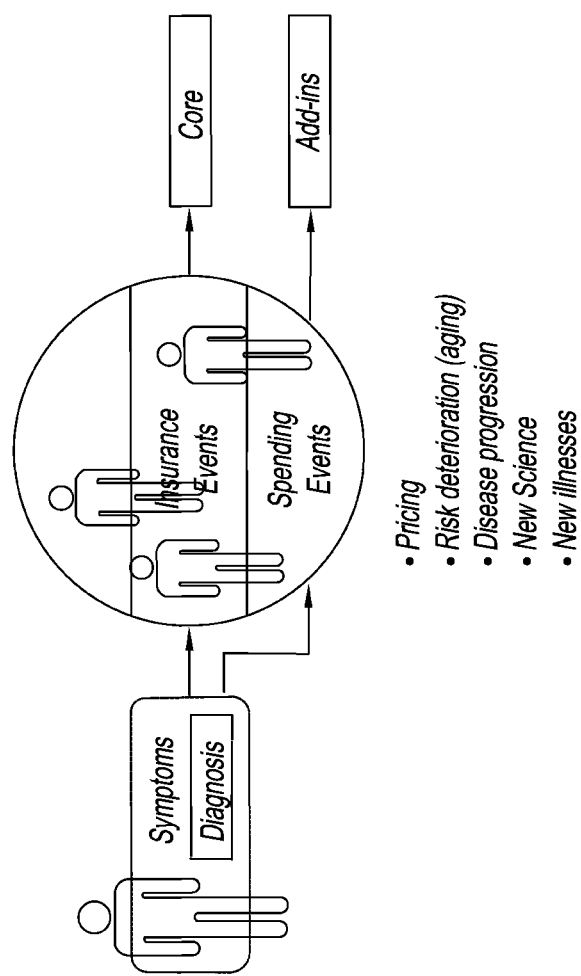
FIG. 1 shows an exemplary model for the UDRCD.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Use Determination Risk Coverage Datastructure for On-Demand and Increased Efficiency Coverage Detection and Rebalancing Apparatuses, Methods and Systems (hereinafter "UDRCD") transforms coverage enrollment request, event signal, ACGG request, search request inputs, via UDRCD components (e.g., ACM, EF, UF, ACGG, ARD, SP, AP, etc. components), into coverage enrollment response, add-in recommendation, ACGG response, search response outputs. The UDRCD components, in various embodiments, implement advantageous features as set forth below. It is to be understood that the word "recommendation" as used throughout this document is used to refer to recommendation of add-ins from a set of atomized add-in options, and is not used to refer to medical recommendations or to assisting members to diagnose their health issues.

Introduction

The UDRCD provides unconventional features (e.g., a self-evolving atomized coverage graph data structure that includes a set of clinical condition objects that include treatment paths data, a set of treatment objects, and a set of provider objects that specify how likely a provider is to utilize each of the available treatment paths) that were never before available in information technology analytics and processing for risk coverage.

In one embodiment, the UDRCD includes Condition-based coverage: Atomization of coverage that is on-demand and based on procedure or condition rather than annual coverage based on broad service categories. In one implementation, the UDRCD includes on-demand coverage atomization to reduce entry costs for members to gain coverage to truly insurable events (unpredictable, highest dollars claims); allows members to personalize coverage to their needs; presents treatment and/or provider pathway at the time of need providing relevant choices at relevant times. Underwriting is done today by volume in service categories. This is misaligned with individual disease progression and epidemiology. Underwriting on-demand coverage with atomization utilizes different data science tools and methodology. In one implementation, the UDRCD includes a novel combination of atomized design (also includes choice of provider), on demand coverage at time of need, and structure of the plan. In one implementation, on-demand insurance may include: atomization of plan coverage; attaching insurance coverage to the atomic components; ability to make continuous insurance decisions to make relevant choices at a relevant time, instead of once per year. In typical annual health insurance none of this atomization exists because coverage choices are made long before health care needs are known.

In another embodiment, the UDRCD includes condition-based coverage: identification of care and coverage need; offer for coverage to patient/member; payment for the coverage. In one implementation, the UDRCD includes processes to identify who should get coverage, what coverage they should get, how they should get it, how it should be priced, and how they should pay for it. In one implementation, the UDRCD includes an Early Listening System (ELS) that determines the event that has occurred and where to direct that event to determine coverage. The ELS is able to understand events from electronic health information (e.g., HL7) data such as encounter data and orders, health care Electronic Data Interchange (EDI) X12 transactions, consumer app and website actions such as search, and other acquired or licensed third party consumer data. In one implementation, the ELS informs a recommendation engine which presents condition-specific coverage information. In another implementation, the ELS and the recommendation engine may be implemented in a component and collectively referred to as ELS.

In another embodiment, the UDRCD's On Demand Customized Coverage is different than any other system in the U.S. marketplace at this time. UDRCD increases the processing around efficiency and resource use (e.g., providing best value) for members so that good health outcomes are achieved and inappropriate data processing around treatments is reduced and ultimately eliminated (e.g., the UDRCD may identify those providers that manage patients most efficiently and effectively in terms of the amount of services they use, in combination with the intensity of those services used and whether those services tend to lead to better outcomes when evaluating how they treat a condition; the UDRCD may create market dynamics that reduce the need for some of the utilization management techniques that have become common in the industry and create additional cost waste on both the provider and insurer that the ultimately must be passed on to the employer/consumer). Through efficiencies around the data processing components of the UDRCD, the system provides alternative approaches to reimbursement, and engages patients and providers, providing options never before available in healthcare.

In one implementation, benefit provisions are constructed to:
  Reduce costs of insurance premiums
  Offer a term of more than one year to allow for actuarial modeling precision as well as other benefits
  Encourage effective health and lifestyle behaviors
  Reduce economic barriers for effective prevention and treatment of chronic illness
  Provide economic protection for unplannable accident and illness
  Encourage patient-provider dialogue and shared decision-making
  Increase personal responsibility and financial risk for treatments:
    of unproven or diminished benefit, and/or
    where less invasive treatment options exist, and/or
    where lower cost options of equal or greater quality are available
  Encourage appropriate member/patient self-care
  Encourage appropriate member/patient conversion to higher value clinical services

UDRCD

FIG. 1 shows an exemplary model for the UDRCD. In FIG. 1, a model of on-demand health insurance (ODHI) is illustrated. ODHI deconstructs insurance into relevant conditional events; creating a better fit between insurable events versus spending events, and providing increased consumer choices around clinical value. As such, plan members may purchase just the insurance they need, just when they need it. This reduces waste in the healthcare system and lowers insurance premiums for consumers in the risk pool.

In one embodiment, the ODHI includes a core plan (e.g., for insurance events) that insures against the unpredictability of emergencies, trauma events, cancers, and/or the like, while also providing care for routine and preventive care services (e.g., at a significantly reduced cost).

In one embodiment, the ODHI includes additional insurance (or "add-ins") (e.g., for spending events) that may be purchased on demand (e.g., for hip replacement, if such coverage is needed and when it is needed), specific to a provider (e.g., in a local area), paid for with a combination of post-tax copays and/or pre-tax payroll deductions, and/or the like. In some implementations, add-ins may have a specified duration (e.g., an add-in may provide coverage for 3 months).

In one embodiment, the UDRCD utilizes specialized data structures, and/or data science to understand and/or model each individual's state within a Markov process, to facilitate underwriting ODHI. In various implementations, ODHI pricing may be determined by taking into account risk deterioration (e.g., based on a multiyear insurance term), disease progression (e.g., based on underwriting the epidemiology of individual disease progression according to Markov properties), new science (e.g., recommended treatment methods), and/or the like.

Figure 2:
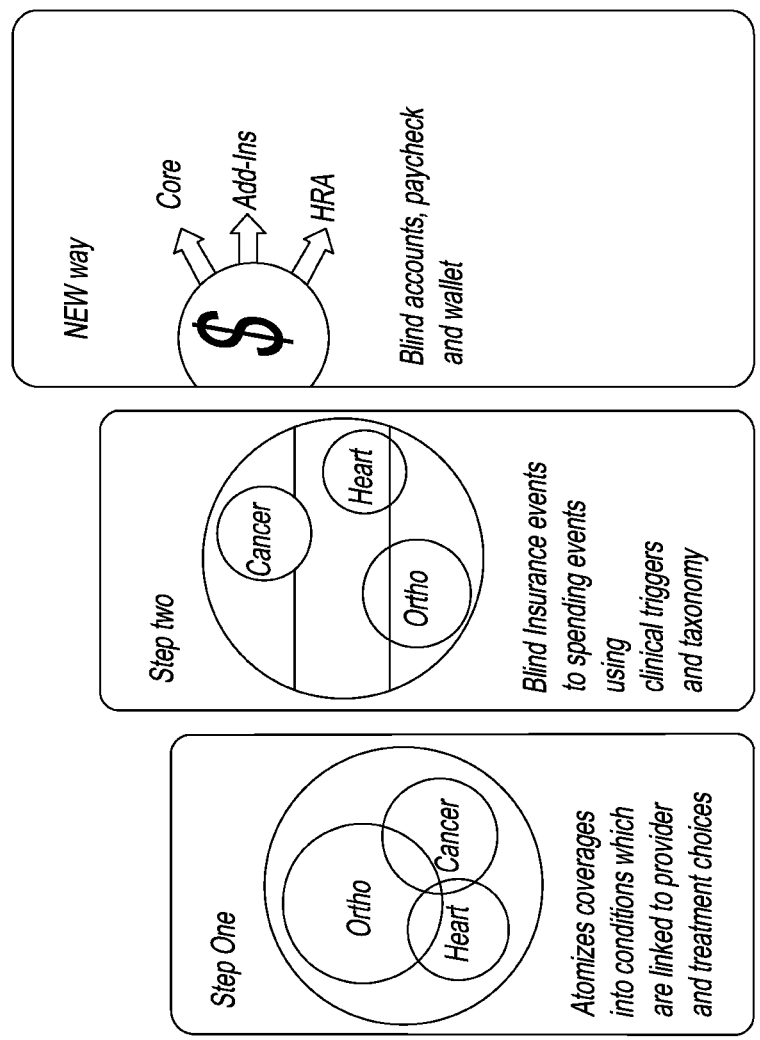
FIG. 2 shows an exemplary model for the UDRCD.

FIG. 2 shows an exemplary model for the UDRCD. In FIG. 2, a model for delivering ODHI is illustrated. In one embodiment, coverage is atomized into conditions which are linked to provider and/or treatment choices. In one implementation, coverage may be atomized for conditions (e.g., knee pain) rather than bucketed (e.g., for all inpatient services) for underwriting. Each condition may include provider choices (e.g., rehab center A, orthopedic group A, surgery center A, hospital A) and/or treatment (e.g., procedure) choices (e.g., up to 4 rehab visits, pain injection series, ACL repair) for which coverage may be purchased (e.g., priced individually for each choice) by plan members.

In one embodiment, insurance events (e.g., core coverage, which plan members share in equally) may be linked (e.g., based on clinical triggers and/or taxonomy) to spending events (e.g., add-ins coverage, which plan members may purchase as conditional needs arise by making provider and/or treatment choices). In one implementation, an insurance event (e.g., visiting a primary care provider several times for knee pain) may indicate a link to a spending event (e.g., knee replacement) that is likely to occur. Accordingly, a knee replacement coverage add-in may be offered to the plan member.

In one embodiment, ODHI may be delivered using a combination of a Health Reimbursement Account (HRA), a core plan, and add-ins. In one implementation, the HRA may be funded via payroll deductions and may be used by a plan member to pay for the core plan and/or for selected add-ins during the term (e.g., 3 years) of the ODHI plan. In one implementation, copays (e.g., for the atomized coverage) associated with the ODHI plan may be paid for using the plan member's other personal funds. In some implementations, copays may vary based on the purchased add-ins (e.g., purchasing an add-in may reduce copays for associated providers and/or treatments).

In one embodiment, the UDRCD utilizes specialized data structures and/or architectures to facilitate delivering ODHI.

Figure 3:
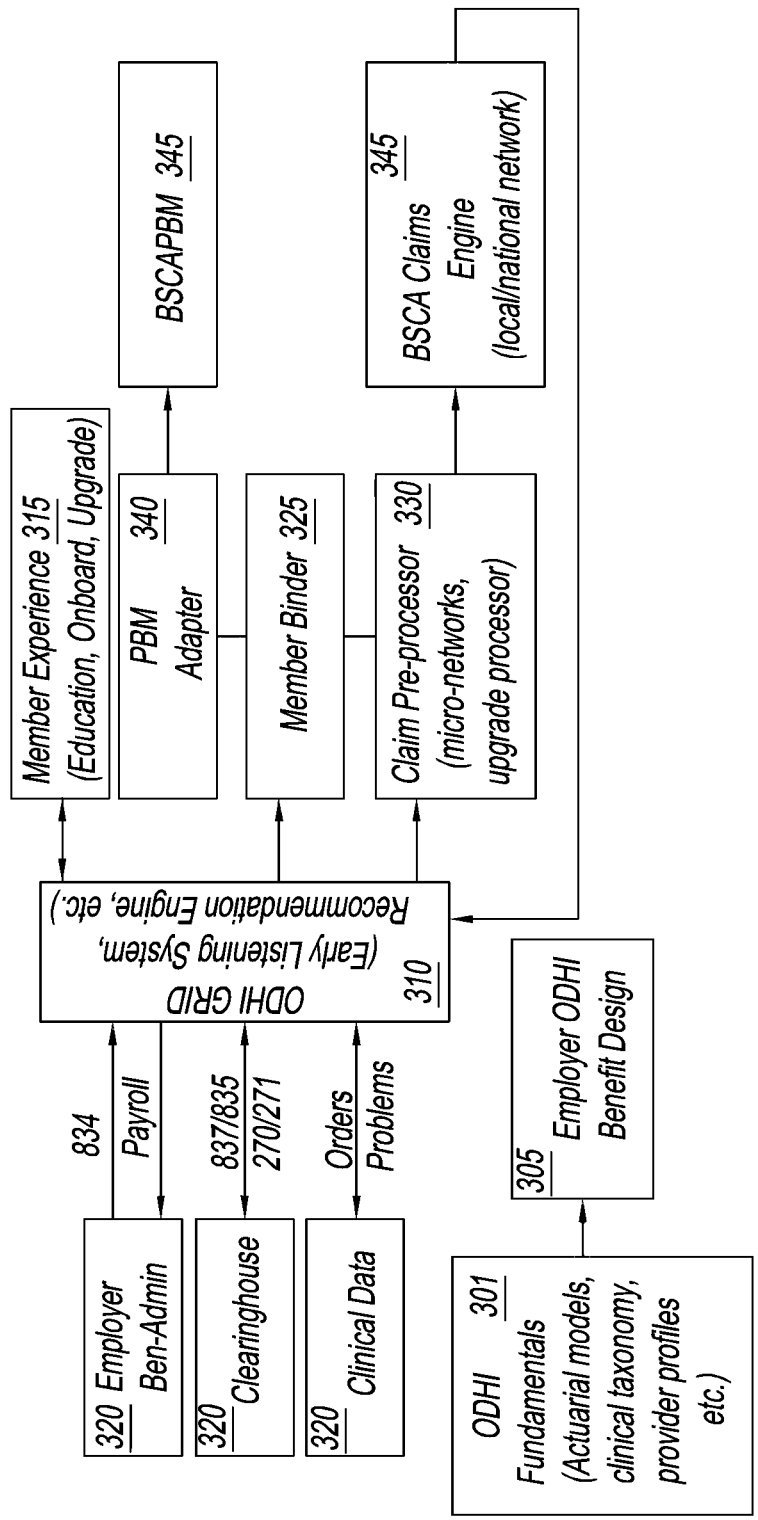
FIG. 3 shows an exemplary architecture for the UDRCD.

FIG. 3 shows an exemplary architecture for the UDRCD. In FIG. 3, ODHI fundamentals 301 may be utilized by an employer ODHI benefit design component 305 to facilitate designing an ODHI plan. In various implementation, an insurance plan sponsor (e.g., employer) may specify parameters, such as the degree of subsidization for core coverage and/or for add-ins coverage by the plan sponsor, the specification of which services are considered to be add-ins, whether payroll deductions are pre-tax or post tax, insurance plan term (e.g., 1 year, 3 years, 10 years), and/or the like, associated with the ODHI plan offered to employees.

An ODHI grid 310, which may include an Early Listening System (ELS), a recommendation engine, pricing engine, and/or the like, interconnects various UDRCD architecture components and/or third party systems to facilitate implementing delivery of the ODHI plan.

A member experience component 315 facilitates educating employees regarding ODHI, onboarding employees who sign up for the ODHI plan, upgrading a plan member's plan to include add-ins, and/or the like. An employer benefit administrator system 320 facilitates enrolling (e.g., via X12 834 formatted data files) employees into an ODHI plan and/or configuring associated employee payroll deductions. A member binder 325 facilitates keeping track of ODHI plan members.

A claim pre-processor 330 facilitates connecting to systems of health plan networks, such as to a Blue Shield of California (BSCA) claims engine 335. A pharmacy benefit manager (PBM) adapter 340 facilitates connecting to systems of third-party administrators of prescription drug programs, such as to a BSCA PBM 345.

A clearinghouse system 350 facilitates determining eligibility (e.g., via X12 270 formatted eligibility request files and/or X12 271 formatted eligibility response files), obtaining healthcare claims (e.g., via X12 837 formatted data files), providing claim payments (e.g., via X12 835 formatted data files), and/or the like.

Clinical data 355 (e.g., orders, problems) may be utilized by the ELS to facilitate determining add-ins or alternative services that should be offered to plan members (e.g., based on spending events that are likely to occur).

Figure 4:
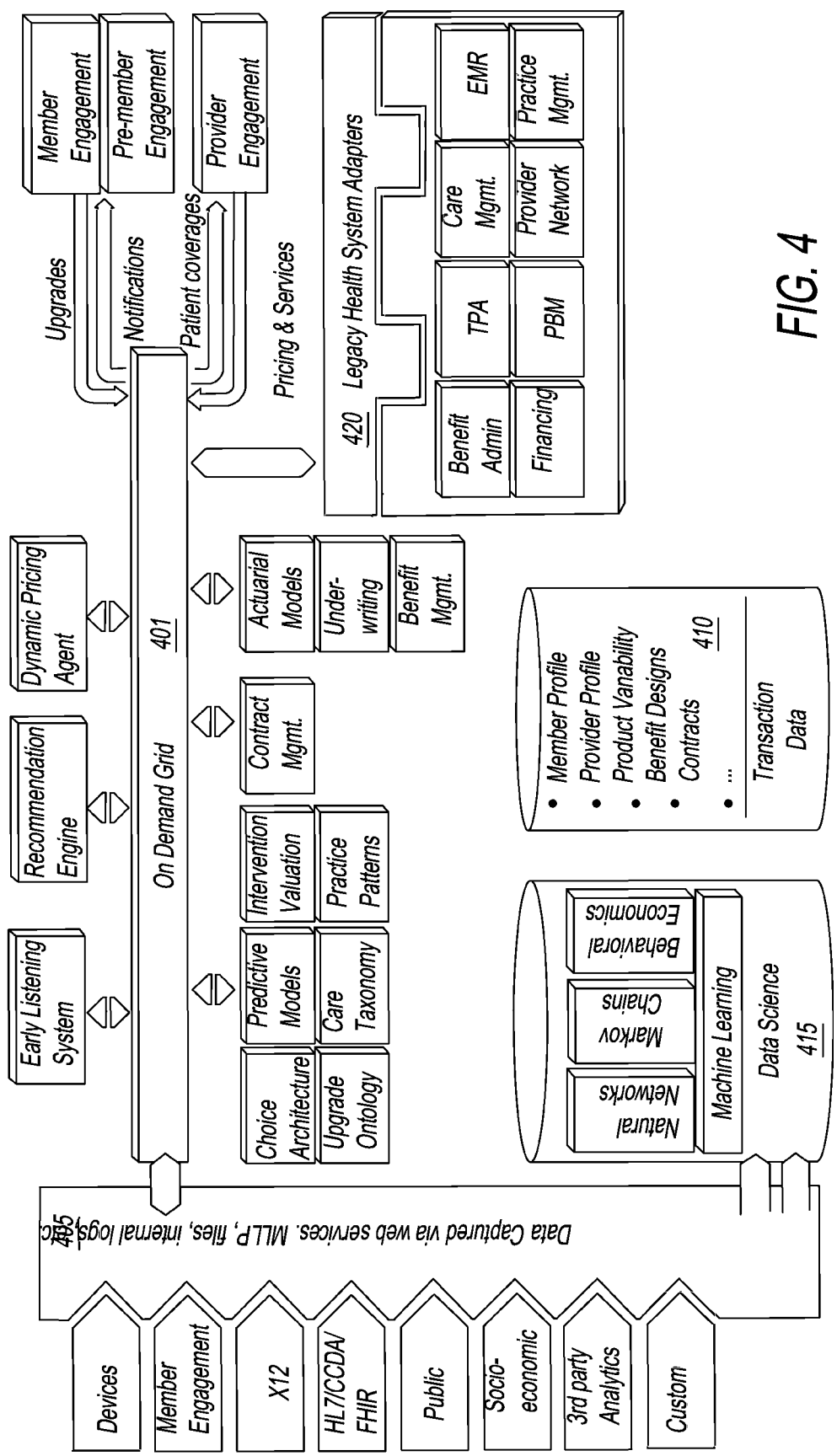
FIG. 4 shows an exemplary architecture for the UDRCD.

FIG. 4 shows an exemplary architecture for the UDRCD. In FIG. 4, the UDRCD may facilitate implementing delivery of an ODHI plan via an ODHI grid 401. In one embodiment, the ODHI grid may include a variety of architecture components. In one implementation, the ODHI grid may include a pre-member engagement component that facilitates member enrollment. In another implementation, the ODHI grid may include a member engagement component that facilitates notifying a plan member regarding add-ins or alternative services that may be useful to the plan member, and/or that facilitates upgrading the plan member's plan to include add-ins selected by the plan member. In another implementation, the ODHI grid may include an early listening system (ELS) and/or a recommendation engine that facilitate determining which add-ins may be useful to the plan member. In another implementation, the ODHI grid may include a dynamic pricing agent that facilitates determining pricing for core coverage and/or for add-ins coverage. See FIGS. 25-27 for additional details regarding the dynamic pricing agent. In another implementation, the ODHI grid may include an actuarial models component (e.g., to facilitate determining pricing), an underwriting component, a benefit management component (e.g., to facilitate keeping track of members' plan benefits), and/or the like that facilitate implementing the ODHI plan. In another implementation, the ODHI grid may include a contract management component that facilitates keeping track of contracts with providers, plan sponsors, plan members, and/or the like. In another implementation, the ODHI grid may include a provider engagement component that facilitates informing providers regarding plan members' coverage, and/or facilitates claims processing (e.g., based on services provided by providers and providers' pricing). The ODHI grid may utilize a variety of captured data 405. For example, such data may be captured via web services, Minimal Lower Layer protocol (MLLP), files, messages, internal logs, and/or the like. In various implementations, such data may include devices data, member engagement data, X12 data, HL7/CCDA/FHIR data, public data, socio-economic data, third party analytics data, custom data, and/or the like. The ODHI grid may utilize a variety of transaction data 410 (e.g., stored in a transaction data database). In various implementations, transaction data may include member profiles data, provider profiles data, product variability data, benefit designs data, contracts data, and/or the like. The captured data and/or the transaction data may be utilized by a data science component 415 to implement machine learning processes (e.g., using neural networks, Markov chains, behavioral economics), by the ELS and/or recommendation engine to facilitate determining which add-ins may be useful to the plan member, and/or the like. In another implementation, the ODHI grid may include a choice architecture component, a predictive models component, an intervention valuation component, an upgrade ontology component, a care taxonomy component, a practice patterns component, and/or the like that facilitate implementing the ODHI plan and that are based on the captured data and/or the transaction data and/or the machine learning processes. In another implementation, the ODHI grid may include a legacy health system adapters component 420 to facilitate interfacing the ODHI grid with legacy health systems.

Figure 62:
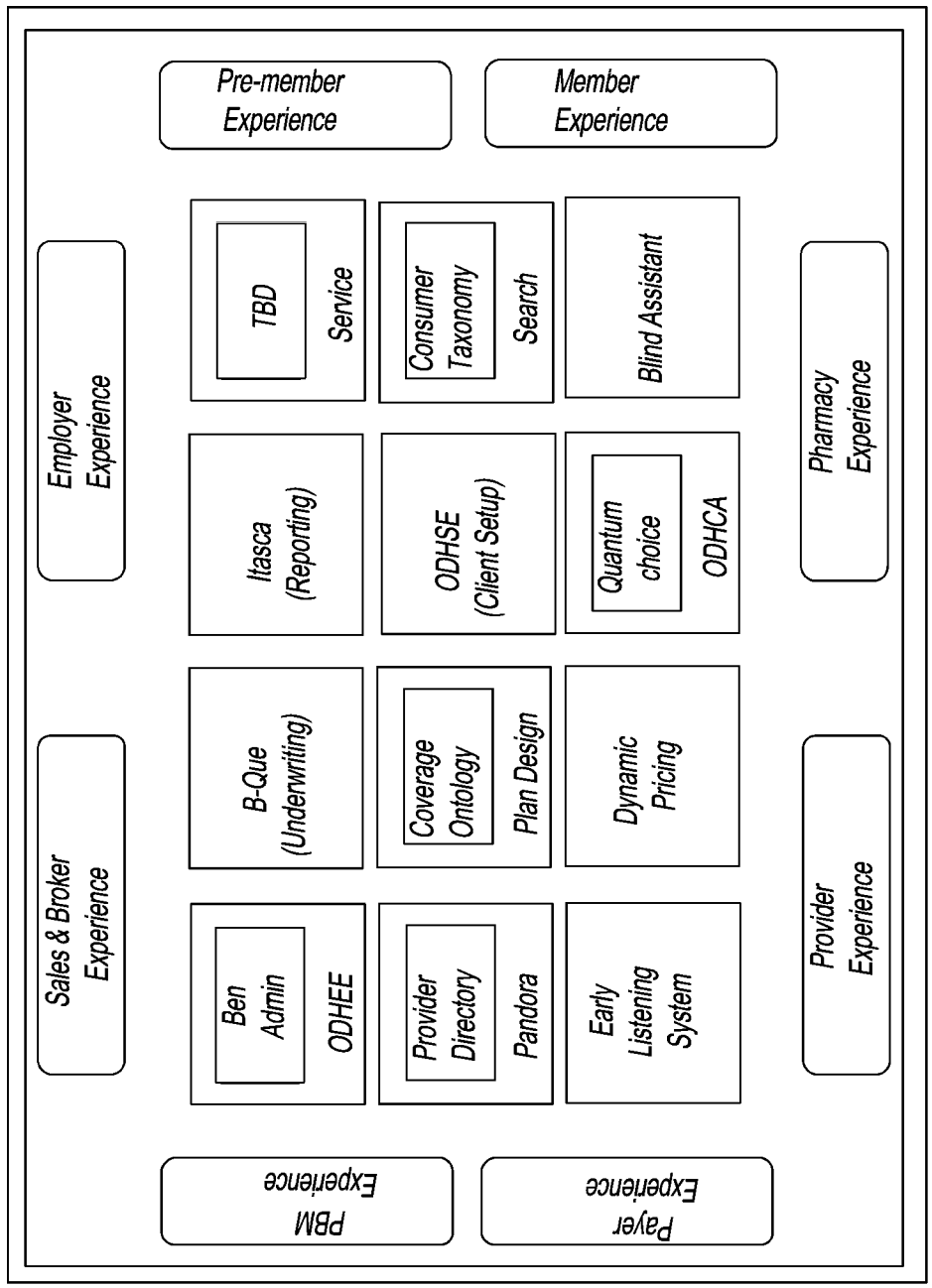
FIG. 62 shows an exemplary architecture for the UDRCD.

FIG. 62 shows an exemplary architecture for the UDRCD. In FIG. 62, the UDRCD may facilitate implementing delivery of ODHI plan features for various stakeholders via a set of architecture components. In one embodiment, the set of architecture components may include a benefit administering component (e.g., ODHEE), a provider directory component (e.g., Pandora), an ELS component, a dynamic pricing component, a plan design component (e.g., coverage ontology), an underwriting component (e.g., B-Que), a reporting component (e.g., Itasca), a client setup component (e.g., ODHSE), an ODHCA component (e.g., Quantum Choice), an assistant component, a search component (e.g., consumer taxonomy), a service component, and/or the like. In one implementation, the stakeholders may include pre-members, members, pharmacies, providers, payers, PBMs, sales and broker personnel, employers, and/or the like.

Figure 5:
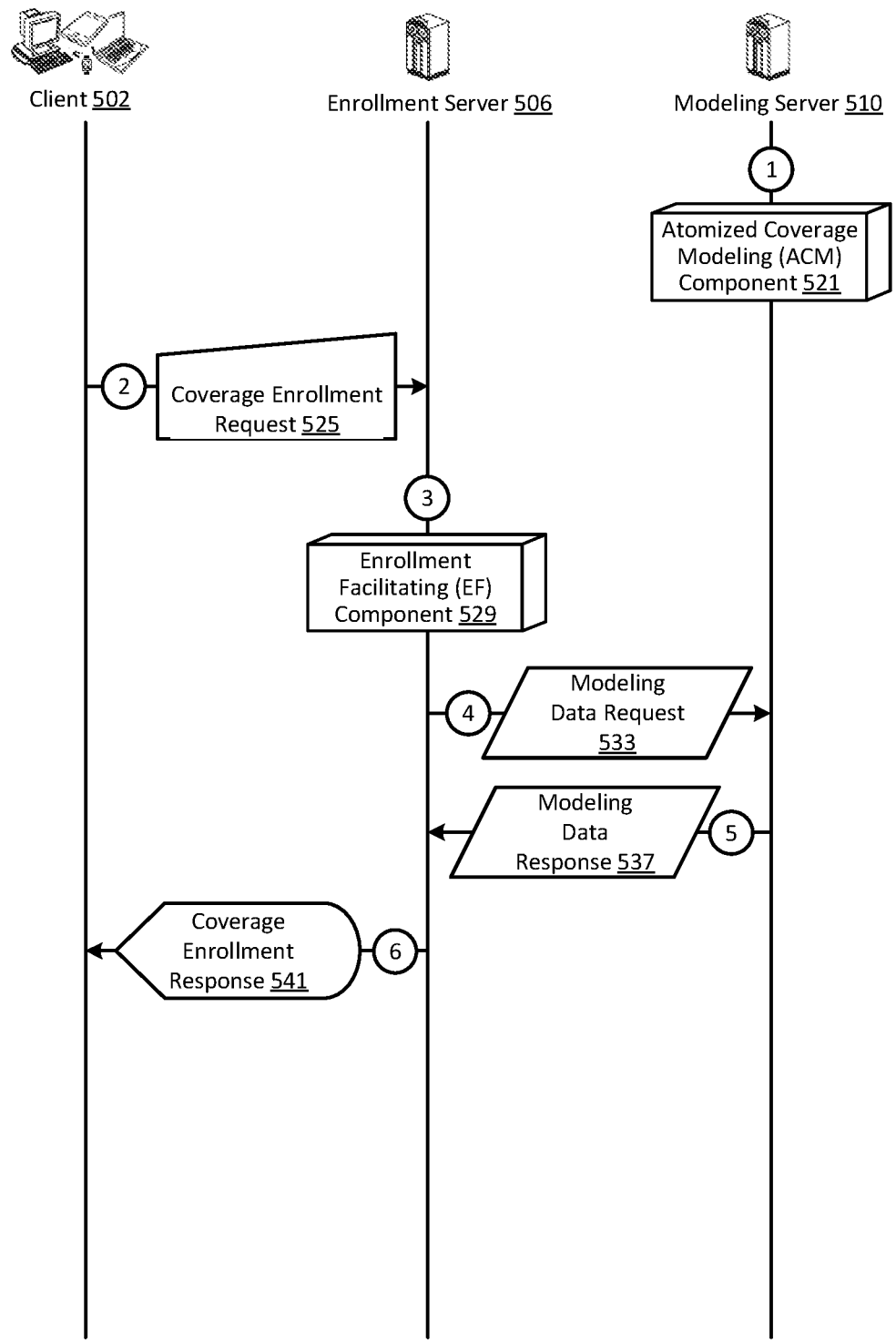
FIG. 5 shows a datagraph diagram illustrating embodiments of a data flow for the UDRCD.

FIG. 5 shows a datagraph diagram illustrating embodiments of a data flow for the UDRCD. In FIG. 5, a modeling server 510 may utilize an atomized coverage modeling (ACM) component 521 to facilitate generate modeling data (e.g., atomized conditions data, atomized procedures data, core coverage data, add-ins coverage data). See FIG. 6 for additional details regarding the ACM component.

A client 502 may send a coverage enrollment request 525 to an enrollment server 506 to facilitate coverage enrollment (e.g., into an ODHI plan) for a user. For example, the client may be a desktop, a laptop, a tablet, a smartphone, and/or the like that is executing a client application. In one implementation, the coverage enrollment request may include data such as a request identifier, user account details, coverage details, and/or the like. In one embodiment, the client may provide the following example coverage enrollment request, substantially in the form of a (Secure) Hypertext Transfer Protocol ("HTTP(S)") POST message including eXtensible Markup Language ("XML") formatted data, as provided below:

POST/authrequest.php HTTP/1.1

```
Host: www.server.com
Content-Type: Application/XML
Content-Length: 667
<?XML version ="1.0" encoding ="UTF-8"?>
<auth_request>
   <timestamp>2020-12-3123:59:59</timestamp>
   <user_accounts_details>
      <user_account_credentials>
         <user_name>ID_user_1</user_name>
         <password>abc123</password>
         //OPTIONAL <cookie>cookieID</cookie>
         //OPTIONAL <digital_cert_link>www.mydigitalcertificate.com/
JohnDoeDaDoeDoe@gmail.com/mycertifcate.dc</digital_cert_link>
         //OPTIONAL <digital_certificate>_DATA_</digital_certificate>
      </user_account_credentials>
   </user_accounts_details>
   <client_details>//iOS Client with App and Webkit
      //it should be noted that althoughseveral client details
      //sections are provided to show example variants of client
      //sources, further messages willinclude only on to save
      //space
      <client_IP>10.0.0.123</client_IP>
      <user_agent_string>Mozilla/5.0 (iPhone; CPU iPhone OS 7_1_1 like Mac OS X)
AppleWebKit/537.51.2(KHTML, like Gecko)Version/7.0 Mobile/11D201
Safari/9537.53</user_agent_string>
      <client_product_type>iPhone6,1</client_product_type>
      <client_serial_number>DNXXX1X1XXXX</client_serial_number>
      <client_UDID>3XXXXXXXXXXXXXXXXXXXXXXXXD</client_UDID>
      <client_OS>iOS</client_OS>
      <client_OS_version>7.1.1</client_OS_version>
      <client_app_type>app withwebkit</client_app_type>
      <app_installed_flag>true</app_installed_flag>
      <app_name>UDRCD.app</app_name>
      <app_version>1.0 </app_version>
      <app_webkit_name>Mobile Safari</client_webkit_name>
      <client_version>537.51.2</client_version>
   </client_details>
   <client_details> //iOS Client withWebbrowser
      <client_IP>10.0.0.123</client_IP>
      <user_agent_string>Mozilla/5.0 (iPhone; CPU iPhone OS 7_1_1 like Mac OS X)
```

```
AppleWebKit/537.51.2 (KHTML, like Gecko)Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
  </client_details>
  <client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30(KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14(KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <coverage_enrollment_request>
    <request_identifier>ID_request_1</request_identifier>
    <coverage_details>
      <plan_sponsor>ID_employer_1</plan_sponsor>
      <plan_selected>ID_ODHI_plan_1</plan_selected>
      <plan_term>3 years</plan_term>
      <coverage_type>individual</coverage_type>
      <provider_networks_selected>
        HealthEast, Fairview, HealthPartners
      </provider_networks_selected>
      <copays_selected>
        <emergency_room>$300</emergency_room>
        <hospitalization_unplanned>$2,500</hospitalization_unplanned>
        <medication_brand>$30</medication_brand>
        <medication_generic>$20</medication_generic>
        . . .
      </copays_selected>
      <conditions_selected>
        <add_in>ID_condition_asthmaqadd_in>
      </conditions_selected>
      <procedures_selected>
        <add_in>
          <type>ID_procedure_acupunctureqtype>
          <provider>ID_provider_1</provider>
        </add_in>
      </procedures_selected>
    </coverage_details>
  </coverage_enrollment_request>
</auth_request>
```

An enrollment facilitating (EF) component 529 may utilize data provided in the coverage enrollment request to facilitate coverage enrollment for the user. See FIG. 7 for additional details regarding the EF component.

The enrollment server may send a modeling data request 533 to the modeling server to obtain relevant modeling data. In one implementation, the modeling data request may include data such as a request identifier, coverage details, and/or the like. In one embodiment, the enrollment server may provide the following example modeling data request, substantially in the form of a HTTP(S) POST message including XML-formatted data, as provided below:

POST/modeling_data_request.php HTTP/1.1
Host: www.server.com
Content-Type: Application/XML
Content-Length: 667

```
<?XML version="1.0" encoding="UTF-8"?>
<modeling_data_request>
    <request_identifier>ID_request_2</request_identifier>
    <coverage_details>
        <plan_selected>ID_ODHI_plan_1</plan_selected>
        <plan_term>3 years</plan_term>
        <coverage_type>individual</coverage_type>
        <provider_networks_selected>
          HealthEast, Fairview, HealthPartners
        </provider_networks_selected>
        <copays_selected>
           <emergency_room>$300</emergency_room>
           <hospitalization_unplanned>$2,500</hospitalization_unplanned>
           <medication_brand>$30</medication_brand>
           <medication_generic>$20</medication_generic>
           . . .
        </copays_selected>
        <conditions_selected>
           <add_in>ID_condition_asthma</add_in>
        </conditions_selected>
        <procedures_selected>
           <add_in>
              <type>ID_procedure_acupuncture</type>
              <provider>ID_provider_1</provider>
           </add_in>
        </procedures_selected>
    </coverage_details>
</modeling_data_request>
```

The modeling server may send a modeling data response 537 to the enrollment server to provide the requested modeling data. In one implementation, the modeling data response may include data such as a response identifier, core insurance costs, add-ins insurance costs, and/or the like. In one embodiment, the modeling server may provide the following example modeling data response, substantially in the form of a HTTP(S) POST message including XML-formatted data, as provided below:

```
POST/modeling_data_response.php HTTP/1.1
Host: www.server.com
Content-Type: Application/XML
Content-Length: 667
<?XML version="1.0" encoding="UTF-8"?>
<modeling_data_response>
    <response_identifier>ID_response_2</response_identifier>
    <modeling_data>
       <core_cost>$45,292 for 3 years</core_cost>
       <add_ins_costs>
          <add_in>
             <type>ID_condition_asthma</type>
             <cost>$100 per month</cost>
          </add_in>
          <add_in>
             <type>ID_procedure_acupuncture</type>
             <cost>$500 for up to 4 sessions</cost>
          </add_in>
       </add_ins_costs>
    </modeling_data>
</modeling_data_response>
```

The enrollment server may send a coverage enrollment response 541 to the client to inform the user (e.g., via a website, application (e.g., a mobile app), and/or the like) that the coverage enrollment request has been processed. In one implementation, the coverage enrollment response may include data such as a response identifier, a status, and/or the like. In one embodiment, the enrollment server may provide the following example coverage enrollment response, substantially in the form of a HTTP(S) POST message including XML-formatted data, as provided below:

```
POST/coverage_enrollment_response.php HTTP/1.1
Host: www.server.com
Content-Type: Application/XML
Content-Length: 667
<?XML version="1.0" encoding="UTF-8"?>
<coverage_enrollment_response>
    <response_identifier>ID_response_1</response_identifier>
    <status>User Enrolled Successfully</status>
</coverage_enrollment_response>
```

Figure 6:
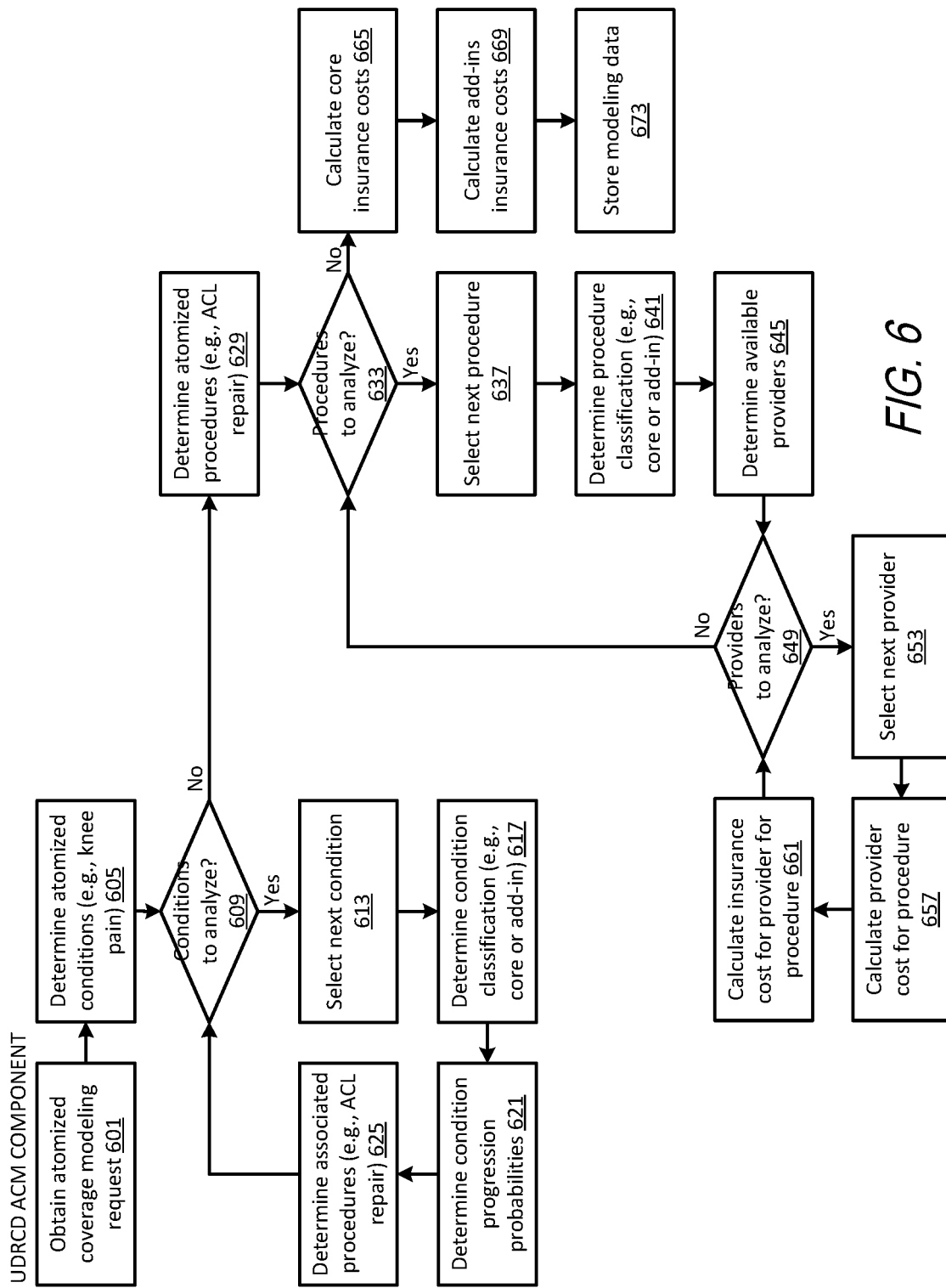
FIG. 6 shows a logic flow diagram illustrating embodiments of an atomized coverage modeling (ACM) component for the UDRCD.

FIG. 6 shows a logic flow diagram illustrating embodiments of an atomized coverage modeling (ACM) component for the UDRCD. In FIG. 6, an atomized coverage modeling request may be received at 601 to generate modeling data. For example, a modeling server may be configured to generate modeling data periodically (e.g., monthly, annually). In another example, a modeling server may be configured to generate modeling data on demand In one implementation, modeling data may be generated for general UDRCD use. In another implementation, modeling data may be generated for a specified plan sponsor, ODHI plan, locality, provider network, plan term, plan member type (e.g., individual, family, member demographic), and/or the like.

Atomized conditions (e.g., knee pain) may be determined at 605. In one implementation, captured data (e.g., International Classification of Diseases (ICD)) may be utilized to determine a care taxonomy that specifies atomized conditions. In another implementation, machine learning processes may be utilized to analyze captured data (e.g., X12 data, HL7 data) to determine a care taxonomy that specifies atomized conditions.

A determination may be made at 609 whether there remain conditions to analyze. In one implementation, any atomized condition may be analyzed. If there remain conditions to analyze, the next atomized condition may be selected for analysis at 613.

Condition classification of the selected atomized condition may be determined at 617. For example, the selected atomized condition may be classified as being part of a core plan or as being an add-in. In one implementation, this determination may be made based on a general UDRCD setting. In another implementation, this determination may be made based on a setting associated with the plan sponsor, with the ODHI plan, with the locality, with the provider network, with the plan term, with the plan member type, and/or the like. For example, the condition classification may be determined via a MySQL database command similar to the following:

```
SELECT ConditionClassification
FROM Models
WHERE ConditionID=ID_condition_knee_pain;
```

Disease progression probabilities associated with the selected atomized condition may be determined at 621. In one implementation, machine learning processes may be utilized to determine probabilities associated with various ways (branches) in which a disease may progress. For example, Markov chains may be utilized.

Atomized procedures associated with the atomized condition may be determined at 625. In one embodiment, practice patterns data (e.g., as provided by the practice patterns component) may be utilized to determine procedures available to treat the condition. In one implementation, associated procedures may be determined for the various determined disease progression branches. For example, a set of procedures may be determined for each branch. In another implementation, associated procedures may be determined for the atomized condition. For example, a set of procedures utilized to treat the condition may be determined.

Atomized procedures (e.g., ACL repair) may be determined at 629. In one implementation, captured data (e.g., Current Procedural Terminology (CPT)) may be utilized to determine a care taxonomy that specifies atomized procedures. In another implementation, machine learning processes may be utilized to analyze captured data (e.g., X12 data, HL7 data) to determine a care taxonomy that specifies atomized procedures.

A determination may be made at 633 whether there remain procedures to analyze. In one implementation, any atomized procedure may be analyzed. If there remain procedures to analyze, the next atomized procedure may be selected for analysis at 637.

Procedure classification of the selected atomized procedure may be determined at 641. For example, the selected atomized procedure may be classified as being part of a core plan or as being an add-in. In one implementation, this determination may be made based on a general UDRCD setting. In another implementation, this determination may be made based on a setting associated with the plan sponsor, with the ODHI plan, with the locality, with the provider network, with the plan term, with the plan member type, and/or the like. For example, the procedure classification may be determined via a MySQL database command similar to the following:

SELECT ProcedureClassification
FROM Models
WHERE PlanID=ID_ODHI_plan_1 AND ProcedureID= ID_procedure_ACL_repair;

Available providers for the selected atomized procedure (e.g., providers that may perform the procedure) may be determined at 645. In one implementation, this determination may be made based on available UDRCD providers (e.g., providers that have a contract with the UDRCD and that perform the procedure). In another implementation, this determination may be made based on available UDRCD providers that are associated with the plan sponsor, with the ODHI plan, with the locality, with the provider network, with the plan term, with the plan member type, and/or the like. In some embodiments, available provider networks may be determined instead of individual providers.

A determination may be made at 649 whether there remain providers to analyze. In one implementation, any available provider or provider network may be analyzed. If there remain providers to analyze, the next available provider or provider network may be selected for analysis at 653.

The selected provider's or provider network's cost for the selected atomized procedure may be calculated at 657. In one implementation, practice patterns data (e.g., historical claims data (e.g., member claims experience, claims from partner providers and insurers, CMS, and other available claims data sets) as provided by the practice patterns component) may be utilized to calculate the expected (e.g., average) cost that the provider or provider network charges (e.g., based on their utilization patterns and reimbursement rates on expected services) for performing the selected atomized procedure. For example, claims submitted by the provider or provider network for the procedure over the last 3 years may be analyzed to calculate the average cost.

Insurance cost (e.g., to insure an individual plan member, to insure a family) associated with the selected atomized procedure for the selected provider or provider network may be calculated at 661. In one implementation, the selected provider's or provider network's cost for the selected atomized procedure, actuarial models (e.g., as provided by the actuarial models component), the plan term (e.g., 3 years), machine learning processes, and/or the like may be utilized to calculate the insurance cost.

Core insurance costs (e.g., for general UDRCD use; associated with the specified plan sponsor, ODHI plan, locality, provider network, plan term, plan member type) may be calculated at 665. In one implementation, insurance costs for each atomized procedure classified as core may be calculated. For example, insurance cost for an atomized procedure may be calculated based on a weighted average (e.g., weighted by provider utilization) of insurance costs associated with the available providers. Insurance costs for each atomized condition classified as core may be calculated. For example, insurance cost for an atomized condition may be calculated based on the sum of the insurance costs for the set of procedures utilized to treat the condition. In another example, insurance cost for an atomized condition may be calculated based on a weighted average (e.g., weighted by probabilities associated with each disease progression branch) of insurance costs for each branch. Insurance costs for a core plan may be calculated (e.g., to insure an individual plan member, to insure a family). For example, the insurance cost for the core plan may be calculated based on the sum of the calculated insurance costs for core procedures and core conditions.

Add-ins insurance costs (e.g., for general UDRCD use; associated with the specified plan sponsor, ODHI plan, locality, provider network, plan term, plan member type) may be calculated (e.g., to insure an individual plan member, to insure a family) at 669. In one implementation, insurance costs for each atomized procedure classified as add-in may be calculated and insurance costs for each atomized condition classified as add-in may be calculated.

Modeling data may be stored at 673. For example, the modeling data (e.g., for general UDRCD use; associated with the specified plan sponsor, ODHI plan, locality, provider network, plan term, plan member type) may be stored (e.g., via one or more SQL statements) in a models database 7119*j*. In various implementations, modeling data may include atomized conditions data (e.g., atomized conditions, condition classification, condition progression probabilities, associated procedures), atomized procedures data (e.g., atomized procedures, procedure classification, available providers, providers costs, insurance costs for providers), core insurance coverage data (e.g., the set of atomized conditions and atomized procedures included in core insurance), core insurance costs, add-ins insurance coverage data (e.g., the set of atomized conditions and atomized procedures included in add-ins insurance), add-ins insurance costs, and/or the like.

Figure 7:
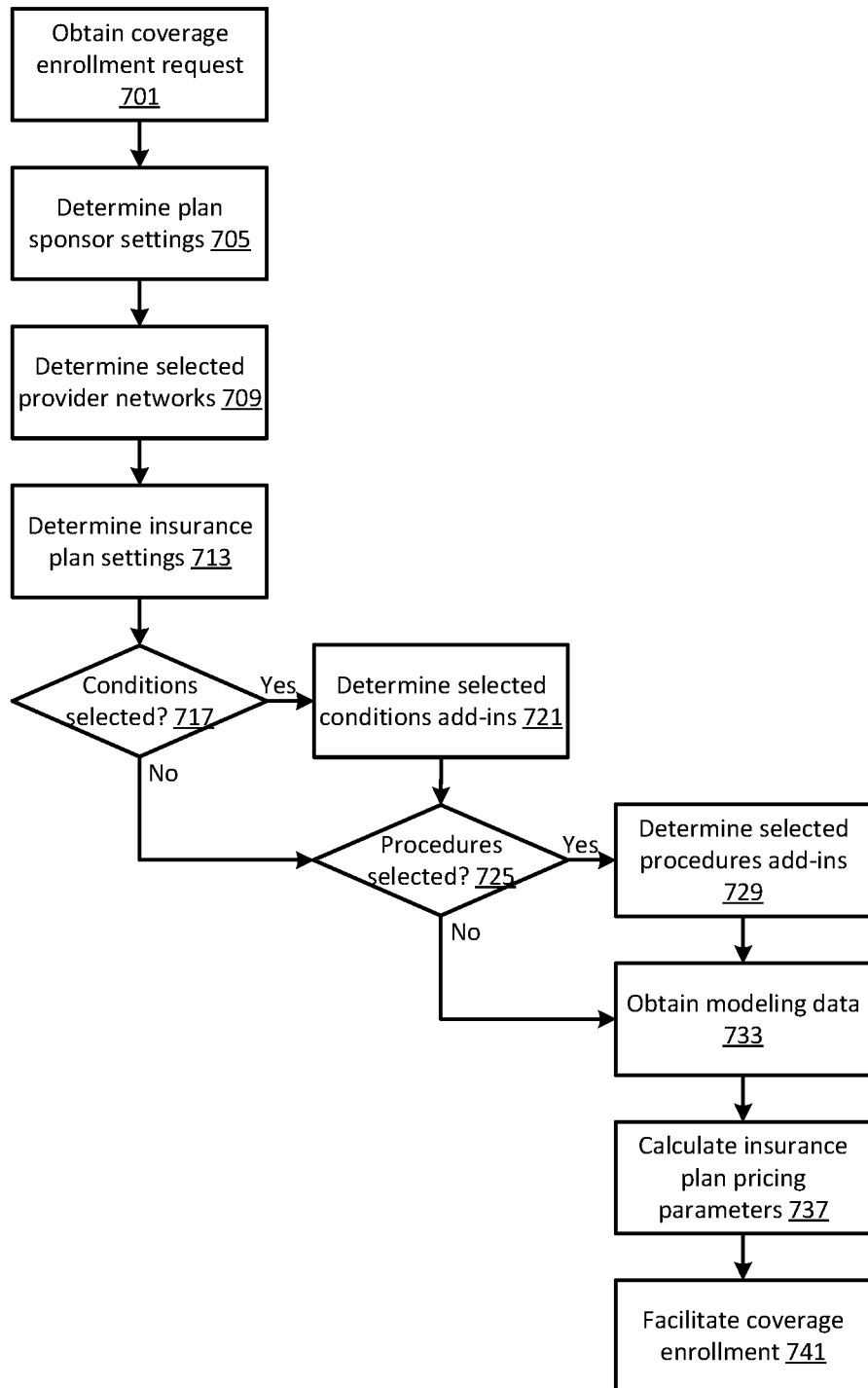
FIG. 7 shows a logic flow diagram illustrating embodiments of an enrollment facilitating (EF) component for the UDRCD.

FIG. 7 shows a logic flow diagram illustrating embodiments of an enrollment facilitating (EF) component for the UDRCD. In FIG. 7, a coverage enrollment request may be obtained at 701. For example, the coverage enrollment request may be obtained as a result of a user requesting to enroll into an ODHI plan.

Plan sponsor settings associated with the enrollment request may be determined at 705. For example, a plan sponsor may be an employer of the user. In one embodiment, the plan sponsor may subsidize (e.g., in whole or in part) core insurance costs and/or add-ins insurance costs for the user. In various implementations, the plan sponsor settings may include available insurance plans, available plan terms, available coverage types, available provider networks, condition classification settings specified by the plan sponsor, procedure classification settings specified by the plan sponsor, data regarding subsidies offered by the plan sponsor (e.g., for the core insurance costs, for the add-ins insurance costs), HRA settings (e.g., data regarding the plan sponsor's contribution to the HRA), and/or the like. For example, the plan sponsor settings may be retrieved (e.g., as provided by the employer ODHI benefit design component) via one or more SQL statements. In one implementation, the plan sponsor settings may be utilized to configure available options for an enrollment user interface that may be utilized by the user (e.g., via a mobile app, via a website) to configure the user's ODHI plan by selecting from the available options. In another implementation, the plan sponsor settings may be utilized to facilitate calculating insurance plan pricing parameters for the user's ODHI plan.

Provider networks selected by the user may be determined at 709. In one implementation, the coverage enrollment request may be parsed (e.g., using PHP commands) to determine the user selected (e.g., via the enrollment user interface) provider networks. For example, the user may select provider networks that include providers that the user is likely to use (e.g., based on geographic proximity of such providers to the user's location). In another example, the user may select provider networks that fit the user's budget (e.g., insurance costs associated with different provider networks may differ).

Insurance plan settings selected by the user may be determined at 713. In one implementation, the coverage enrollment request may be parsed (e.g., using PHP commands) to determine the user selected (e.g., via the enrollment user interface) insurance plan settings. For example, the user may select from available plans (e.g., having different configurations), plan terms (e.g., 1 year, 3 years, 10 years), coverage types (e.g., individual, family), and/or the like. In another example, the user may set copay amounts for various individual services (e.g., emergency room, unplanned hospitalization, brand medication, generic medication).

A determination may be made at 717 whether the user selected any atomized conditions. If so, the selected conditions add-ins (e.g., asthma) may be determined at 721. In one implementation, the coverage enrollment request may be parsed (e.g., using PHP commands) to determine the user selected (e.g., via the enrollment user interface) conditions add-ins.

A determination may be made at 725 whether the user selected any atomized procedures. If so, the selected procedures add-ins (e.g., acupuncture) may be determined at 729. In one implementation, the coverage enrollment request may be parsed (e.g., using PHP commands) to determine the user selected (e.g., via the enrollment user interface) procedures add-ins.

Modeling data associated with the coverage enrollment request may be obtained at 733. In one implementation, the modeling data may be obtained by sending a modeling data request to a modeling server (e.g., based on the plan sponsor settings and/or the user selected options). In another implementation, the modeling data may be cached (e.g., by an enrollment server, by a client) to facilitate generating the enrollment user interface (e.g., to show the user how insurance plan pricing parameters change based on the user's selections).

Insurance plan pricing parameters may be calculated at 737. For example, insurance plan pricing parameters may include pay period deduction for the user to pay for the user's ODHI plan, available HRA balance remaining (e.g., to pay for additional conditions and/or procedures in the future), how a change (e.g., the last insurance plan configuration change made by the user via the enrollment user interface) affects pay period deduction and/or available HRA balance remaining, and/or the like. In one implementation, core insurance cost and/or add-ins insurance costs associated with the user's ODHI plan may be utilized to determine an overall insurance cost for the user's ODHI plan. For example, the overall insurance cost (e.g., $49,392 for 3 years) for the user's ODHI plan may be calculated based on the sum of the core insurance cost (e.g., $45,292 core cost) and add-ins insurance costs (e.g., $3,600 for 3 years (at $100 per month) for Asthma condition add-in and $500 for up to four sessions of acupuncture procedure add-in) associated with the user's ODHI plan. Plan sponsor settings (e.g., data regarding subsidies offered by the plan sponsor (e.g., for the core insurance costs, for the add-ins insurance costs), HRA settings) may be utilized to calculate pay period deduction for the user, available HRA balance remaining, effects of a change, and/or the like. For example, if the plan sponsor subsidizes 50% of the cost of the user's ODHI plan and the user gets paid two times per month, then the user's pay period deduction (e.g., $343) may be calculated as follows:

$49,392 overall cost for three years*50% user responsibility=$24,696 user cost for three years $24,696 user cost for three years/36 months=$686 user cost per month $686 user cost per month/2 pay periods per month=$343 pay period deduction Coverage enrollment of the user into the user's ODHI plan may be facilitated at 741. In one implementation, enrollment data associated with the user's ODHI plan may be provided to an employer benefit administrator system of the plan sponsor to facilitate enrolling the user into the plan, setting up payroll deductions to pay for the plan, and/or the like.

FIG. 8 shows a screenshot diagram illustrating embodiments of the UDRCD. In FIG. 8, an exemplary enrollment user interface is shown. Screen 801 shows how a user may select different provider networks for the user's ODHI plan. For example, the user may use a toggle switch 802 to select the HealthEast provider network. In another example, the user may click on a details GUI widget 804 to view additional information regarding each provider network (e.g., participating providers, insurance cost data). Screen 810 shows how a user may set copays for various services. For example, the user may use a slider 812 to set the emergency room copay. In another example, the resulting pay period deduction 814, available HRA balance remaining 816, and how the last change (e.g., to increase emergency room copay from $200 to $300) affected the pay period deduction and the available HRA balance remaining 818. Screen 820 shows how the user may select condition add-ins for the user's ODHI plan. For example, the user may use a toggle switch 822 to select the Asthma add-in.

FIG. 9 shows a screenshot diagram illustrating embodiments of the UDRCD. In FIG. 9, an exemplary enrollment user interface is shown. An upgrade options screen 901 shows how a user may upgrade the user's ODHI plan by selecting an add-in (e.g., for knee pain coverage). For example, the user may click on one of the available knee replacement surgery coverage add-in options 902 or 904 to upgrade. Screen 910 shows an example of the upgrade options that may be available to the user in screen 901. For example, the user may select from three different hospitals 912, 914, and 916, with each hospital having a different quality rating and a different insurance cost (e.g., higher quality providers may have lower insurance costs). Screen 920 shows another example of the upgrade options that may be available to the user in screen 901. For example, the user may select from four different providers 922, 924, 926, and 928, with providers offering different treatment options (e.g., procedures) and having different employer subsidization percentages.

FIG. 10 shows a screenshot diagram illustrating embodiments of the UDRCD. In FIG. 10, an exemplary copay schedule comparison of copay amounts that a user has to pay for various services with core coverage vs. core coverage and add-ins coverage is shown. As shown in FIG. 10, having add-ins coverage may lower copays for certain services (e.g., primary care visit, specialty visit, urgent care, prescription drugs). It is to be understood that different add-ins may affect copays for different services.

Figure 11:
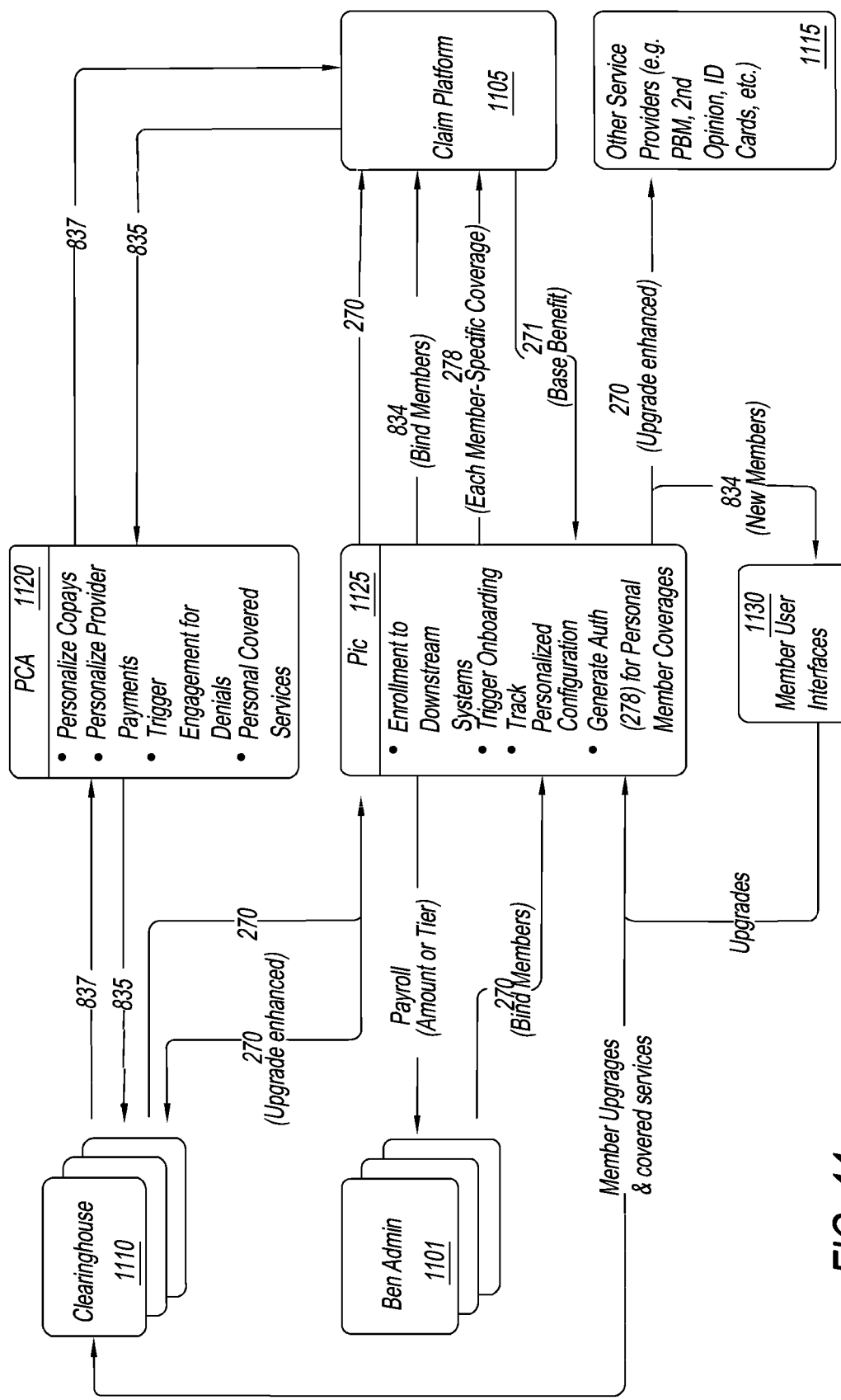
FIG. 11 shows an exemplary architecture for the UDRCD.

FIG. 11 shows an exemplary architecture for the UDRCD. In FIG. 11, a claim administration platform is illustrated. In one embodiment, the claim administration platform facilitates claim processing of each member's individually configured ODHI plan. In one implementation, the claim administration platform interoperates with benefit administration systems 1101 (e.g., benefit administration systems cannot support member personalization of a medical benefit and the resulting calculations and communications), a claim platform 1105 (e.g., claim platforms predefine the insurance coverage and providers, and then associated members to one of the predefined options), clearinghouse systems 1110, other service provider (e.g., pharmacy benefit manager (PBM), $2^{nd}$ opinion, ID cards) systems 1115, and/or the like to facilitate ODHI plan administration in a pluggable manner with health industry systems. For example, numbered arrows indicate various X12 data files that may be sent among different claim administration platform components and health industry systems.

In one embodiment, the claim administration platform includes a personal claim administrator (PCA) component 1120, a personal insurance coordinator (PIC) component 1125, and an onboarding engine (OE) 1130. In one implementation, the PCA component may facilitate personalization of copays, personalization of provider payments, triggering engagement for denials, personal covered services, and/or the like. In one implementation, the PIC component may facilitate enrollment to downstream systems, triggering onboarding, tracking personalized configuration, generating authorization (e.g., X12 278 formatted data files) for personal member coverages, and/or the like. In one implementation, the OE may facilitate onboarding new members and upgrades via member user interfaces, and/or the like.

For Example:

Personalize Copays

Copays for the services delivered to plan members by providers are applied during claims processing based on the chosen insurance coverage at the time the member added that coverage to the member's benefit. The copay can vary based on a variety of factors, including treatment choice, providers delivering the treatments, location of the treatments, the underlying provider and location fees and practice patterns at the time the coverage was added, provider warranties or guarantees of their work, provider collection and use of functional outcomes information, provider integration of clinical data sharing or scheduling, and/or the like. These copays are determined and passed to the Claim Platform for adjudication accordingly.

Personalize Provider Payments

The amount paid to providers for services delivered to members is determined at the time the member coverage was added. The amount can vary by provider price commitment at any given point in time, either by providers configuring specific prices or by provider specification of an algorithm, within agreed on parameters. Personalized claim processing delivers payment instructions to be used to pay specific claims based on the fees captured at the time coverage was added. In one embodiment, the price variation in the amount paid to providers is driven by the provider's use of dynamic pricing tools that allow them to vary the allowed costs for services within parameters denoted in their contractual arrangements. This is different than the copayment that the provider collects from the member, which typically makes up a portion of that overall allowed amount they collect for the service. The member copayment may take into account changes made by the provider through their dynamic pricing of a service in determining the member share of that cost that the provider may collect as a copay.

Trigger Engagement for Denials

In addition to proactive outreach based on algorithms in the Early Listening System, outreach to members based on Denials is used to both inform and educate members, as well as to allow for member coverage additions per plan sponsor configured parameters by post processing claims.

Personal Covered Services

The coverage available for member selection can vary by services included. Personalized claim adjudication takes into consideration the services included for that member based on the member's coverage choices at the time the coverage was added.

Enrollment to Downstream Systems

Enrollment information may be provided to other systems involved in delivering the on-demand health insurance. The mechanism as well as the amount of information provided is determined and delivered based on the specifications of each downstream system.

Trigger Onboarding

Enrollment is a multi-part process, including the initial selection of the on-demand health insurance, the subsequent personalization of that insurance for each member, and the configuration of the product specifically for each member.

Track Personalized Configuration

Each member's personal health coverage is tracked, including all of the parameters involved in the coverage at the point at which it was chosen.

Generate Auth for Personal Member Coverages

Successful adjudication of claims is facilitated in part by creation and management of electronic prior authorization instructions for the claims system that specify coverage and payment parameters for additional personal coverage for each member.

In one implementation, the claim administration platform allows insurance to be individually configurable by each member to meet specific personal insurance needs. The claim administration platform manages the member's individually configured insurance, along with individualized changes over time, and performs the computations utilized to ensure insurance claims are processed according to each member's individual insurance configuration. For example, the claim administration platform may include the capability to provide instructions to the claims system on the member's individual configuration through the use of prior authorizations to specify coverages for services at one or more providers with specific payment arrangements, and the capability to set inline claims instructions that specify how a specific claim should be processed per the member's chosen configuration. In another example, the claim administration platform may allow for varying each capability to adapt to the unique constraints of the target claims adjudication engine.

Figure 63:
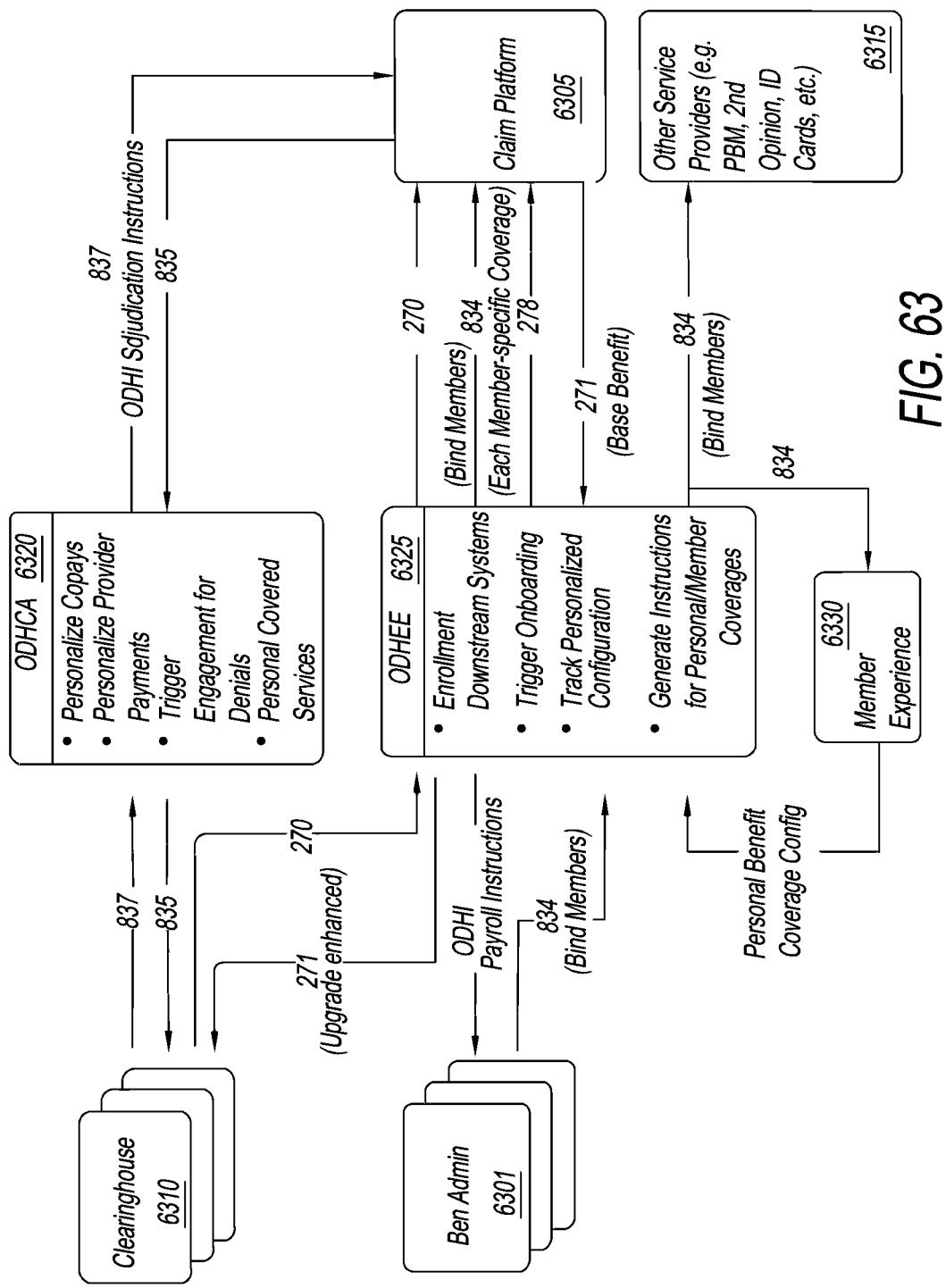
FIG. 63 shows an exemplary architecture for the UDRCD.

FIG. 63 shows an exemplary architecture for the UDRCD. In FIG. 63, alternative embodiments of a claim administration platform are illustrated. In one embodiment, the claim administration platform facilitates claim processing of each member's individually configured ODHI plan. In one implementation, the claim administration platform interoperates with benefit administration systems 6301 (e.g., benefit administration systems cannot support member personalization of a medical benefit and the resulting calculations and communications), a claim platform 6305 (e.g., claim platforms predefine the insurance coverage and providers, and then associated members to one of the predefined options), clearinghouse systems 6310, other service provider (e.g., pharmacy benefit manager (PBM), $2^{nd}$ opinion, ID cards) systems 6315, and/or the like to facilitate ODHI plan administration in a pluggable manner with health industry systems. For example, numbered arrows indicate various X12 data files that may be sent among different claim administration platform components and health industry systems.

In one embodiment, the claim administration platform includes an On-Demand Health Claims Administrator (ODHCA) component 6320, an On-Demand Health Enrollment Engine (ODHEE) component 6325, and a member experience component 6330. In one implementation, the ODHCA component may facilitate personalization of copays, personalization of provider payments, triggering engagement for denials, personal covered services, and/or the like. In one implementation, the ODHEE component may facilitate enrollment to downstream systems, triggering onboarding, tracking personalized configuration, generating instructions (e.g., X12 278 formatted data files) for personal member coverages, and/or the like. In one implementation, the member experience component may facilitate onboarding new members and personal benefit coverage configuration via member user interfaces, and/or the like.

Figure 12:
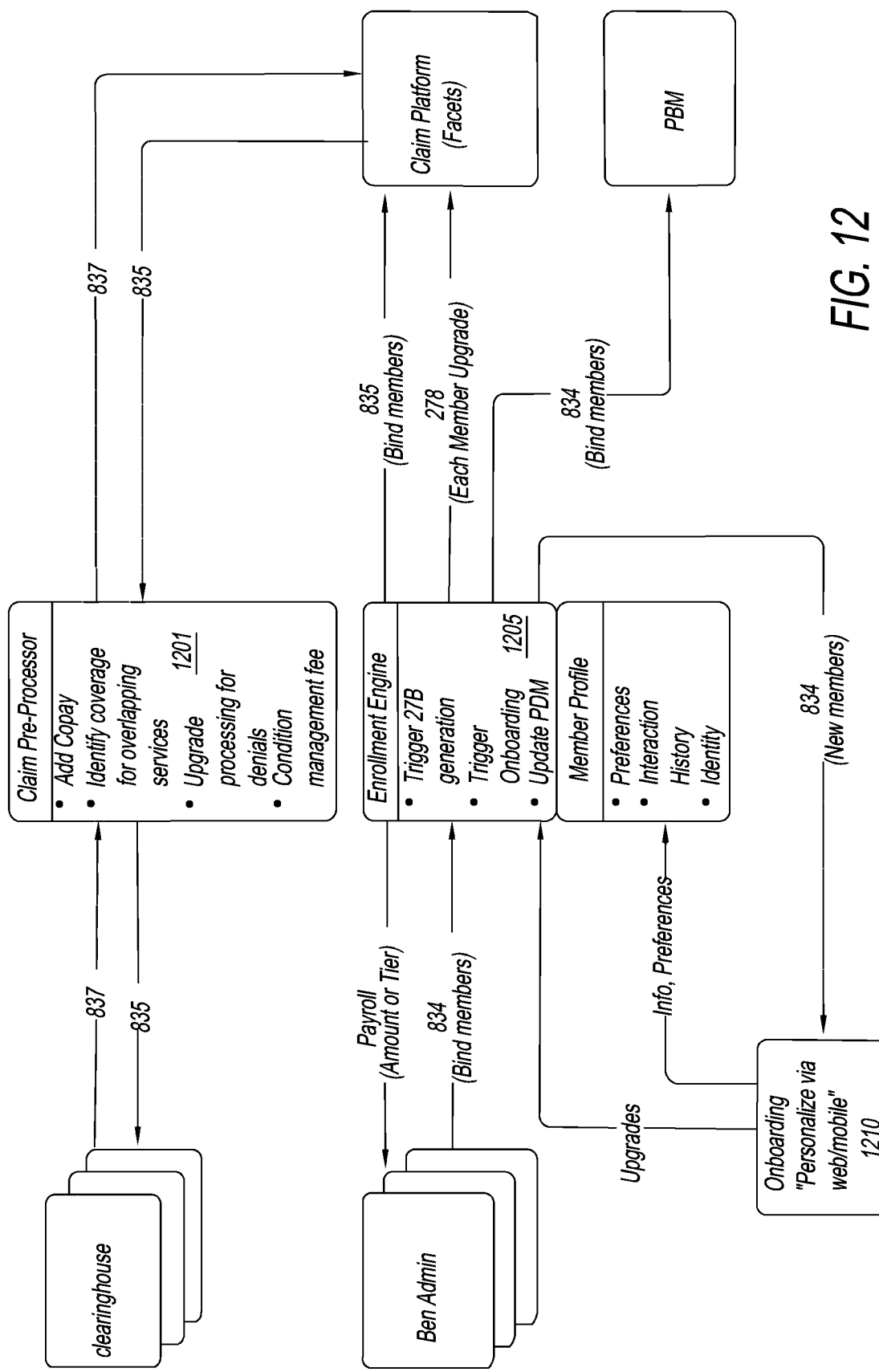
FIG. 12 shows an exemplary architecture for the UDRCD.

FIG. 12 shows an exemplary architecture for the UDRCD. In FIG. 12, alternative embodiments of a claim administration platform are illustrated. In one embodiment, the claim administration platform includes a claim pre-processor component 1201, an enrollment engine 1205, and an onboarding engine (OE) 1210. In one implementation, the claim pre-processor component may facilitate adding copay, identifying coverage for overlapping services, upgrading processing for denials, condition management fee administration, and/or the like. In one implementation, the enrollment engine may facilitate triggering X12 278 formatted data file generation, triggering onboarding, updating PBM, storing a member profile (e.g., a member profile may include preferences, interaction history, identity, and/or the like), and/or the like. In one implementation, the OE may facilitate onboarding new members and upgrades via personalized web and/or mobile user interfaces.

Figure 64:
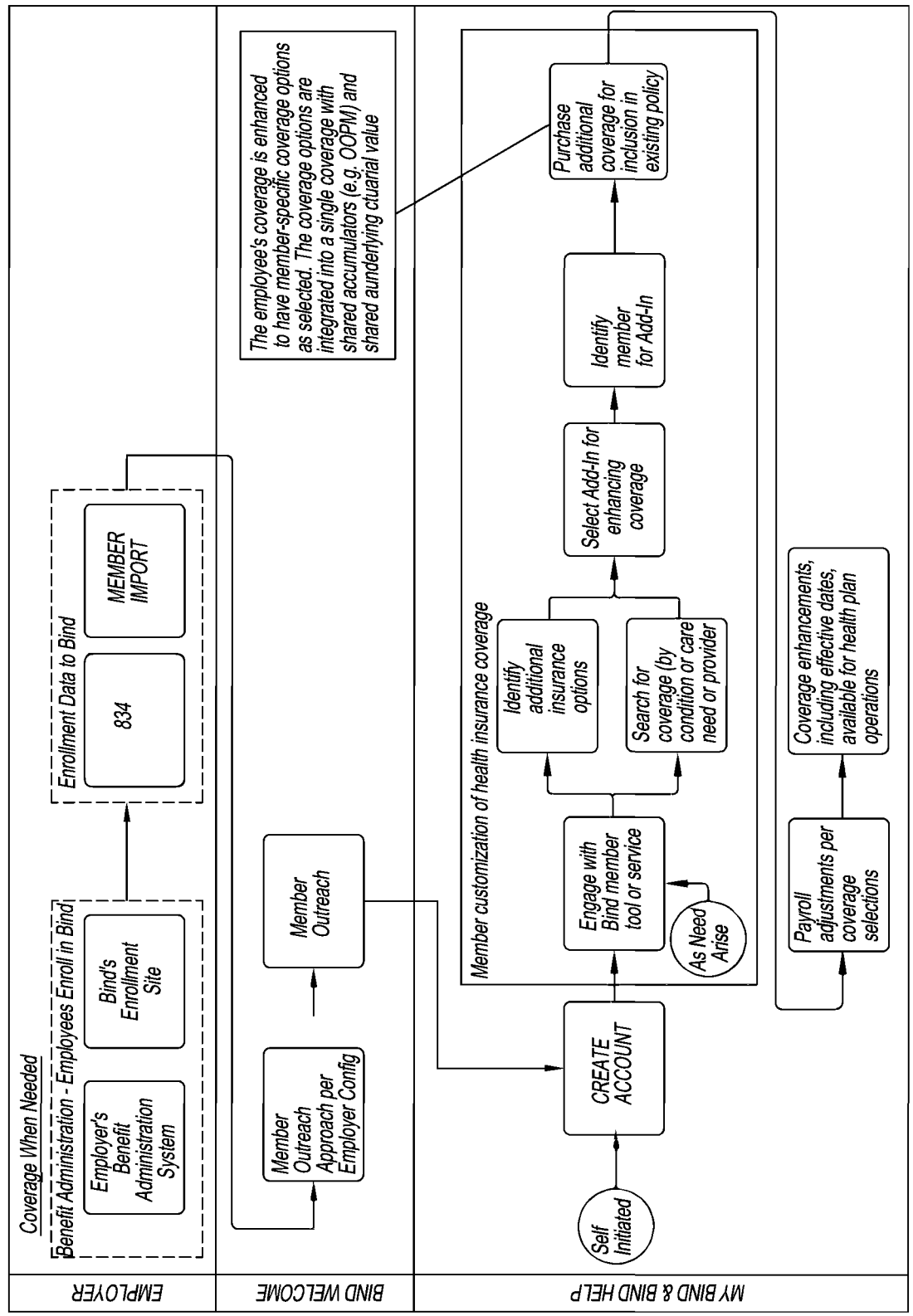
FIG. 64 shows an exemplary architecture for the UDRCD.

FIG. 64 shows an exemplary architecture for the UDRCD. In FIG. 64, an embodiment of how a claim administration platform may be utilized to facilitate member enrollment is illustrated. In one implementation, an employer's benefit administration system and/or a UDRCD enrollment site may be utilized to enable employees to enroll into an ODHI plan. Enrollment data may be provided to the UDRCD. Upon enrollment, member outreach may be provided per the employer's configuration.

In one implementation, once an account is created for a member, the member may utilize UDRCD tools and/or services to identify additional insurance options and/or to search for coverage. Additional add-ins may be selected and added to the member's ODHI plan. The member's payroll may be adjusted based on the selections and coverage enhancements may be enabled.

Figure 13:
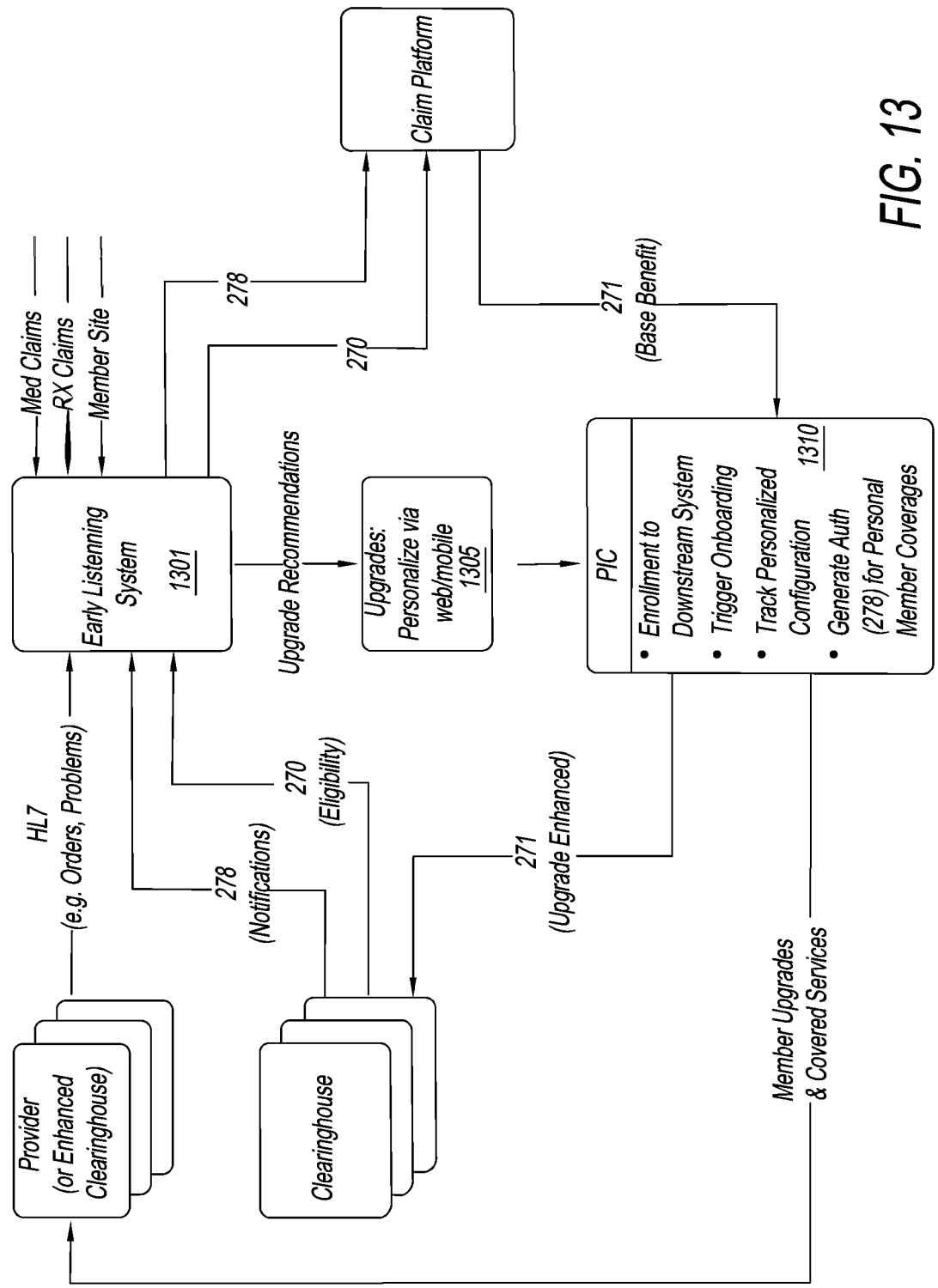
FIG. 13 shows an exemplary architecture for the UDRCD.

FIG. 13 shows an exemplary architecture for the UDRCD. In FIG. 13, an embodiment of how a claim administration platform interoperates with an ELS to provide upgrade recommendations and facilitate upgrade enrollment is illustrated. In one implementation, the ELS 1301 obtains data such as medical claims, medical prescription claims, member site visit data (e.g., "Is it covered?" searches), HL7 data (e.g., orders, problems), X12 data (e.g., notifications, eligibility), and/or the like. The ELS may utilize such data to determine upgrade recommendations (e.g., add-ins that should be offered to plan members).

In one implementation, the ELS may provide the determined upgrade recommendations to an onboarding engine (OE) 1305. For example, the OE may facilitate offering upgrade recommendations to plan members via personalized web and/or mobile user interfaces.

In one implementation, add-in upgrades selected by plan members for enrollment may be provided to a personal insurance coordinator (PIC) component (e.g., an enrollment engine) 1310. For example, the PIC component may facilitate enrollment to downstream systems, triggering onboarding, tracking personalized configuration, generating authorization (e.g., X12 278 formatted data files) for personal member coverages, and/or the like.

Figure 14:
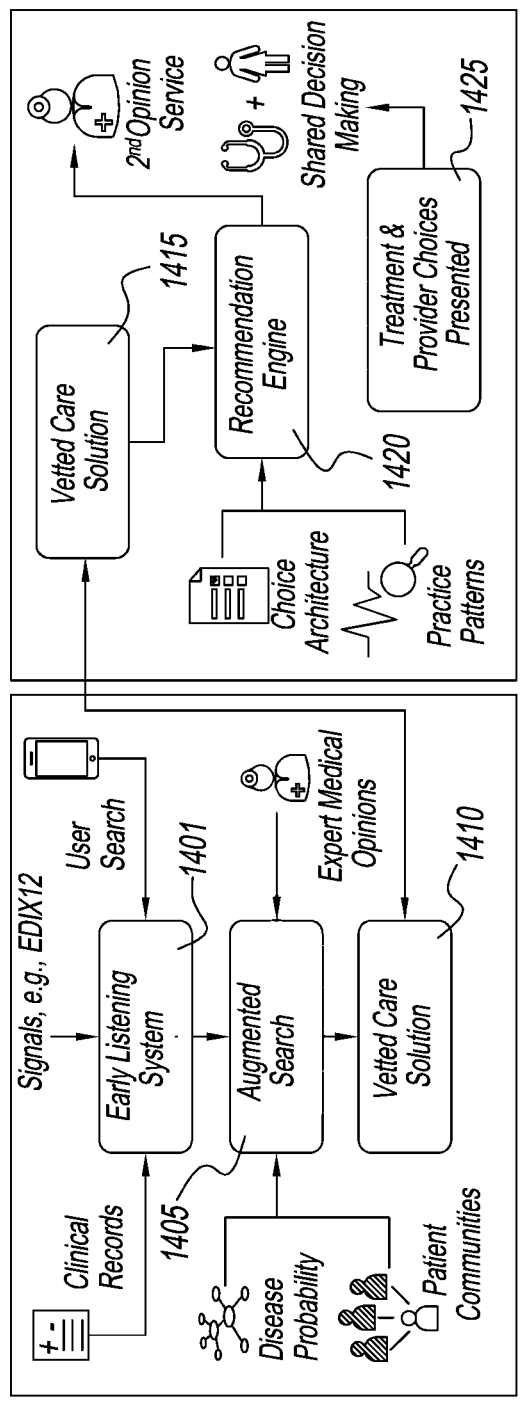
FIG. 14 shows an exemplary architecture for the UDRCD.

FIG. 14 shows an exemplary architecture for the UDRCD. In FIG. 14, an embodiment of how an ELS facilitates presenting treatment and/or provider choices (e.g., associated with a medical condition) to plan members is illustrated. For example, the ELS may facilitate presenting condition-specific coverage information (e.g., existing coverage, available upgrades).

In one implementation, the ELS 1401 obtains event signals from a variety of sources (e.g., clinical records, X12 data files, user searches, provider actions (e.g., prior authorizations, benefit checks, eligibility checks)), and/or the like. The ELS may utilize machine learning processes (e.g., as provided by the data science component) to conduct an augmented search 1405 based on the obtained event signals (e.g., that indicate a medical condition) to determine a vetted care solution 1410 that is appropriate for the condition. In one implementation, the obtained event signal data associated with a plan member, disease progression probability data, patient communities data (e.g., data regarding care efficacy), expert medical opinions data (e.g., data regarding care efficacy), and/or the like may be analyzed (e.g., using a neural network) to determine a set of vetted care solutions (e.g., a set of procedures determined to offer high value care based on medical evidence) that are likely to be utilized by the plan member. For example, the plan member may be likely to choose to use one of the vetted care solutions from the set.

In one implementation, the determined vetted care solutions data 1415 may be provided to a recommendation engine 1420. The recommendation engine may utilize machine learning processes (e.g., as provided by the data science component) to determine treatment and/or provider choices 1425 to present to the plan member. In one implementation, the determined vetted care solutions data, choice architecture data (e.g., data regarding covered benefits available to the plan member), practice patterns (e.g., data regarding quality of care provided by various providers (e.g., located in locality associated with the plan member) with regard to the vetted care solutions), and/or the like may be analyzed (e.g., using a neural network) to determine a set of treatment and/or provider choices (e.g., that best fit the plan member's ODHI plan) to present to the plan member. For example, the plan member may be informed (e.g., via personalized web and/or mobile user interfaces) regarding likely upcoming care, and, if a treatment choice is not covered by the plan member's ODHI plan, the plan member may be prompted to upgrade by purchasing a corresponding add-in (e.g., for a procedure to be performed at one of the provider choices). In another example, a second opinion service regarding likely upcoming care may be offered to the plan member.

Figure 65:
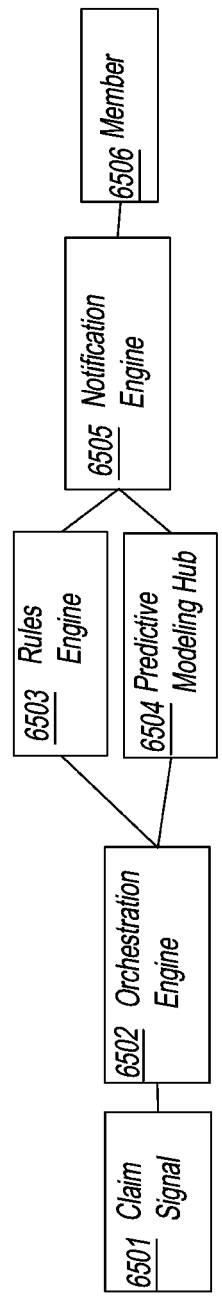
FIG. 65 shows an exemplary architecture for the UDRCD.

FIG. 65 shows an exemplary architecture for the UDRCD. In FIG. 65, an embodiment of how an ELS facilitates sending members notifications of services is illustrated. These notifications may include coverage, cost, and quality information for the relevant services, service providers, and/or locations. In one embodiment, an active system may be utilized which receives signals and runs rules and probabilistic models in real-time to send members notifications of services.

A signal 6501 (e.g., a claim, browsing behavior, search behavior, member phone calls to service, provider phone calls to service (e.g., prior authorizations, eligibility checks, benefit checks)) comes in and is processed through an Orchestration Engine 6502. The engine converts the claim into an analytics ready format. Various clients (e.g., a rules engine, a predictive modeling hub) may subscribe to the real-time claims stream allowing for fast paralleled independent processing. In one implementation, Orchestration Engines may be utilized for scaling.

A Rules Engine 6503 runs deterministic rules on the transaction and a Predictive Modeling Hub 6504 runs probabilistic rules on the claims. In one implementation, the Rules Engine and the Predictive Modeling Hub can be combined in the same process. The Predictive Modeling Hub records a history of signals and computes probabilities based on the current signal and the set of historical signals for that member. The Predictive Modeling Hub is designed to minimize the calculation of model features and calculate features once for many models.

The Rules Engine and/or the Predictive Modeling Hub publish output to a Notification Engine 6505. The Notification Engine runs final notification rules and performs appropriate mode of member outreach. The Notification Engine may store member preferences and historical outreach to tune quantity of individual notifications.

The Rules Engine and the Predictive Modeling Hub may be scaled independently of each other and may publish to an Orchestration Engine prior to the running of the Notification Engine which communicates to a member 6506.

Information may be provided to increase options presented for members. In one implementation, services contextual to members' historical signals may be recommended. Member outreach may also result in members seeing their options earlier than traditional approaches and thus may provide them service options prior to receiving potentially unneeded services. The Rules Engine and probabilistic models can be tuned to focus efforts on specific members who are more likely to require healthcare services in the future.

In some implementations, the ELS allows for scaling to additional signal types beyond medical and pharmacy claims (e.g., member website interactions, other member electronic healthcare transactions). Using members' historical signals increases the accuracy of the prediction of need of healthcare services.

Figure 15:
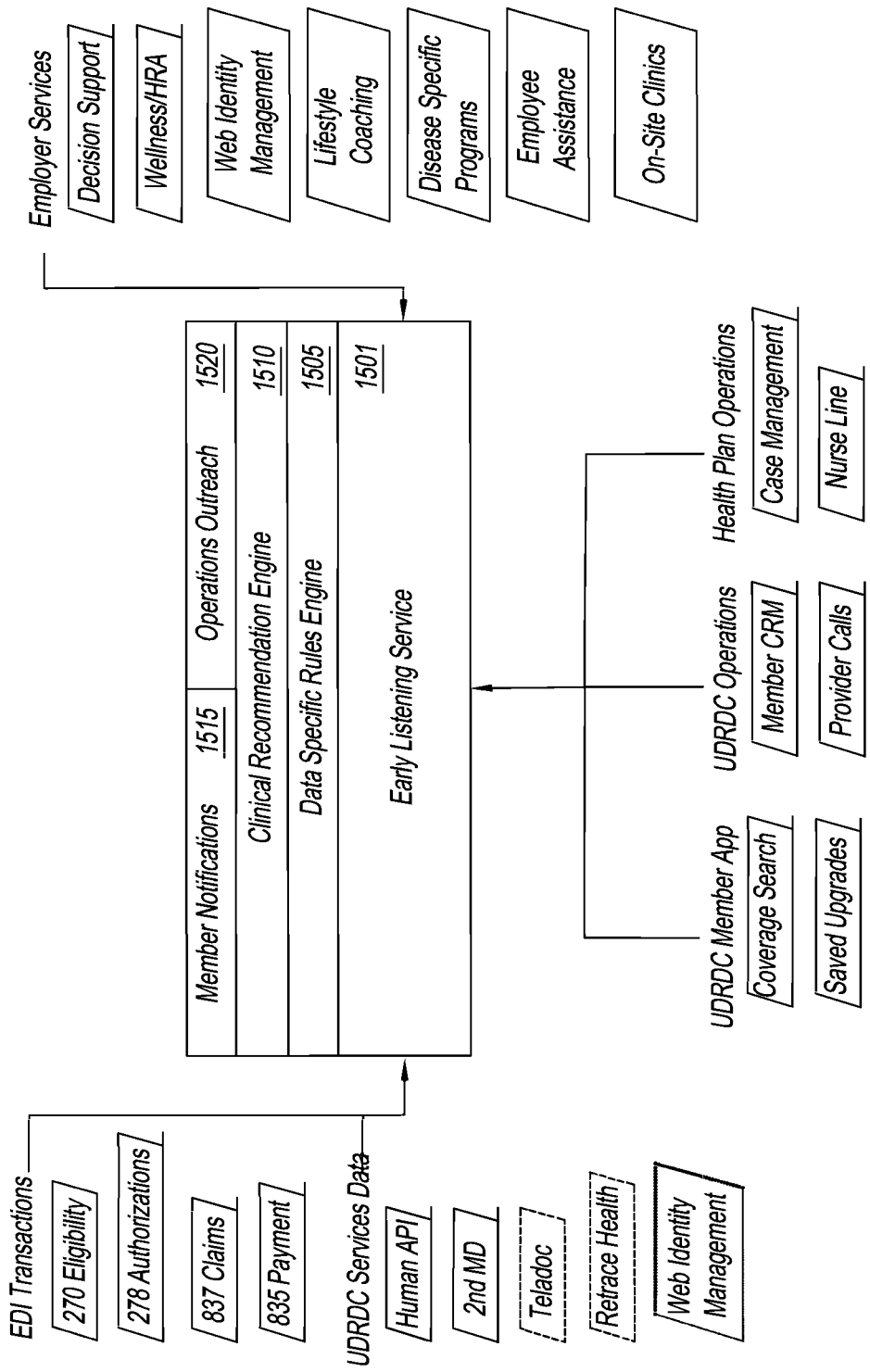
FIG. 15 shows an exemplary architecture for the UDRCD.

FIG. 15 shows an exemplary architecture for the UDRCD. In FIG. 15, alternative embodiments of how an ELS facilitates presenting treatment and/or provider choices to plan members are illustrated. The ELS 1501 obtains event signals from a variety of sources, such as EDI (e.g., X12) transactions (e.g., eligibility, authorizations, claims, payments), UDRCD services data (e.g., human API, $2^{nd}$ MD, teladoc, retrace health, web identity management), UDRCD member app (e.g., coverage search, saved upgrades), UDRCD operations (e.g., member CRM, provider calls), health plan operations (e.g., case management, nurse line), employer services (e.g., decision support, wellness/HRA, engagement platforms, lifestyle coaching, disease specific programs, employee assistance, on-site clinics), and/or the like. A data specific rules engine 1505 may be utilized to determine how data from the various sources should be treated (e.g., parsed, analyzed using a rules-based system, utilized in machine learning processes) to determine relevant vetted care solutions. A recommendation engine 1510 may determine relevant treatment and/or provider choices to present to plan members. A member notifications component 1515 may facilitate notifying (e.g., via personalized web and/or mobile user interfaces) plan members regarding add-in upgrade recommendations. An operations outreach component 1520 may facilitate notifying plan members who do not upgrade regarding the add-in upgrade recommendations via alternative notification channels (e.g., via email, text message, mail, phone).

Figure 66:
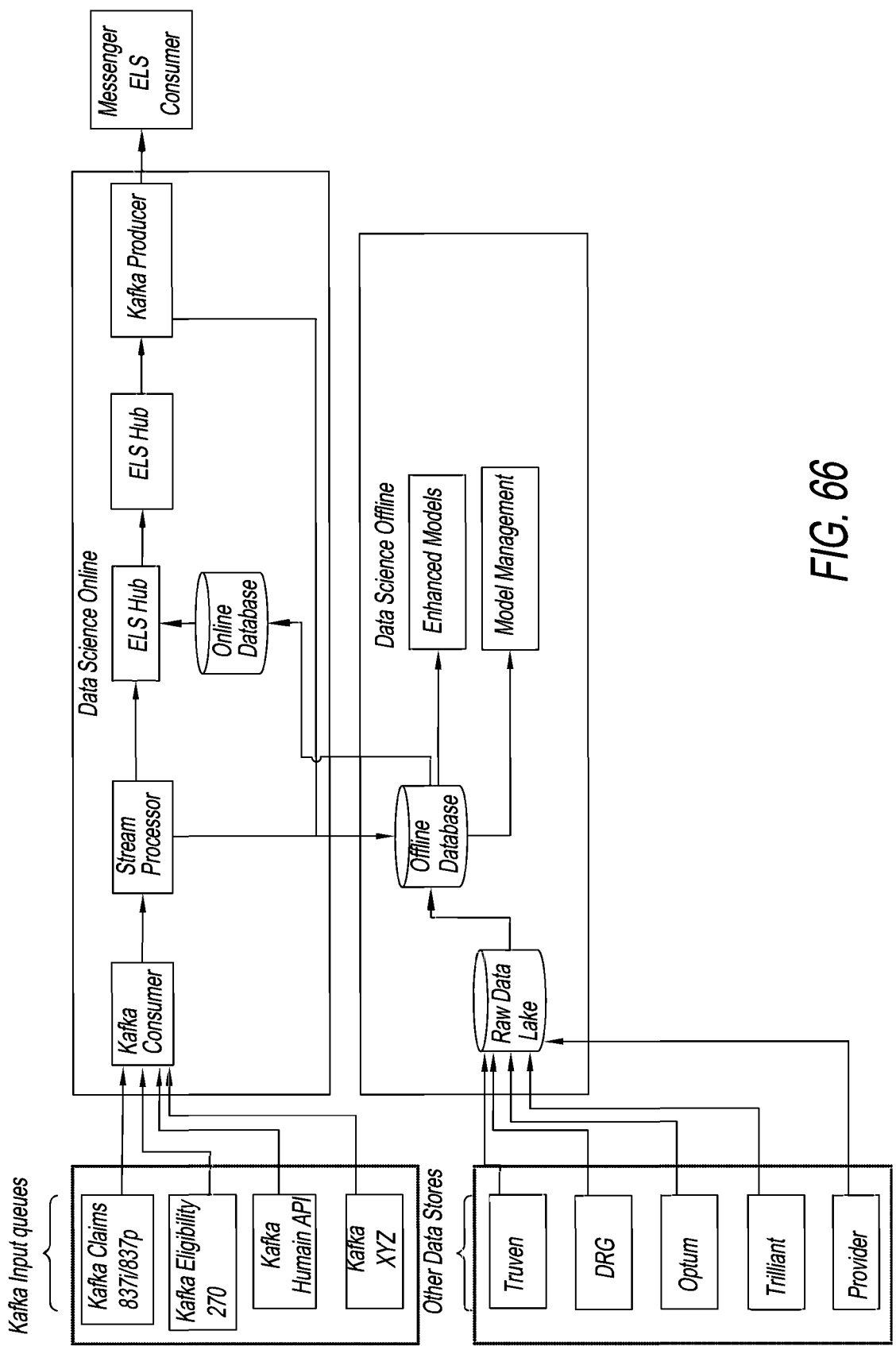
FIG. 66 shows an exemplary architecture for the UDRCD.

FIG. 66 shows an exemplary architecture for the UDRCD. In FIG. 66, alternative embodiments of how an ELS facilitates presenting treatment and/or provider choices to plan members are illustrated. In one implementation, data from Kafka input queues and/or other data stores may be provided to data science offline to facilitate probabilistic model management and/or to generate enhanced models for the ELS. Signal data (e.g., from Kafka input queues) may be utilized along with the probabilistic models to generate notifications for members.

Figure 67:
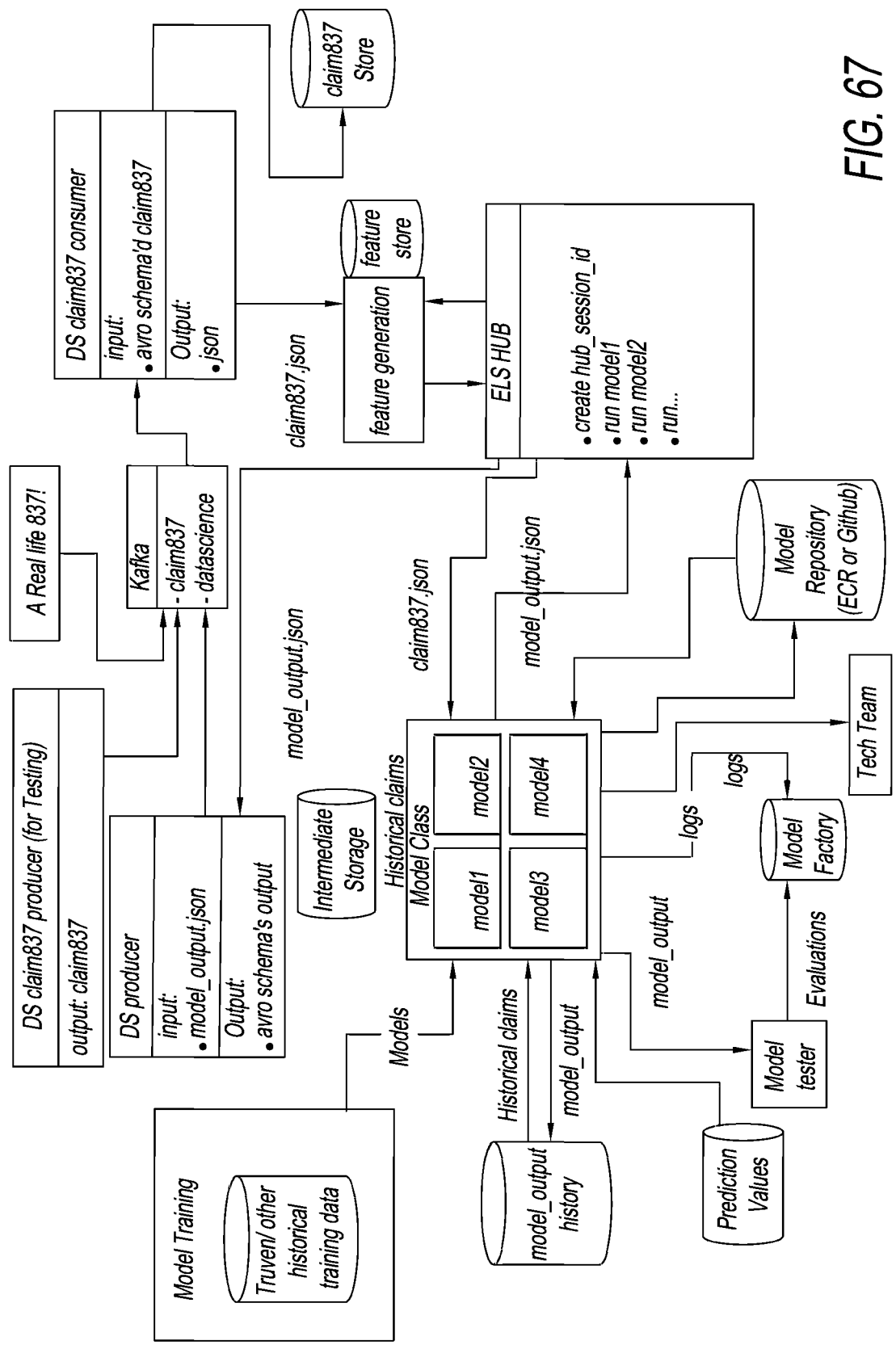
FIG. 67 shows an exemplary architecture for the UDRCD.

FIG. 67 shows an exemplary architecture for the UDRCD. In FIG. 67, alternative embodiments of how predictive models for an ELS may be generated are illustrated. In one implementation, model training data (e.g., Truven and/or other historical training data), historical and/or real time claims data, and/or the like may be utilized to generate a plurality of probabilistic models.

Figure 16:
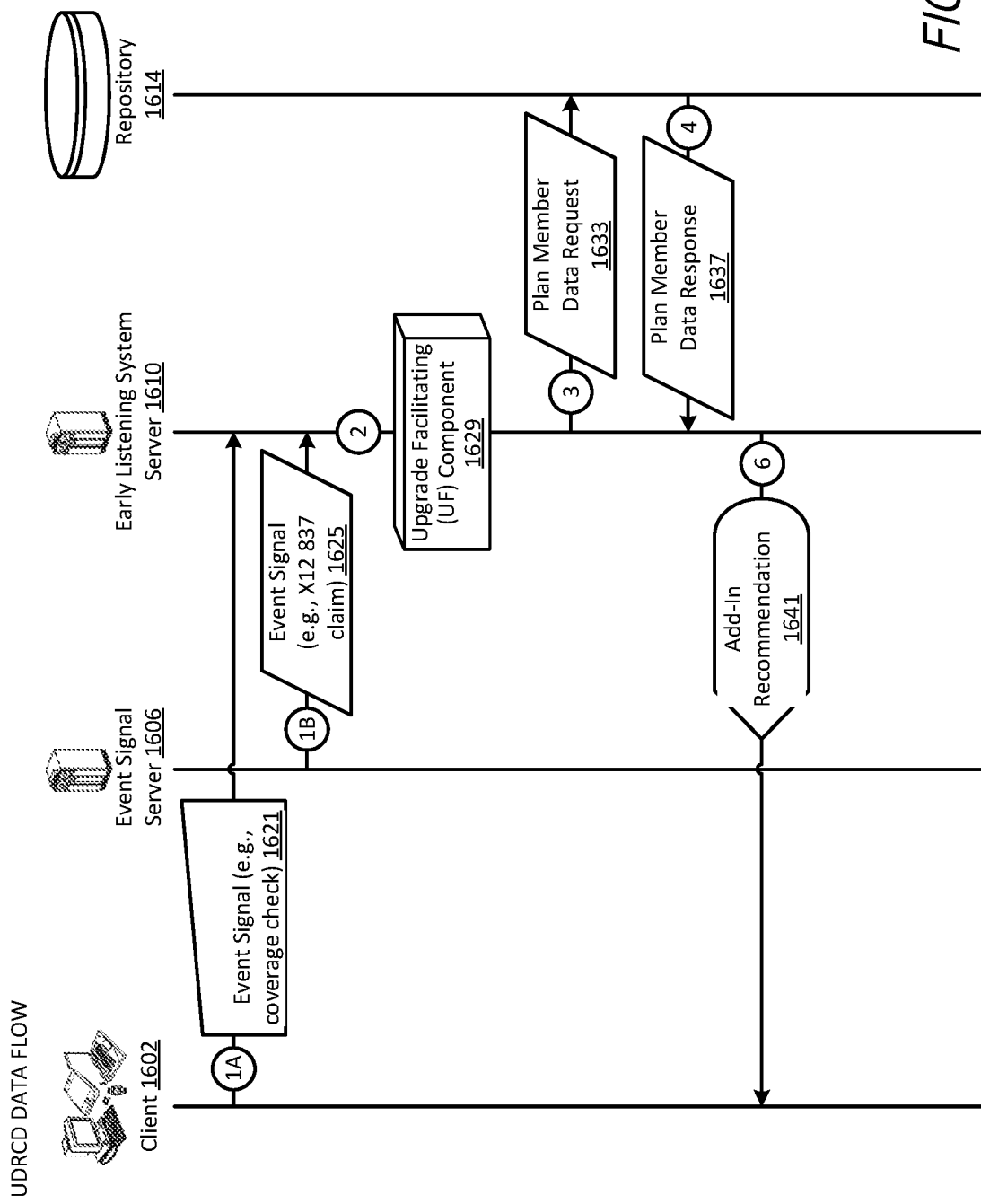
FIG. 16 shows a datagraph diagram illustrating embodiments of a data flow for the UDRCD.

FIG. 16 shows a datagraph diagram illustrating embodiments of a data flow for the UDRCD. In FIG. 16, a client 1602 may send an event signal 1621 to an early listening system (ELS) server 1610. For example, the event signal may be a plan member's "Is it covered?" search for a service, condition, specialty, treatment (e.g., procedure), drug, and/or the like. In one embodiment, the client may provide the following example event signal, substantially in the form of a HTTP(S) POST message including XML-formatted data, as provided below:

POST/search_request.php HTTP/1.1
Host: www.server.com
Content-Type: Application/XML
Content-Length: 667
<?XML version="1.0" encoding="UTF-8"?>
<search_request>

```
    <user_accounts_details>
        <username>IDuser1</username>
        . . .
    </user_accounts_details>
    <search_query>ear infection</search_query>
</search_request>
```

An event signal server 1606 (e.g., any server or component that sends captured data) may send an event signal 1625 to the ELS server. For example, the event signal may be an X12 837 health care claim. Accordingly, the event signal server may provide an X12 837 formatted data file associated with the plan member.

It is to be understood that the ELS server may obtain one or more event signals associated with the plan member. For example, the ELS server may either obtain the event signal from the client or obtain the event signal from the event signal server. In another example, the ELS server may both obtain the event signal from the client and obtain the event signal from the event signal server.

An upgrade facilitating (UF) component 1629 may utilize event signal data to facilitate determining add-in upgrade recommendations for the plan member. See FIG. 17 for additional details regarding the UF component.

The ELS server may send a plan member data request 1633 to a repository 1614 to obtain plan member data (e.g., the plan member's profile, the plan member's clinical data, the plan member's ODHI plan configuration). For example, the repository may include a members database 7119*k*. In one implementation, the plan member data request may include data such as a request identifier, a plan member identifier, requested data specification, and/or the like. In one embodiment, the ELS server may provide the following example plan member data request, substantially in the form of a HTTP(S) POST message including XML-formatted data, as provided below:

```
POST/plan_member_data_request.php HTTP/1.1
Host: www.server.com
Content-Type: Application/XML
Content-Length: 667
<?XML version="1.0" encoding="UTF-8"?>
<plan_member_data_request>
    <request_identifier>ID_request_3</request_identifier>
    <user_name>ID_user1</user_name>
    <requested_data>
        member profile, member clinical data, member plan
            configuration
    </requested_data>
</plan_member_data_request>
```

The repository may send a plan member data response 1637 to the ELS server to provide the ELS server with the requested plan member data. In one implementation, the plan member data response may include data such as a response identifier, the requested plan member data, and/or the like. In one embodiment, the repository may provide the following example plan member data response, substantially in the form of a HTTP(S) POST message including XML-formatted data, as provided below:

```
POST/plan_member_data_response.php HTTP/1.1
Host: www.server.com
Content-Type: Application/XML
Content-Length: 667
<?XML version="1.0" encoding="UTF-8"?>
<plan_member_data_response>
    <response_identifier>ID_response_3</response_identifier>
    <requested_data>
        <profile>profile data (e.g., address, preferences)</profile>
        <clinical_data>
            clinical data (e.g., electronic health records,
                claims data)
        </clinical_data>
        <plan_configuration>
            plan configuration data (e.g., covered atomized
                conditions and/or
            procedures, purchased add-ins, add-ins available
                as upgrades)
        </plan_configuration>
    </requested_data>
</plan_member_data_response>
```

The ELS server may send an add-in recommendation 1641 to the client to inform the plan member (e.g., via a website, application (e.g., a mobile app), email, text message, and/or the like) regarding add-ins that are likely to be useful to the plan member (e.g., add-ins that may lower the cost of likely upcoming care to the plan member) and/or to facilitate purchasing upgrades for such add-ins.

Figure 17:
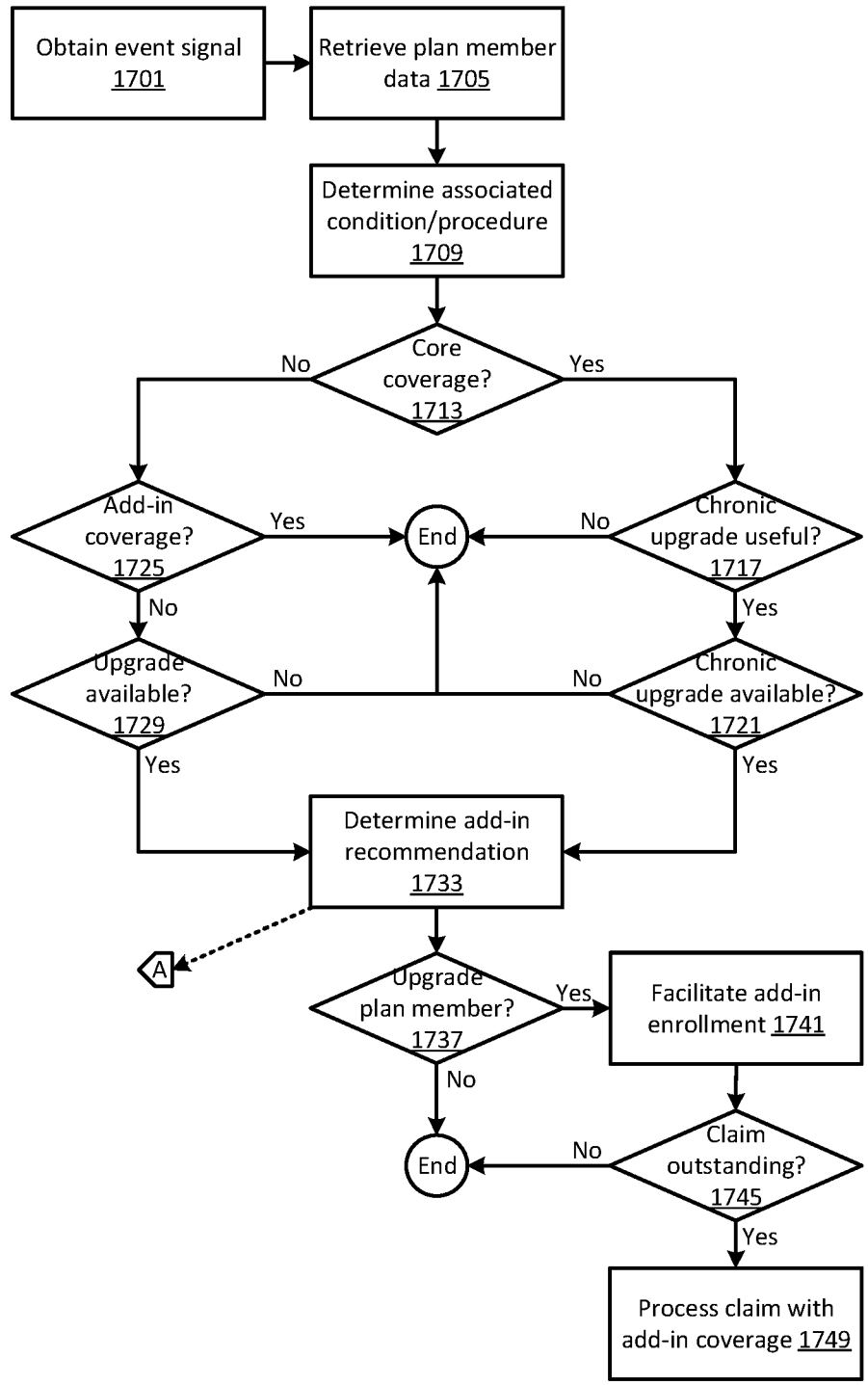
FIG. 17 shows a logic flow diagram illustrating embodiments of an upgrade facilitating (UF) component for the UDRCD.

FIG. 17 shows a logic flow diagram illustrating embodiments of an upgrade facilitating (UF) component for the UDRCD. In FIG. 17, an event signal may be obtained at 1701. For example, the event signal may be obtained from any of the variety of sources from which an ELS may obtain event signals. In another example, a plurality of event signals may be obtained (e.g., from different sources).

Plan member data of a plan member (e.g., of an ODHI plan) may be retrieved at 1705. In one implementation, the plan member data may be retrieved by sending a plan member data request to a repository. For example, member profile data, member clinical data, plan configuration of the plan member's ODHI plan, member state, and/or the like may be retrieved.

A condition and/or a procedure associated with the event signal may be determined at 1709. In one embodiment, event signal data from the one or more obtained event signals, the retrieved plan member data (e.g., the retrieved member clinical data, such as the plan member's health and/or treatment history), modeling data (e.g., disease progression probabilities), and/or the like may be analyzed using machine learning processes (e.g., as provided by the data science component) to determine the associated condition and/or procedure. In one implementation, a condition may be determined. For example, such data may be analyzed (e.g., via a neural network) to determine a condition (e.g., asthma) that the user is likely to have. In another example, such data may be analyzed (e.g., via a neural network) to determine a vetted care solution (e.g., a set of procedures to treat knee pain) for the condition. In another implementation, a procedure may be determined. For example, such data may be analyzed (e.g., via a rules engine) to determine a procedure (e.g., knee replacement) that the user is likely to utilize.

A determination may be made at 1713 whether the determined condition and/or procedure is covered by the ODHI plan's core coverage (e.g., based on the plan configuration). For example, it may be determined that treatment for asthma is covered by the core coverage. In another example, it may be determined that knee replacement is not covered by the core coverage.

If the determined condition and/or procedure is covered by the core coverage, a determination may be made at 1717 whether a chronic upgrade (e.g., a chronic condition add-in) may be useful for the plan member. For example, the chronic condition add-in may lower copay costs associated with treatment for the chronic condition. In one implementation, if the chronic condition add-in exists and the user is not already enrolled into the chronic condition add-in, the chronic condition add-in may be useful. In another implementation, the plan member's profile data (e.g., preferences) may be analyzed to determine whether the chronic condition add-in may be useful (e.g., not useful if the user previously declined to purchase the chronic condition add-in). If it is determined that the chronic upgrade may be useful, a determination may be made at 1721 whether the chronic upgrade is available to the plan member. In one implementation, the plan configuration may be analyzed to make this determination (e.g., based on how the ODHI plan was configured by a plan sponsor).

If the determined condition and/or procedure is not covered by the core coverage, a determination may be made at 1725 whether the determined condition and/or procedure is covered by the ODHI plan's add-in coverage purchased by the plan member (e.g., based on the plan configuration). If the determined condition and/or procedure is not covered by the add-in coverage, a determination may be made at 1729 whether an upgrade (e.g., a procedure add-in) is available to the plan member. In one implementation, the plan configuration may be analyzed to make this determination (e.g., based on whether the procedure add-in exists, based on how the ODHI plan was configured by the plan sponsor). In another implementation, this determination may be made based on whether the procedure is considered useful (e.g., whether scientific evidence supports claims of the procedure's value). For example, if the procedure is not considered useful, the associated procedure add-in may not be recommended (e.g., the plan member could still purchase the upgrade, but the ELS would not provide a recommendation).

If the chronic upgrade or the upgrade is available to the plan member, an add-in recommendation may be determined at 1733. In one embodiment, available add-ins, the plan member data, ACG data, and/or the like may be analyzed using machine learning processes (e.g., as provided by the data science component) to determine the add-in recommendation. In one implementation, a condition add-in upgrade may be available, and the condition add-in may be determined as the add-in recommendation for the plan member (e.g., see screen 820). In another implementation, multiple procedures and/or providers may be available to treat the condition, and the relevant (e.g., based on care efficacy, based on geographic proximity of providers to the plan member's location) add-ins (e.g., for relevant procedures at relevant providers) may be determined as the add-in recommendation for the plan member (e.g., see screen 920). In another implementation, a procedure add-in upgrade may be available, and the procedure add-in may be determined as the add-in recommendation for the plan member. In another implementation, multiple providers may be available to perform the procedure, and the relevant (e.g., based on providers' quality, based on geographic proximity of providers to the plan member's location) add-ins (e.g., for relevant providers) may be determined as the add-in recommendation for the plan member (e.g., see screen 910). In one embodiment, an add-in recommendation may be determined using an add-in recommendation determining (ARD) component. See FIG. 36 for additional details regarding the ARD component.

A determination may be made at 1737 whether the plan member should be upgraded. In one implementation, this determination may be made based on whether the plan member chose to purchase one of the recommended add-ins. In another implementation, this determination may be made based on whether the plan sponsor specifies that the plan member should be auto-enrolled into add-ins (e.g., that lower costs for the plan member).

If the plan member should be upgraded, add-in enrollment into the selected (e.g., by the plan member, by the plan sponsor) add-in may be facilitated at 1741. In one implementation, enrollment data associated with the selected add-in may be provided to an employer benefit administrator system of the plan sponsor to facilitate enrolling the plan member into the selected add-in, setting up payroll deductions to pay for the selected add-in, and/or the like.

A determination may be made at 1745 whether there is an outstanding claim associated with the plan member that benefits (e.g., results in lower cost for the plan member) from enrollment into the selected add-in. For example, the outstanding claim may be the obtained event signal (e.g., a claim for a procedure not covered by the plan member's ODHI plan). If there is an outstanding claim, the outstanding claim may be processed with add-in coverage at 1749. In one implementation, a previously not covered procedure (e.g., not covered at the time the procedure was performed) may be processed as covered by the add-in coverage (e.g., the plan member is responsible for paying a copay instead of for paying for the procedure). In another implementation, a copay amount associated with the outstanding claim may be reduced (e.g., based on a copay schedule associated with the selected add-in).

Figure 18:
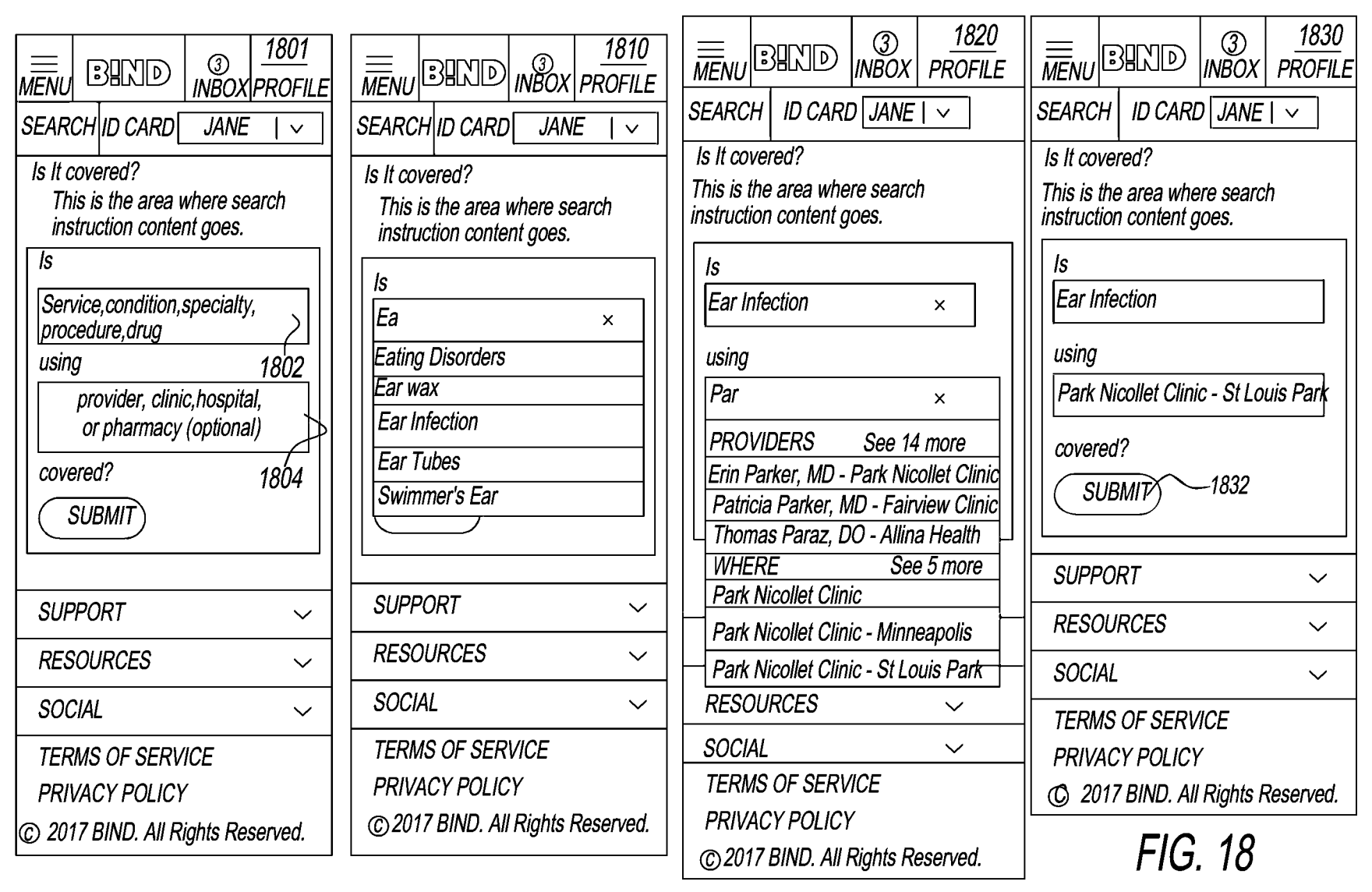

FIG. 18 shows a screenshot diagram illustrating embodiments of the UDRCD. In FIG. 18, an exemplary user interface (e.g., for a mobile device) for conducting an "Is it covered?" search is illustrated. In one embodiment, conducting an "Is it covered?" search may send an event signal (e.g., with details regarding the search query) to an ELS. Screen 1801 shows that a user may conduct a search to determine whether a service, condition, specialty, procedure, drug, and/or the like specified via a GUI widget 1802 is covered using (e.g., optional) a person provider (e.g., a particular doctor), clinic, hospital, pharmacy, and/or the like specified via a GUI widget 1804 for a plan member (e.g., of an ODHI plan) specified via a GUI widget 1806. Screens 1810 and 1820 show that autocomplete suggestions may be available for GUI widget 1802 and/or GUI widget 1804, respectively. Screen 1830 shows that the user may utilize a submit button 1832 to submit the search query (e.g., Is Ear Infection using Park Nicollet Clinic—St Louis Park covered for plan member Jane).

Figure 19:
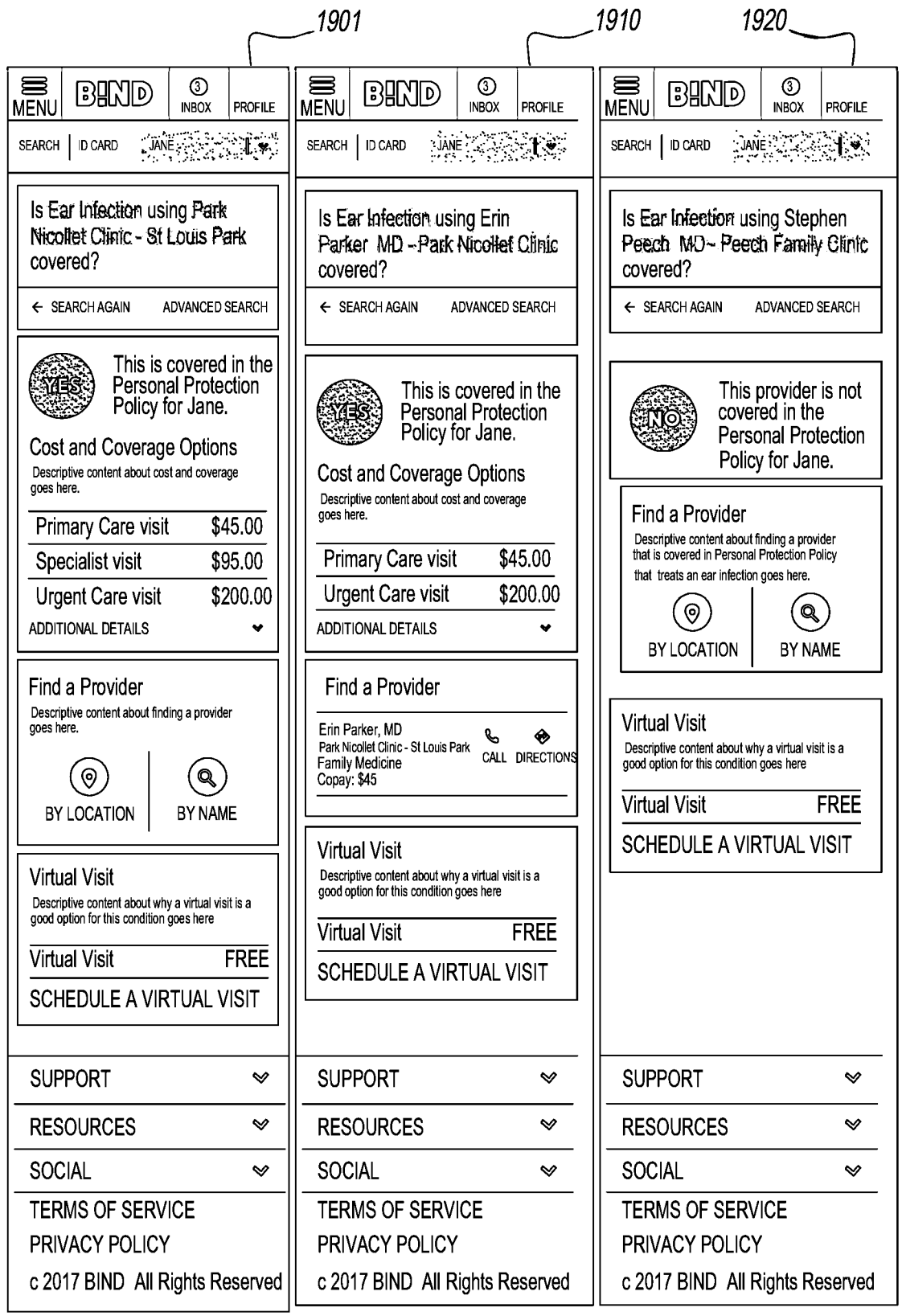
FIG. 19 shows a screenshot diagram illustrating embodiments of the UDRCD.

FIG. 19 shows a screenshot diagram illustrating embodiments of the UDRCD. In FIG. 19, an exemplary user interface (e.g., for a mobile device) for providing results for an "Is it covered?" search is illustrated. Screen 1901 shows results when a condition is covered at a clinic. For example, an indication that the condition is covered and information regarding cost and coverage options may be provided. Screen 1910 shows results when a condition is covered for a specific doctor at a clinic. For example, an indication that the condition is covered and information regarding cost and coverage options may be provided. Screen 1920 shows results when a condition is not covered for a specific doctor at a clinic. For example, an indication that the provider is not covered and a GUI widget 1922 that may be utilized to find a covered provider may be provided.

Figure 20:
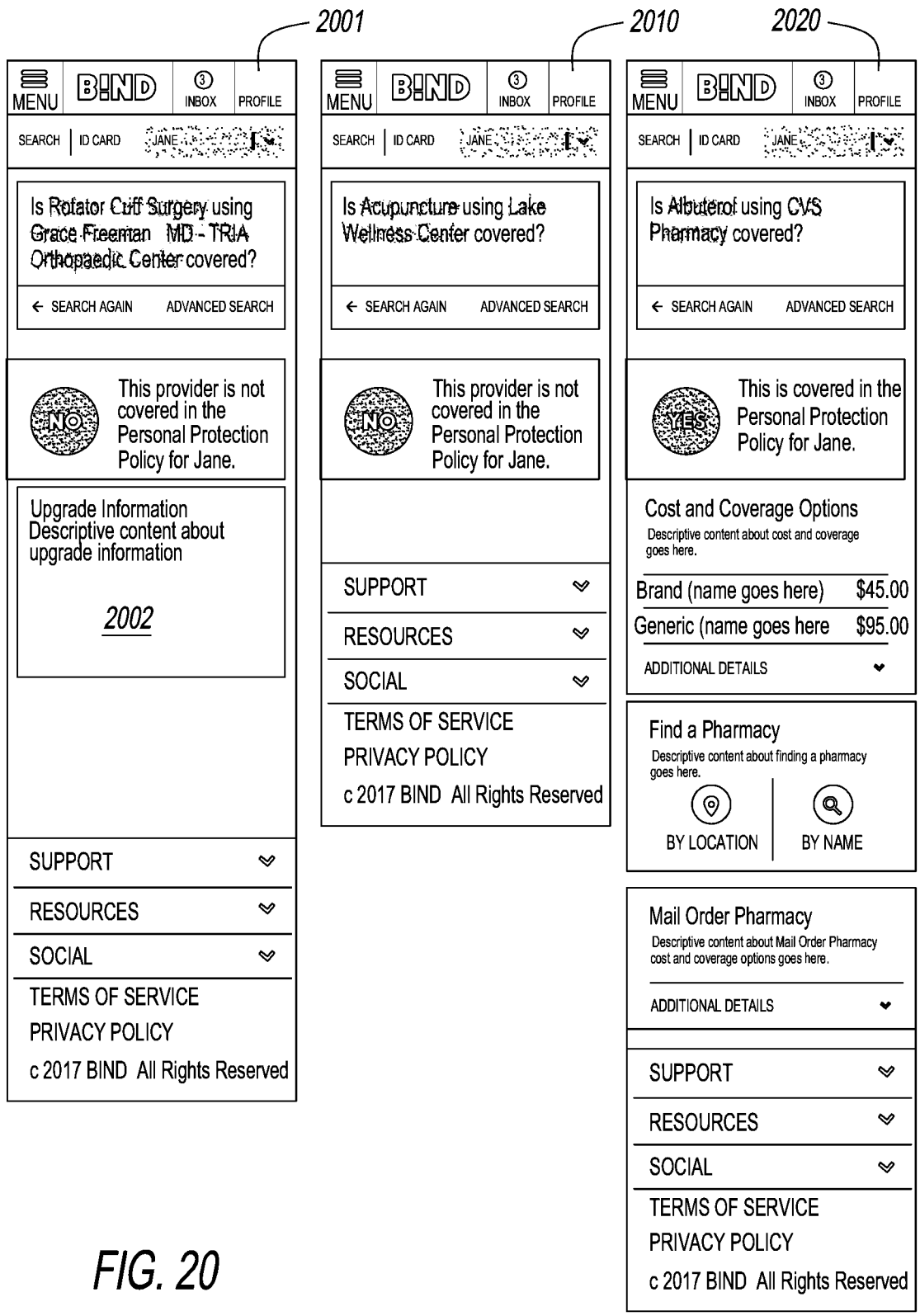
FIG. 20 shows a screenshot diagram illustrating embodiments of the UDRCD.

FIG. 20 shows a screenshot diagram illustrating embodiments of the UDRCD. In FIG. 20, an exemplary user interface (e.g., for a mobile device) for providing results for an "Is it covered?" search is illustrated. Screen 2001 shows results when a procedure is not covered. For example, an indication that the procedure is not covered and a GUI widget 2002 with an add-in recommendation (e.g., that facilitates purchasing an upgrade) may be provided. Screen 2010 shows results when a procedure is not covered. For example, an indication that the procedure is not covered may be provided, but, if the procedure is not considered useful, no add-in recommendation may be provided. Screen 2020 shows results when a drug is covered at a pharmacy chain. For example, an indication that the drug is covered and information regarding cost and coverage options may be provided.

Figure 21:
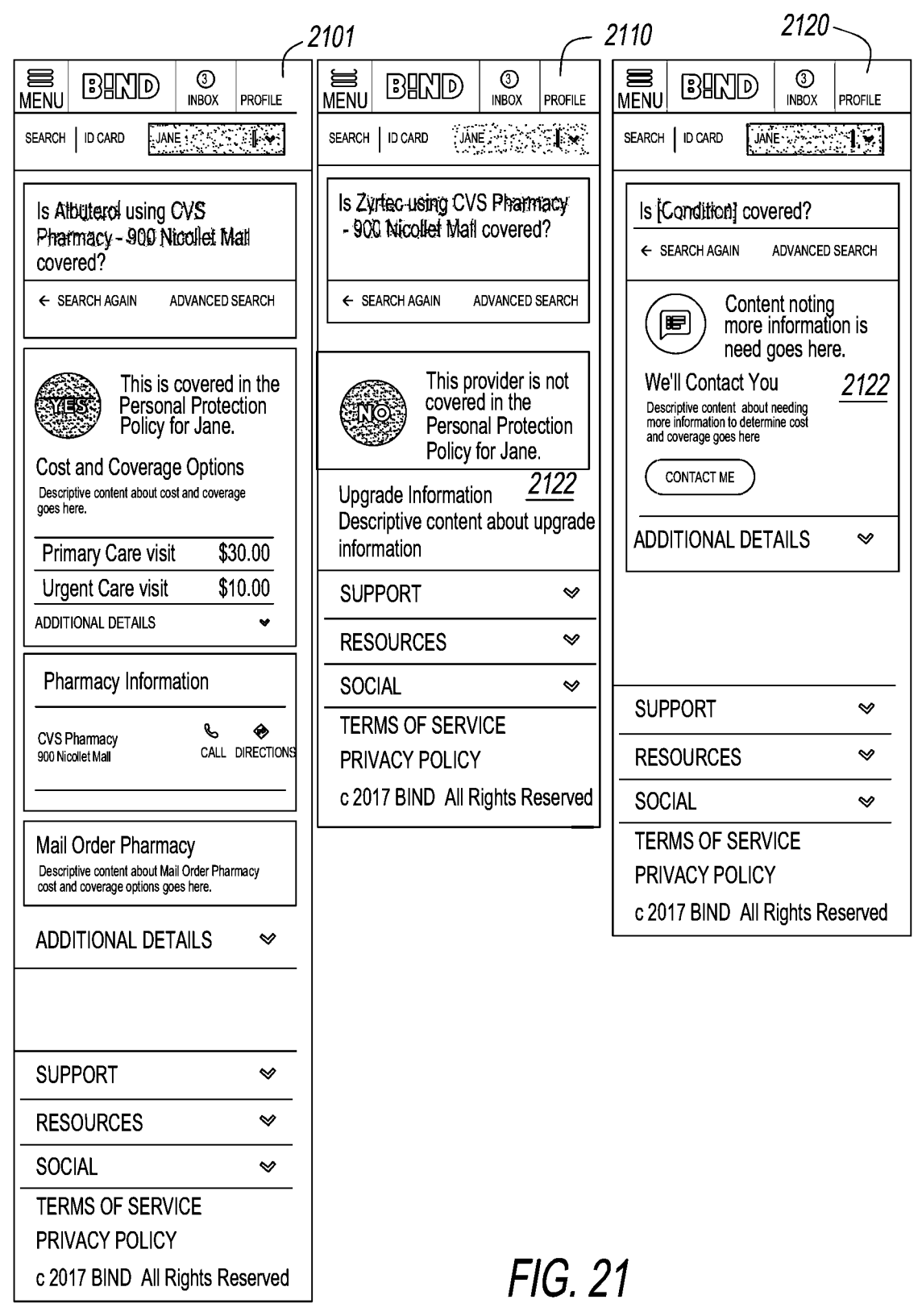

FIG. 21 shows a screenshot diagram illustrating embodiments of the UDRCD. In FIG. 21, an exemplary user interface (e.g., for a mobile device) for providing results for an "Is it covered?" search is illustrated. Screen 2101 shows results when a drug is covered at a pharmacy at a particular location. For example, an indication that the drug is covered and information regarding cost and coverage options may be provided. Screen 2110 shows results when a drug is not covered at a pharmacy at a particular location. For example, an indication that the drug is not covered and a GUI widget 2112 with an add-in recommendation (e.g., that facilitates purchasing an upgrade) may be provided. Screen 2120 shows results when more information is needed to make a coverage determination. For example, an indication that more information is needed and a GUI widget 2122 that facilitates obtaining such information may be provided.

Figure 22:
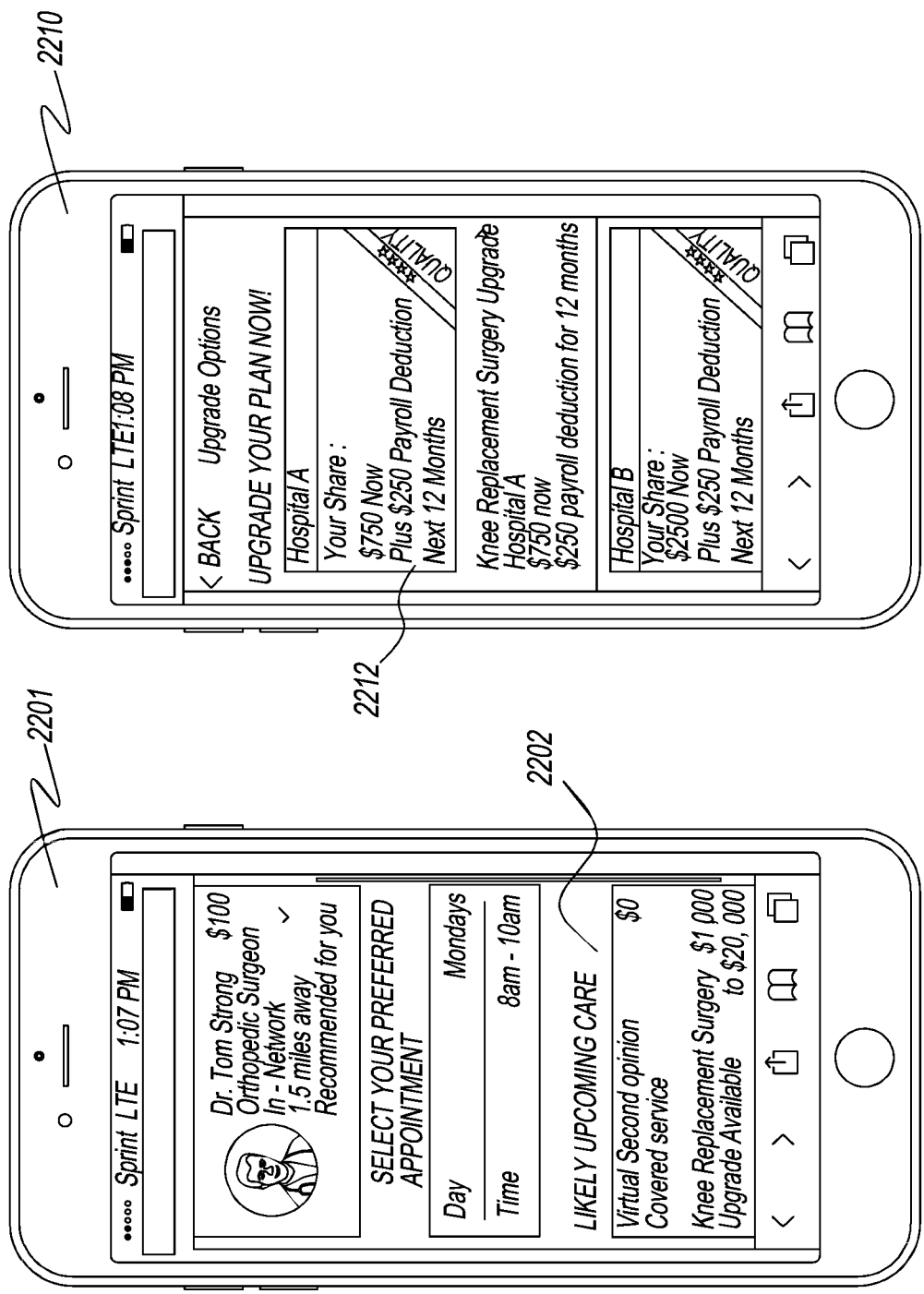
FIG. 22 shows a screenshot diagram illustrating embodiments of the UDRCD.

FIG. 22 shows a screenshot diagram illustrating embodiments of the UDRCD. In FIG. 22, an exemplary user interface (e.g., for a mobile device) is shown. Screen 2201 shows that a plan member scheduled an appointment with an orthopedic surgeon. In one embodiment, scheduling an appointment may send an event signal (e.g., with details regarding the appointment) to an ELS. The ELS may determine that knee replacement surgery is likely and may facilitate purchasing a knee replacement surgery add-in upgrade. For example, the plan member may click on a knee replacement surgery section of a likely upcoming care GUI widget 2202 to view available upgrade options. An upgrade options screen 2210 shows how a user may upgrade the user's ODHI plan by selecting an add-in. For example, the user may click on one of the available knee replacement surgery coverage add-in options 2212 or 2214 to upgrade.

FIG. 23 shows a screenshot diagram illustrating embodiments of the UDRCD. In FIG. 23, an alternative embodiment of a likely upcoming care GUI widget is illustrated. For example, this user interface may be utilized for a website.

Figure 24:
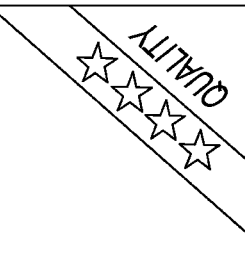
FIG. 24 shows a screenshot diagram illustrating embodiments of the UDRCD.

FIG. 24 shows a screenshot diagram illustrating embodiments of the UDRCD. In FIG. 24, an alternative embodiment of an upgrade options screen is illustrated. For example, this user interface may be utilized for a website.

Figure 68:
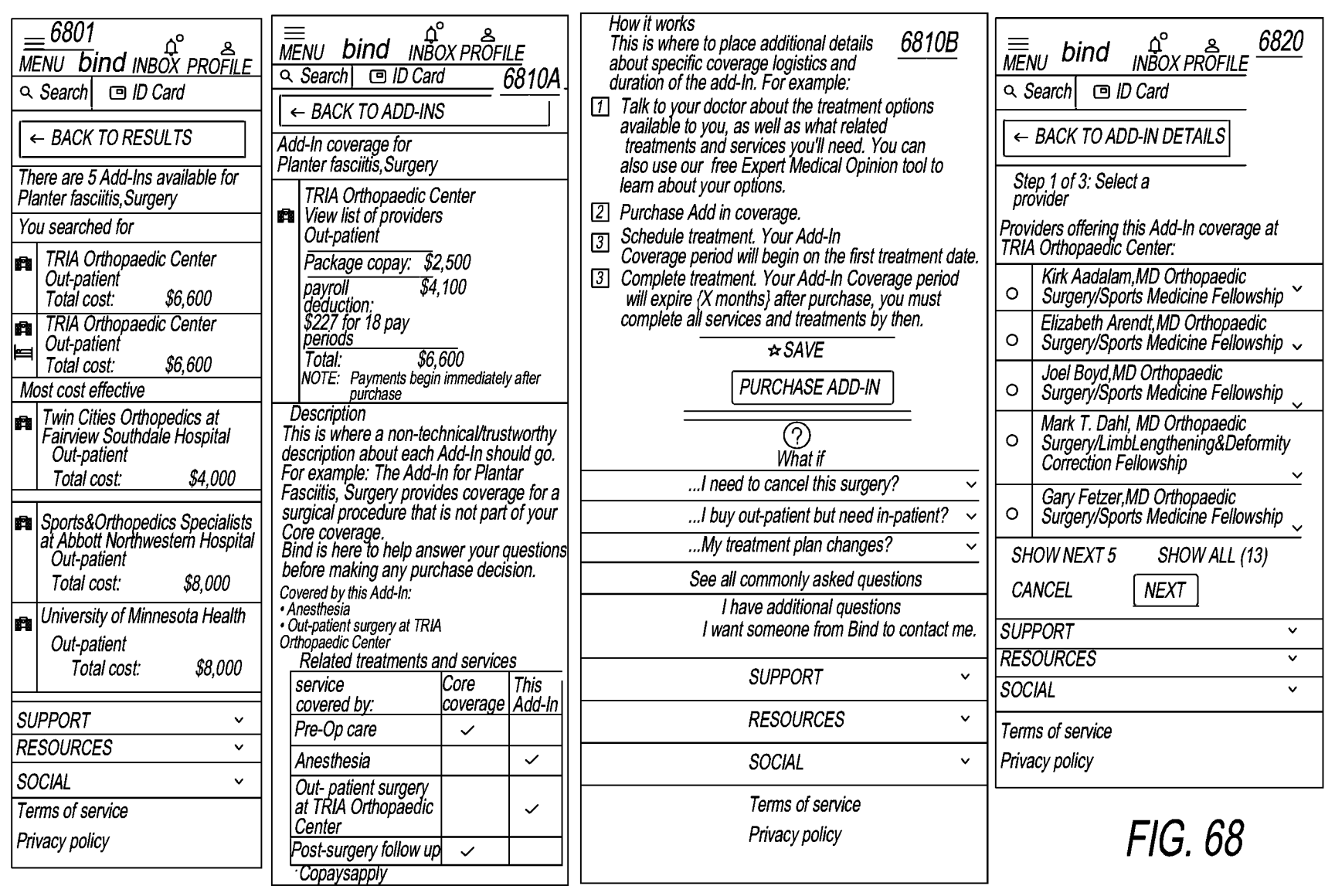
Figure 69:
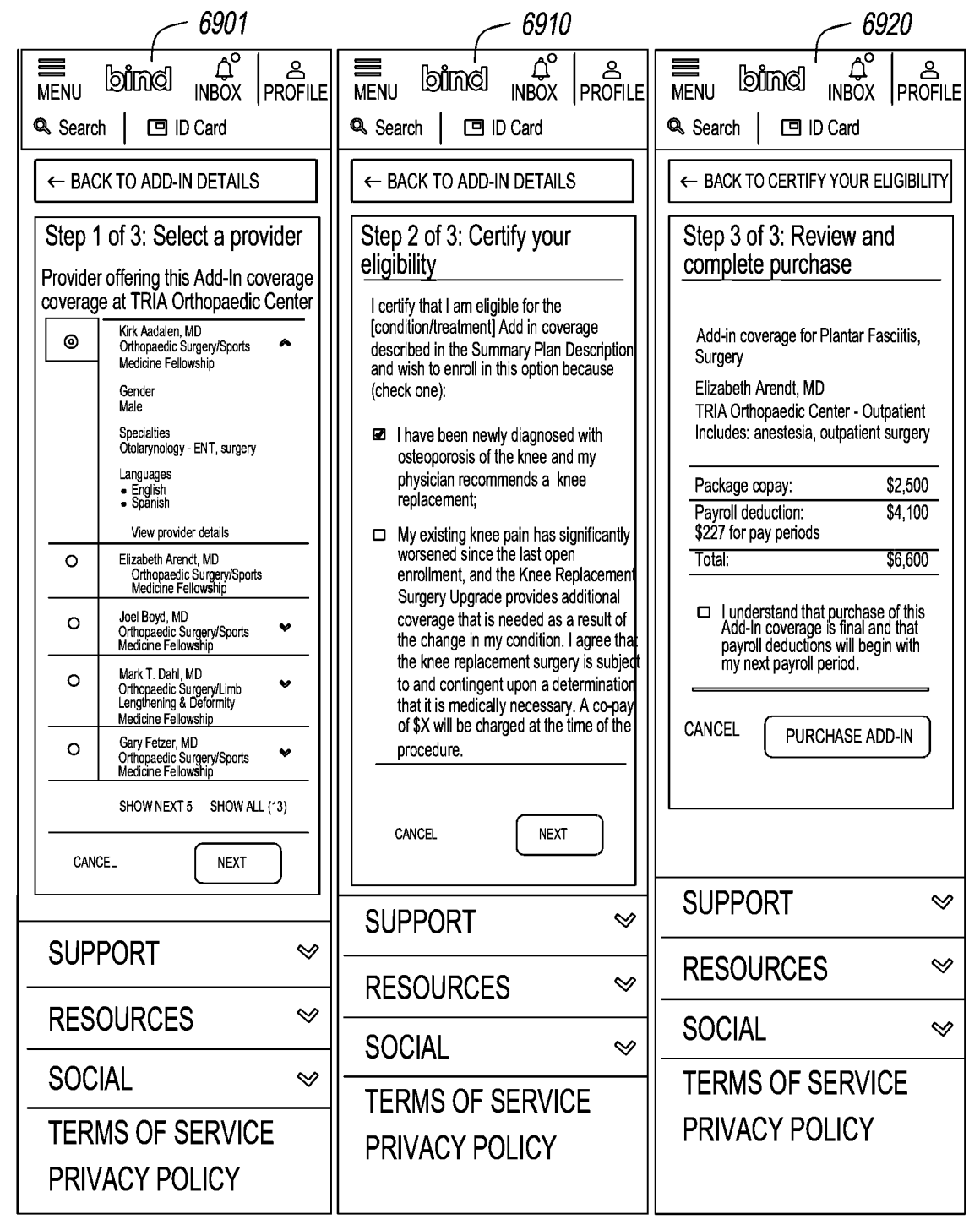
Figure 70:
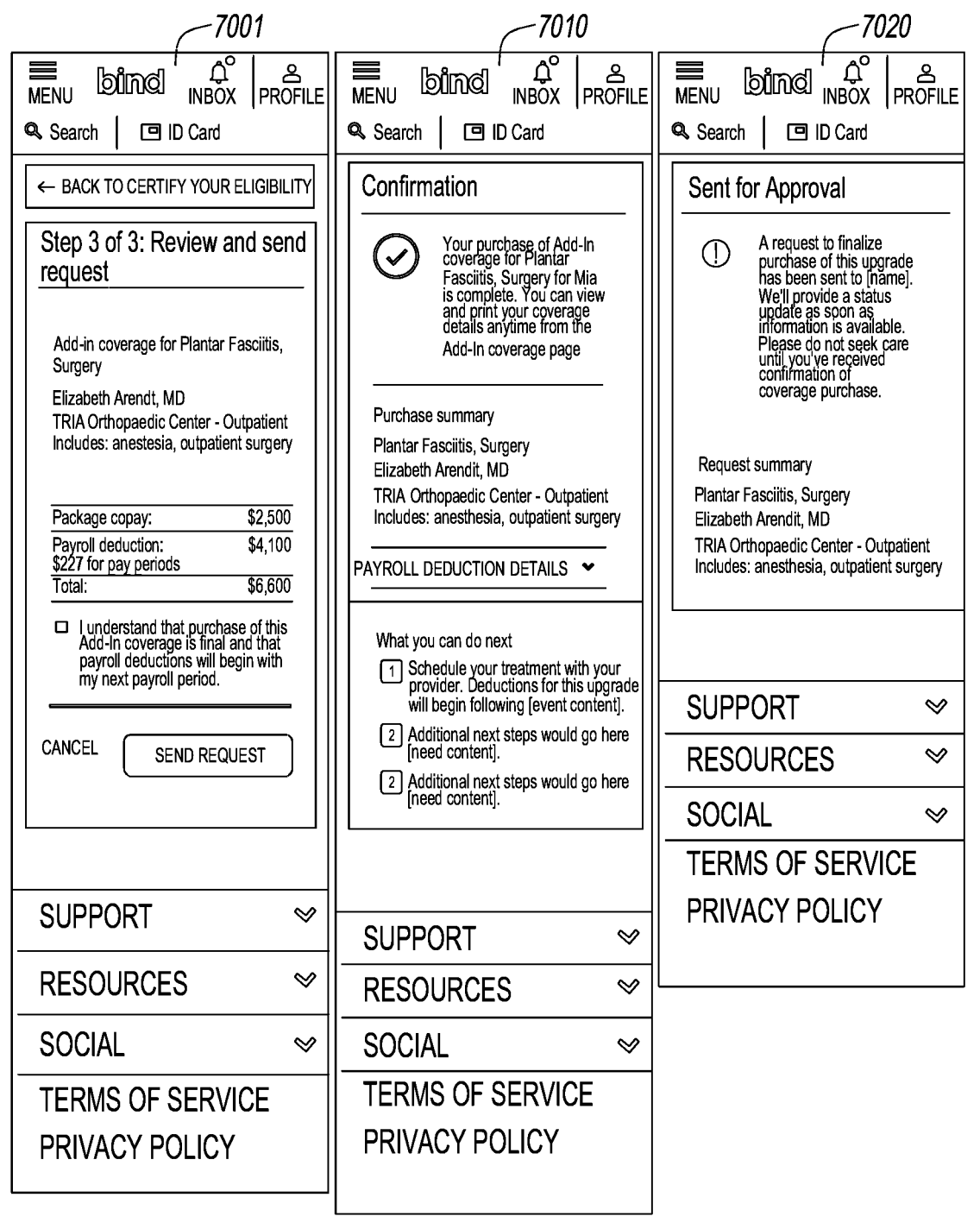

FIGS. 68, 69, 70 show screenshot diagrams illustrating embodiments of the UDRCD. In FIGS. 68, 69, 70, an exemplary user interface (e.g., for a mobile device) for providing results for an add-ins search and facilitating an add-in purchase is illustrated. Screen 6801 shows available add-ins in response to a search for Plantar Fasciitis Surgery at TRIA Orthopaedic Center. In one implementation, results for the search term (e.g., TRIA Orthopaedic Center out-patient and in-patient add-ins), results the most cost-effective option (e.g., Twin Cities Orthopedics out-patient), and other additional options may be shown. Screen 6810A-B shows a description for a user selected add-in (e.g., add-in for Plantar Fasciitis Surgery at TRIA Orthopaedic Center out-patient) and facilitates user purchase of the add-in (e.g., via the purchase add-in button). Screen 6820 shows that the user may be shown a list of providers at the selected facility. Screen 6901 shows that the user may select a desired provider from the list of providers. Screen 6910 shows that that user may be prompted to certify the user's eligibility. Screen 6920 shows that the user may be prompted to review and complete the add-in purchase. Screen 7001 shows that the user may send the add-in purchase request (e.g., via the send request button). Screen 7010 shows an add-in purchase confirmation may be shown to the user. Screen 7020 shows that the user may be informed that a request to finalize the add-in purchase was sent.

FIG. 25 shows a screenshot diagram illustrating embodiments of the UDRCD. In FIG. 25, a screenshot diagram of a provider's current performance for add-in coverages is shown. A current performance screen 2501 shows the provider's performance relative to other providers in the market (e.g., one of 86 rating regions defined for creating price ranges on add-ins amongst providers and locations) on an episodic basis for each of the add-in coverages they offer services for 2502. In one implementation, different rating region levels may be defined for different types of services to align the comparison groups for price variation based on the frequency with which the services are used, the differences in cost for an episode or encounter associated with that service and the willingness of a consumer to travel for a given type of service. The variance in episodic cost in the market is shown to the provider as a low (e.g. $10^{th}$ percentile) 2511 and high (e.g. $90^{th}$ percentile) 2512. The provider's own average episodic cost is then also showed to them 2613 and plotted graphically relative to the market 2520. The factors contributing to the provider's episodic cost relative to the rest of the country are a cost factor and a utilization factor 2531 that combine to comprise a price factor 2532 that is representative of the episodic cost.

In one implementation, the utilization may be constructed by pricing each occurrence of a code within an episode for a given add-in coverage based on the Centers for Medicare & Medicaid Services (CMS) fee schedule. The provider's average price per episode for each add-in coverage using the CMS fee schedule is then divided by the market average of other episodes of that add-in coverage also repriced based on the CMS fee schedule. With this implementation, the cost factor would then be calculated as the difference in average allowed amount for that provider against the market average that is not accounted for by the utilization factor.

In one implementation, the utilization factor could account for not just the propensity of utilization within an episode, but also the frequency with which surgical and less invasive treatment paths are used by a provider in treating a condition associated with an add-in coverage.

Price factors may be applied to the member add-in cost 2540 to determine the amount of copay and paycheck deduction a member would have to pay to purchase each add-in coverage for that particular provider. In one implementation, the member copay and paycheck deduction amount may be determined at the provider organization level. In another implementation, it may be determined based on the specific location/facility where the procedure would be delivered under the add-in coverage. In another implementation, the copay and paycheck deduction amount may be determined based on the individual practitioner that would be delivering the service. In another implementation, price factors developed compared to national benchmarks may be compared within a pricing region for each add-in or smart copay and may then be ranked by percentile. These percentile ranks may then be used in a pricing formula in order to create a consistent spectrum of member cost share amounts across each of the pricing regions.

FIG. 26A shows a screenshot diagram illustrating embodiments of the UDRCD. In FIG. 26A, a screenshot diagram of the Provider Pricing Controller (PPC) is shown. Screen 2601 shows how a provider can dynamically modify their allowed amount at any point in time during the year. Based on a configuration setting that establishes a price maximum that the provider may not exceed, providers are able to use the PPC to establish rates for their services at any point below the maximum established for each code or episode. The flexibility allows the providers to adapt to market demand as well as any changes to their supply of physician time or space in their facilities.

Providers can change their allowed amount on an episodic basis 2610. In one implementation, the provider may change the allowed amount for a given episode by having a percent change apply universally across the codes associated with that episode, including those codes that happen during the anchor event, a pre-window (period prior to an admission or anchor service for the episode), and a post-window (period following a discharge or anchor service for the episode).

In one implementation, the provider may limit the changes to allowed amounts for services within the anchor event. This would include services that happen from the time the patient is admitted and discharged for inpatient stays or during the visit for a service performed as outpatient.

In one implementation, the provider can change the allowed amount differentially for each code associated with an episode, including those codes in the pre-window, anchor service, and post-window. The provider can change or not change their allowed amount for each of these codes and then see how the expected allowed amount and price factor change based on the expected utilization of each of the codes in the episode based on their historical performance. In some implementations, a provider may contract for a single price on a set of services, also known as a bundled payment, and would have the ability to modify that price on the bundle of services.

The provider is able to see how changes in the allowed amount 2620, whether changed at an episodic level or for specific codes within the episode, impact the total member responsibility 2630 associated with buying coverage for a specific add-in at that provider. This new member responsibility is shown to the provider in terms of the copay and paycheck deduction 2640 comprising the total member responsibility as well as how these changes impact how the total member responsibility arrays relative to the low and high amounts of member responsibility for add-in coverages for other providers in the market.

Figure 26B:
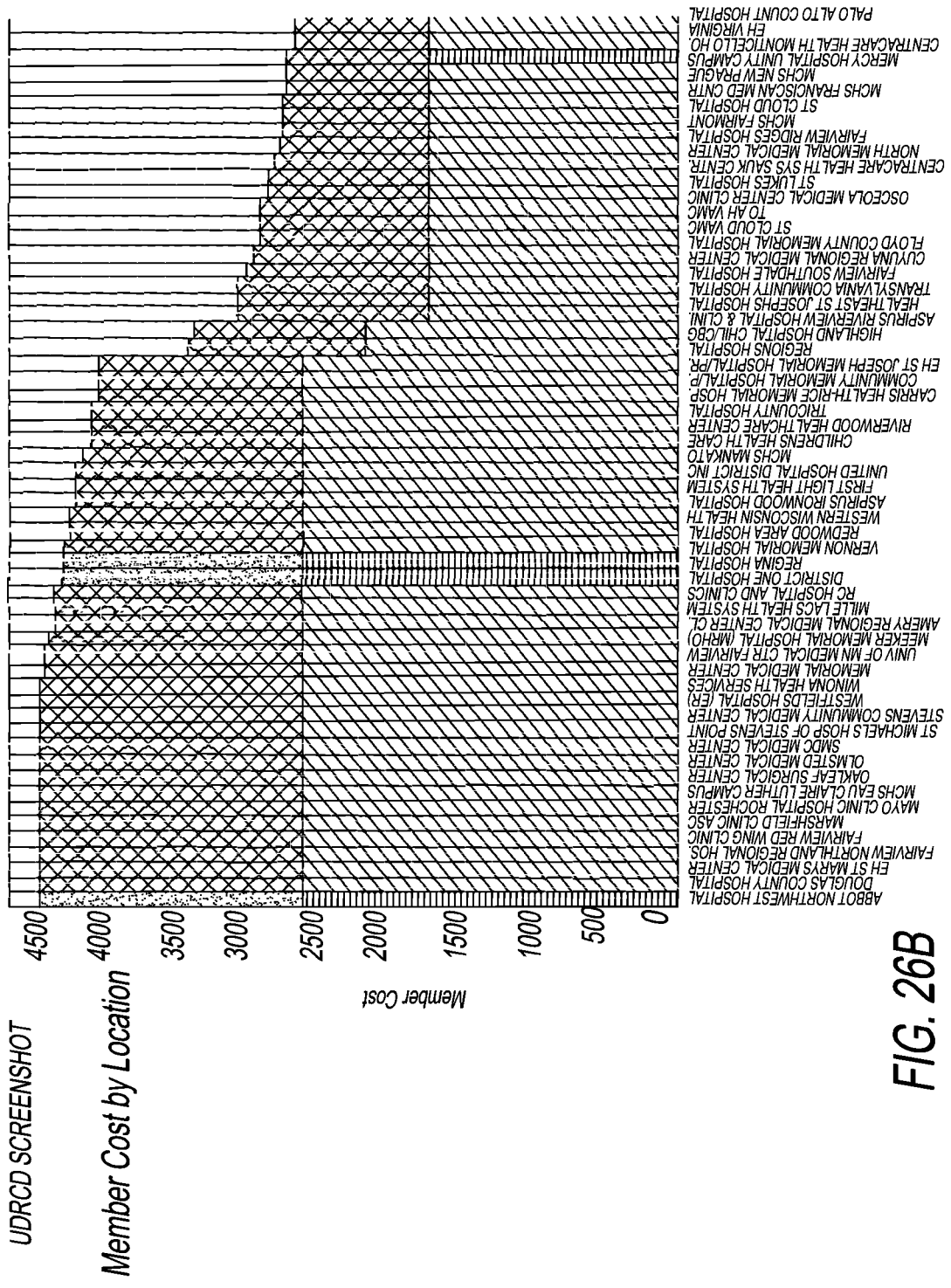
Figure 26C:
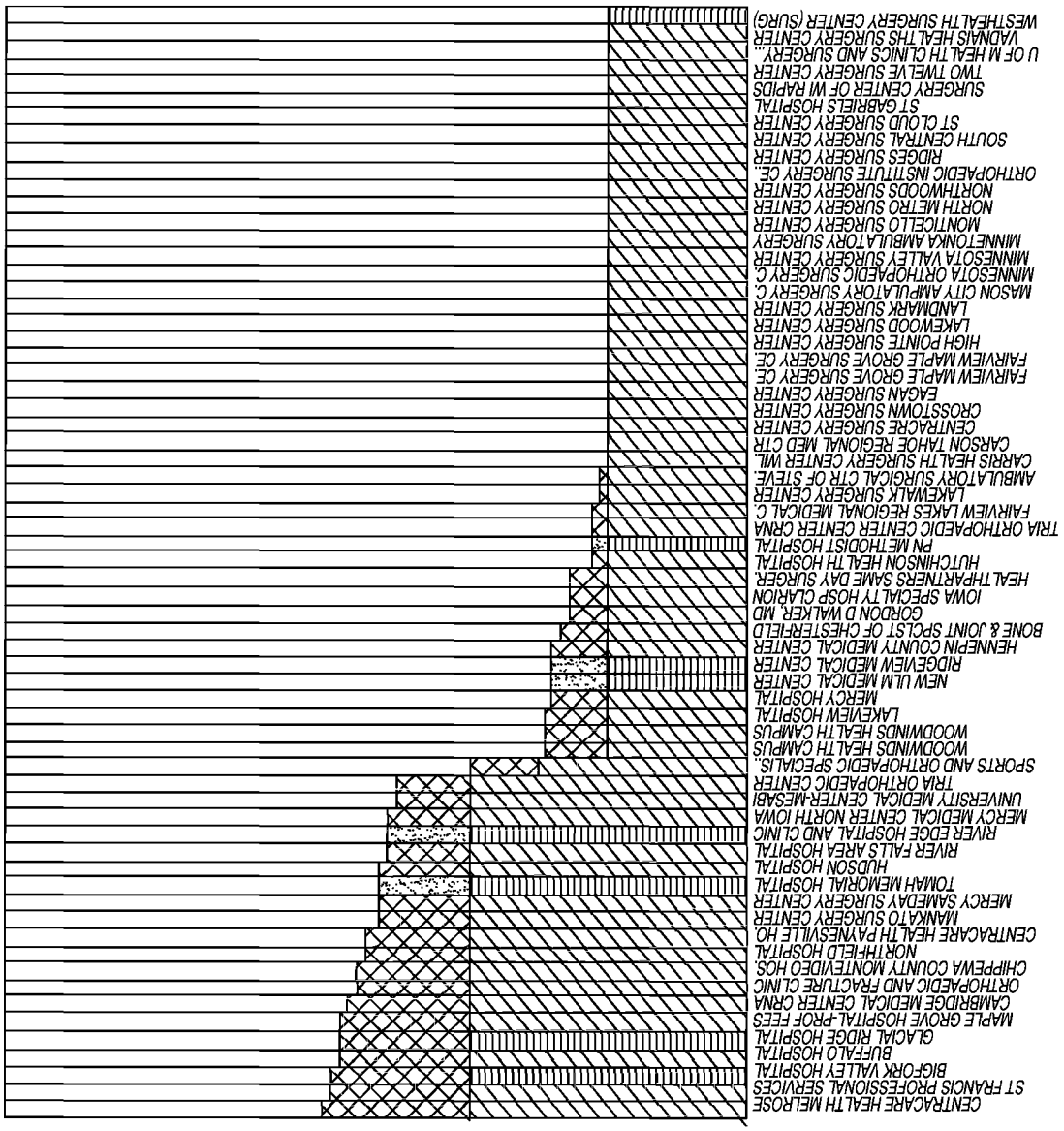

FIG. 26B shows a screenshot diagram illustrating embodiments of the UDRCD. In FIG. 26B, a screenshot diagram of how a provider's cost to members may vary amongst the provider's locations and how those costs to the members compare to other locations in their region is shown.

FIGS. 27A-27B show a screenshot diagram illustrating embodiments of the UDRCD. In FIG. 27, a screen shot diagram for how a provider is able to change the allowed amounts for any of the codes associated with episode for an add-in coverage is shown. Screen 2701 (as shown in FIGS. 27A-27B) shows an example episode for which a provider can modify the pricing for each code associated with that episode of care. This screen shows the provider what the frequency of each code associated with an episode is for the market 2710 and for that provider 2721. The current allowed amount 2722 for each code is then multiplied by the existing frequency for those codes to determine their expected cost contribution to the episode 2723.

Providers may alter the allowed amounts for each code in the episode 2731 on a percent basis and determine the new allowed amount for each code 2732 and its modified contribution to the cost of the episode 2733. The total cost of the episode and the new price factor 2740 that is calculated from it are then applied back to the coverage calculations occurring in FIG. 26.

Figure 28A:
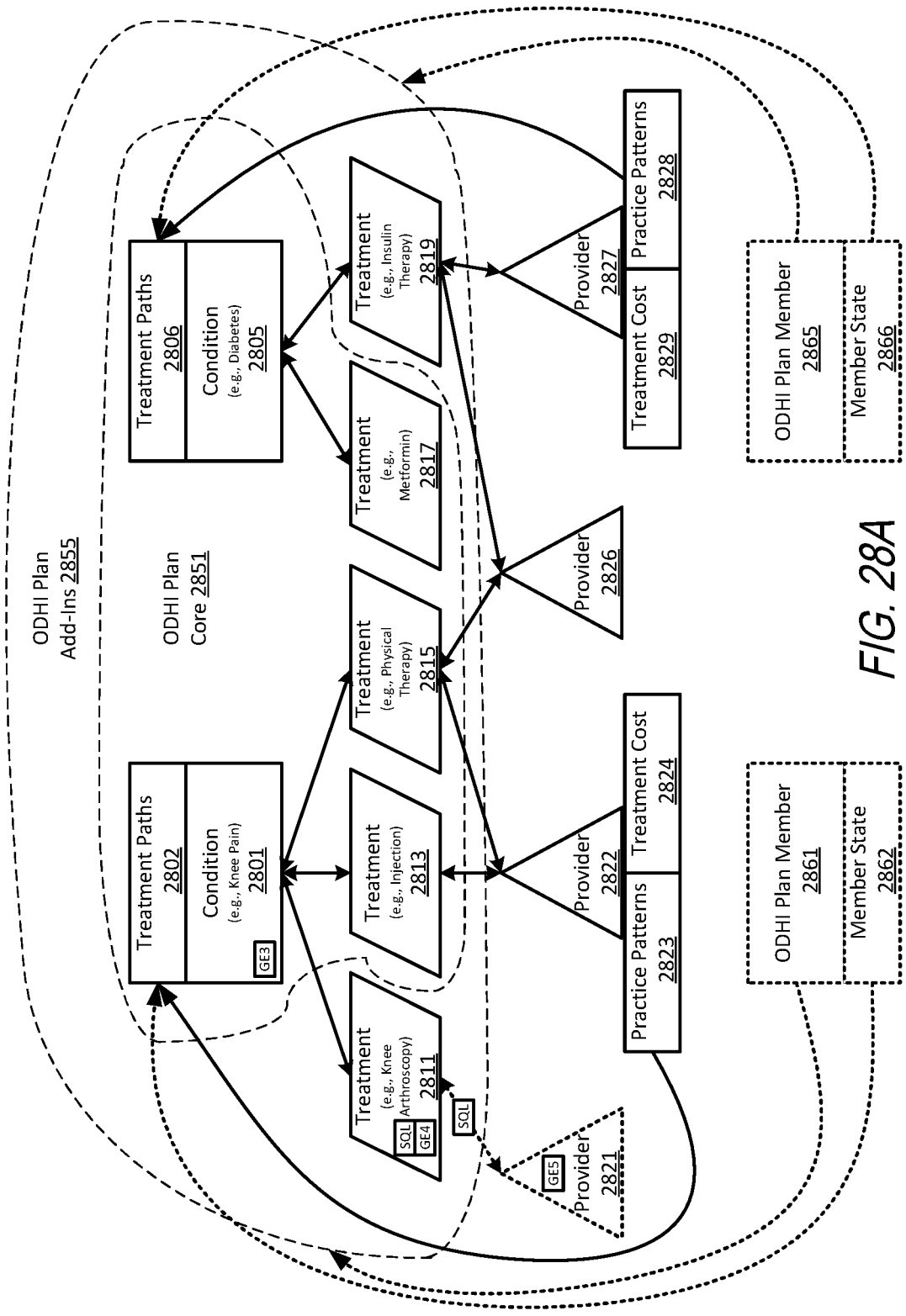
FIGS. 28A-B show exemplary atomized coverage graphs of the UDRCD.
Figure 28B:
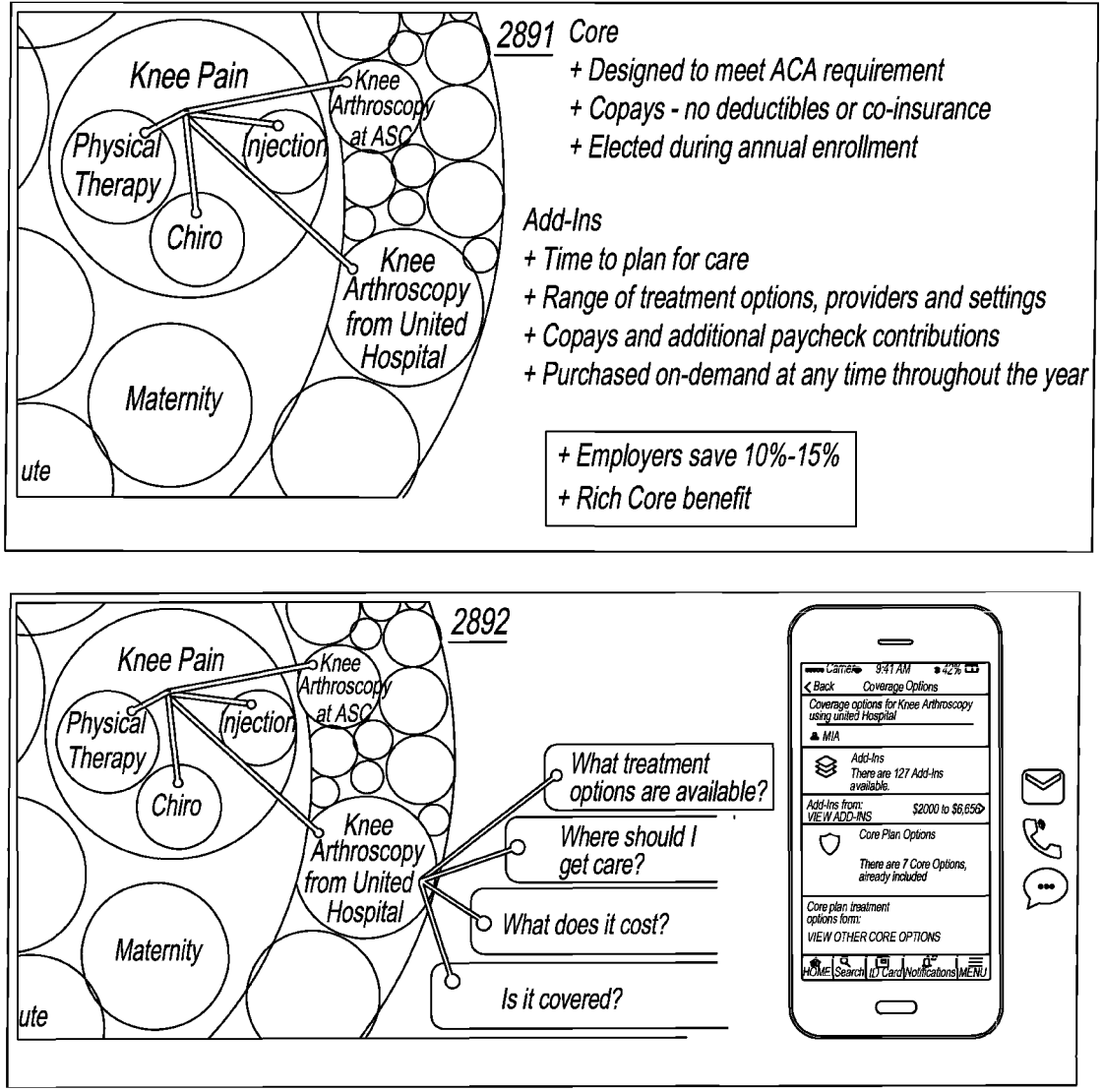

FIGS. 28A-B show exemplary atomized coverage graphs of the UDRCD. In FIG. 28A, the atomized coverage graph example shows relationships between conditions 2801, 2805, treatments (or procedures) 2811, 2813, 2815, 2817, 2819, and providers 2821, 2822, 2826, 2827. Solid lines indicate elements (e.g., objects, links) that are part of the atomized coverage graph, and dashed lines indicate elements that illustrate the context in which the atomized coverage graph may be used. It is to be understood that while portions of the atomized coverage graph structure may be hierarchical, it may be a multi-directional and/or a self-referential datastructure.

In some implementations, each object in the atomized coverage graph may be associated with a graph encapsulation (GE) level that indicates the relationship of an object to other objects. For example, Knee Pain condition object 2801 may have graphical encapsulation level 3 (GE3), may be a subset of a Knee Ailment condition object (not shown) with graphical encapsulation level 2 (GE2), and may be treated using Knee Arthroscopy 2811 treatment with graphical encapsulation level 4 (GE4). In some implementations, frequently utilized subsets of nodes in the atomized coverage graph (e.g., as determined by statistical analysis, as determined by a machine learning structure (e.g., a neural network)) may be split off into new nodes (e.g., a Severe Knee Pain object and/or associated treatment objects may be generated, and linked with relevant provider objects) providing the atomized coverage graph the ability to evolve and change its own structure.

As shown in the atomized coverage graph example, condition objects may include data regarding available treatment paths for the respective condition (e.g., as part of a condition object, as a separate linked object). For example, Knee Pain condition 2801 may include treatment paths data 2802. In another example, type II Diabetes condition 2805 may include treatment paths data 2806. Treatment paths may identify various (e.g., high frequency) pathways that are utilized to treat a condition, whether a pathway is high value, medium value or low value (e.g., based on the cost and clinical outcome associated with the pathway), and key pathway nodes where members select between different treatments and/or providers. Condition objects such as Knee Pain 2801 and Diabetes 2805 may be linked with treatment objects of treatments that are available for the respective condition. For example, Knee Arthroscopy 2811, Injection 2813 and Physical Therapy 2815 may be available treatments for Knee Pain condition 2801, and may be linked to the condition (e.g., a condition object may be queried to determine linked treatments, a treatment object may be queried to determine a linked condition). In another example, Metformin 2817 and Insulin Therapy 2819 may be available treatments for type II Diabetes condition 2805, and may be linked to the condition (e.g., using object identifiers, using pointers).

As shown in the atomized coverage graph example, treatment objects may be linked with provider objects of providers that offer the respective treatment. For example, Physical Therapy treatment 2815 may be linked with provider 2822 and provider 2826 (e.g., a treatment object may be queried to determine linked providers, a provider object may be queried to determine linked treatments). In some implementations, a node in the atomized coverage graph may be dynamically generated when utilized. For example, Knee Arthroscopy treatment object 2821 may include an embedded SQL query that may be utilized to dynamically generate a linked provider object 2821. In some implementation, a frequently utilized dynamically generated node may be converted to a static node and instantiated as a node in the atomized coverage graph.

As shown in the atomized coverage graph example, provider objects may include data regarding practice patterns of the respective provider (e.g., as part of a provider object, as a separate linked object). Practice patterns data indicates the propensity of a provider to utilize various treatment paths for a condition. For example, practice patterns data 2823 of provider 2822 may indicate how likely the provider is to utilize each of the high frequency treatment paths defined by treatment paths 2802 to treat Knee Pain condition 2801. Provider objects may include data regarding treatment cost of linked treatments for the respective provider (e.g., as part of a provider object, as a separate linked object). Treatment cost data indicates how much a provider charges for the various treatments that the provider offers. For example, treatment cost data 2824 of provider 2822 may indicate how much the provider charges for Injection treatment 2813 and for Physical Therapy treatment 2815.

The atomized coverage graph may be utilized when generating ODHI plans. In one implementation, some of the nodes of the atomized coverage graph may be selected for inclusion into an ODHI plan core and some other nodes may be selected for inclusion into an ODHI plan add-ins. For example, an ODHI plan may be generated by selecting nodes 2801, 2805, 2813, 2815 and 2817 into ODHI plan core 2851, and by selecting nodes 2811 and 2819 into ODHI plan add-ins 2855. It is to be understood that some of the nodes of the atomized coverage graph may not be selected for inclusion into the generated ODHI plan (e.g., a particular condition may not be covered by the generated ODHI plan), but may be selected when generating other ODHI plans.

ODHI plan members 2861 and 2865 may be associated with the generated ODHI plan. Plan members may include member state data (e.g., as part of an ODHI plan member object, as a separate linked object). Member state data indicates a plan member's location with regard to treatment paths for a condition. For example, member state data 2862 of plan member 2861 indicates the plan member's treatment paths location (e.g., tried using Physical Therapy treatment 2815 but did not yet try Injection treatment 2813) with regard to the high frequency treatment paths defined by treatment paths 2802 for Knee Pain condition 2801.

In FIG. 28B, alternative embodiments of how an atomized coverage graph may be configured are illustrated. Atomized coverage graph examples 2891 and 2892 show relationships between various ACG objects (e.g., condition, treatment) and how these ACG objects fit with core and add-in components of an ODHI plan. In one embodiment, the user interface illustrated in these examples may be utilized to configure the data structure topology of a linked ACG and/or of a linked ODHI plan thereby instantiating a connection between the data structure topology and the user interface. In one implementation, the linked ODHI plan may be represented in the user interface as nested shapes (e.g., concentric circles with an inner circle representing an ODHI plan core and an outer circle representing an ODHI plan add-ins). The linked ODHI plan may be configured by placing ACG objects, which may be represented in the user interface as shapes (e.g., circles), into an appropriate ODHI plan shape (e.g., directly inside the appropriate ODHI plan shape, nested in another ACG object that is inside the appropriate ODHI plan shape). For example, an ACG object may be placed (e.g., dragged, added) from a library of ACG objects. In another example, an ACG object may be newly created. In one implementation, the user interface may be utilized to configure ACG objects. For example, links between ACG objects may be created (e.g., by dragging a connector GUI widget from one ACG object to another ACG object). In one implementation, configuration changes produced via the graphical user interface are propagated to the data structure topology of the linked ACG and/or of the linked ODHI plan. In an alternative embodiment, user interface configurations and options may come from the graph data structure topology. For example, the user interface may retrieve options for a user and consult the graph data structure topology to provide details about treatment options, add-in options, what procedures are covered, available treatment locations, copays, discounts, etc. by reading and traversing nodes within the data structure topology.

Figure 29A:
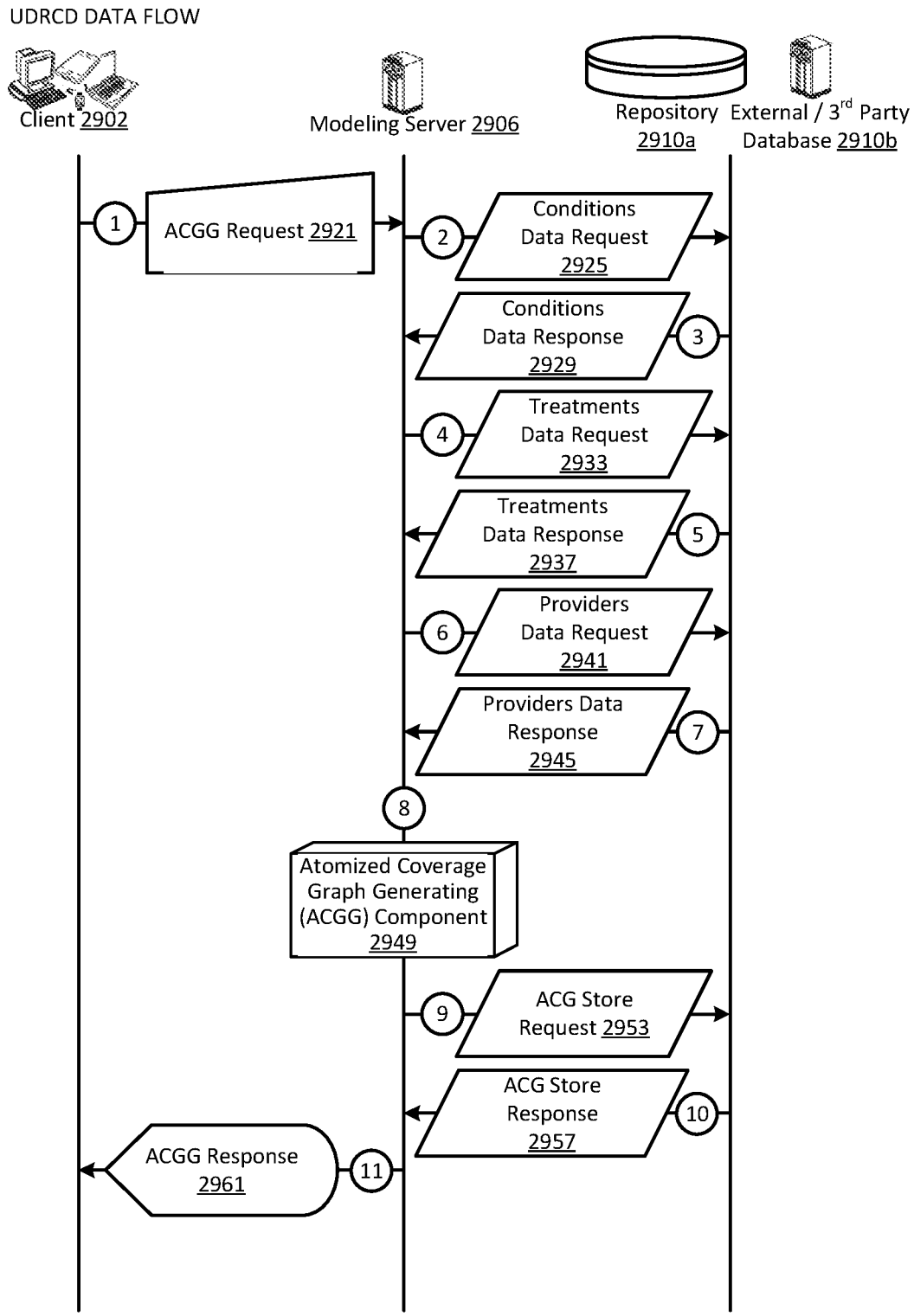
FIGS. 29A-B show a datagraph illustrating data flow(s) for the UDRCD.
Figure 29B:
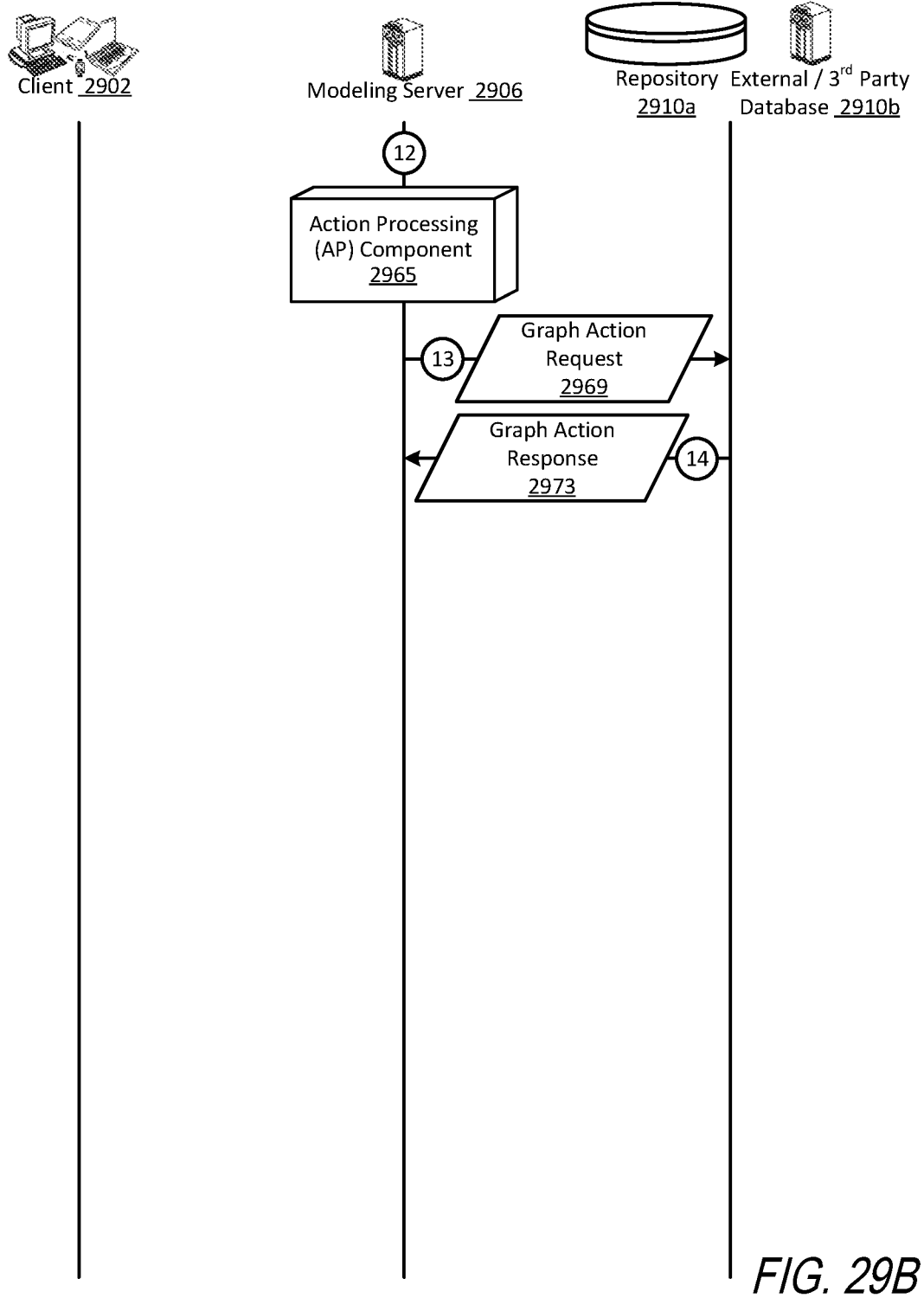

FIGS. 29A-B show a datagraph illustrating data flow(s) for the UDRCD. In FIGS. 29A-B, a client 2902 (e.g., of a user) may send an atomized coverage graph generating (ACGG) request 2921 to a modeling server 2906 to facilitate generating an atomized coverage graph. For example, the client may be a desktop, a laptop, a tablet, a smartphone, and/or the like that is executing a client application. In one implementation, the ACGG request may include data such as a request identifier, a request type, and/or the like. In one embodiment, the client may provide the following example ACGG request, substantially in the form of a HTTP(S) POST message including XML-formatted data, as provided below:

POST/ACGG_request.php HTTP/1.1
Host: www.server.com
Content-Type: Application/XML
Content-Length: 667
<?XML version="1.0" encoding="UTF-8"?>
<ACGG_request>
   <request_identifier>ID_request_11</request_identifier>
   <request_type>GENERATE_ACG</request_type>
</ACGG_request>

The modeling server may send a conditions data request 2925 to a data source such as a repository 2910a or an external/3$^{rd}$ party database 2910b to obtain information regarding classified conditions. In one implementation, the conditions data request may include data such as a request identifier, requested data specification, and/or the like. In one embodiment, the modeling server may provide the following example conditions data request, substantially in the form of a HTTP(S) POST message including XML-formatted data, as provided below:

POST/conditions_data_request.php HTTP/1.1
Host: www.server.com
Content-Type: Application/XML
Content-Length: 667
<?XML version="1.0" encoding="UTF-8"?>
<conditions_data_request>
   <request_identifier>ID_request_12</request_identifier>
   <requested_data>conditions data</requested_data>
</conditions_data_request>

The repository and/or the external/3$^{rd}$ party database may send a conditions data response 2929 to the modeling server to provide the modeling server with the requested conditions data. In one implementation, the conditions data response may include data such as a response identifier, the requested conditions data, and/or the like. In one embodiment, the repository and/or the external/3$^{rd}$ party database may provide the following example conditions data response, substantially in the form of a HTTP(S) POST message including XML-formatted data, as provided below:

```
POST/conditions_data_response.php HTTP/1.1
Host: www.server.com
Content-Type: Application/XML
Content-Length: 667
<?XML version="1.0" encoding="UTF-8"?>
<conditions_data_response>
    <request_identifier>ID_response_12</request_identifier>
    <requested_data>
        <condition>
            <condition_identifier>ID_condition_knee_pain</condition_identifier>
            <treatments>
                ID_treatment_injection, ID_treatment_physical_therapy
            </treatments>
        </condition>
        <condition>
            <condition_identifier>ID_condition_diabetes</condition_identifier>
            <treatments>
                ID_treatment_metformin, ID_treatment_insulin_therapy
            </treatments>
        </condition>
        . . .
    </requested_data>
</conditions_data_response>
```

The modeling server may send a treatments data request 2933 to a data source such as the repository 2910*a* or the external/3$^{rd}$ party database 2910*b* to obtain information regarding classified treatments. In one implementation, the treatments data request may include data such as a request identifier, requested data specification, and/or the like. In one embodiment, the modeling server may provide the following example treatments data request, substantially in the form of a HTTP(S) POST message including XML-formatted data, as provided below:

```
POST/treatments_data_request.php HTTP/1.1
Host: www.server.com
Content-Type: Application/XML
Content-Length: 667
<?XML version="1.0" encoding="UTF-8"?>
<treatments_data_request>
    <request_identifier>ID_request_13</request_identifier>
    <requested_data>treatments data</requested_data>
</treatments_data_request>
```

The repository and/or the external/3$^{rd}$ party database may send a treatments data response 2937 to the modeling server to provide the modeling server with the requested treatments data. In one implementation, the treatments data response may include data such as a response identifier, the requested treatments data, and/or the like. In one embodiment, the repository and/or the external/3$^{rd}$ party database may provide the following example treatments data response, substantially in the form of a HTTP(S) POST message including XML-formatted data, as provided below:

```
POST/treatments_data_response.php HTTP/1.1
Host: www.server.com
Content-Type: Application/XML
Content-Length: 667
<?XML version="1.0" encoding="UTF-8"?>
<treatments_data_response>
    <request_identifier>ID_response_13</request_identifier>
    <requested_data>
        <treatment>
            <treatment_identifier>ID_treatment_injection</treatment_identifier>
            <condition>ID_condition_knee_pain</condition>
            <providers>ID_provider_1, ID_provider_2</providers>
        </treatment>
        <treatment>
            <treatment_identifier>ID_treatment_arthroscopy</treatment_identifier>
            <condition>ID_condition_knee_pain</condition>
            <providers>SQL query that determines providers</providers>
        </treatment>
        . . .
    </requested_data>
</treatments_data_response>
```

The modeling server may send a providers data request 2941 to a data source such as the repository 2910*a* or the external/3$^{rd}$ party database 2910*b* to obtain information regarding available providers. In one implementation, the providers data request may include data such as a request identifier, requested data specification, and/or the like. In one embodiment, the modeling server may provide the following example providers data request, substantially in the form of a HTTP(S) POST message including XML-formatted data, as provided below:

```
POST/providers_data_request.php HTTP/1.1
Host: www.server.com
Content-Type: Application/XML
Content-Length: 667
<?XML version="1.0" encoding="UTF-8"?>
<providers_data_request>
    <request_identifier>ID_request_14</request_identifier>
    <requested_data>providers data</requested_data>
</providers_data_request>
```

The repository and/or the external/3$^{rd}$ party database may send a providers data response 2945 to the modeling server to provide the modeling server with the requested providers data. In one implementation, the providers data response may include data such as a response identifier, the requested providers data, and/or the like. In one embodiment, the repository and/or the external/3$^{rd}$ party database may provide the following example providers data response, substantially in the form of a HTTP(S) POST message including XML-formatted data, as provided below:

```
POST/providers_data_response.php HTTP/1.1
Host: www.server.com
Content-Type: Application/XML
Content-Length: 667
<?XML version="1.0" encoding="UTF-8"?>
<providers_data_response>
    <request_identifier>ID_response_14</request_identifier>
```

```
<requested_data>
  <provider>
    <provider_identifier>ID_provider_1</provider_identifier>
    <treatments>
      ID_treatment_injection, ID_treatment_physical_therapy
    </treatments>
    <provider_historical_data>
      historical treatment and/or cost data for provider
    </provider_historical_data>
  </provider>
  <provider_identifier>ID_provider_2</provider_identifier>
    <treatments>
      ID_treatment_physical_therapy, ID_treatment_insulin_therapy
    </treatments>
    <provider_historical_data>
      historical treatment and/or cost data for provider
    </provider_historical_data>
  </provider>
  ...
</requested_data>
</providers_data_response>
```

An atomized coverage graph generating (ACGG) component 2949 may utilize conditions data, treatments data, and/or providers data to facilitate generating an atomized coverage graph. See FIG. 30A for additional details regarding the ACGG component.

The modeling server may send an atomized coverage graph (ACG) store request 2953 to the repository to store the ACG. In one implementation, the ACG store request may include data such as a request identifier, an ACG identifier, ACG data, and/or the like. In one embodiment, the modeling server may provide the following example ACG store request, substantially in the form of a HTTP(S) POST message including XML-formatted data, as provided below:

```
POST/ACG_store_request.php HTTP/1.1
Host: www.server.com
Content-Type: Application/XML
Content-Length: 667
<?XML version="1.0" encoding="UTF-8"?>
<ACG_store_request>
  <request_identifier>ID_request_15</request_identifier>
  <ACG_identifier>ID_ACG_1</ACG_identifier>
  <ACG_data>ACG conditions data, ACG treatments data, ACG providers data</ACG_data>
</ACG_store_request>
```

The repository may confirm that the ACG was stored via an ACG store response 2957.

The modeling server may send an ACGG response to the client to confirm to the user that the ACG was generated successfully. In one implementation, the ACGG response may include data such as a response identifier, a status, and/or the like. In one embodiment, the modeling server may provide the following example ACGG response, substantially in the form of a HTTP(S) POST message including XML-formatted data, as provided below:

```
POST/ACGG_response.php HTTP/1.1
Host: www.server.com
Content-Type: Application/XML
Content-Length: 667
<?XML version="1.0" encoding="UTF-8"?>
<ACGG_response>
  <response_identifier>ID_response_11</response_identifier>
  <status>OK</status>
</ACGG_response>
```

An action processing (AP) component 2965 may analyze previous ACG activity and determine whether action is necessary (e.g., to make the atomized coverage graph more efficient). See FIG. 30B for additional details regarding the AP component.

The modeling server may send a graph action request 2969 to a data source such as the repository 2910a or the external/$3^{rd}$ party database 2910b to obtain graph action data. In one implementation, the graph action request may include data such as a request identifier, an action type, requested data specification, and/or the like. In one embodiment, the modeling server may provide the following example graph action request, substantially in the form of a HTTP(S) POST message including XML-formatted data, as provided below:

```
POST/graph_action_request.php HTTP/1.1
Host: www.server.com
Content-Type: Application/XML
Content-Length: 667
<?XML version="1.0" encoding="UTF-8"?>
<graph_action_request>
  <request_identifier>ID_request_16</request_identifier>
  <action_type>NEW</action_type>
  <requested_data>graph action data for asthma</requested_data>
</graph_action_request>
```

The repository and/or the external/$3^{rd}$ party database may send a graph action response 2973 to the modeling server to provide the modeling server with the requested graph action data. In one implementation, the graph action response may include data such as a response identifier, the requested graph action data, and/or the like. In one embodiment, the repository and/or the external/$3^{rd}$ party database may provide the following example graph action response, substantially in the form of a HTTP(S) POST message including XML-formatted data, as provided below:

```
POST/graph_action_response.php HTTP/1.1
Host: www.server.com
Content-Type: Application/XML
Content-Length: 667
<?XML version="1.0" encoding="UTF-8"?>
<graph_action_response>
  <request_identifier>ID_response_16</request_identifier>
  <requested_data>
    <condition>
      <condition_identifier>ID_condition_asthma</condition_identifier>
      <treatments>
        ID_treatment_inhaler, ID_treatment_bronchial_thermoplasty
      </treatments>
    </condition>
    <treatment>
      <treatment_identifier>ID_treatment_inhaler</treatment_identifier>
      <condition>ID_condition_asthma</condition>
      <providers>ID_provider_1, ID_provider_2</providers>
```

```
    </treatment>
    <treatment>
        <treatment_identifier>
            ID_treatment_bronchial_thermoplasty
        </treatment_identifier>
        <condition>ID_condition_asthma</condition>
        <providers>ID_provider_1, ID_provider_2</providers>
    </treatment>
    </requested_data>
</graph_action_response>
```

Figure 30A:
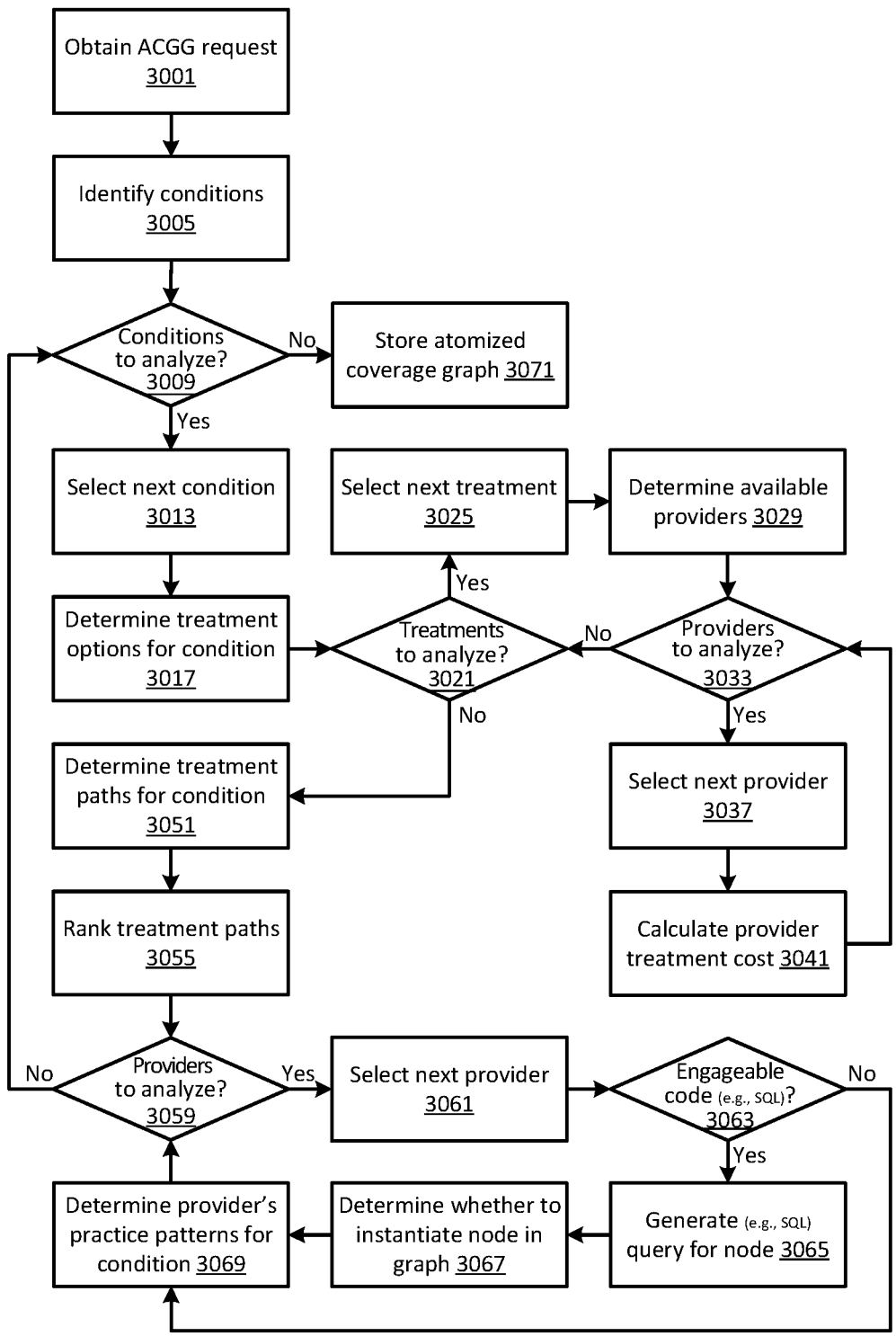
FIG. 30A shows a logic flow illustrating embodiments of an atomized coverage graph generating (ACGG) component for the UDRCD.

FIG. 30A shows a logic flow illustrating embodiments of an atomized coverage graph generating (ACGG) component for the UDRCD. In FIG. 30A, an ACGG request may be obtained at 3001. For example, the ACGG request may be obtained as a result of a user requesting generation of an atomized coverage graph (ACG).

Conditions may be identified at 3005. In one embodiment, atomized conditions classified using a determined care taxonomy may be identified. In one implementation, conditions may be determined by grouping ICD-10 Diagnosis codes for related ailments into conditions or related condition groups. For example, conditions may include Knee Pain, Diabetes, and/or the like. A determination may be made at 3009 whether there remain more conditions to analyze. In one implementation, any identified condition may be analyzed. If there remain conditions to analyze, the next identified condition may be selected for analysis at 3013 and added to the ACG.

Treatment options for the selected condition may be determined at 3017. In one embodiment, practice patterns data may be utilized to determine available treatment options for the condition. In one implementation, service options that are currently used to address the condition may be determined using historical claims data and/or identification of CPT codes provided to individuals that have a diagnosis code associated with the condition. These service options for the condition may then be grouped into a set of treatment options for the condition.

A determination may be made at 3021 whether there remain more treatments (procedures) to analyze. In one implementation, any determined treatment may be analyzed. If there remain treatments to analyze, the next determined treatment may be selected for analysis at 3025 and added to the ACG.

Available providers for the selected treatment may be determined at 3029. In one implementation, this determination may be made based on available UDRCD providers (e.g., providers that have a contract with the UDRCD and that offer the treatment). In some embodiments, available provider networks may be determined instead of individual providers.

A determination may be made at 3033 whether there remain providers to analyze. In one implementation, any available provider or provider network may be analyzed. If there remain providers to analyze, the next available provider or provider network may be selected for analysis at 3037.

Provider treatment cost for the treatment may be calculated at 3041. In one implementation, practice patterns data may be utilized to calculate the expected (e.g., average) cost that the provider or provider network charges for performing the treatment. For example, claims submitted by the provider or provider network for the treatment over the last 3 years may be analyzed to calculate the average cost.

Treatment paths for the selected condition may be determined at 3051. In one implementation, the set of treatment options for the condition may be mapped into clinical treatment paths that create a longitudinal view of the treatments that an individual may utilize over time to address the condition.

The determined treatment paths may be ranked at 3055. In one implementation, the determined treatment paths may be ranked as high value, medium value or low value based on the cost and/or clinical outcome associated with the respective pathway. For example, those treatment paths that are identified as translating to lower cost of care for an individual, based on an annual view for those with chronic conditions or an episodic view for those with acute conditions, and that are found to effectively address the needs of the individual for the condition may be identified as high value. In some implementations, key pathway nodes where members select between different treatments and/or providers may be identified. For example, nodes of influence where key decisions or referrals occur that have a greater determination on the treatment path that an individual will proceed on and whether that path will end with them receiving high or low value treatment may be identified (e.g., based on practice patterns data).

A determination may be made at 3059 whether there remain providers to analyze. In one implementation, any available provider or provider network may be analyzed. If there remain providers to analyze, the next available provider or provider network may be selected for analysis at 3061.

A determination may be made at 3063 whether the provider node associated with the provider utilizes engageable code. For example, the engageable code may be a SQL query that generates the provider node dynamically. If so, the SQL query may be generated for the node at 3065. A determination may be made at 3067 whether to instantiate the dynamic provider node in the ACG so that the provider node becomes a static node. In one implementation, this determination may be made based on the frequency of utilization (e.g., based on a counter of utilization, based on percentage of utilization) and/or based on a determination of importance by a machine learning structure (e.g., a neural network).

The provider's practice patterns for the condition may be determined at 3069. In one implementation, the provider's propensity, or the frequency with which the provider leverages high, medium and low value treatment options, may be determined based on the provider's practice patterns data. In another implementation, the provider's intensity to leverage treatment options may be determined based on the provider's practice patterns data.

The generated ACG may be stored at 3071. In one implementation, the ACG may be stored via a MySQL database command similar to the following:

```
INSERT INTO AtomizedCoverageGraphs (ACG_ID,
    ACG_ConditionsData,
    ACG_TreatmentsData, ACG_ProvidersData)
VALUES (ID_ACG_1, data regarding conditions,
    data regarding treatments, data regarding providers);
```

Figure 30B:
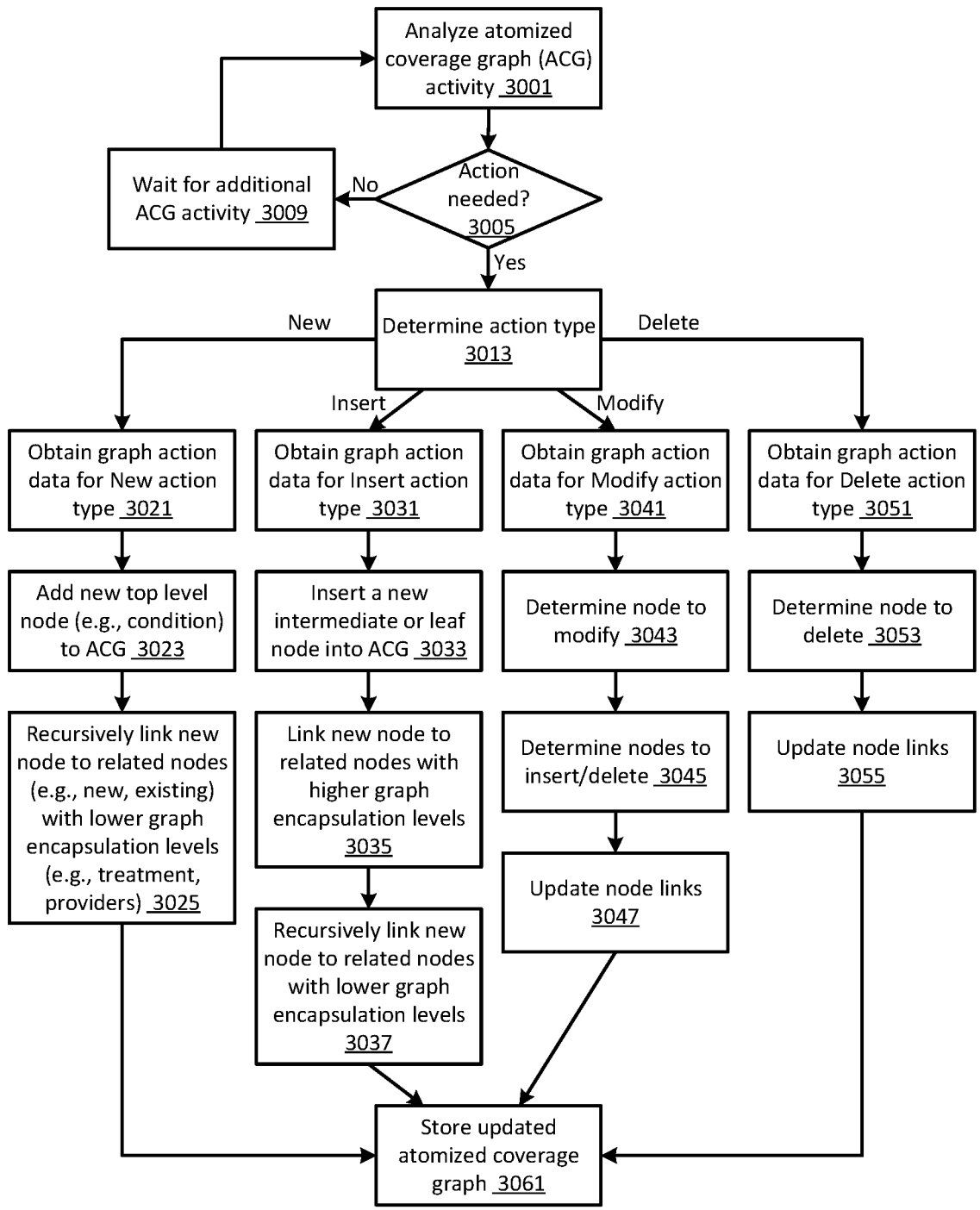
FIG. 30B shows a logic flow illustrating embodiments of an action processing (AP) component for the UDRCD.

FIG. 30B shows a logic flow illustrating embodiments of an action processing (AP) component for the UDRCD. In FIG. 30B, atomized coverage graph (ACG) activity may be analyzed at 3001 to determine whether action should be taken (e.g., to make the atomized coverage graph more efficient). In various embodiments, taking action may involve adding new nodes to an ACG, modifying existing nodes in the ACG, deleting nodes from the ACG, and/or the like. If it is determined at 3005 that no action is needed, the UDRCD may wait for additional ACG activity at 3009.

If it is determined that action is needed, action type of the action that should be taken may be determined at 3013. In one implementation, a machine learning structure (e.g., a neural network) may be utilized to determine (e.g., based on analysis of historical ACG usage activity) what action type to take. In one embodiment, it may be determined that a new top level node (e.g., for a condition) should be added to the ACG. For example, such a determination may be made based on determining (e.g., based on analysis of clinical records, treatments, providers, etc.) that ODHI coverage may be provided more efficiently by adding a new condition to the ACG. In another embodiment, it may be determined that a new intermediate or leaf node (e.g., for a treatment, for a provider) should be added to the ACG. For example, such a determination may be made based on determining (e.g., based on analysis of clinical records, treatments, providers, etc.) that ODHI coverage may be provided more efficiently by adding a new treatment or provider to the ACG. In another embodiment, it may be determined that a node of the ACG should be modified (e.g., split into multiple nodes). For example, such a determination may be made based on determining (e.g., based on analysis of clinical records, treatments, providers, etc.) that ODHI coverage may be provided more efficiently by splitting a treatment (e.g., insulin therapy) into multiple treatments (e.g., insulin pen, insulin pump, and insulin jet injector) in the ACG. In another embodiment, it may be determined that a node of the ACG should be deleted. For example, such a determination may be made based on determining (e.g., based on analysis of clinical records, treatments, providers, etc.) that ODHI coverage may be provided more efficiently by removing a treatment (e.g., an ineffective treatment, an unused treatment) from the ACG. In another example, such a determination may be made based on determining that a provider is no longer in business.

If a new top level node should be added to the ACG, graph action data for New action type may be obtained at 3021. In one implementation, such graph action data may facilitate updating the ACG in accordance with the desired action. A new top level node (e.g., for a condition) may be added to the ACG at 3023. For example, an Asthma condition object may be added to the ACG. The new node may be recursively linked to related nodes (e.g., new, existing) with lower graph encapsulation levels (e.g., treatments, providers) at 3025. For example, the Asthma condition object may be linked with treatment objects (e.g., existing treatment objects for treatments that may be used for asthma, new treatment objects created for treatments that may be used for asthma) related to asthma, which have a lower graph encapsulation level. Each of these treatment objects may in turn be linked with provider objects (e.g., existing provider objects for providers that offer asthma treatments, new provider objects created for providers that offer asthma treatments) related to the respective treatment, which have a lower graph encapsulation level.

If a new intermediate or leaf node should be added to the ACG, graph action data for Insert action type may be obtained at 3031. In one implementation, such graph action data may facilitate updating the ACG in accordance with the desired action. A new intermediate or leaf node (e.g., for a treatment, for a provider) may be added to the ACG at 3033. For example, an Asthma Inhaler treatment object may be added to the ACG. The new node may be linked to related nodes with higher graph encapsulation levels (e.g., conditions) at 3035. For example, the Asthma Inhaler treatment object may be linked with an Asthma condition object. In another example, the Asthma Inhaler treatment object may be linked with an allergy-induced asthma condition object and with an exercise-induced asthma condition object. The new node may be recursively linked to related nodes (e.g., new, existing) with lower graph encapsulation levels (e.g., providers) at 3037. For example, the Asthma Inhaler treatment object may be linked with provider objects (e.g., existing provider objects, new provider objects) that offer the asthma inhaler treatment.

If a node of the ACG should be modified (e.g., split into multiple nodes), graph action data for Modify action type may be obtained at 3041. In one implementation, such graph action data may facilitate updating the ACG in accordance with the desired action. The node of the ACG should be modified may be determined at 3043. For example, it may be determined that analysis by the machine learning structure indicates that the Insulin Therapy treatment object should be modified (e.g., split into multiple treatment objects specified by the machine learning structure). ACG nodes to insert and/or delete may be determined at 3045. For example, it may be determined that the Insulin Therapy treatment object should be deleted and that an Insulin Pen treatment object, an Insulin Pump treatment object, and an Insulin Jet Injector treatment object should be inserted, and these deletions and/or insertions may be executed. Node links may be updated at 3047. For example, links of condition objects and provider objects that previously linked to the Insulin Therapy treatment object may be updated to link to the Insulin Pen treatment object, the Insulin Pump treatment object, and/or the Insulin Jet Injector treatment object as appropriate.

If a node of the ACG should be deleted, graph action data for Delete action type may be obtained at 3051. In one implementation, such graph action data may facilitate updating the ACG in accordance with the desired action. The node of the ACG that should be deleted may be determined at 3053. For example, it may be determined that a provider object should be deleted because the associated provider is no longer in business, and this deletion may be executed. Node links may be updated at 3055. For example, each treatment object that previously linked to the provider object may be updated to remove the link to the provider object from the respective treatment object.

Figure 31:
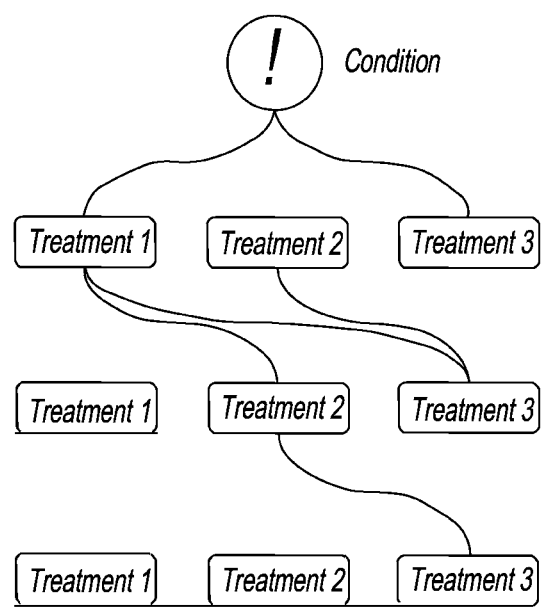
FIG. 31 shows a screenshot diagram illustrating embodiments of the UDRCD.

The updated ACG may be stored at 3061. In one implementation, the ACG may be updated via a MySQL database command similar to the following:

UPDATE AtomizedCoverageGraphs
SET ACG_ConditionsData=updated conditions data,
ACG_TreatmentsData=updated treatments data,
ACG_ProvidersData=updated providers data
WHERE ACG_ID=ID_ACG_1;

FIG. 31 shows a screenshot diagram illustrating embodiments of the UDRCD. In FIG. 31, treatment pathways for a condition are illustrated. In one embodiment, treatment paths identify the different clinical paths (e.g., ordered treatment sequences) that a member may follow to address a condition. Each node may be associated with a treatment. In some implementations, key pathway nodes where members select between different treatments and/or providers may be identified and marked.

FIG. 32 shows a screenshot diagram illustrating embodiments of the UDRCD. In FIG. 32, an exemplary treatment pathway generation for meniscus tear is illustrated. A trigger code set (e.g., a set of codes that identify a condition and its subsegments and trigger logic) for meniscus tear is shown. The Meniscus Tear trigger code set includes 122 codes. A relevant procedure code set (e.g., a set of relevant and/or important treatments (e.g., procedures) for each condition)

for meniscus tear is shown. The Meniscus Tear relevant procedure code set includes 322 codes categorized into 33 treatments. The Meniscus Tear trigger code set and the Meniscus Tear relevant procedure code set are utilized by a treatment pathway analytic engine to generate treatment paths for meniscus tear condition. The treatment pathway analytic engine generated 2112 unique treatment paths for meniscus tear. High frequency treatment paths (e.g., that account for at least a specified threshold percentage of members) may be determined by the treatment pathway analytic engine. The treatment pathway analytic engine determined 26 high frequency pathways for meniscus tear that account for more than 60% of members.

Figure 33A:
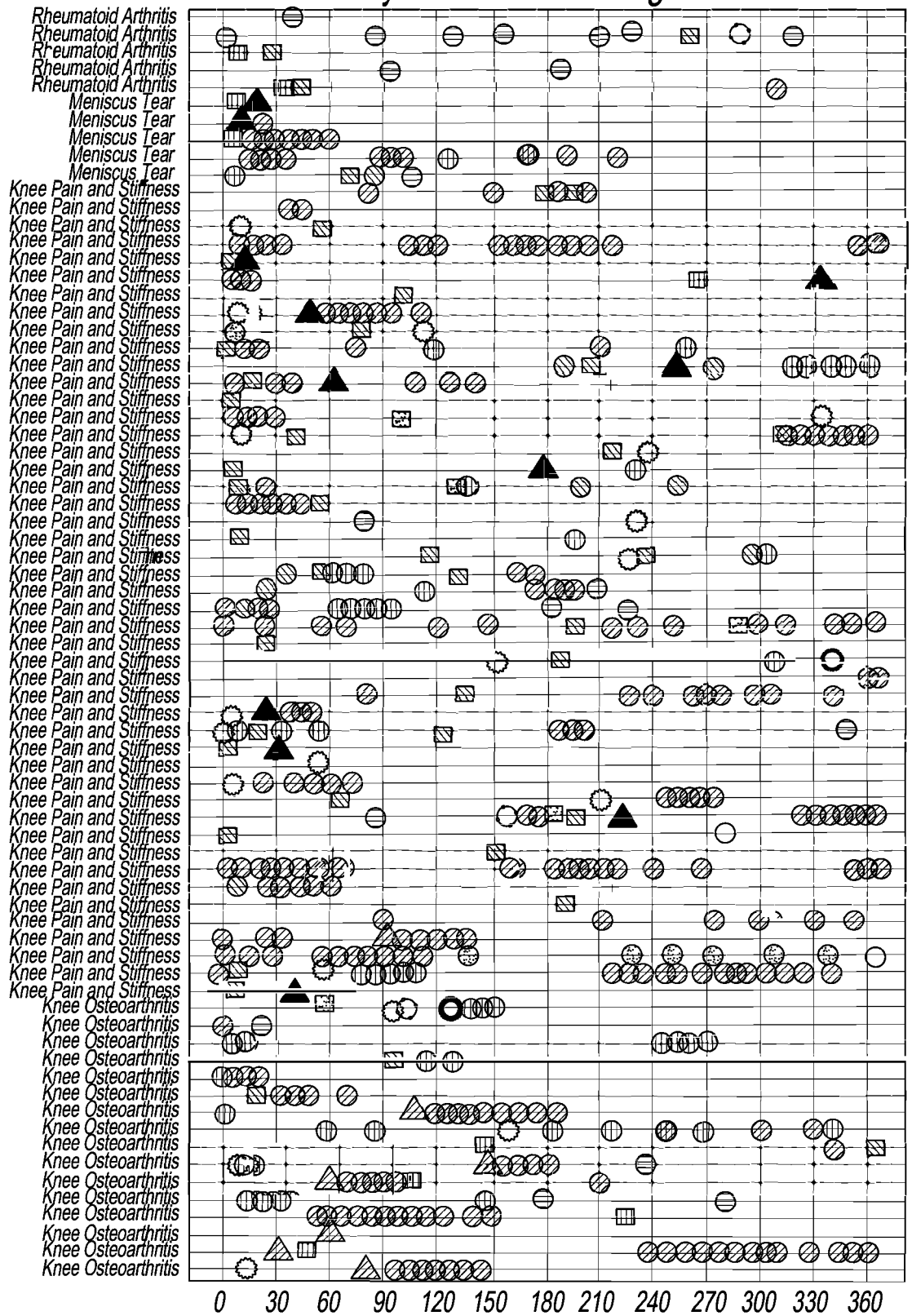
FIGS. 33 A-B (hereinafter "FIG. 33") show a screenshot diagram illustrating embodiments of the UDRCD.
Figure 33B:
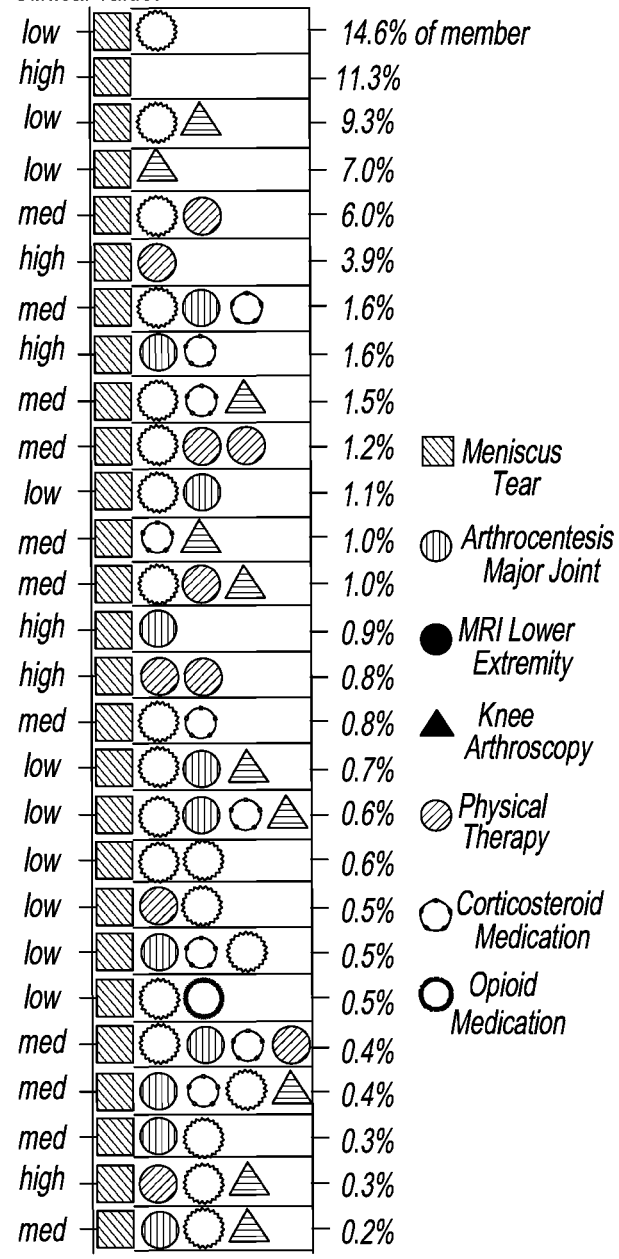

FIG. 33 shows a screenshot diagram illustrating embodiments of the UDRCD. In FIG. 33, exemplary high frequency pathways for meniscus tear are illustrated. 27 high frequency pathways for meniscus tear that account for 68.5% of meniscus tear members are shown. A clinical value (e.g., high value, medium value or low value) for each pathway is determined (e.g., based on the cost and clinical outcome associated with the pathway) and shown.

Figure 34A:
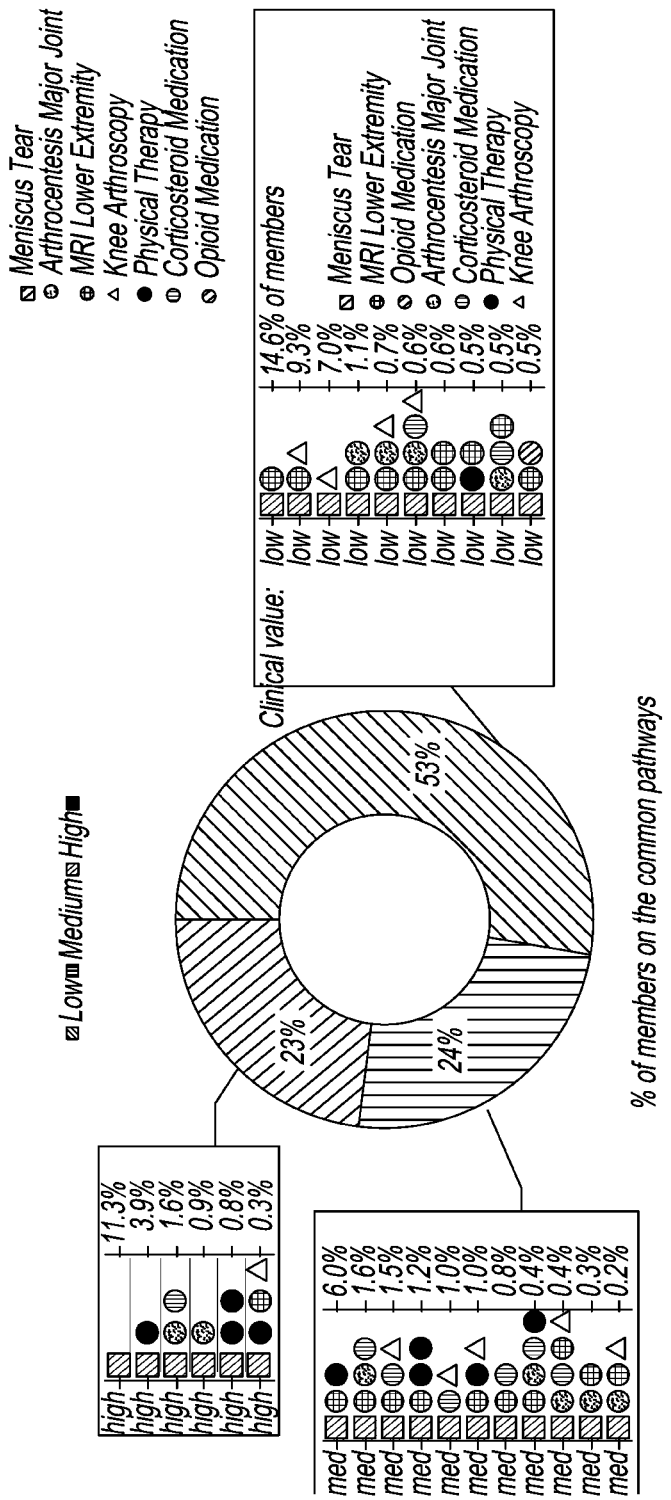
Figure 34C:
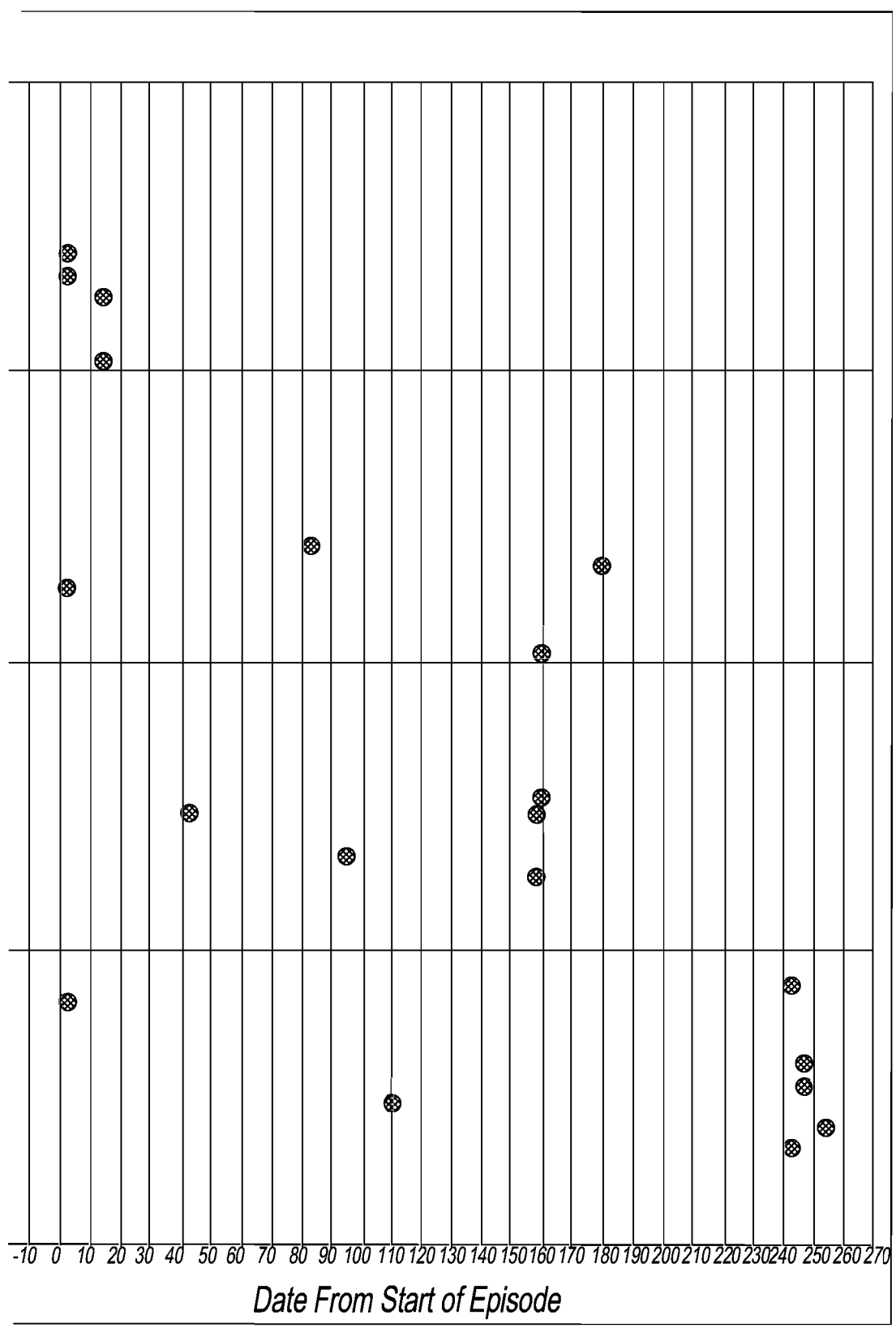

FIG. 34A shows a screenshot diagram illustrating embodiments of the UDRCD. In FIG. 34A, exemplary high frequency pathways for meniscus tear are illustrated. As shown in FIG. 34A, only 23% of high frequency pathways for meniscus tear have high clinical value. This illustrates the advantage of being able to utilize treatment paths analysis to steer members (e.g., the other 77%) toward treatment paths with high clinical value.

FIG. 34B shows a screenshot diagram illustrating embodiments of the UDRCD. In FIG. 34B, a screenshot of example treatment pathway episodes for back pain is shown. FIG. 34B demonstrates how high and low value treatment pathways may be identified and/or validated by looking at the sequencing and timing of different treatments within an episode and how those then result in differences in the rate of surgeries or the cost of care for treating that condition.

Figure 35:
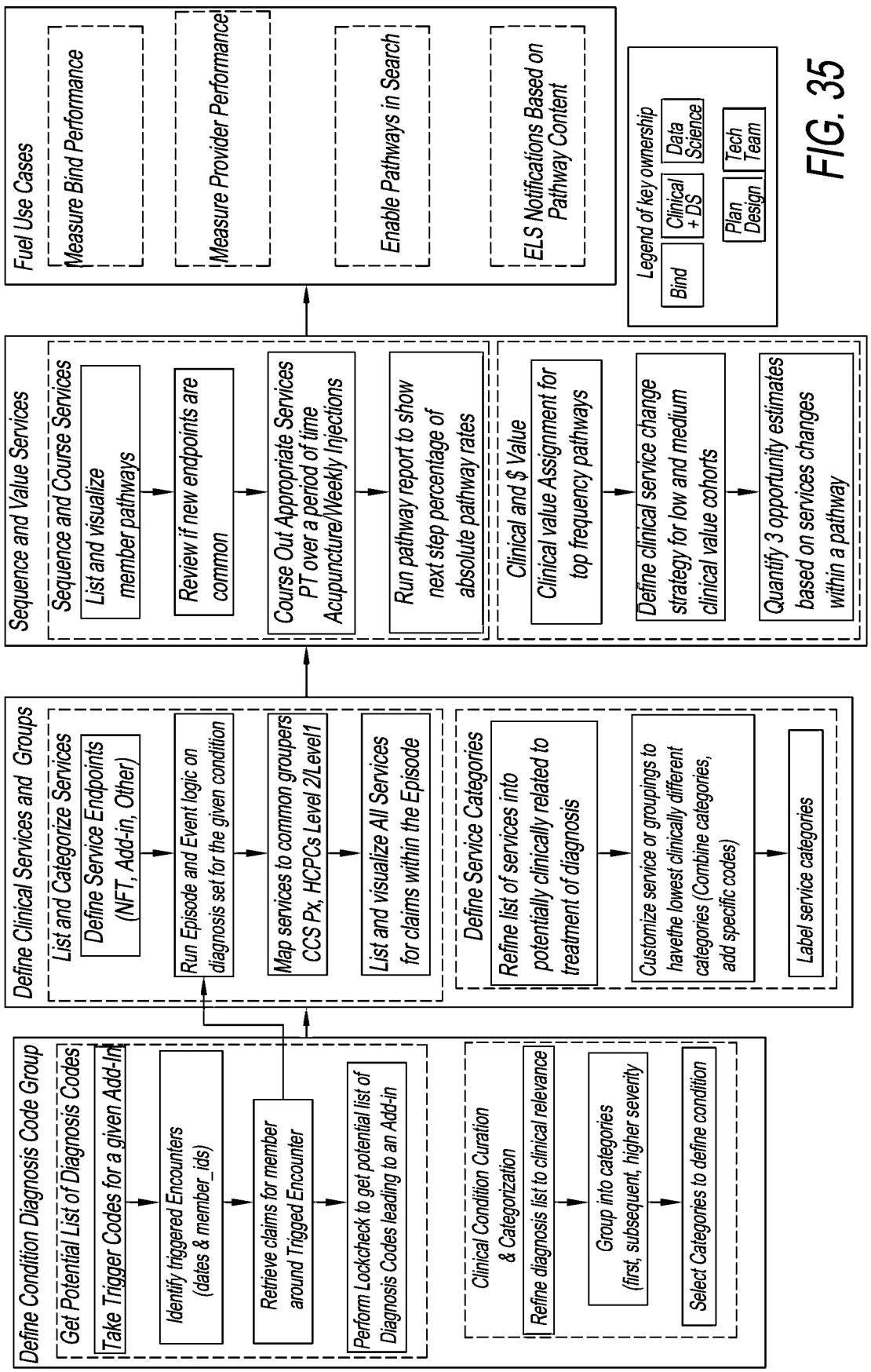
FIG. 35 shows an exemplary architecture for the UDRCD.

FIG. 35 shows an exemplary architecture for the UDRCD. In FIG. 35, embodiments of a treatment pathway analytic engine are illustrated. In one embodiment, condition diagnosis code group may be defined. This may involve getting potential list of diagnosis codes, and clinical condition curation and categorization. Getting potential list of diagnosis codes may involve taking trigger codes for a given add-in, identifying triggered encounters (e.g., dates and member identifiers), retrieving claims for member around triggered encounter, performing lookback to get potential list of diagnosis codes leading to an add-in, and summarizing diagnosis to add-in data. Clinical condition curation and categorization may involve refining diagnosis list to clinical relevance, refining the list of first clinical trigger diagnosis, grouping into categories (e.g., first, subsequent, higher severity), and selecting categories to define condition.

In one embodiment, clinical services and groups may be defined. This may involve listing and categorizing services, and defining service categories. Listing and categorizing services may involve defining service endpoints (e.g., NFT, add-in, other), running episode and event logic on diagnosis set for the given condition, mapping services to common groupers (e.g., CCS Px, HCPCs Level 2/Level 1), and listing and/or visualizing services for claims within the episode. Defining service categories may involve refining list of services into potentially clinically related to treatment of diagnosis, customizing service groupings to have the fewest clinically different categories (e.g., combine categories, add specific codes), and labeling service categories.

In one embodiment, services may be sequenced and valued. This may involve sequencing and coursing services, and evaluating clinical and fiscal values. Sequencing and coursing services may involve listing and/or visualizing member pathways, reviewing if new endpoints are common, coursing out appropriate services (e.g., physical therapy) over a period of time (e.g., acupuncture/weekly injections), and running a pathway report to show next step percentage of absolute pathway rates. Evaluating clinical and fiscal values may involve clinical value assignment for top frequency pathways, clinical value percentage reporting, defining clinical service change strategy for low and medium clinical value cohorts, and quantifying fiscal opportunity estimates based on services changes within a pathway.

In various embodiments, utilizing the treatment pathway analytic engine may facilitate use cases such as measuring UDRCD performance, measuring provider performance, enabling pathways in search, ELS notifications based on pathway content, and/or the like.

Figure 36:
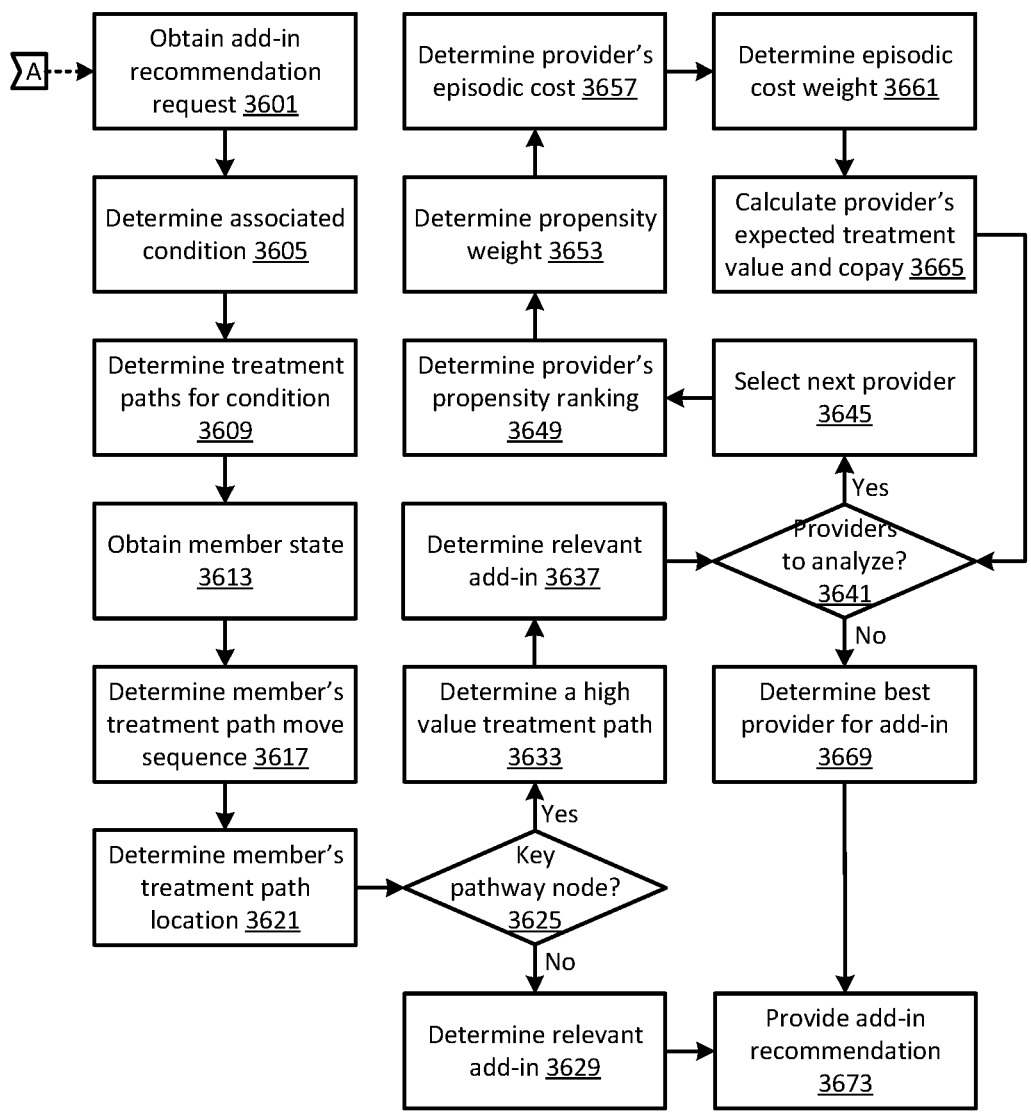
FIG. 36 shows a logic flow diagram illustrating embodiments of an add-in recommendation determining (ARD) component for the UDRCD.

FIG. 36 shows a logic flow diagram illustrating embodiments of an add-in recommendation determining (ARD) component for the UDRCD. In FIG. 36, an add-in recommendation request may be obtained at 3601. For example, the add-in recommendation request may be obtained from the UF component.

A condition associated with the add-in recommendation request may be determined at 3605. In one implementation, the add-in recommendation request may be parsed (e.g., using PHP commands) to determine the associated condition. For example, a condition identifier (e.g., ID_condition_knee_pain) may be determined.

Treatment paths for the condition may be determined at 3609. In one embodiment, the treatment paths may identify various (e.g., high frequency) pathways that are utilized to treat the condition, whether a pathway is high value, medium value or low value (e.g., based on the cost and clinical outcome associated with the pathway), key pathway nodes where members select between different treatments and/or providers, and/or the like. In one implementation, the treatment paths may be determined via a MySQL database command similar to the following:

SELECT conditionTreatmentPaths
FROM ACGs
WHERE ACG_ID=ID_ACG_1 AND ConditionID= ID_condition_knee_pain;

Member state of a member associated with the add-in recommendation request may be determined at 3613. In one implementation, the add-in recommendation request may be parsed (e.g., using PHP commands) to determine the associated member (e.g., ID_member_1), and the member state of the member may be determined via a MySQL database command similar to the following:

SELECT memberState
FROM members
WHERE memberID=ID_member_1;

The member's treatment path move sequence may be determined at 3617 and the member's treatment path location may be determined at 3621. In one implementation, the member state (e.g., the member's claim history based on X12 837 health care claims) may be analyzed with regard to the treatment paths (e.g., compared to the treatment paths for the condition) to determine the member's treatment path move sequence and the member's treatment path location.

A determination may be made at 3625 whether the member's treatment path move sequence and/or the member's treatment path location indicate that the member is at a key pathway node. For example, this determination may be made based on whether the treatment path node associated with the member's treatment path location is marked as a key pathway node.

If the member is not at a key pathway node, a relevant add-in for the member may be determined at 3629. In one implementation, add-ins available to the member may be analyzed to determine a relevant add-in for the next treatment that the member is likely to utilize based on the member's treatment path move sequence and/or the member's treatment path location. In another implementation, add-ins available to the member may be analyzed to determine a relevant condition add-in that covers the condition. An add-in recommendation with the relevant add-in may be provided at 3673. For example, the add-in recommendation may be provided to the UF component.

If the member is at a key pathway node, a high value treatment path for the member may be determined at 3633. In one implementation, available treatment paths that the member may take from the member's treatment path location may be determined (e.g., based on available treatment paths and the configuration of the member's ODHI plan) and a high value treatment path for the member may be selected.

A relevant add-in for the member may be determined at 3637. In one implementation, add-ins available to the member may be analyzed to determine a relevant add-in for the next treatment that the member should utilize to follow the selected high value treatment path from the member's treatment path location. In another implementation, add-ins available to the member may be analyzed to determine a relevant condition add-in that covers the condition.

A determination may be made at 3641, whether there remain providers to analyze. In one implementation, each of the providers or provider networks available for the relevant add-in (e.g., each provider that treats the condition and offers the next treatment) may be analyzed. If there remain providers to analyze, the next available provider or provider network may be selected for analysis at 3645.

The selected provider's propensity ranking with regard to the key pathway node may be determined at 3649. In one embodiment, a propensity ranking may be calculated based on a set of probabilities that indicate the frequency with which a provider utilizes each of the available (e.g., high frequency) treatment paths, and expected treatment cost associated with each treatment path (e.g., calculated based on expected episodic cost of each treatment in a treatment path). In one implementation, the selected provider's practice patterns data may be analyzed to determine how likely the selected provider is to utilize each of the (e.g., high frequency) treatment paths that the member may take from the member's treatment path location. The expected treatment cost associated with each treatment path may be calculated as the sum of expected episodic costs of treatments in a treatment path. The selected provider's propensity ranking may be calculated as a weighted average of the expected treatment costs for the available treatment paths weighted by the likelihood that the selected provider is going to utilize each respective available treatment path.

Propensity weight may be determined at 3653. In one implementation, the propensity weight may be determined based on the level of influence the key pathway node has on the treatment path options for the condition and/or the level of variance in expected cost and/or outcomes that have been identified for each of the treatment paths downstream from the key pathway node.

The selected provider's expected episodic cost for the next treatment may be determined at 3657. In one embodiment, the episode of care may include the primary encounter for the next treatment. In another embodiment, the episode of care may include a pre and/or post window (e.g., 30 days prior to the primary encounter for the next treatment through 90 days after the primary encounter for the next treatment). In one implementation, the selected provider's treatment cost data may be analyzed to determine the selected provider's expected episodic cost for the next treatment.

Episodic cost weight with regard to the key pathway node may be determined at 3661. In one implementation, the episodic cost weight may be determined depending on which node the key pathway node makes up on a treatment path and/or how far down a path it is. For example, a node that is closer to the end of a treatment path may have a higher episodic cost weight, whereas an earlier node may have a higher propensity weight.

The selected provider's expected longitudinal treatment value and copay may be calculated at 3665. In one embodiment, the expected longitudinal treatment value accounts for how the cost and/or outcomes for the condition can vary based on the provider that is providing the treatment for the condition. For example, the calculation of the expected longitudinal treatment value may include: frequency with which the provider utilizes high value treatment paths and treatment options, the cost of an episode of care, initiatives targeted at reducing administrative waste between the ODHI plan and the provider (e.g., reducing the need for prior authorizations), clinical data and workflow integrations (e.g., mutually agreed upon prompts in physicians' clinical decision support tools that support the use of high-value treatment paths, scheduling integrations that create an enhanced member experience and the collection and use of patient reported outcomes measures to better understand the efficacy of treatments for the condition), guarantees or warranties offered by the provider on its treatments (e.g., based on the expected reduction in low-value treatment options and the expected frequency with which those low-value treatments are expected to persist combined with the amount the provider will reimburse the plan sponsor if one of those low-value treatment options occurs), and/or the like. In one implementation, the expected longitudinal treatment value may be calculated as a weighted average of the selected provider's propensity ranking and the expected episodic cost for the next treatment weighted by their respective weights. In one embodiment, the copay for the member to utilize the relevant add-in may be determined. In one implementation, the copay may be a base copay calculated based on the average longitudinal treatment value for providers in the region associated with the member. In another implementation, the copay may be a smart copay (e.g., a smart copay varies in cost to the member based on the provider that provides treatment) that may be calculated by adjusting the base copay based on the expected longitudinal treatment value. For example, the lower the expected longitudinal treatment value for the provider (e.g., as compared with the average longitudinal treatment value for providers in the region), the lower the smart copay for the provider. See FIGS. 45A-B for an example of how a copay may be calculated.

In some alternative embodiments, propensity ranks, propensity weights, episodic costs, episodic cost weights, expected longitudinal treatment values, and/or the like may be recursively calculated for each node for each of the treatment paths downstream from the key pathway node, and utilized to calculate the expected longitudinal treatment value for the key pathway node.

In some alternative embodiments, the copay and/or other add-in costs to the member may be adjusted based on the member state (e.g., to steer members toward treatment paths with high clinical value). In one implementation, the member may receive a treatment path progression discount on the relevant add-in if the member already utilized a more conservative treatment. See FIG. 37 for an example of how a treatment path progression discount may be offered. In another implementation, the member may receive a condition-based discount (e.g., a discount offered if the member has a certain medical condition) on the relevant add-in. See FIG. 41 for an example of how a condition-based discount may be offered.

If there are no more providers to analyze, the best provider for the relevant add-in may be determined at 3669. In one implementation, the best provider for the relevant add-in may be the provider with the lowest expected longitudinal treatment value. For example, the best provider may have the lowest smart copay (e.g., to steer members toward a provider that is likely to use treatment paths with high clinical value).

An add-in recommendation with the relevant add-in with services to be provided by the best provider may be provided at 3673. For example, the add-in recommendation may be provided to the UF component.

Figure 37:
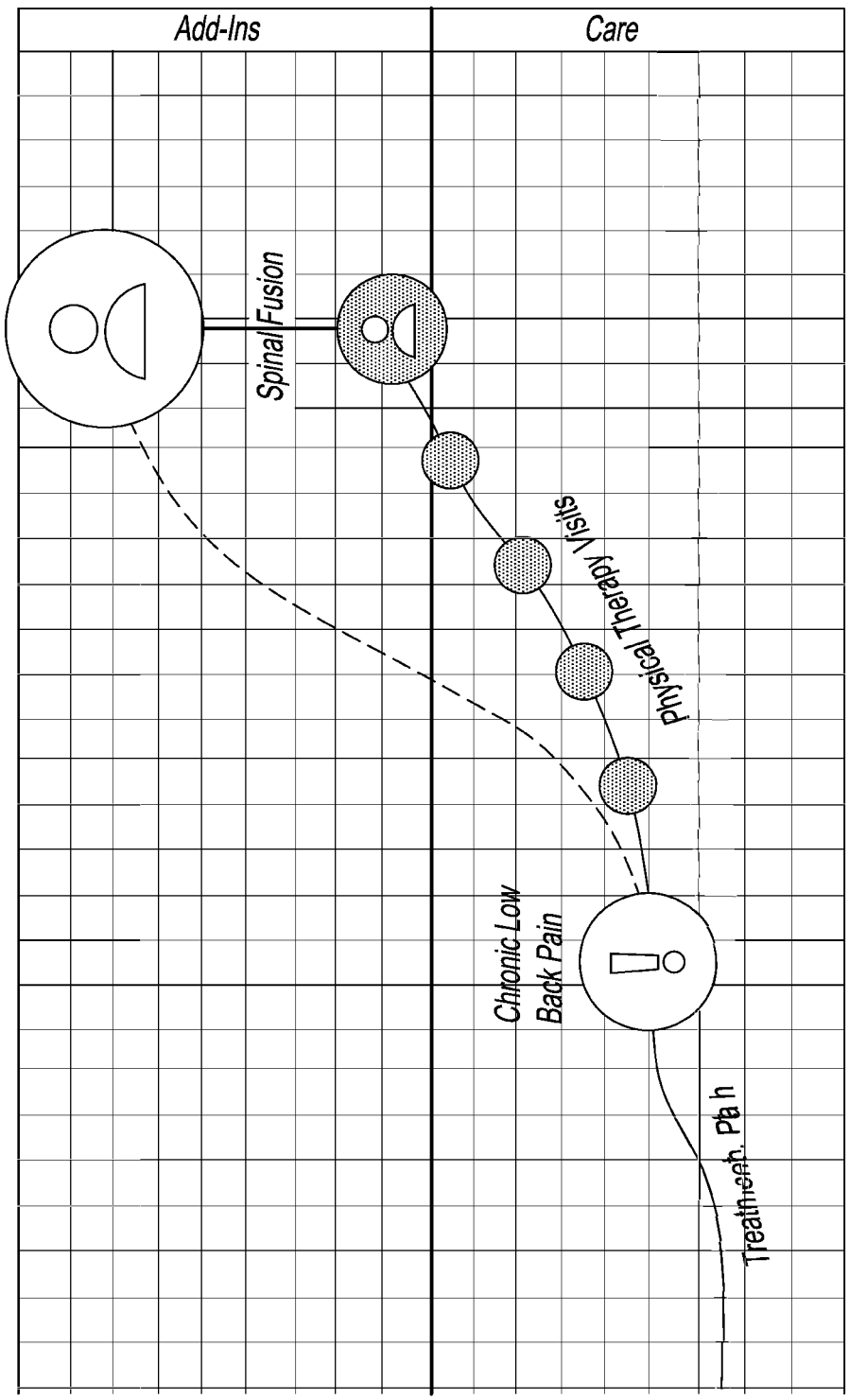
FIG. 37 shows a screenshot diagram illustrating embodiments of the UDRCD.

FIG. 37 shows a screenshot diagram illustrating embodiments of the UDRCD. In FIG. 37, treatment pathways available to a member to treat a chronic low back pain condition (e.g., spinal stenosis) are illustrated. There are several treatment paths available to the member to treat spinal stenosis. If the member chooses a low value treatment path of immediately pursuing spinal fusion, the member may purchase a spinal fusion add-in. However, if the member chooses a high value treatment path of first trying physical therapy and then pursuing spinal fusion if surgery is still required, the member may get a discount when purchasing the spinal fusion add-in. A provider's expected longitudinal treatment value and copay (e.g., for an add-in that covers chronic low back pain) may depend on the provider's propensity to utilize each of the available treatment paths.

Figure 38:
FIG. 38 shows a screenshot diagram illustrating embodiments of the UDRCD.

FIG. 38 shows a screenshot diagram illustrating embodiments of the UDRCD. In FIG. 38, an exemplary ELS implementation case is shown. Screen 3801 shows that when a plan member visits an orthopedic surgeon, the ELS may utilize information regarding the visit (e.g., 837 claim data) and/or other member state data to determine that the Knee Arthroscopy add-in should be recommended to the member. Accordingly, a notification may be sent to the member to inform the member regarding the recommended add-in. In one implementation, the member may click on the notification to view additional details Screen 3810 shows additional details for a notification. For example, the notification may inform the member why the Knee Arthroscopy add-in is recommended. In one implementation, the member may click on the "see my options" button to view additional details regarding the recommended add-in and/or to purchase the recommended add-in. Screen 3820 shows that if the member does not purchase the add-in, the ELS may generate a notification to inform the member if a provider checks for coverage (e.g., to obtain prior authorization before performing surgery) for a service (e.g., Knee Arthroscopy) that is not currently covered by the member's ODHI plan. In one implementation, the member may click on the notification to view additional details.

FIG. 39 shows a screenshot diagram illustrating embodiments of the UDRCD. In FIG. 39, an exemplary user interface (e.g., for a mobile device) for viewing add-in coverage details (e.g., for the Knee Arthroscopy add-in) is shown. Screen 3901 shows that a plan member may view information regarding providers and costs (e.g., payroll deduction, copay) associated with the add-in. Screen 3910 shows that the plan member may view information regarding individual practitioners at a provider (e.g., practitioner specialty, quality rating). Screen 3920 shows that the plan member may view services that the add-in covers (e.g., as compared with core coverage of the member's ODHI plan).

FIG. 40 shows a screenshot diagram illustrating embodiments of the UDRCD. In FIG. 40, an exemplary user interface (e.g., for a mobile device) for purchasing an add-in (e.g., for the Knee Arthroscopy add-in) is shown. Screen 4001 shows that a plan member may review add-in coverage details prior to purchasing the add-in. Screen 4010 shows an add-in purchase confirmation that may be provided to the plan member.

Figure 41:
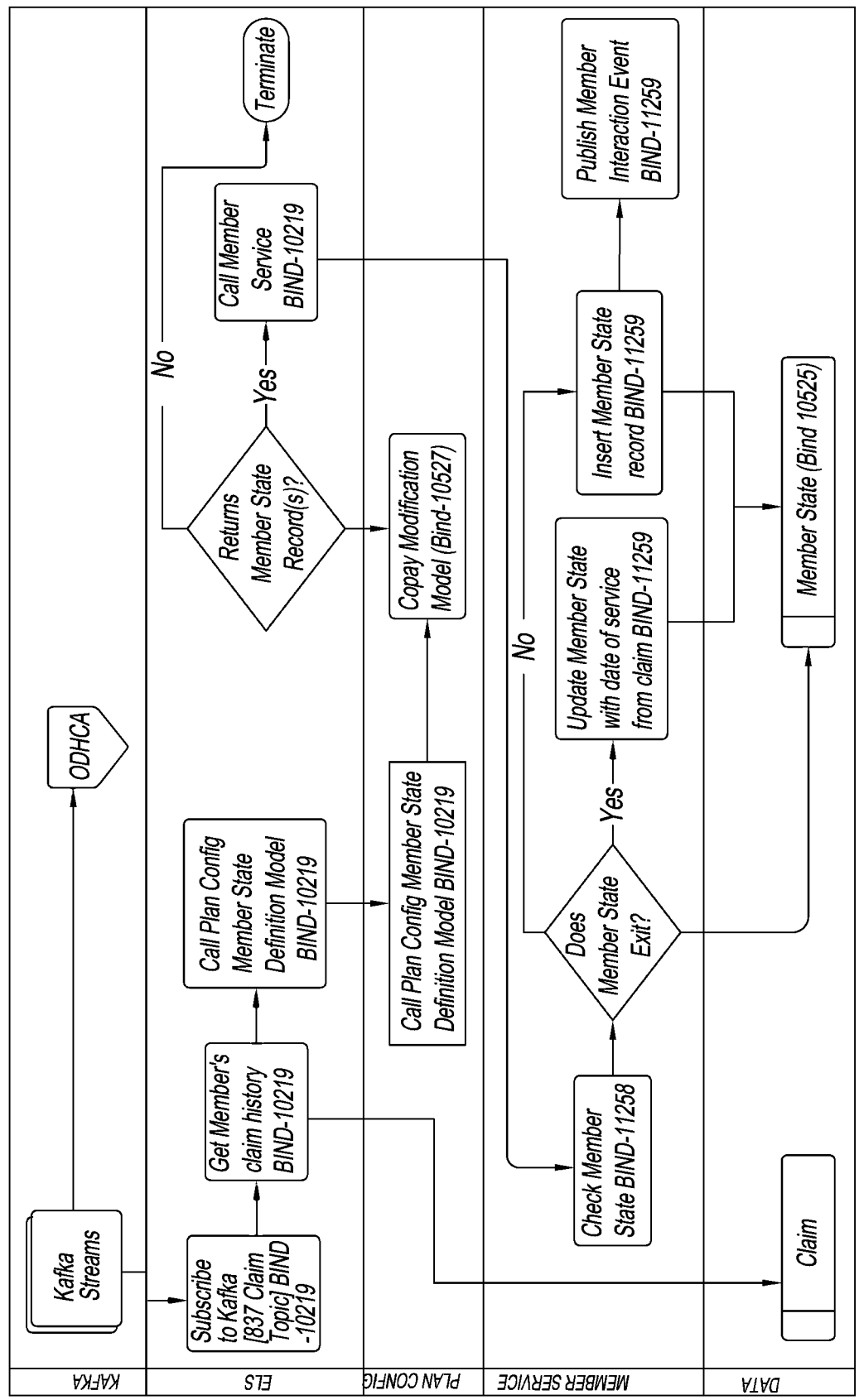
FIG. 41 shows an exemplary architecture for the UDRCD.

FIG. 41 shows an exemplary architecture for the UDRCD. In FIG. 41, Kafka streams (e.g., with X12 837 health care claims) may be provided to the ODHCA component and/or to the ELS. The ELS may analyze (e.g., parse) Kafka data to determine new claims data for a member. The ELS may also determine the member's current member state (e.g., based on the member state definition model for the member's ODHI plan).

In one implementation, a member state may include clinical data, coverage data, preferences data, sociographic data, and/or the like (e.g., over time). For example, clinical data may include clinical state information (e.g., claims, searches, 270/71/78, providers), health trajectory information, the member's location on a treatment pathway, and/or the like. For example, coverage data may include information regarding the member's qualification for contextual coverage (e.g., are there claims to indicate that the member completed steps for qualifying for contextual coverage), and/or the like. For example, preferences data may include offer reaction information (e.g., whether the member accepted or declined previous offers), provider preferences (e.g., the member does not like going to hospitals, the member likes getting care from an out of network provider), systems preferences (e.g., systems that are relevant to the member and/or which the member may be more interested in), and/or the like. For example, sociographic data may include demographic information (e.g., marital status, health literacy, patient activation), lifestyle information (e.g., what the member does, how the member spends time), lifestage information, and/or the like.

The ELS may analyze (e.g., based on the copay modification model for the member's ODHI plan) the new claims data and/or the current member state to determine condition-based discounts for the member. In one embodiment, a condition-based discount may be offered if the member has a certain medical condition (e.g., to help the member manage the medical condition and to avoid poor health outcomes that may arise from not treating the medical condition). For example, if the member has diabetes, a condition-based discount may be offered on visits to qualifying providers and/or on medicines that help manage diabetes. In one implementation, a condition-based discount may be a reduction in copay that the member has to pay. For example, a condition-based discount may be determined as follows:
Condition-Based Discount for Diabetes
IF:
  Member State: If Dx in (x, y, z) OR Rx in (A, B)
  and Provider Attribute=x
  and Provider: PD in (A, B)
  and Provider: Specialty in (x, y, z)

THEN:

$10 off for coverage family in (A, B)

e.g., Primary Care and Specialty Care Office Visits: −$10

The ELS may call a member service, which may determine whether a member state already exists for the member. If the member state exists, the current member state may be updated with the new claims data. If the member state does not exist, a new member state record based on the new claims data may be inserted. A member interaction event may be published to inform other components about the updated member state for the member.

Figure 42:
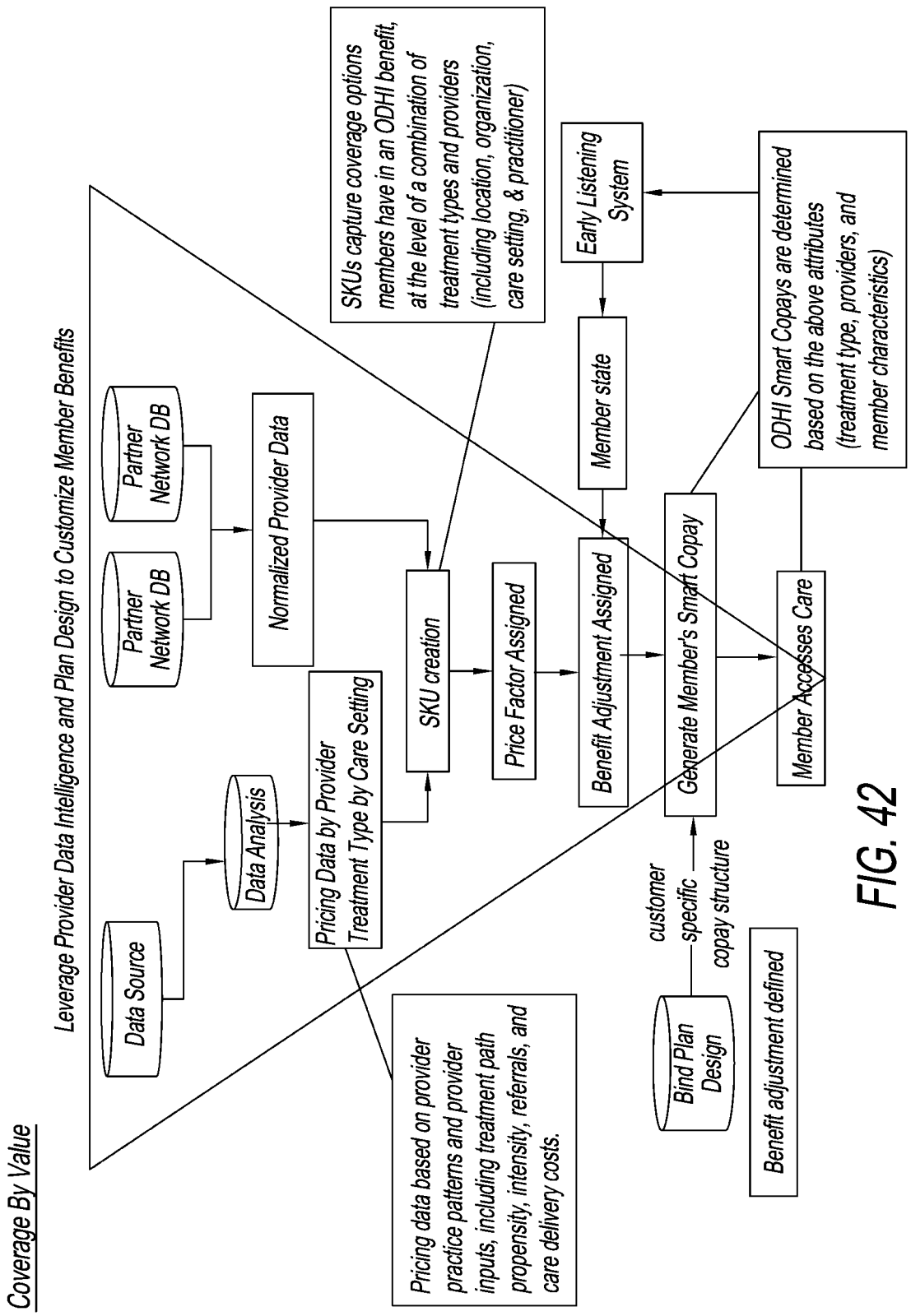
FIG. 42 shows an exemplary architecture for the UDRCD.

FIG. 42 shows an exemplary architecture for the UDRCD. In FIG. 42, embodiments of how smart copays may be generated for a plan member are illustrated. In one implementation, information regarding providers may be obtained from partner network databases and normalized. For example, each partner network may provider information regarding participating providers. In one implementation, information from a variety of data sources may be analyzed to determine pricing data by provider by treatment type by care setting. For example, pricing data may be determined based on provider practice patterns and provider inputs (e.g., treatment path propensity, intensity, referrals, care delivery costs). The normalized provider data and/or the pricing data may be utilized for SKU creation. In one embodiment, SKUs capture coverage options members have in an ODHI plan, at the level of a combination of treatment types and providers (e.g., including location, organization, care setting, practitioner, etc.).

Each SKU may be assigned a price factor. In one implementation, the price factor may indicate how to price a treatment offered by a provider (e.g., based on the provider's pricing data as compared with the pricing data for providers in a region) as compared with the average price for the treatment (e.g., in the region).

A benefit adjustment for the member for each SKU may be determined based on the member's member state. In various implementations, a treatment path progression discount, a condition-based discount, and/or the like may be utilized to determine the benefit adjustment for the member.

Information regarding the member's ODHI plan (e.g., the copay structure specific to the member) may be utilized to generate a smart copay for the member for each SKU. In one implementation, smart copays may be determined based on attributes such as treatment type, providers, member characteristics, and/or the like.

Information regarding how the member accesses care (e.g., based on X12 837 health care claims) may be provided to the ELS. In one implementation, the ELS may facilitate updating the member's member state based on such information.

Figure 43:
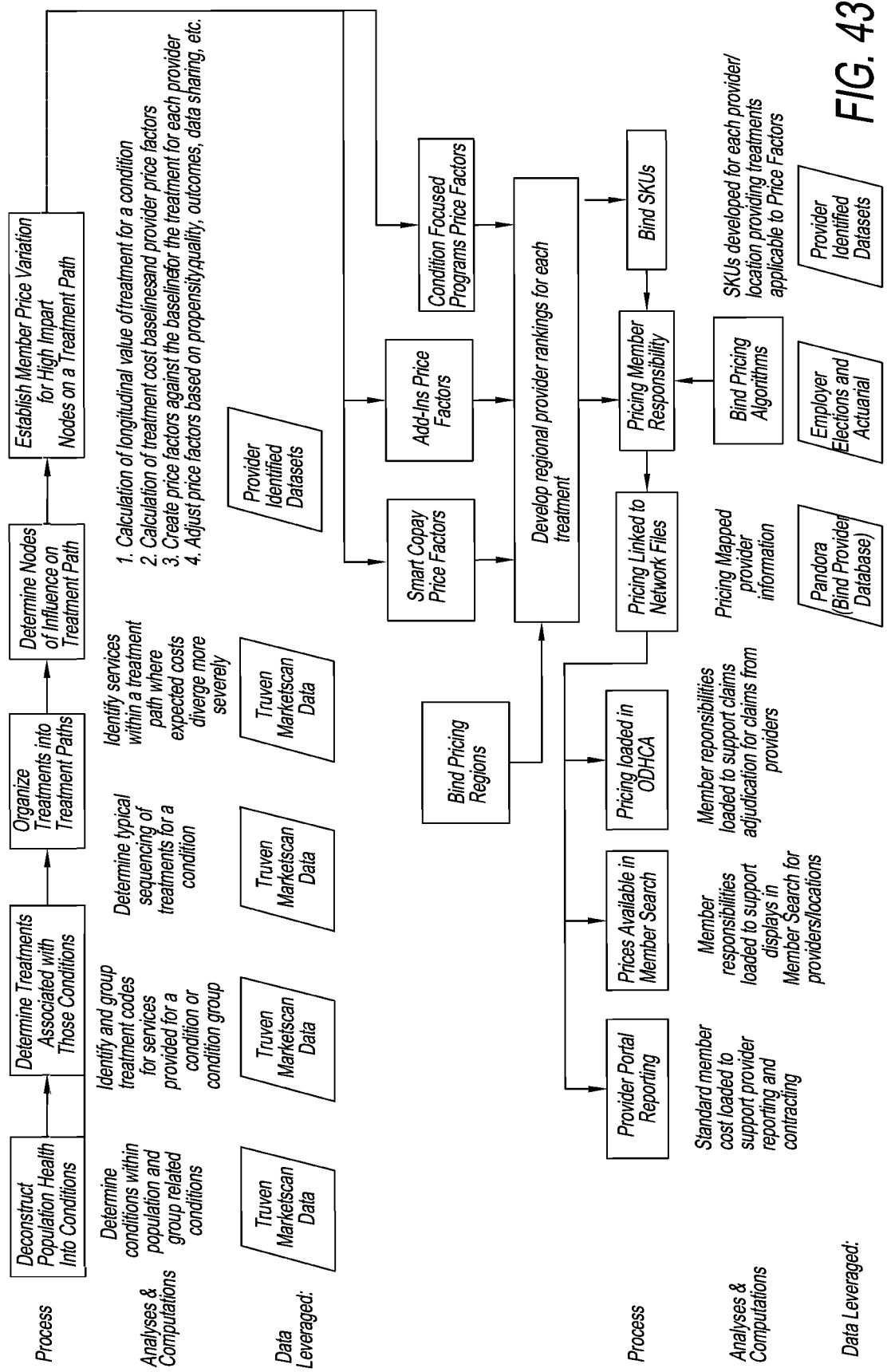
FIG. 43 shows an exemplary architecture for the UDRCD.

FIG. 43 shows an exemplary architecture for the UDRCD. In FIG. 43, embodiments of how pricing data may be generated and/or utilized by various UDRCD components are illustrated. In one implementation, population health may be deconstructed into conditions. For example, this may involve determining conditions within population and/or grouping related conditions. Treatments associated with the conditions may be determined. For example, this may involve identifying and/or grouping treatment codes for services provided for a condition or condition group. Treatments may be organized into treatment paths. For example, this may involve determining typical sequencing of treatments for the conditions. Nodes of influence of treatment paths may be determined. For example, this may involve identifying services with a treatment path where expected costs diverge more severely.

Member price variation for high impact nodes (e.g., nodes of influence) on a treatment path may be established. In one implementation, this may involve calculating longitudinal value of treatments for a condition, calculating treatment cost baselines and/or provider price factors, creating price factors against the baseline for the treatment for each provider, adjusting price factors based on propensity, quality, outcomes, data sharing, etc., and/or the like. For example, price factors may include smart copay price factors, add-ins price factors, condition-based programs price factors, and/or the like.

Regional provider rankings may be developed for various pricing regions and utilized along with conditions data, treatments data, price factors, and/or the like to develop SKUs for each provider and/or location providing treatments applicable to price factors. Member responsibility pricing may be determined for the SKUs (e.g., based on employer elections for an ODHI plan, actuarial data, and/or the like). Member responsibility pricing may be linked to network files (e.g., mapped to provider information).

Member responsibility pricing may be provided to various UDRCD components. In one implementation, member responsibility pricing may be loaded in ODHCA (e.g., to support claims adjudication for claims from providers). In another implementation, member responsibility pricing may be made available in member search (e.g., to support providing pricing information for providers and/or locations in member coverage search). In another implementation, member cost data may be loaded in provider portal reporting (e.g., to support provider reporting and/or contracting).

Figure 44:
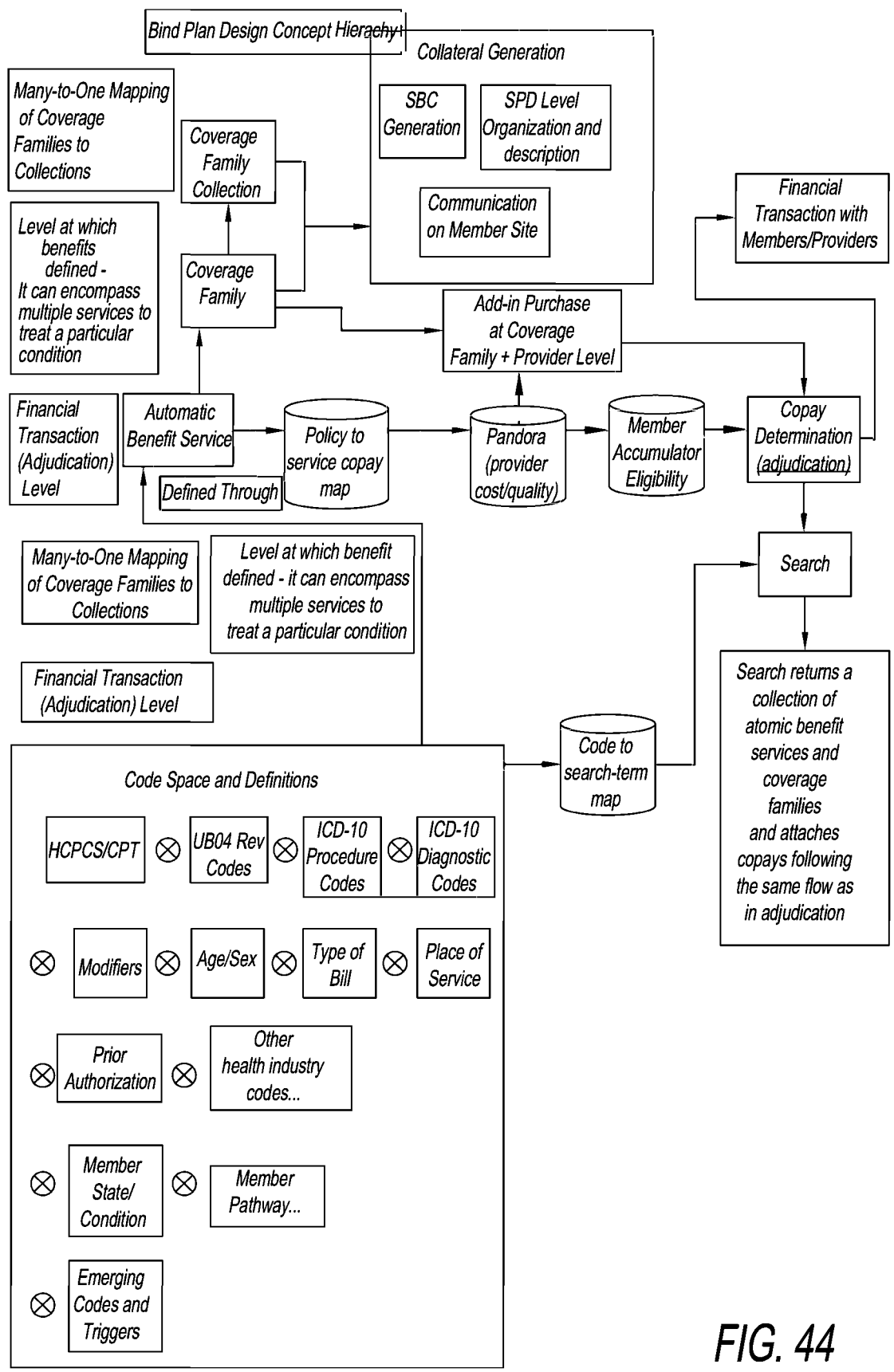
FIG. 44 shows an exemplary architecture for the UDRCD.

FIG. 44 shows an exemplary architecture for the UDRCD. In FIG. 44, embodiments of ODHI plan design hierarchy are illustrated. In one implementation, cost space and definitions (e.g., HCPCS/CPT, UB04 rev codes, ICD-10 procedure codes, ICD-10 diagnosis codes, modifiers, age/sex, type of bill, place of service, prior authorization, other health industry codes, member state/condition, member pathway, emerging codes and triggers, etc.) may be utilized to define atomic benefit services, coverage families, coverage family collections, and/or the like. Add-in purchases may be defined at coverage family and/or provider levels. Copays for atomic benefit services and/or add-ins may be determined (e.g., adjudication) and utilized to process financial transactions with members and/or providers. A code to search term map and copays may be utilized in member search (e.g., a search may return a collection of atomic benefit services and/or coverage families with copays).

Figure 45A:
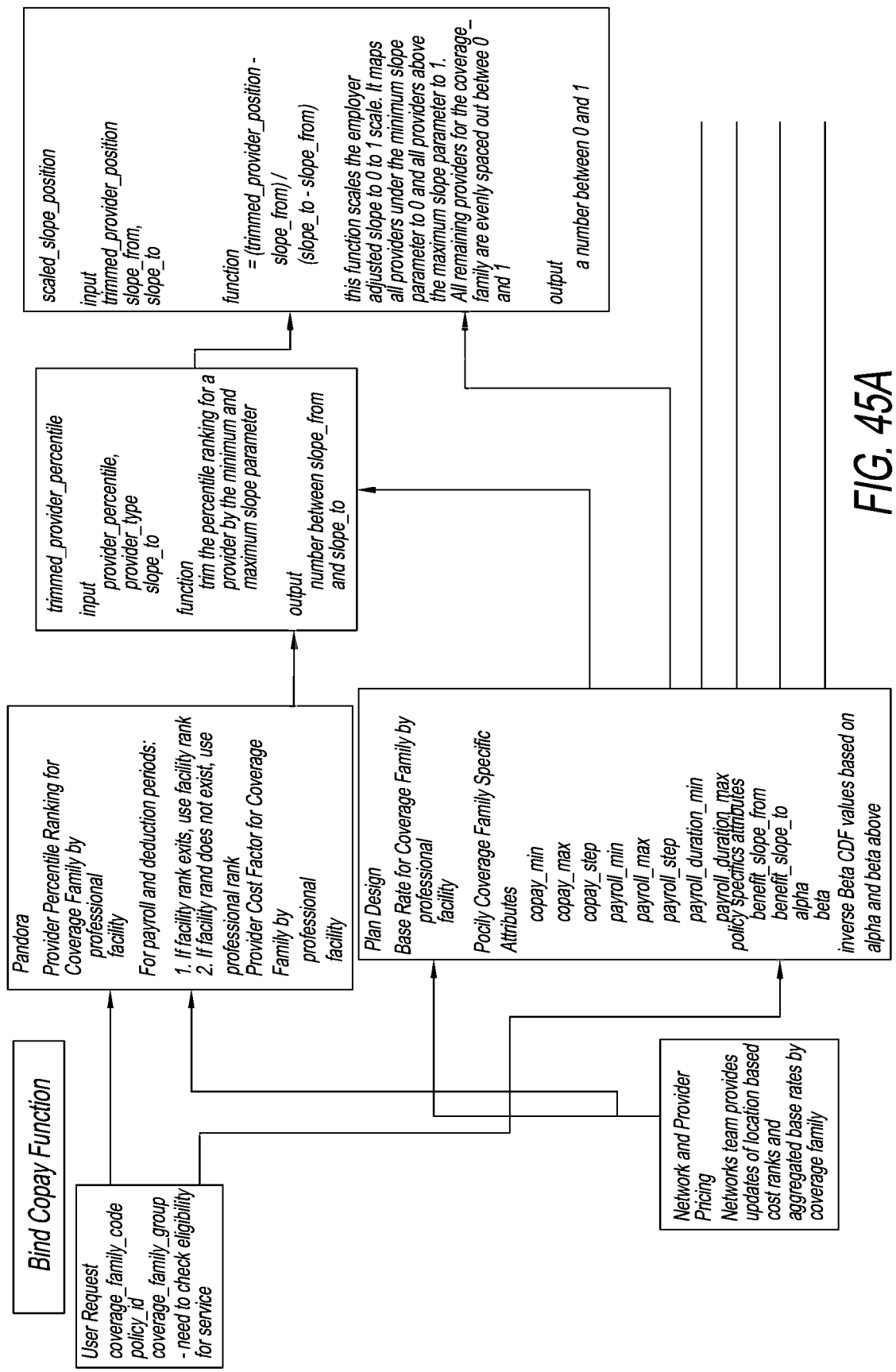
FIGS. 45A-B show an exemplary architecture for the UDRCD.
Figure 45B:
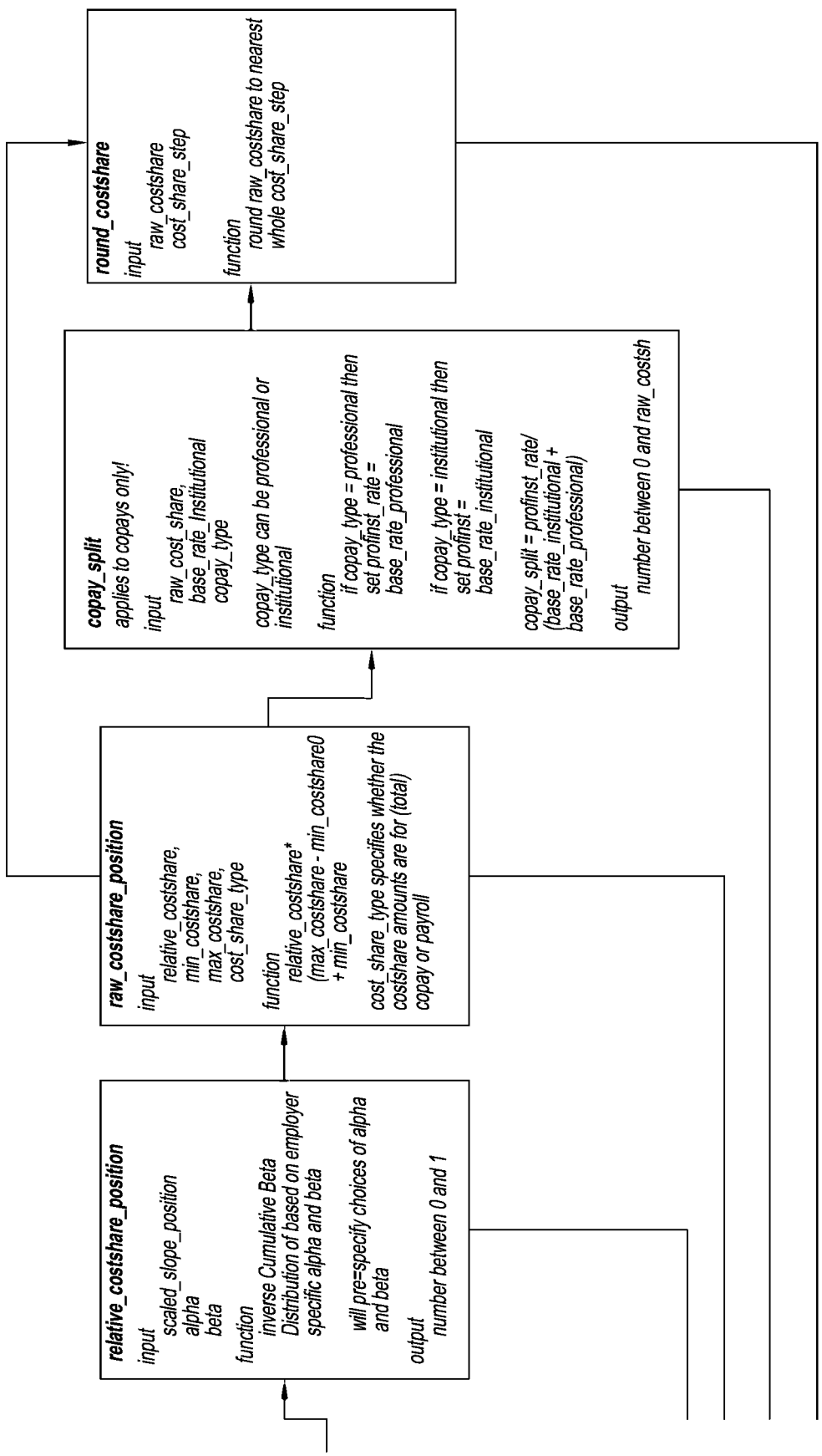

FIGS. 45A-B show an exemplary architecture for the UDRCD. In FIGS. 45A-B, embodiments of an exemplary copay determining function are illustrated. In one embodiment, copay may be determined based on a request from a user (e.g., when a user conducts a coverage search). In another embodiment, copay may be determined based on a request from the ELS (e.g., when the ELS recommends an add-in to a user). In one implementation, user request parameters may be analyzed to determine specified coverage (e.g., based on coverage family code and/or coverage family group) for which copay should be determined. Provider rankings (e.g., percentile rankings) and/or cost factors (e.g., by professional, by facility) for the specified coverage may be determined based on network and provider pricing data. In one implementation, user request parameters may be analyzed to determine a policy identifier of the user's ODHI plan. Plan design data (e.g., policy coverage family specific attributes, policy specific attributes) associated with the user's ODHI plan may be determined. For example, inverse beta cumulative distribution function (CDF) values may be determined based on alpha and beta.

In one implementation, providers' percentile rankings may be trimmed by the minimum and/or maximum slope parameters. The trimmed percentile rankings may be scaled to determine scaled slope positions (e.g., between 0 and 1). For example, providers under the minimum slope parameter may be mapped to 0, providers above the maximum slope parameter may be mapped to 1, and the remaining providers for the coverage family may be evenly spaced out between 0 and 1.

In one implementation, providers' relative cost share positions may be determined based on the scaled slope positions using inverse cumulative beta distribution and employer specific alpha and beta. The relative cost share positions may be used to determine raw cost share positions for providers. For example, cost share amounts may be determined for (e.g., total) copay or payroll based on the cost share type. The raw cost share positions may be analyzed to determine copay split (e.g., a number between 0 and raw cost share) for professionals and/or institutions. The raw cost share positions may be rounded (e.g., to the nearest whole cost share step) and provided to the requestor.

Figure 46:
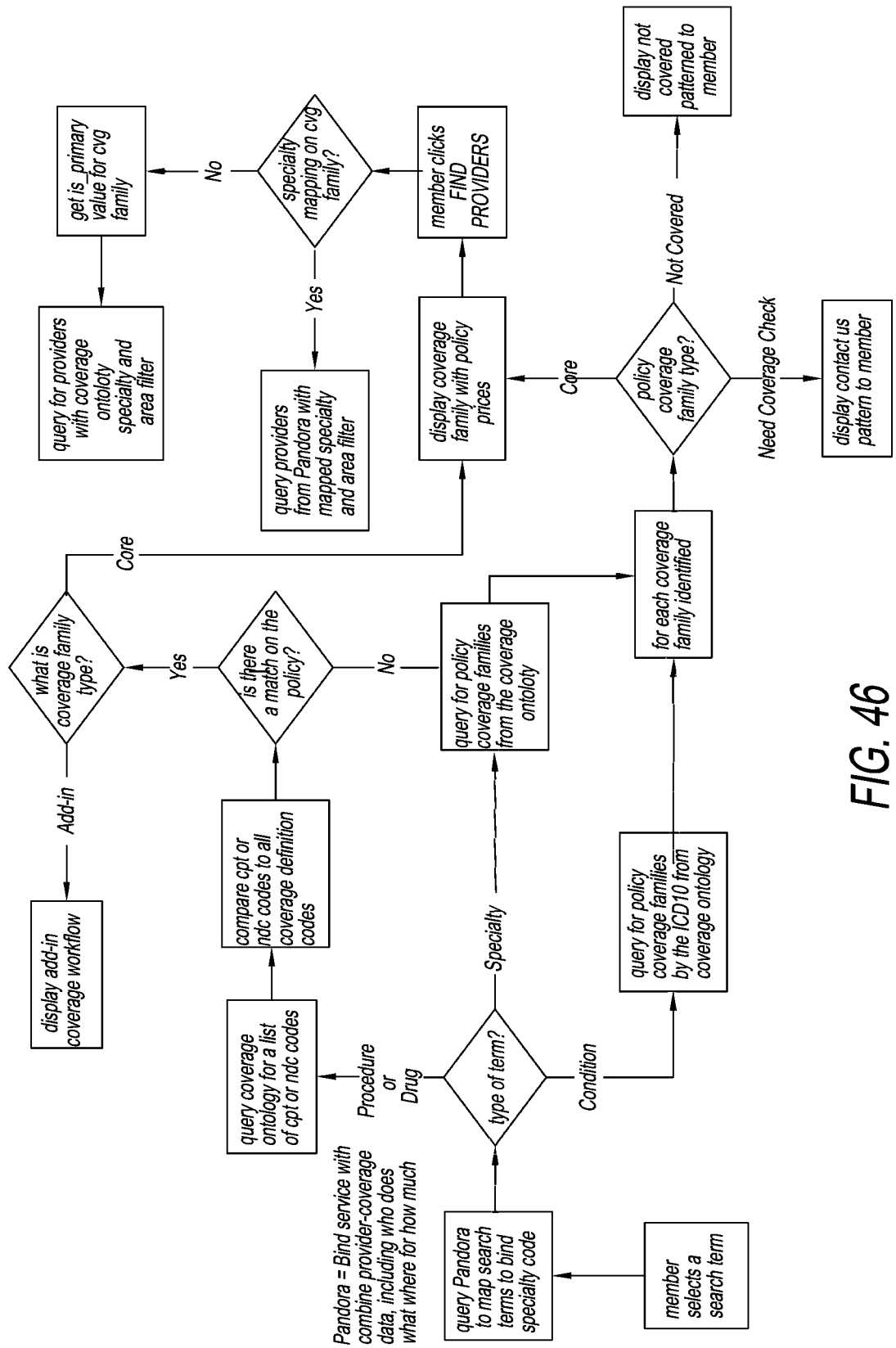
FIG. 46 shows an exemplary architecture for the UDRCD.

FIG. 46 shows an exemplary architecture for the UDRCD. In FIG. 46, embodiments of how a search (e.g., an "Is it covered?" search) may be handled are illustrated. In one embodiment, a member may select a search term (e.g., for a condition, for a procedure, for a drug, for a specialty). In one implementation, the search term may be mapped to a specialty code (e.g., using Pandora service that provides combined provider-coverage data such as who (e.g., provider) does what (e.g., treatment) where (e.g., facility) for how much).

If the member searched for a procedure or drug, coverage ontology may be queried and compared to coverage definition codes of the member's ODHI plan to determine whether the policy covers the procedure or drug. If so, information regarding the add-in or core coverage may be provided to the member. Information regarding available providers may also be provided to the member (e.g., when the member clicks "find providers").

For other search terms, coverage families may be identified from coverage ontology, and, for each identified coverage family, coverage information may be provided. If the member's ODHI plan provides core coverage, information regarding available providers may be provided to the member. If the member's ODHI plan does not provide core coverage but add-in coverage is available, information regarding purchasing a relevant add-in may be provided to the member.

Figure 47:
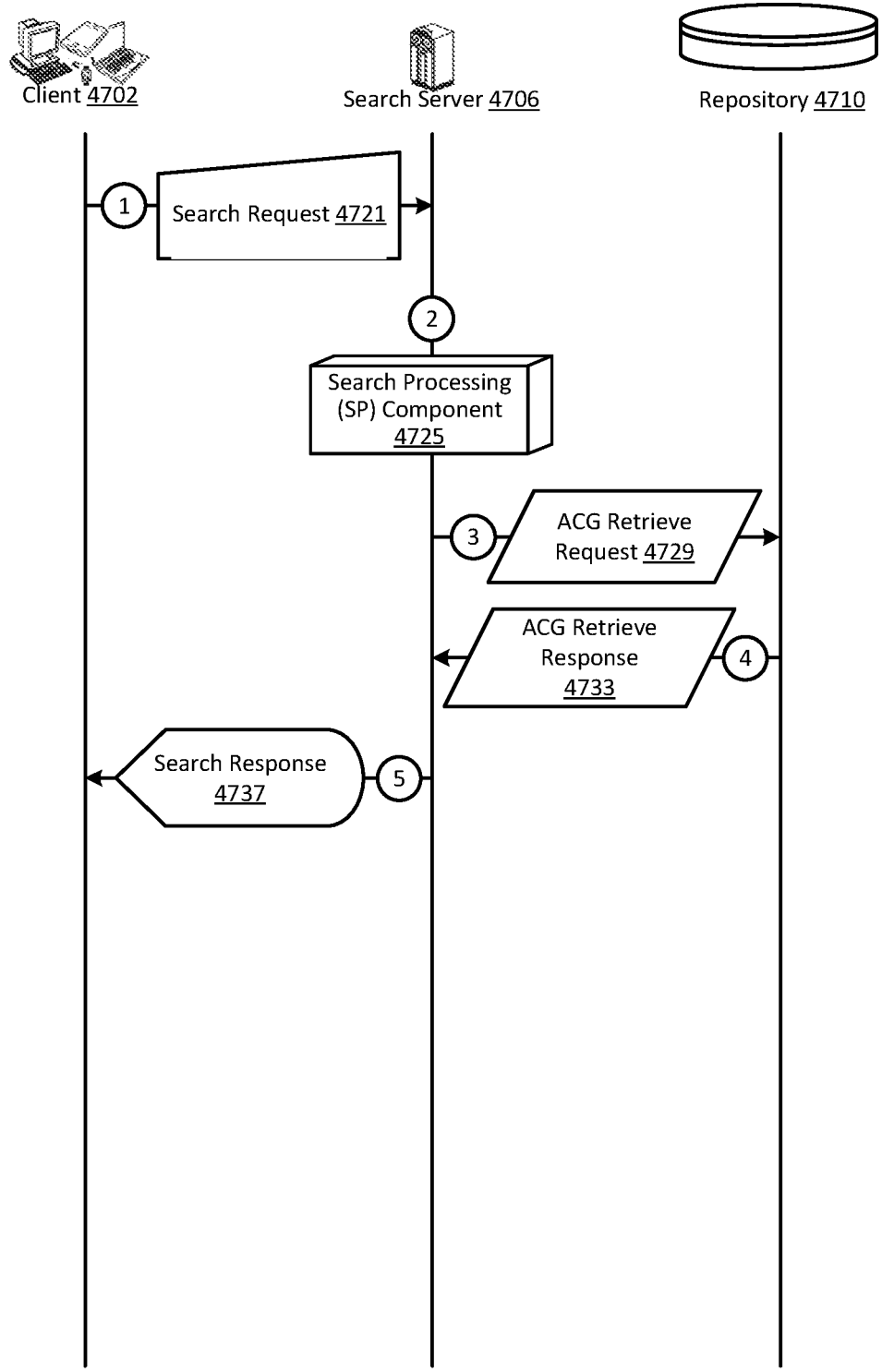
FIG. 47 shows a datagraph diagram illustrating embodiments of a data flow for the UDRCD.

FIG. 47 shows a datagraph diagram illustrating embodiments of a data flow for the UDRCD. In FIG. 47, a client 4702 may send a search request 4721 to a search server 4706. For example, the search request may be a plan member's coverage search (e.g., "Is it covered?" search) for a service, condition, specialty, treatment (e.g., procedure), drug, and/or the like. In one embodiment, the client may provide the following example search request, substantially in the form of a HTTP(S) POST message including XML-formatted data, as provided below:

POST/search_request.php HTTP/1.1
Host: www.server.com
Content-Type: Application/XML
Content-Length: 667
<?XML version="1.0" encoding="UTF-8"?>
<search_request>
  <user_accounts_details>
    <user_name>ID_user1</user_name>
    ...
  </user_accounts_details>
  <search_query>Knee Arthroscopy using United Hospital</search_query>
</search_request>

A search processing (SP) component 4725 may utilize data provided in the search request to provide search results for the plan member. See FIG. 48 for additional details regarding the SP component.

The search server may send an atomized coverage graph (ACG) retrieve request 4729 to a repository 4710 to obtain ACG data and/or related data (e.g., plan member data). In one implementation, the ACG retrieve request may include data such as a request identifier, an ACG identifier, a plan member identifier, requested data specification, and/or the like. In one embodiment, the search server may provide the following example ACG retrieve request, substantially in the form of a HTTP(S) POST message including XML-formatted data, as provided below:

POST/ACG_retrieve_request.php HTTP/1.1
Host: www.server.com
Content-Type: Application/XML
Content-Length: 667
<?XML version="1.0" encoding="UTF-8"?>
<ACG_retrieve_request>
  <request_identifier>ID_request_21</request_identifier>
  <ACG_identifier>ID_ACG_1</ACG_identifier>
  <user_name>ID_user1</user_name>
  <requested_data>
    graph action data for Knee Arthroscopy, plan member data
  </requested_data>
</ACG_retrieve_request>

The repository may send an ACG retrieve response 4733 to the search server to provide the search server with the requested ACG data and/or related data (e.g., plan member data). In one implementation, the ACG retrieve response may include data such as a response identifier, the requested data, and/or the like. In one embodiment, the repository may provide the following example ACG retrieve response, substantially in the form of a HTTP(S) POST message including XML-formatted data, as provided below:

POST/ACG_retrieve_response.php HTTP/1.1
Host: www.server.com
Content-Type: Application/XML
Content-Length: 667
<?XML version="1.0" encoding="UTF-8"?>
<ACG_retrieve_response>
  <response_identifier>ID_response_21</response_identifier>
  <requested_data>
    <condition>
      <condition_identifier>ID_condition_knee_pain</condition_identifier>
      <treatments>
        ID_treatment_arthroscopy, ID_treatment_injection,
        ID_treatment_physical_therapy
      </treatments>
    </condition>
    <treatment>
      <treatment_identifier>ID_treatment_arthroscopy</treatment_identifier>
      <condition>ID_condition_knee_pain</condition>

```
<providers>providers determined based on a SQL
    query</providers>
</treatment>
<treatment>
  <treatment_identifier>ID_treatment_injection</
      treatment_identifier>
  <condition>ID_condition_knee_pain</condi-
      tion>
  <providers>ID_provider_1, ID_provider_2</pro-
      viders>
</treatment>
<treatment>
  <treatment_identifier>
      ID_treatment_physical_therapy
  </treatment_identifier>
  <condition>ID_condition_knee_pain</condi-
      tion>
  <providers>ID_provider_2, ID_provider_3</pro-
      viders>
</treatment>
<provider>
  <provider_identifier>ID_provider_1</provid-
      er_identifier>
  <treatments>
      ID_treatment_injection,  ID_treatment_physi-
      cal_therapy
  </treatments>
  <provider_historical_data>
      historical treatment and/or cost data for pro-
      vider
  </provider_historical_data>
</provider>
<provider_identifier>ID_provider_2</provid-
    er_identifier>
  <treatments>
      ID_treatment_physical_therapy, ID_treatment_
      insulin_therapy
  </treatments>
  <provider_historical_data>
      historical treatment and/or cost data for pro-
      vider
  </provider_historical_data>
</provider>
<provider_identifier>ID_provider_3</provid-
    er_identifier>
  <treatments>ID_treatment_arthroscopy</treat-
      ments>
  <provider_historical_data>
      historical treatment and/or cost data for pro-
      vider
  </provider_historical_data>
</provider>
<member>
  <profile>profile data</profile>
  <plan_configuration>plan  configuration  data</
      plan_configuration>
  <member_state>member  state  data</member_
      state>
</member>
</requested_data>
</ACG_retrieve_response>
```

The search server may send a search response 4737 to the client to provide the search results to the plan member. For example, the search response may be displayed using a website, application (e.g., a mobile app), and/or the like. The search response may provide coverage information (e.g., whether a treatment is covered, whether alternative treatments are available for a condition, best provider for each treatment, copay amounts, etc.) to the plan member and/or may facilitate purchasing add-ins to obtain additional coverage.

Figure 48:
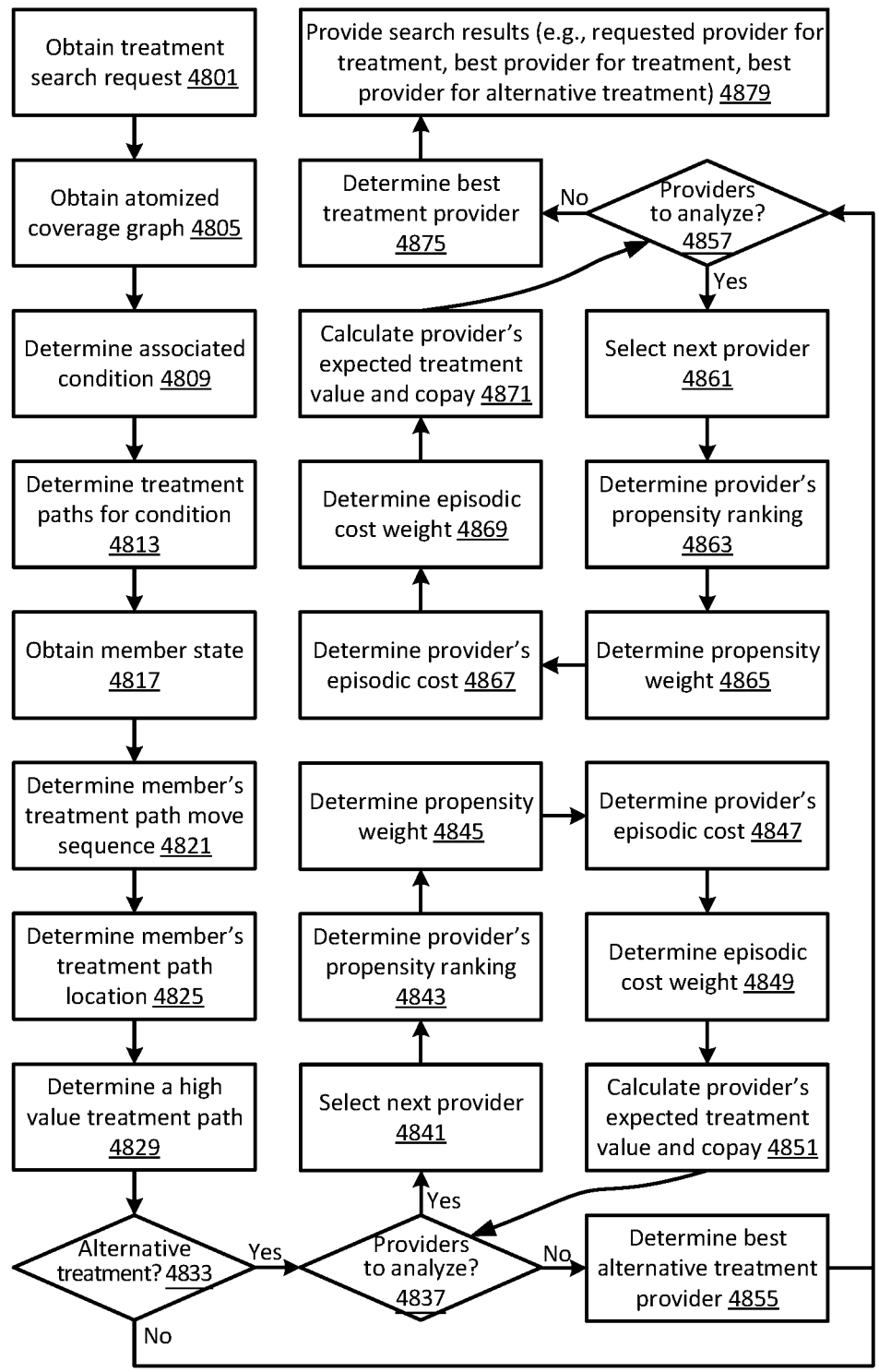
FIG. 48 shows a logic flow diagram illustrating embodiments of a search processing (SP) component for the UDRCD.

FIG. 48 shows a logic flow diagram illustrating embodiments of a search processing (SP) component for the UDRCD. In FIG. 48, a treatment search request may be obtained at 4801. For example, the treatment search request may be obtained as a result of a plan member's coverage search (e.g., an "Is it covered?" search) for a service, condition, specialty, treatment (e.g., procedure), drug, and/or the like.

Atomized coverage graph for the treatment search request may be obtained at 4805. In one implementation, the ACG (e.g., the default ACG) may be obtained via an ACG retrieve request. For example, the ACG may be retrieved via a MySQL database command similar to the following:

SELECT ACG_ConditionsData, ACG_TreatmentsData,
        ACG_ProvidersData,
    FROM ACGs
    WHERE ACG_ID=ID_ACG_1;

A condition associated with the treatment search request may be determined at 4809. In one implementation, the treatment search request may be parsed (e.g., using PHP commands) to determine an associated condition specified by the member. For example, a condition identifier (e.g., ID_condition_knee_pain) may be determined based on the member's search query. In another implementation, the treatment search request may be parsed (e.g., using PHP commands) to determine a treatment specified by the member, and the ACG may be analyzed to determine an associated condition that is linked to the treatment. For example, if the member searched for Knee Arthroscopy, Knee Pain (e.g., ID_condition_knee_pain) may be determined as the linked condition. In another implementation, the treatment search request may be parsed (e.g., using PHP commands) to determine a member requested provider (e.g., for the member specified condition, for the member specified treatment).

Treatment paths for the condition may be determined at 4813. In one embodiment, the treatment paths may identify various (e.g., high frequency) pathways that are utilized to treat the condition, whether a pathway is high value, medium value or low value (e.g., based on the cost and clinical outcome associated with the pathway), key pathway nodes where members select between different treatments and/or providers, and/or the like. In one implementation, the treatment paths may be determined via a MySQL database command similar to the following:

SELECT conditionTreatmentPaths
    FROM ACGs
    WHERE  ACG_ID=ID_ACG_1  AND  ConditionID=
        ID_condition_knee_pain;

Member state of the member may be determined at 4817. In one implementation, the treatment search request may be parsed (e.g., using PHP commands) to determine the member's identifier (e.g., ID_member_1), and the member state of the member may be determined via a MySQL database command similar to the following:

SELECT memberState
    FROM members
    WHERE memberID=ID_member_1;

The member's treatment path move sequence may be determined at 4821 and the member's treatment path location may be determined at 4825. In one implementation, the member state (e.g., the member's claim history based on X12 837 health care claims) may be analyzed with regard to the treatment paths (e.g., compared to the treatment paths for the condition) to determine the member's treatment path move sequence and the member's treatment path location.

A high value treatment path for the member may be determined at 4829. In one implementation, available treatment paths that the member may take from the member's treatment path location may be determined (e.g., based on available treatment paths and the configuration of the member's ODHI plan) and a high value treatment path for the member may be selected.

A determination may be made at 4833, whether an alternative treatment (e.g., different from the member specified treatment) that the member should utilize to follow the selected high value treatment path from the member's treatment path location is available. In one implementation, this determination may be made based on whether the next treatment on the high value treatment path matches the treatment specified by the member. In various embodiments, this determination may be made when the member is at any pathway node, when the member is at a key pathway node, when the member is at a pathway node having a level of influence or variance above a specified threshold, and/or the like.

If an alternative treatment is available, a determination may be made at 4837, whether there remain alternative treatment providers to analyze. In one implementation, each of the providers or provider networks that treats the condition and/or offers the alternative treatment may be analyzed. If there remain providers to analyze, the next available provider or provider network may be selected for analysis at 4841.

The selected provider's propensity ranking may be determined at 4843. In one embodiment, a propensity ranking may be calculated based on a set of probabilities that indicate the frequency with which a provider utilizes each of the available (e.g., high frequency) treatment paths, and expected treatment cost associated with each treatment path (e.g., calculated based on expected episodic cost of each treatment in a treatment path). In one implementation, the selected provider's practice patterns data may be analyzed to determine how likely the selected provider is to utilize each of the (e.g., high frequency) treatment paths that the member may take from the member's treatment path location. The expected treatment cost associated with each treatment path may be calculated as the sum of expected episodic costs of treatments in a treatment path. The selected provider's propensity ranking may be calculated as a weighted average of the expected treatment costs for the available treatment paths weighted by the likelihood that the selected provider is going to utilize each respective available treatment path.

Propensity weight may be determined at 4845. In one implementation, the propensity weight may be determined based on the level of influence the member's treatment path location node has on the treatment path options for the condition and/or the level of variance in expected cost and/or outcomes that have been identified for each of the treatment paths downstream from the member's treatment path location node.

The selected provider's expected episodic cost for the alternative treatment may be determined at 4847. In one embodiment, the episode of care may include the primary encounter for the alternative treatment. In another embodiment, the episode of care may include a pre and/or post window (e.g., 30 days prior to the primary encounter for the alternative treatment through 90 days after the primary encounter for the alternative treatment). In one implementation, the selected provider's treatment cost data may be analyzed to determine the selected provider's expected episodic cost for the alternative treatment.

Episodic cost weight may be determined at 4849. In one implementation, the episodic cost weight may be determined depending on which node the member's treatment path location node makes up on a treatment path and/or how far down a path it is. For example, a node that is closer to the end of a treatment path may have a higher episodic cost weight, whereas an earlier node may have a higher propensity weight.

The selected provider's expected longitudinal treatment value and copay may be calculated at 4851. In one embodiment, the expected longitudinal treatment value accounts for how the cost and/or outcomes for the condition can vary based on the provider that is providing the treatment for the condition. In one implementation, the expected longitudinal treatment value may be calculated as a weighted average of the selected provider's propensity ranking and the expected episodic cost for the alternative treatment weighted by their respective weights. In one embodiment, the copay for the member to utilize the alternative treatment (e.g., via core coverage, via a relevant add-in) may be determined. In one implementation, the copay may be a base copay calculated based on the average longitudinal treatment value for providers in the region associated with the member. In another implementation, the copay may be a smart copay (e.g., a smart copay varies in cost to the member based on the provider that provides treatment) that may be calculated by adjusting the base copay based on the expected longitudinal treatment value. See FIGS. 45A-B for an example of how a copay may be calculated.

In some alternative embodiments, propensity ranks, propensity weights, episodic costs, episodic cost weights, expected longitudinal treatment values, and/or the like may be recursively calculated for each node for each of the treatment paths downstream from the member's treatment path location node, and utilized to calculate the expected longitudinal treatment value for the member's treatment path location node.

In some alternative embodiments, the copay and/or other add-in costs to the member may be adjusted based on the member state (e.g., to steer members toward treatment paths with high clinical value). In one implementation, the member may receive a treatment path progression discount on the relevant add-in if the member already utilized a more conservative treatment. See FIG. 37 for an example of how a treatment path progression discount may be offered. In another implementation, the member may receive a condition-based discount (e.g., a discount offered if the member has a certain medical condition) on the relevant add-in. See FIG. 41 for an example of how a condition-based discount may be offered.

If there are no more providers to analyze, the best alternative treatment provider may be determined at 4855. In one implementation, the best provider for the alternative treatment may be the provider with the lowest expected longitudinal treatment value. For example, the best provider may have the lowest smart copay (e.g., to steer members toward a provider that is likely to use treatment paths with high clinical value).

A determination may be made at 4857, whether there remain member specified treatment providers to analyze. In one implementation, each of the providers or provider networks that treats the condition and/or offers the member specified treatment may be analyzed. If there remain providers to analyze, the next available provider or provider network may be selected for analysis at 4861.

The selected provider's propensity ranking may be determined at 4863. In one embodiment, a propensity ranking may be calculated based on a set of probabilities that indicate the frequency with which a provider utilizes each of the available (e.g., high frequency) treatment paths, and expected treatment cost associated with each treatment path (e.g., calculated based on expected episodic cost of each treatment in a treatment path). In one implementation, the selected provider's practice patterns data may be analyzed to determine how likely the selected provider is to utilize each of the (e.g., high frequency) treatment paths that the member may take from the member's treatment path location (e.g., assuming that the member utilizes the member specified treatment next). The expected treatment cost associated with each treatment path may be calculated as the sum of expected episodic costs of treatments in a treatment path. The selected provider's propensity ranking may be calculated as a weighted average of the expected treatment costs for the available treatment paths weighted by the likelihood that the selected provider is going to utilize each respective available treatment path.

Propensity weight may be determined at 4865. In one implementation, the propensity weight may be determined based on the level of influence the member's treatment path location node has on the treatment path options for the condition and/or the level of variance in expected cost and/or outcomes that have been identified for each of the treatment paths downstream from the member's treatment path location node (e.g., assuming that the member utilizes the member specified treatment next).

The selected provider's expected episodic cost for the member specified treatment may be determined at 4867. In one embodiment, the episode of care may include the primary encounter for the member specified treatment. In another embodiment, the episode of care may include a pre and/or post window (e.g., 30 days prior to the primary encounter for the member specified treatment through 90 days after the primary encounter for the member specified treatment). In one implementation, the selected provider's treatment cost data may be analyzed to determine the selected provider's expected episodic cost for the member specified treatment.

Episodic cost weight may be determined at 4869. In one implementation, the episodic cost weight may be determined depending on which node the member's treatment path location node makes up on a treatment path and/or how far down a path it is (e.g., assuming that the member utilizes the member specified treatment next). For example, a node that is closer to the end of a treatment path may have a higher episodic cost weight, whereas an earlier node may have a higher propensity weight.

The selected provider's expected longitudinal treatment value and copay may be calculated at 4871. In one embodiment, the expected longitudinal treatment value accounts for how the cost and/or outcomes for the condition can vary based on the provider that is providing the treatment for the condition. In one implementation, the expected longitudinal treatment value may be calculated as a weighted average of the selected provider's propensity ranking and the expected episodic cost for the member specified treatment weighted by their respective weights. In one embodiment, the copay for the member to utilize the member specified treatment (e.g., via core coverage, via a relevant add-in) may be determined. In one implementation, the copay may be a base copay calculated based on the average longitudinal treatment value for providers in the region associated with the member. In another implementation, the copay may be a smart copay (e.g., a smart copay varies in cost to the member based on the provider that provides treatment) that may be calculated by adjusting the base copay based on the expected longitudinal treatment value. See FIGS. 45A-B for an example of how a copay may be calculated.

In some alternative embodiments, propensity ranks, propensity weights, episodic costs, episodic cost weights, expected longitudinal treatment values, and/or the like may be recursively calculated for each node for each of the treatment paths downstream from the member's treatment path location node, and utilized to calculate the expected longitudinal treatment value for the member's treatment path location node (e.g., assuming that the member utilizes the member specified treatment next).

In some alternative embodiments, the copay and/or other add-in costs to the member may be adjusted based on the member state (e.g., to steer members toward treatment paths with high clinical value). In one implementation, the member may receive a treatment path progression discount on the relevant add-in if the member already utilized a more conservative treatment. See FIG. 37 for an example of how a treatment path progression discount may be offered. In another implementation, the member may receive a condition-based discount (e.g., a discount offered if the member has a certain medical condition) on the relevant add-in. See FIG. 41 for an example of how a condition-based discount may be offered.

If there are no more providers to analyze, the best member specified treatment provider may be determined at 4875. In one implementation, the best provider for the member specified treatment may be the provider with the lowest expected longitudinal treatment value. For example, the best provider may have the lowest smart copay (e.g., to steer members toward a provider that is likely to use treatment paths with high clinical value).

Search results may be provided to the member at 4879. In one implementation, the search results may be returned via a search response. For example, the search results may include coverage information for the member specified condition, for the member specified treatment (e.g., for the member requested provider for the member specified treatment, for the best provider for the member specified treatment), for the alternative treatment (e.g., for the best provider for the alternative treatment), and/or the like.

Figure 49:
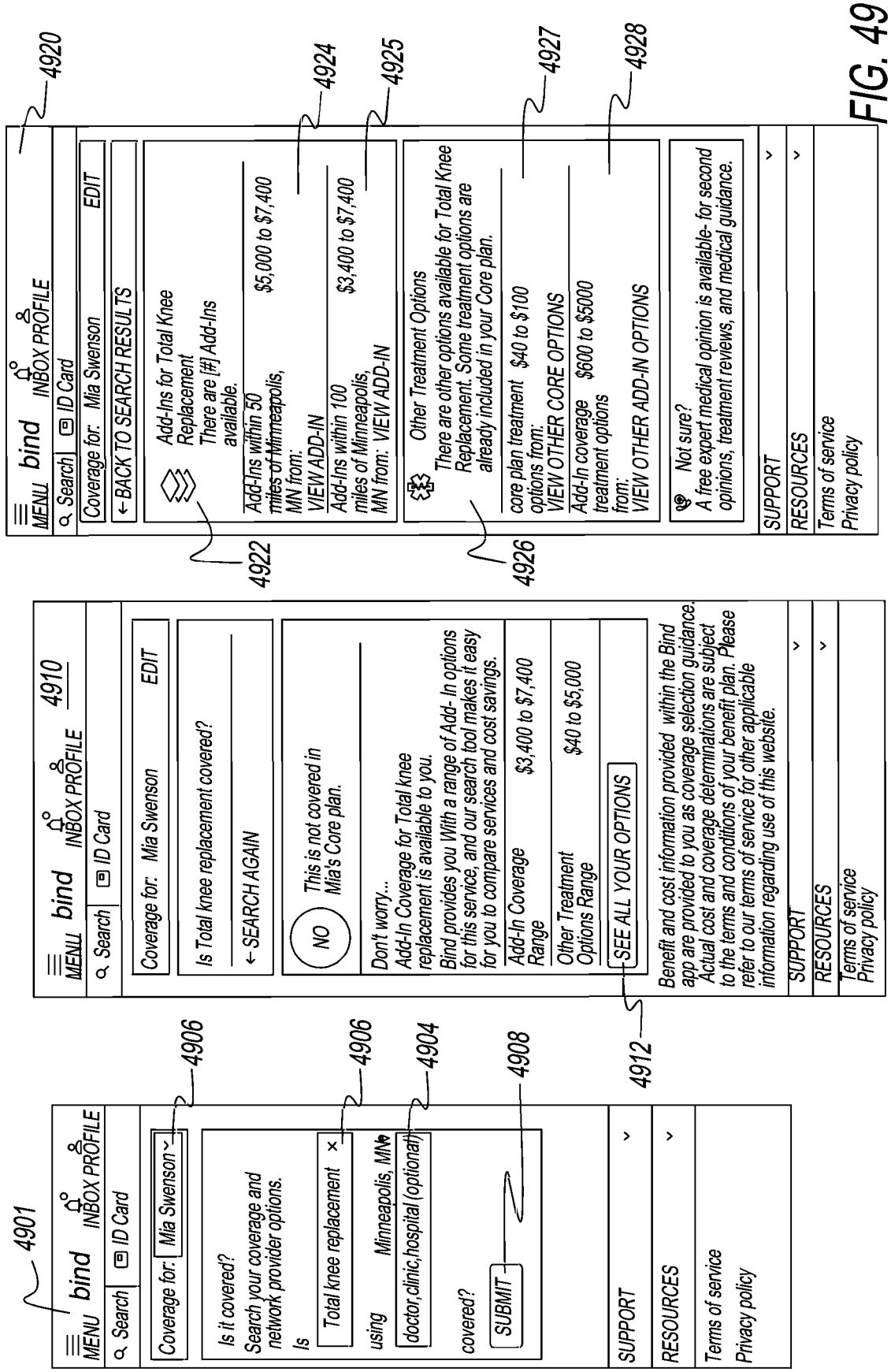
FIG. 49 shows a screenshot diagram illustrating embodiments of the UDRCD.

FIG. 49 shows a screenshot diagram illustrating embodiments of the UDRCD. In FIG. 49, an exemplary user interface (e.g., for a website) for conducting an "Is it covered?" search is illustrated. Screen 4901 shows that a member may conduct a search to determine whether a service, condition, specialty, treatment (e.g., procedure), drug, and/or the like specified via a GUI widget 4902 is covered using (e.g., optional) a person provider (e.g., a particular doctor), clinic, hospital, pharmacy, and/or the like specified via a GUI widget 4904 for a plan member (e.g., of an ODHI plan) specified via a GUI widget 4906. The member may utilize a "Submit" button 4908 to submit the search query (e.g., Is Total Knee Replacement using a provider near Minneapolis, Minn. covered for plan member Mia). Screen 4910 shows results when a treatment is not covered. For example, an indication that the treatment is not covered may be provided, and information about available add-in coverage options for the treatment and alternative treatment coverage options may be provided. The member may utilize a "See All Your Options" button 4912 to view additional details regarding the available coverage options. Screen 4920 shows additional details regarding the available coverage options. A GUI widget 4922 shows details regarding available add-ins for the Total Knee Replacement treatment. The member may utilize a "View Add-in" link 4924 to view available add-ins for the treatment within 50 miles of Minneapolis, Minn. These add-ins range from $5,000 to $7,400 in cost. The member may utilize a "View Add-in" link 4925 to view available add-ins for the treatment within 100 miles of Minneapolis, Minn. These add-ins range from $3,400 to $7,400 in cost. A GUI widget 4926 shows details regarding available alternative treatment coverage options. The member may utilize a "View Other Core Options" link 4927 to view additional details regarding core coverage options for alternative treatments. The member may utilize a "View Other Add-in Options" link 4928 to view additional details regarding add-in coverage options for alternative treatments.

Figure 50:
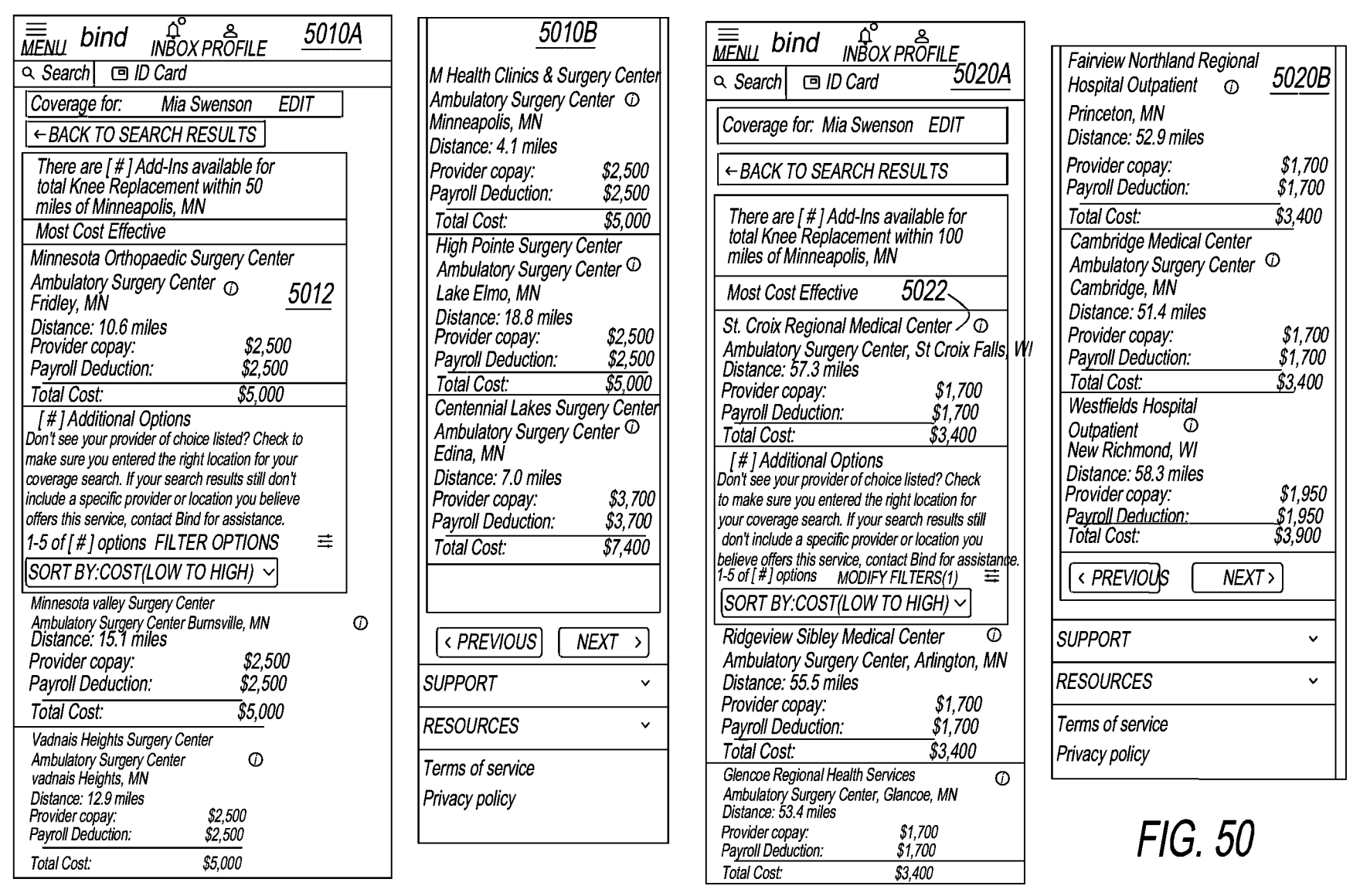

FIG. 50 shows a screenshot diagram illustrating embodiments of the UDRCD. In FIG. 50, an exemplary user interface (e.g., for a website) for providing results for an "Is it covered?" search is illustrated. Screen 5010A-B shows available add-ins for the treatment within 50 miles of Minneapolis, Minn. A GUI widget 5012 shows the most cost effective available add-in for the treatment (e.g., the add-in associated with the best provider within 50 miles of Minneapolis, Minn.). Screen 5020A-B shows available add-ins for the treatment within 100 miles of Minneapolis, Minn. A GUI widget 5022 shows the most cost effective available add-in for the treatment (e.g., the add-in associated with the best provider within 100 miles of Minneapolis, Minn.). The member may select one of the available add-ins to facilitate purchasing add-in coverage.

Figure 51:
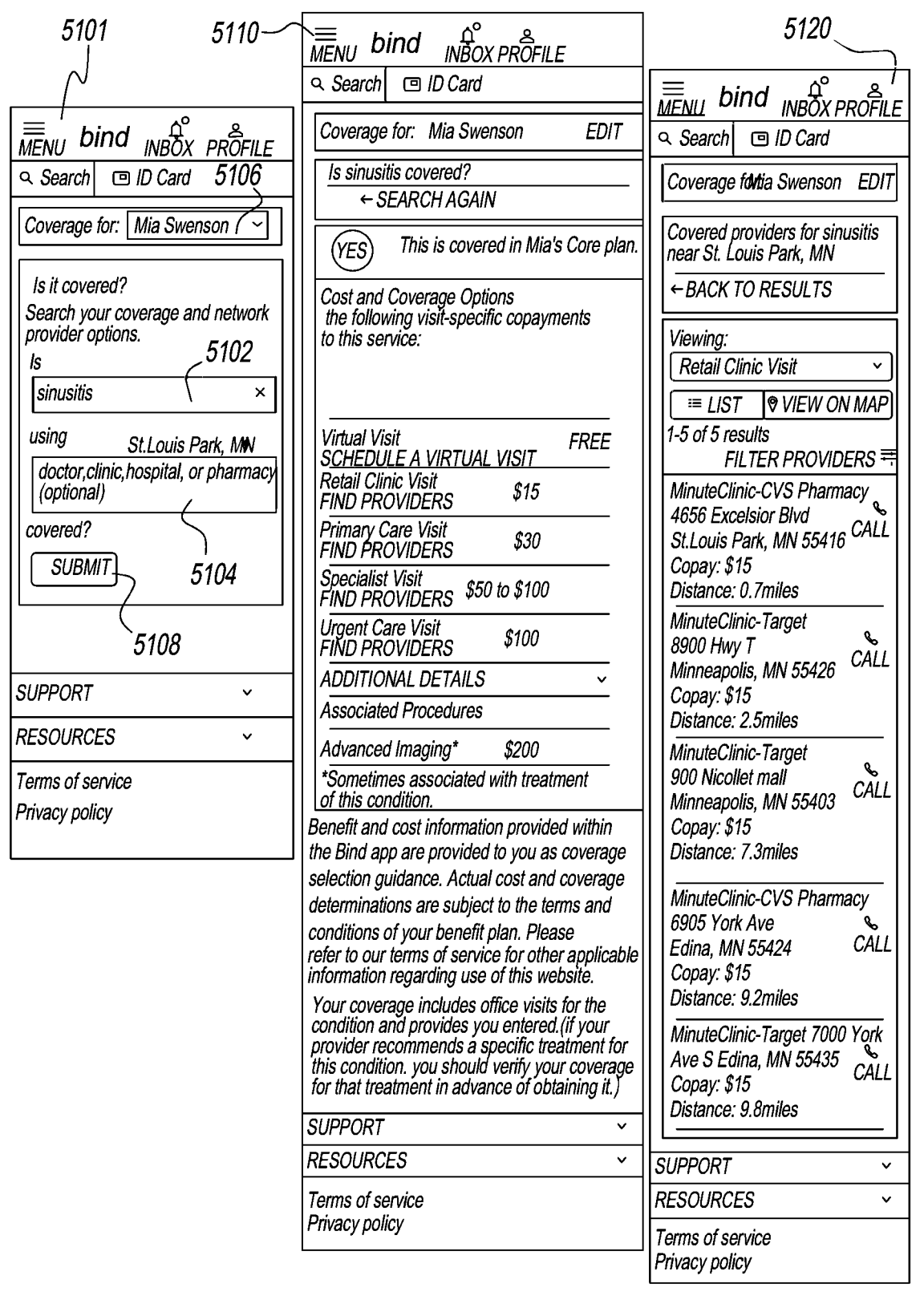

FIG. 51 shows a screenshot diagram illustrating embodiments of the UDRCD. In FIG. 51, an exemplary user interface (e.g., for a website) for conducting an "Is it covered?" search is illustrated. Screen 5101 shows that a member may conduct a search to determine whether a service, condition, specialty, treatment (e.g., procedure), drug, and/or the like specified via a GUI widget 5102 is covered using (e.g., optional) a person provider (e.g., a particular doctor), clinic, hospital, pharmacy, and/or the like specified via a GUI widget 5104 for a plan member (e.g., of an ODHI plan) specified via a GUI widget 5106. The member may utilize a "Submit" button 5108 to submit the search query (e.g., Is Sinusitis using a provider near St. Louis Park, Minn. covered for plan member Mia). Screen 5110 shows results when a treatment is covered via core coverage. For example, an indication that the Sinusitis condition is covered via core coverage and information regarding cost and coverage options may be provided. The member may utilize "Find Providers" links to find providers to treat the condition (e.g., retail clinic providers, primary care providers, specialist providers, urgent care providers). Screen 5120 shows available providers for Sinusitis near St. Louis Park, Minn.

Figure 52:
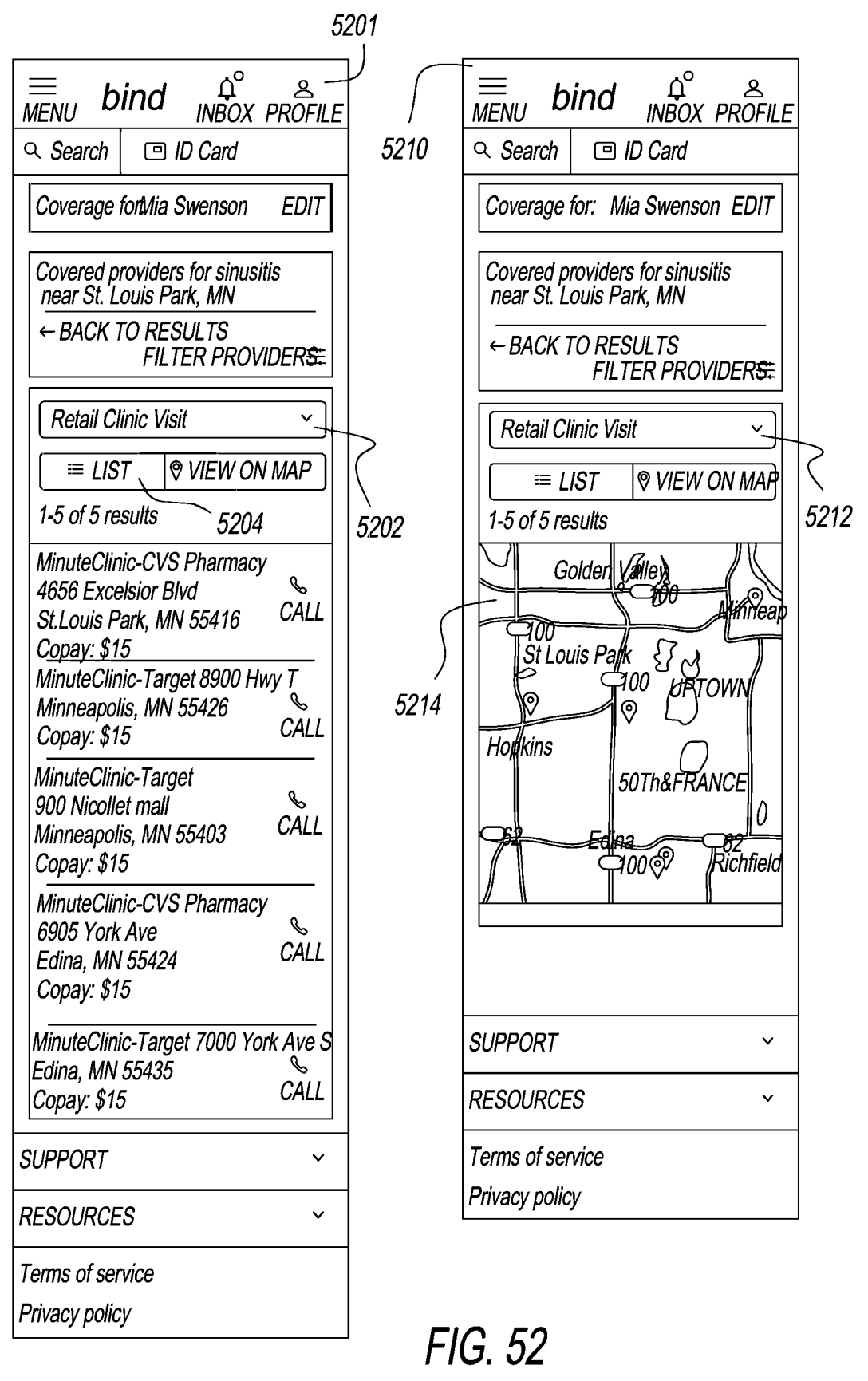

FIG. 52 shows a screenshot diagram illustrating embodiments of the UDRCD. In FIG. 52, an exemplary user interface (e.g., for a website) for providing results for an "Is it covered?" search is illustrated. Screen 5201 shows available providers for Sinusitis near St. Louis Park, Minn. The member may utilize a GUI widget 5202 to select to view retail clinic providers. The member may utilize a GUI widget 5204 to select to view a list of available retail clinic providers. Screen 5210 shows available providers for Sinusitis near St. Louis Park, Minn. The member may utilize a GUI widget 5212 to select to view available retail clinic providers on a map via a map component 5214.

Figure 53:
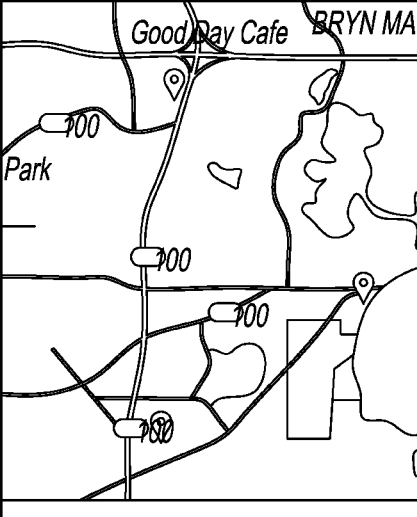
FIG. 53 shows a screenshot diagram illustrating embodiments of the UDRCD.

FIG. 53 shows a screenshot diagram illustrating embodiments of the UDRCD. In FIG. 53, an exemplary user interface (e.g., for a website) for providing results for an "Is it covered?" search is illustrated. Screen 5301 shows available providers for Sinusitis near St. Louis Park, Minn. The member may utilize a GUI widget 5302 to select to view primary care providers. The member may utilize a GUI widget 5304 to select to view a list of available primary care providers. Screen 5310 shows available providers for Sinusitis near St. Louis Park, Minn. The member may utilize a GUI widget 5312 to select to view available primary care providers on a map via a map component 5314.

Figure 54:
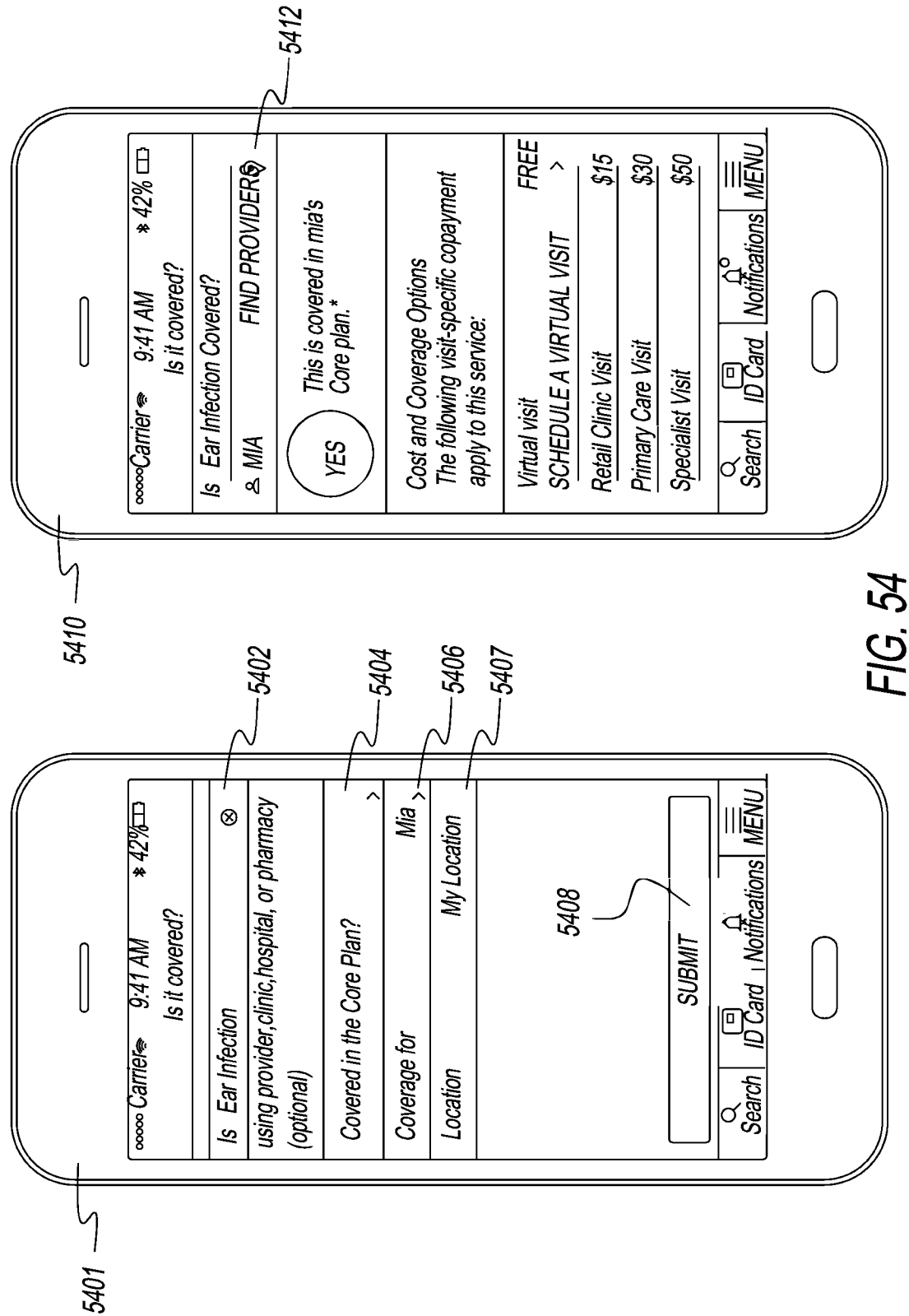
FIG. 54 shows a screenshot diagram illustrating embodiments of the UDRCD.

FIG. 54 shows a screenshot diagram illustrating embodiments of the UDRCD. In FIG. 54, an exemplary user interface (e.g., for a mobile app) for conducting an "Is it covered?" search is illustrated. Screen 5401 shows that a member may conduct a search to determine whether a service, condition, specialty, treatment (e.g., procedure), drug, and/or the like specified via a GUI widget 5402 is covered using (e.g., optional) a person provider (e.g., a particular doctor), clinic, hospital, pharmacy, and/or the like specified via a GUI widget 5404 for a plan member (e.g., of an ODHI plan) specified via a GUI widget 5406 at a location specified via a GUI widget 5407. The member may utilize a "Submit" button 5408 to submit the search query (e.g., Is Ear Infection covered for plan member Mia using a provider near Mia's location). Screen 5410 shows results when a treatment is covered via core coverage. For example, an indication that the Ear Infection condition is covered via core coverage and information regarding cost and coverage options may be provided. The member may utilize a "Find Providers" link 5412 to find providers to treat the condition (e.g., retail clinic providers, primary care providers, specialist providers, urgent care providers).

Figure 55:
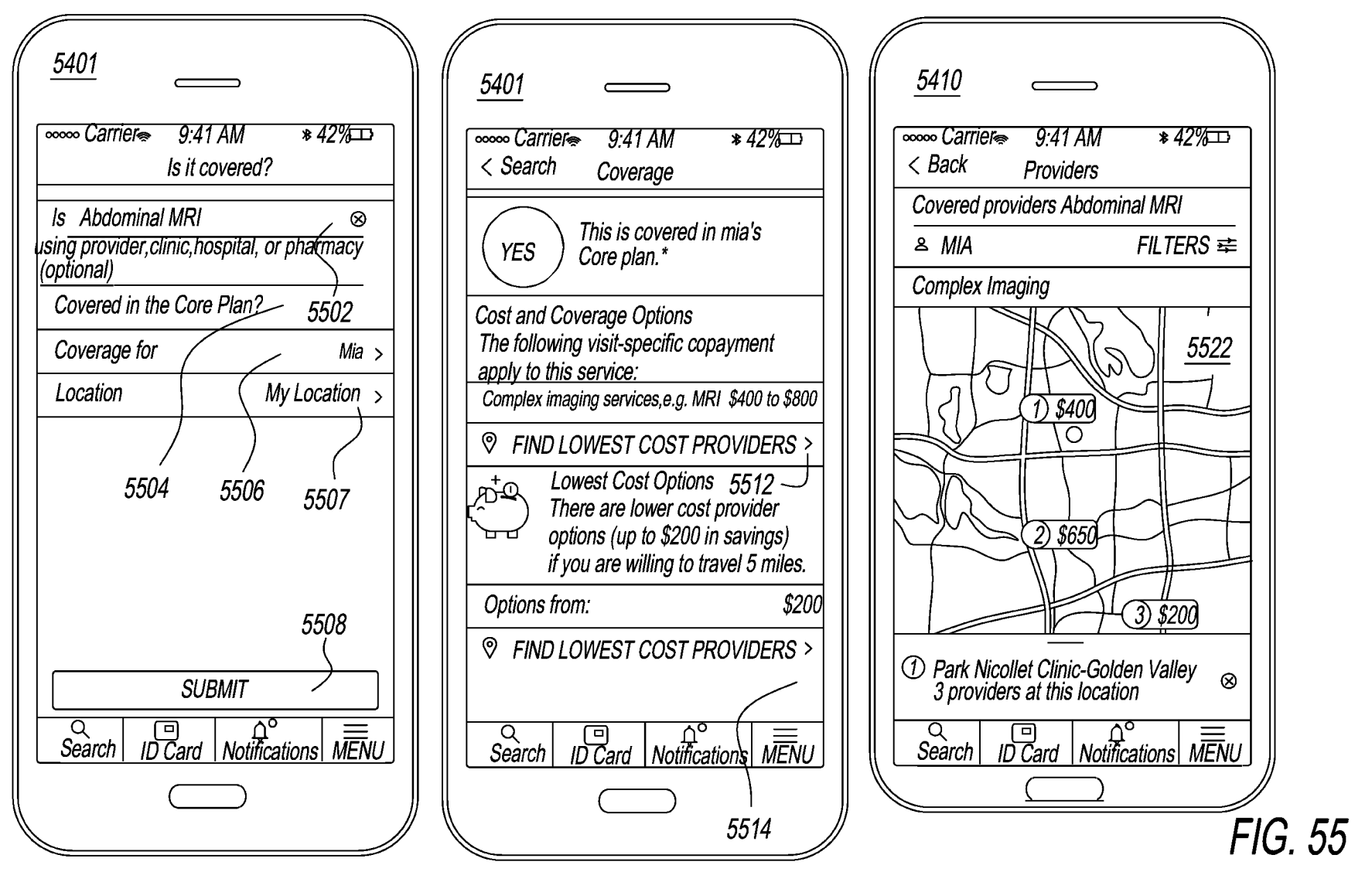

FIG. 55 shows a screenshot diagram illustrating embodiments of the UDRCD. In FIG. 55, an exemplary user interface (e.g., for a mobile app) for conducting an "Is it covered?" search is illustrated. Screen 5501 shows that a member may conduct a search to determine whether a service, condition, specialty, treatment (e.g., procedure), drug, and/or the like specified via a GUI widget 5502 is covered using (e.g., optional) a person provider (e.g., a particular doctor), clinic, hospital, pharmacy, and/or the like specified via a GUI widget 5504 for a plan member (e.g., of an ODHI plan) specified via a GUI widget 5506 at a location specified via a GUI widget 5507. The member may utilize a "Submit" button 5508 to submit the search query (e.g., Is Abdominal MRI covered for plan member Mia using a provider near Mia's location). Screen 5510 shows results when a treatment is covered via core coverage. For example, an indication that the Abdominal MRI treatment is covered via core coverage and information regarding cost and coverage options may be provided. The member may utilize "Find Lower Cost Providers" link 5512 to find providers that offer the treatment (e.g., with smart copays utilized to steer the member toward the best providers). For example, the member may find lower cost providers if the member is willing to travel 5 miles. Similarly, the member may utilize "Find Lower Cost Providers" link 5514 to find providers that offer an alternative treatment (e.g., based on a high value treatment path). Screen 5520 shows available providers for Abdominal MRI near Mia's location and the smart copay associated with utilizing each provider on a map via a map component 5522.

Figure 56:
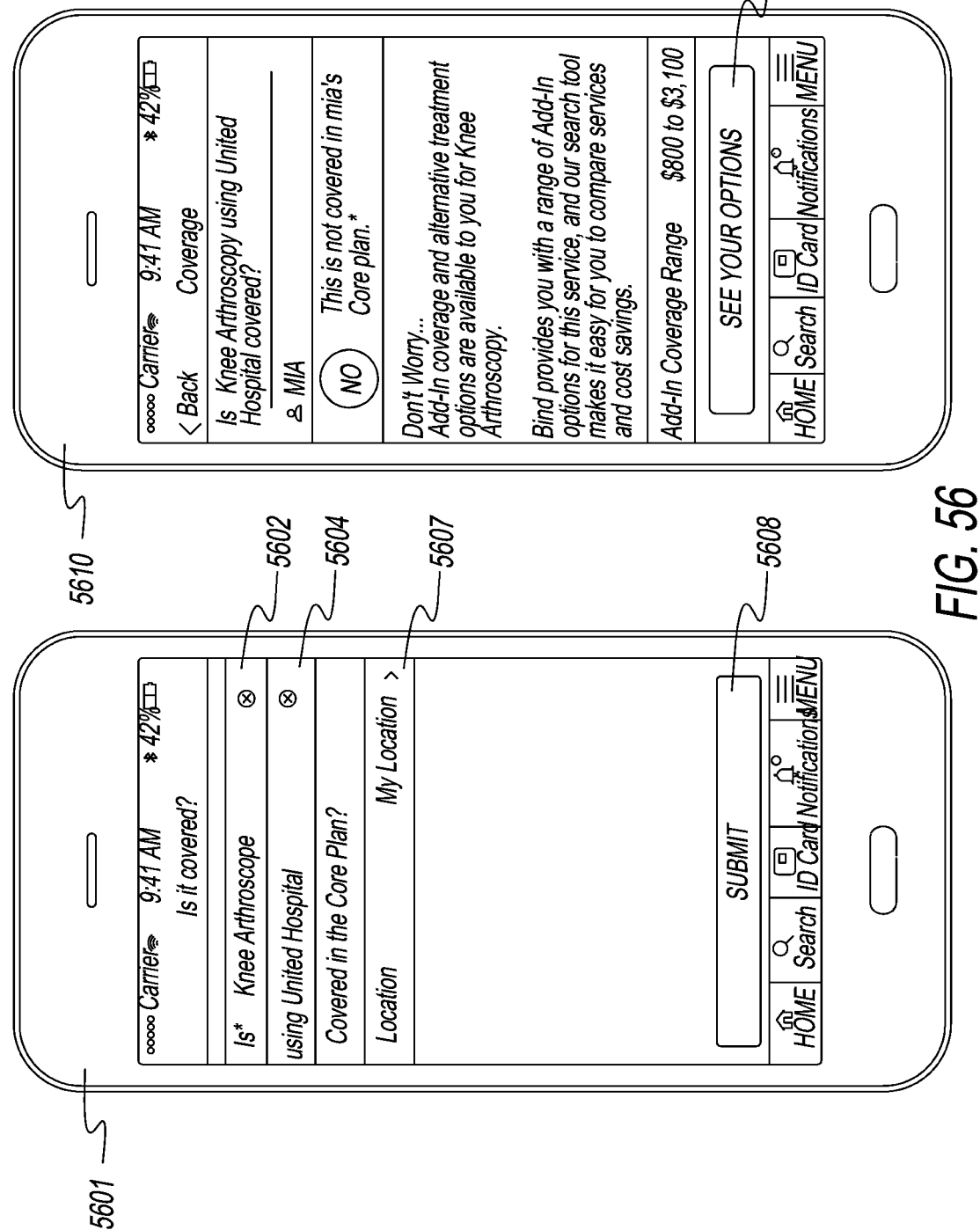
FIG. 56 shows a screenshot diagram illustrating embodiments of the UDRCD.

FIG. 56 shows a screenshot diagram illustrating embodiments of the UDRCD. In FIG. 56, an exemplary user interface (e.g., for a mobile app) for conducting an "Is it covered?" search is illustrated. Screen 5601 shows that a member may conduct a search to determine whether a service, condition, specialty, treatment (e.g., procedure), drug, and/or the like specified via a GUI widget 5602 is covered using (e.g., optional) a person provider (e.g., a particular doctor), clinic, hospital, pharmacy, and/or the like specified via a GUI widget 5604 for a plan member (e.g., of an ODHI plan) at a location specified via a GUI widget 5607. The member may utilize a "Submit" button 5608 to submit the search query (e.g., Is Knee Arthroscopy using United Hospital covered for plan member Mia using a provider near Mia's location). Screen 5610 shows results when a treatment is not covered. For example, an indication that the treatment is not covered via core coverage may be provided, and information about available add-in coverage options for the treatment and alternative treatment coverage options may be provided. The member may utilize a "See Your Options" button 5612 to view additional details regarding the available coverage options.

Figure 57:
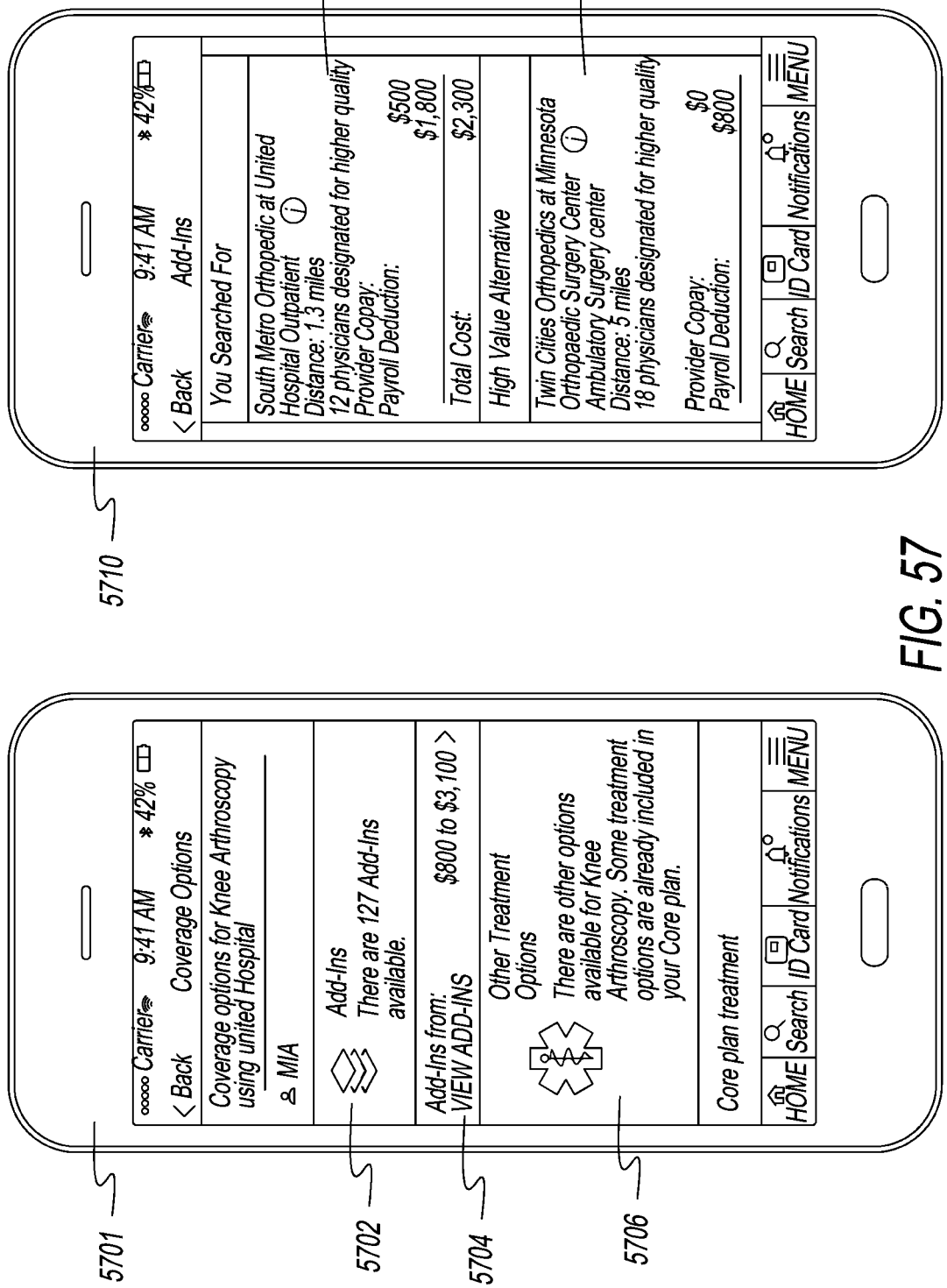
FIG. 57 shows a screenshot diagram illustrating embodiments of the UDRCD.

FIG. 57 shows a screenshot diagram illustrating embodiments of the UDRCD. In FIG. 57, an exemplary user interface (e.g., for a mobile app) for providing results for an "Is it covered?" search is illustrated. Screen 5701 shows additional details regarding the available coverage options. A GUI widget 5702 shows details regarding available add-ins for the Knee Arthroscopy treatment using United Hospital. The member may utilize a "View Add-ins" link 5704 to view available add-ins for the treatment. A GUI widget 5706 shows details regarding available alternative treatment coverage options. For example, links (e.g., to view additional details regarding core coverage options, to view additional details regarding add-in coverage options) may be provided that the member may utilize to view additional details regarding alternative treatment options. Screen 5710 shows available add-ins for the Knee Arthroscopy treatment. A GUI widget 5712 shows the add-in for the member requested provider (e.g., United Hospital), which costs $2,300. A GUI widget 5714 shows the add-in for the best available provider (e.g., Minnesota Orthopaedic Surgery Center), which costs $800.

Figure 58:
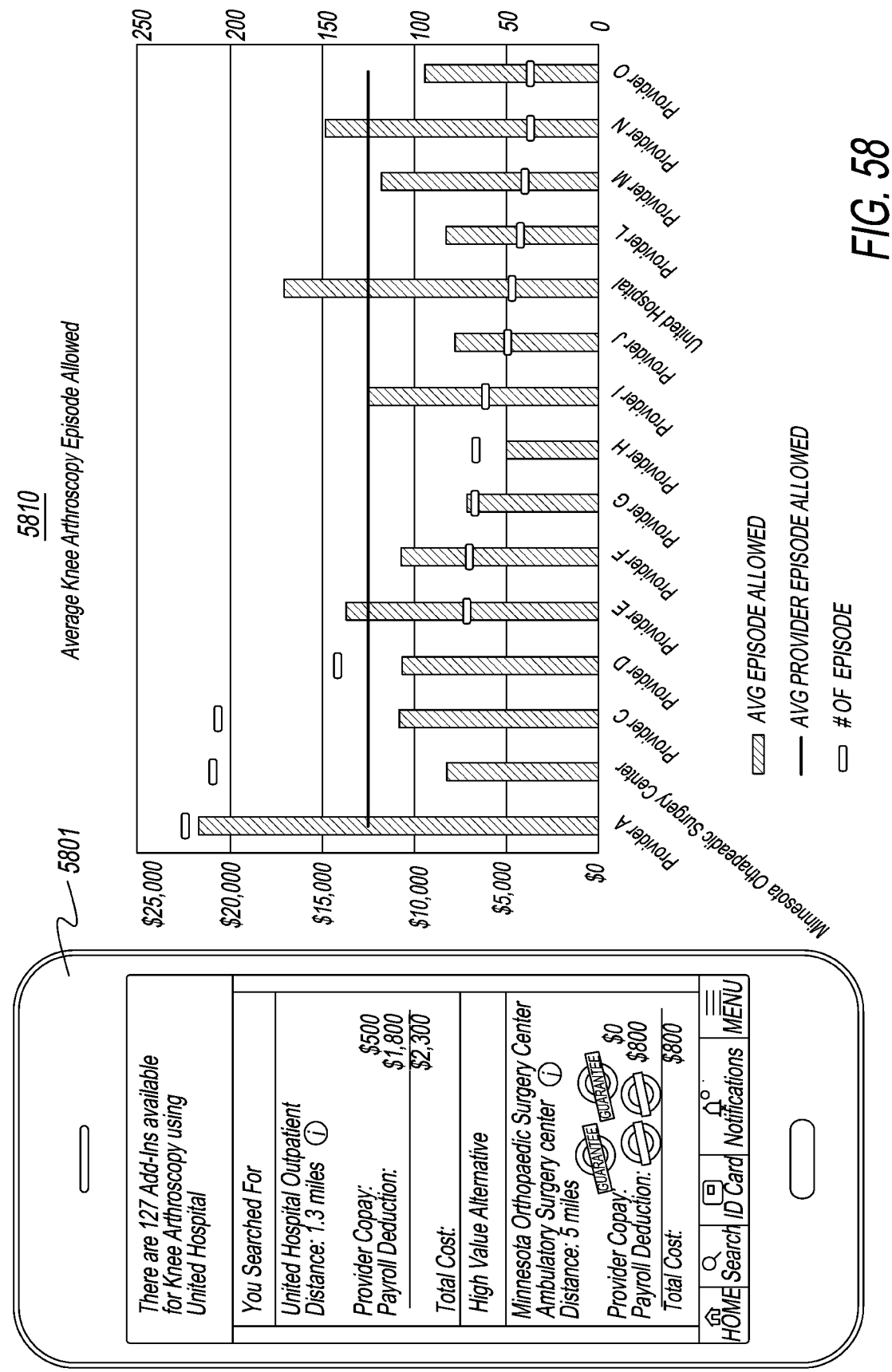
FIG. 58 shows a screenshot diagram illustrating embodiments of the UDRCD.

FIG. 58 shows a screenshot diagram illustrating embodiments of the UDRCD.

Screen 5801 shows the add-ins shown in screen 5710. Diagram 5810 shows how add-in prices for the add-ins shown in in screen 5801 may be calculated. For example, smart copays may be determined based on how the number of episodes and/or the average cost per episode for a provider compares to the average cost per episode for available providers.

FIG. 59 shows a screenshot diagram illustrating embodiments of the UDRCD. In FIG. 59, an exemplary user interface (e.g., for a mobile app) for providing results for an "Is it covered?" search is illustrated. Screen 5901 shows results when a drug is covered via core coverage. For example, an indication that Epipen is covered via core coverage and information regarding cost and coverage options may be provided. Alternative drug options may also be shown to the member. The member may utilize "Find Lower Cost Options" link 5902 to view additional details regarding alternative drug options. Screen 5910 shows that Adrenaclick is an alternative drug option. The member may utilize a "View Pharmacies" link 5912 to view available pharmacies for the alternative drug. Screen 5920 shows available pharmacies for Adrenaclick near Mia's location and the smart copay associated with utilizing each pharmacy on a map via a map component 5922.

Figure 60:
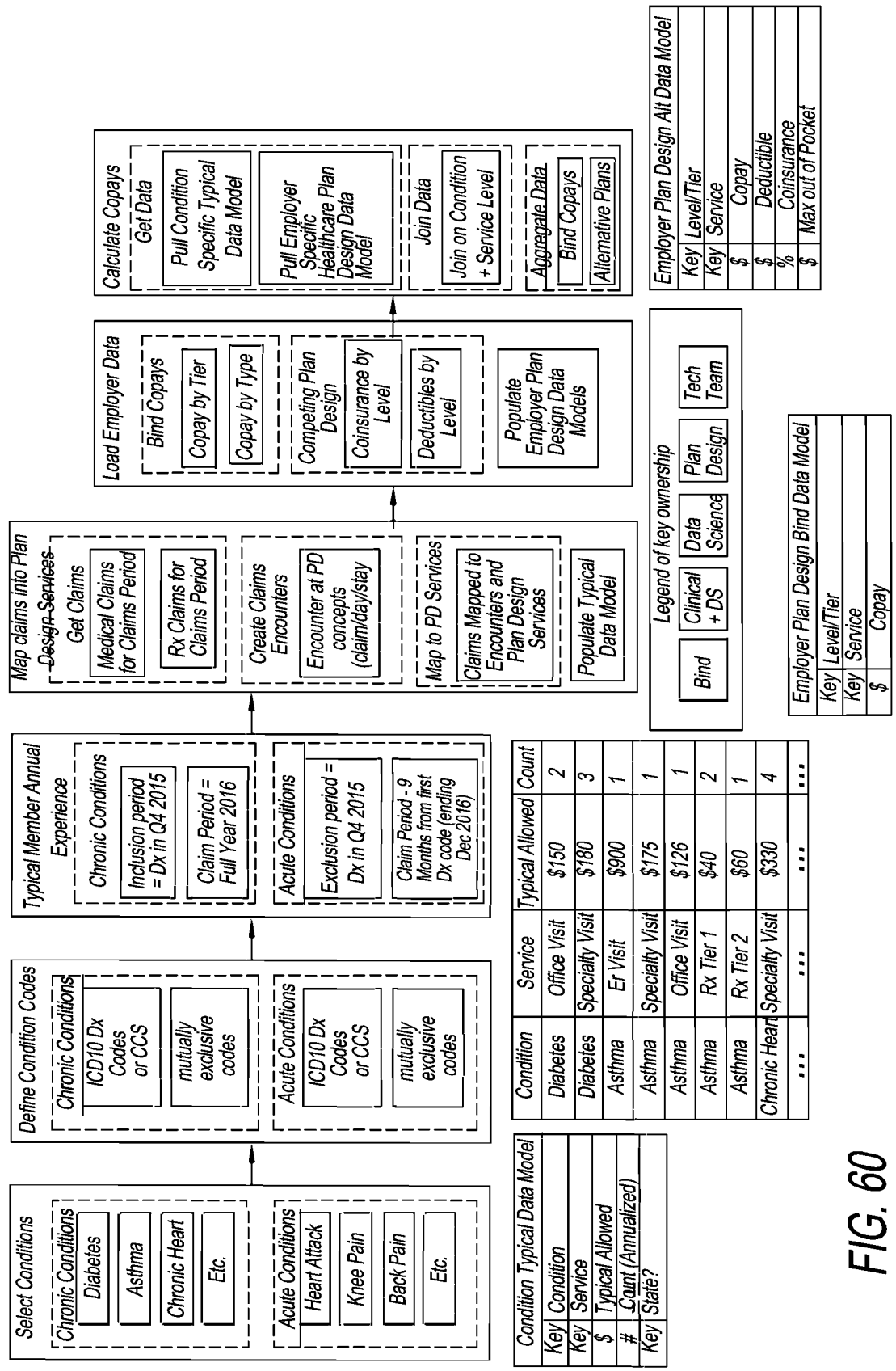
FIG. 60 shows an exemplary architecture for the UDRCD.

FIG. 60 shows an exemplary architecture for the UDRCD. In FIG. 60, embodiments of a cost calculator are illustrated. In one embodiment, conditions for which the cost calculator may be utilized may be selected. This may involve selecting chronic conditions and/or acute conditions. For example, chronic conditions may include diabetes, asthma, chronic heart conditions, and/or the like. For example, acute conditions may include heart attack, knee pain, back pain, and/or the like. In one embodiment, condition codes for the selected conditions may be defined. This may involve defining (e.g., mutually exclusive) codes (e.g., ICD-10 diagnosis codes) associated with each selected condition.

In one embodiment, a typical member annual experience may be determined. For example, for chronic conditions, a typical member annual experience may be determined based on an inclusion period (e.g., diagnosis in Q4 of 2015) and a claim period (e.g., full year 2016). In another example, for acute conditions, a typical member annual experience may be determined based on an exclusion period (e.g., diagnosis in Q4 of 2015) and a claim period (e.g., 9 months from first diagnosis code ending December 2016).

In one embodiment, claims may be mapped into plan design services. This may involve getting claims, creating claim encounters, mapping claims to encounters and plan design services, and populating a typical data model. Getting claims may involve getting medical claims and/or prescription claims for claims period. Creating claim encounters may involve encounter at plan design concepts (e.g., claim, day, stay).

In one embodiment, employer data may be loaded. This may involve determining UDRCD copays for an ODHI plan (e.g., copay by tier, copay by type), determining competing plan designs (e.g., coinsurance by level, deductibles by level), and populating employer plan design data models.

In one embodiment, copays may be calculated. This may involve pulling condition specific typical data model, pulling employer specific healthcare plan design data model, joining data on condition and service level, and storing results regarding calculated UDRCD copays for the ODHI plan and data for alternative competing plans.

FIG. 61 shows a screenshot diagram illustrating embodiments of the UDRCD. In FIG. 61, an exemplary user interface (e.g., for a website) for utilizing a cost calculator is illustrated. Screen 6101 shows that a member may select one or more service, condition, specialty, treatment (e.g., procedure), drug, and/or the like for comparison with alternative competing plans. For example, the member may select Diabetes. Screen 6110 shows a cost summary for an ODHI plan vs. a traditional plan.

Additional Alternative Embodiment Examples

The following alternative example embodiments provide a number of variations of some of the core principles already discussed for expanded color on the abilities of the UDRCD.

Members

Members starts with a core (or Personal Protection Plan (PPP)) (which in one non-limiting embodiment is a data structure including: coverage amounts, pointers to usage, estimated usage, goals, entities of coverage, persons of coverage, etc.) and a Health Reimbursement Account (HRA) (e.g., which also is a data structure with novel coverage, demand, reimbursement, and other data, structures, and links, etc.). The core provides coverage for unplanned accidents and illness and encourages the use of preventive services. The core was not designed to provide rich coverage for everyday medical expenses. Those expenses can be funded by the member's HRA or from their other personal financial accounts. Additionally, the core deliberately does not cover discretionary procedures and diagnostics. Coverage for those services are available through upgrades (or add-ins), which can be purchased at any point in the coverage cycle. The plan also includes automatic upgrades for those members with chronic conditions. The automatic upgrades reduce cost sharing for valuable preventive services designed to prevent hospitalizations.

Core

The core has no deductible and relies on co-pays to encourage effective health behaviors. As part of the core, members have unlimited access to free virtual care visits. Additionally, each member has access to 24×7 concierge support with a dedicated care advisor. When medical needs require more complex care, the core also provides a free virtual second opinion service. The core fully covers several preventive services, such as immunizations, well-child visits and mammograms, with no member co-pays. As such the UDRCD helps to decrease future costs by preventing more serious health issues from occurring or getting worse.

Default co-pay amounts are built into the services covered by the core, however, members have the opportunity to adjust their co-pays for each distinct service.

If members choose higher co-pays their premiums are reduced and the incremental savings created are deposited into their HRA. The reverse happens if they choose co-pay amounts below the default.

The default co-pay amounts under the core follow: (Illustrative prices/Not Actual)

| BENEFIT HIGHLIGHTS | In Network Co-Pay | Out Of Network Co-Pay |
|---|---|---|
| Preventive Health and Wellness Services | | |
| Periodic health exams; well-baby care | $0 | $75 |
| Routine immunizations/shots | $0 | $75 |
| Hearing screenings | $0 | $75 |
| Colorectal cancer screening: sigmoidoscopy, colonoscopy | $0 | $75 |
| Prostate screening exam (calendar year) | $0 | $75 |
| Nutritional counseling (limited to two visits per calendar year) | $0 | $75 |
| Physician/Provider Services | | |
| Office visits to Personal Physician/Provider | $25 | $75 |
| Office visits to Specialist | $100 | $300 |
| E-visits, telephone, video visits to a participating provider | $0 | Not Covered |
| Allergy shots, serums, infusions, and injectable medications $25 | $75 | |
| Surgery and anesthesia (in office) | $100 | $300 |
| Inpatient hospital visits for unplanned hospitalizations (including surgery and anesthesia) | $25 | $75 |
| Women's Health Services | | |
| Gynecological exams (calendar year); Pap tests | $0 | $75 |
| Mammograms | $0 | $200 |
| Mental Health/Chemical Dependency | | |
| Inpatient, residential services | $250 per day/Up To $2000 per admission | $500 per day/Up To $5000 per admission |
| Day treatment, intensive outpatient, and partial hospitalization services | $25 | $75 |
| Applied behavior analysis | $25 | $75 |
| Outpatient provider visits | $25 | $75 |
| Unplanned Hospital Services | | |
| Inpatient care | $250 per day/Up To $2000 per admission | $500 per day/Up To $5000 per admission |
| Observation care | $250 per day/Up To $2000 per admission | $500 per day/Up To $5000 per admission |
| Rehabilitative care (30 days per calendar year; 60 days head or spinal cord injuries) | $250 per day/Up To $2000 per admission | $500 per day/Up To $5000 per admission |
| Skilled nursing facility (180 days per calendar year) | $250 per day/Up To $2000 per admission | $500 per day/Up To $5000 per admission |
| Durable medical equipment and supplies | | |
| Durable medical equipment and supplies | 15% of cost | 30% of cost |
| Urgent Care/Emergency/Emergency Medical Transportation | | |
| Urgent care visits (for non-life threatening illness/minor injury) | $100 | $100 |
| Emergency services (for emergency medical conditions only. If admitted to hospital, copayment is not applied; all services subject to inpatient benefits.) | $300 | $300 |
| Emergency medical transportation | $150 | $150 |
| Other Covered Services | | |
| X-ray; lab services | $50 | $100 |
| Outpatient rehabilitative services (60 visits per calendar year) | $25 | $25 |
| Outpatient surgery, dialysis, infusion, chemotherapy, radiation therapy | $25 | $50 |
| Cardiac rehabilitation | $25 | $50 |
| Home health care (up to 180 visits per calendar year) | $25 | $50 |

-continued

| BENEFIT HIGHLIGHTS | In Network Co-Pay | Out Of Network Co-Pay |
|---|---|---|
| Hospice care | $25 | $50 |
| Hearing exam (limited to one per calendar year) | $25 | $50 |
| Hearing aids (one per ear every four calendar years) | 10% of cost | 10% of cost |
| Self-administered chemotherapy (Up to a 30-day supply from a designated participating pharmacy) | | |
| Generic Drugs | $25 | Not Covered |
| Formulary brand-name drugs | $25 | Not Covered |
| Non-formulary brand-name drugs | $25 | Not Covered |

The premiums and co-pays for the personal protection plan are designed to fund the initial coverage level as well as the portion of additional coverage upgrades within the same coverage period that are not funded by upgrade premium and co-pay amounts.

Coverage Upgrades

Coverage Upgrades may include three different types:
Chronic Condition Coverage Upgrades
Discretionary Procedure Coverage Upgrades
Service Category Coverage Upgrades Chronic Condition Coverage Upgrades The goal of chronic condition care is to keep members out of the hospital by removing barriers to preventive care including visits with their clinical team (primary care plus specialists), tests and medications. To remove these barriers the chronic condition upgrades remove co-pay amounts for preventive care as specified by the protocols developed by each of the specialty societies that are primarily responsible for managing each respective chronic condition. Our benefit makes preventive care free for those with chronic conditions, after they self identify as having that condition. By asking the member to enroll in the upgrade, our plan overcomes the challenge of identifying members with chronic conditions. Our plan identifies these members either during open enrollment or at the onset/diagnosis of the chronic condition because with our plan a member can upgrade on demand. This allows us to engage the member early and immediately put support programs in place for them.

The chronic conditions available for upgrade may include:
  Asthma
  Bipolar mood disease
  Brochiectasis
  Cardiac failure
  Cardiomyopathy
  Chronic obstructive pulmonary disease
  Chronic kidney disease
  Coronary artery disease
  Crohn's disease
  Diabetes insipidus
  Diabetes mellitus type 1
  Diabetes mellitus type 2
  Arrythmia (irregular heartbeat)
  Epilepsy
  Glaucoma
  Haemophilia
  HIV
  Hyperlipidaemia (high cholesterol)
  Hypertension (high blood pressure)
  Hypothyroidism (inactive thyroid gland)
  Multiple sclerosis
  Parkinson's disease
  Rheumatoid arthritis
  Schizophrenia
  Systemic lupus erythematosis
  Ulcerative colitis
  Clinical depression Discretionary Procedure Coverage Upgrades In addition to our strategy to better support preventive services, another aspect of our cost reduction strategy is to decrease the use of services that do not return substantial value to members. Leveraging the benefit designs put in place in South Africa and for the State of Oregon employees, we identified several services that are not supported by evidence. Those services are not covered by the core. However, coverage upgrades can be purchased for those services at any point in time. By not covering these services and making them available through a deliberate enrollment step that requires a significant financial commitment from the member, our plan encourages members to talk with their providers about treatment options and outcomes, rather than immediately settle on the most expensive treatment available. The savings created by lowering the use of these non-valuable services help to fund the increased investment the plan makes in preventive services for members with chronic conditions.

The following is an exemplary list of the procedure upgrades:
  Infertility services
  Temporomandibular joint (TMJ)
  Maternity care
  Routine newborn nursery care
  Bariatric surgery
  Sleep studies
  Conservative back and neck treatment
  Myringotomy (grommets)
  Tonsillectomy
  Adenoidectomy
  Colonoscopy (other than colo rectal cancer screen where evidence based)
  Sigmoidoscopy
  Proctoscopy
  Gastroscopy
  Cystoscopy
  Knee Arthroscopy
  Shoulder Arthroscopy
  Functional Nasal Procedure/Sinus surgery
  Hysterectomy (except for pre-operatively diagnosed cancer)

Laparoscopy
Hysteroscopy
Endometrial Ablation
Nissan Fundoplication (reflux surgery)
Spinal surgery (back & neck)
Knee Resurfacing
Knee Replacement
Hip Resurfacing
Hip Replacement
Bariatric Surgery
Bunionectomy
Hammertoe surgery
Knee viscosupplementation
Morton's neuroma
Spinal injections for pain
Upper GI endoscopy
Surgery For Benign Prostatic Hyperplasia
Warts
Varicose vein surgery
Varicose vein stripping
Ganglion surgery
Breast reduction
Radio frequency ablation The upgrades options vary in their premium and co-pay amounts, based on who and where the member chooses to receive the upgrade from. This variable pricing encourages the use of high quality and low cost providers.

Service Category Coverage Upgrades

Similar to discretionary procedures, there exist other categories of medical care that do not provide substantial value to members. These service categories are not covered as part of the core but can be purchased as an upgrade at any time by members.

The following is an exemplary list of the service category upgrades:
Sleep studies
High tech diagnostic imaging=PET, CT, MRI
ED visits without an inpatient stay
Acupuncture
Chiropractic
Naturopath UDRCD Controller FIG. 71 shows a block diagram illustrating embodiments of a UDRCD controller. In this embodiment, the UDRCD controller 7101 may serve to aggregate, process, store, search, serve, identify, instruct, generate, match, and/or facilitate interactions with a computer through information technology analytics and processing for risk coverage technologies, and/or other related data.

Users, which may be people and/or other systems, may engage information technology systems (e.g., computers) to facilitate information processing. In turn, computers employ processors to process information; such processors 7103 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 7129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the UDRCD controller 7101 may be connected to and/or communicate with entities such as, but not limited to: one or more users from peripheral devices 7112 (e.g., user input devices 7111); an optional cryptographic processor device 7128; and/or a communications network 7113.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The UDRCD controller 7101 may be based on computer systems that may comprise, but are not limited to, components such as: a computer systemization 7102 connected to memory 7129.

Computer Systemization

A computer systemization 7102 may comprise a clock 7130, central processing unit ("CPU(s)" and/or "processor (s)" (these terms are used interchangeable throughout the disclosure unless noted to the contrary)) 7103, a memory 7129 (e.g., a read only memory (ROM) 7106, a random access memory (RAM) 7105, etc.), and/or an interface bus 7107, and most frequently, although not necessarily, are all interconnected and/or communicating through a system bus 7104 on one or more (mother)board(s) 7102 having conductive and/or otherwise transportive circuit pathways through which instructions (e.g., binary encoded signals) may travel to effectuate communications, operations, storage, etc. The computer systemization may be connected to a power source 7186; e.g., optionally the power source may be internal. Optionally, a cryptographic processor 7126 may be connected to the system bus. In another embodiment, the cryptographic processor, transceivers (e.g., ICs) 7174, and/or sensor array (e.g., accelerometer, altimeter, ambient light, barometer, global positioning system (GPS) (thereby allowing UDRCD controller to determine its location), gyroscope, magnetometer, pedometer, proximity, ultra-violet sensor, etc.) 7173 may be connected as either internal and/or external peripheral devices 7112 via the interface bus I/O 7108 (not pictured) and/or directly via the interface bus 7107. In turn, the transceivers may be connected to antenna(s) 7175, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 7129 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's ® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the UDRCD controller and beyond through various interfaces. Should processing requirements dictate a greater amount speed and/or capacity, distributed processors (e.g., see Distributed UDRCD below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the UDRCD may be achieved by implementing a microcontroller such as CAST's® R8051XC2 microcontroller; Intel's® MCS 51 (i.e., 8051 microcontroller); and/or the like. Also, to implement certain features of the UDRCD, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the UDRCD component collection (distributed or otherwise) and/or features may be implemented via the microprocessor and/or via embedded components; e.g., via ASIC, coprocessor, DSP, FPGA, and/or the like. Alternately, some implementations of the UDRCD may be implemented with embedded components that are configured and used to achieve a variety of features or signal processing.

Depending on the particular implementation, the embedded components may include software solutions, hardware solutions, and/or some combination of both hardware/software solutions. For example, UDRCD features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the UDRCD features. A hierarchy of programmable interconnects allow logic blocks to be interconnected as needed by the UDRCD system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the UDRCD may be developed on FPGAs and then migrated into a fixed version that more resembles ASIC implementations. Alternate or coordinating implementations may migrate UDRCD controller features to a final ASIC instead of or in addition to FPGAs. Depending on the implementation all of the aforementioned embedded components and microprocessors may be considered the "CPU" and/or "processor" for the UDRCD.

Power Source

The power source 7186 may be of any various form for powering small electronic circuit board devices such as the following power cells alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 7186 is connected to at least one of the interconnected subsequent components of the UDRCD thereby providing an electric current to all subsequent components. In one example, the power source 7186 is connected to the system bus component 7104. In an alternative embodiment, an outside power source 7186 is provided through a connection across the I/O 7108 interface. For example, a USB and/or IEEE 1394 connection carries both data and power across the connection and is therefore a suitable source of power.

Interface Adapters

Interface bus(ses) 7107 may accept, connect, and/or communicate to a number of interface adapters, variously although not necessarily in the form of adapter cards, such as but not limited to: input output interfaces (I/O) 7108, storage interfaces 7109, network interfaces 7110, and/or the like. Optionally, cryptographic processor interfaces 7127 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 7109 may accept, communicate, and/or connect to a number of storage devices such as, but not limited to: storage devices 7114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 7110 may accept, communicate, and/or connect to a communications network 7113. Through a communications network 7113, the UDRCD controller is accessible through remote clients 7133b (e.g., computers with web browsers) by users 7133a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed UDRCD below), architectures may similarly be employed to pool, load balance, and/or otherwise decrease/increase the communicative bandwidth required by the UDRCD controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 7110 may be used to engage with various communications network types 7113. For example, multiple network interfaces may be employed to allow for the communication over broadcast, multicast, and/or unicast networks.

Input Output interfaces (I/O) 7108 may accept, communicate, and/or connect to user, peripheral devices 7112 (e.g., input devices 7111), cryptographic processor devices 7128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 7112 may be connected and/or communicate to I/O and/or other facilities of the like such as network interfaces, storage interfaces, directly to the interface bus, system bus, the CPU, and/or the like. Peripheral devices may be external, internal and/or part of the UDRCD controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 7111 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the UDRCD controller may be embodied as an embedded, dedicated, and/or monitor-less (i.e., headless) device, wherein access would be provided over a network interface connection.

Cryptographic units such as, but not limited to, microcontrollers, processors 7126, interfaces 7127, and/or devices 7128 may be attached, and/or communicate with the UDRCD controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 7129. However, memory is a fungible technology and resource, thus, any number of memory embodiments may be employed in lieu of or in concert with one another. It is to be understood that the UDRCD controller and/or a computer systemization may employ various forms of memory 7129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 7129 will include ROM 7106, RAM 7105, and a storage device 7114. A storage device 7114 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 7129 may contain a collection of program and/or database components and/or data such as, but not limited to: operating system component(s) 7115 (operating system); information server component(s) 7116 (information server); user interface component(s) 7117 (user interface); Web browser component(s) 7118 (Web browser); database(s) 7119; mail server component(s) 7121; mail client component(s) 7122; cryptographic server component(s) 7120 (cryptographic server); the UDRCD component(s) 7135; and/or the like (i.e., collectively a component collection). These components may be stored and accessed from the storage devices and/or from storage devices accessible through an interface bus. Although unconventional program components such as those in the component collection may be stored in a local storage device 7114, they may also be loaded and/or stored in memory such as: peripheral devices, RAM, remote storage facilities through a communications network, ROM, various forms of memory, and/or the like.

Operating System

The operating system component 7115 is an executable program component facilitating the operation of the UDRCD controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the UDRCD controller to communicate with other entities through a communications network 7113. Various communication protocols may be used by the UDRCD controller as a subcarrier transport mechanism for interaction, such as, but not limited to: multicast, TCP/IP, UDP, unicast, and/or the like.

Information Server

An information server component 7116 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C(++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the UDRCD controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the UDRCD database 7119, operating systems, other program components, user interfaces, Web browsers, and/or the like.

Access to the UDRCD database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the UDRCD. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the UDRCD as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 7117 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 7118 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the UDRCD enabled nodes. The combined application may be nugatory on systems employing Web browsers.

Mail Server

A mail server component 7121 is a stored program component that is executed by a CPU 7103. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the UDRCD. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the UDRCD mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 7122 is a stored program component that is executed by a CPU 7103. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 7120 is a stored program component that is executed by a CPU 7103, cryptographic processor 7126, cryptographic processor interface 7127, cryptographic processor device 7128, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the UDRCD may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the UDRCD component to engage in secure transactions if so desired. The cryptographic component facilitates the secure accessing of resources on the UDRCD and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The UDRCD Database

The UDRCD database component 7119 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the UDRCD database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the UDRCD database is implemented as a data-structure, the use of the UDRCD database 7119 may be integrated into another component such as the UDRCD component 7135. Also, the database may be implemented as a mix of data structures, objects, and relational structures. Databases may be consolidated and/or distributed in countless variations (e.g., see Distributed UDRCD below). Portions of databases, e.g., tables, may be exported and/or imported and thus decentralized and/or integrated.

In one embodiment, the database component 7119 includes several tables 7119*a-m:*

An accounts table 7119*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), account CreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 7119*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a UDRCD);

An devices table 7119*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 7119*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, app Preferences, appRestrictions, portNum, access_API_call, linked_wallets_list, and/or the like;

An assets table 7119*e* includes fields such as, but not limited to: assetID, accountID, userID, distributorAccountID, distributorPaymentID, distributorOnwerID, assetOwnerID, as setType, as setSourceDeviceID, assetSourceDeviceType, assetSourceDeviceName, assetSourceDistribution ChannelID, assetSourceDistributionChannelType, asset- SourceDistributionChannelName, as setTargetChannelID, as setTargetChannelType, as setTargetChannelName, as setName, as setSeriesName, assetSeriesSeason, as setSeriesEpisode, assetCode, assetQuantity, assetCost, as setPrice, assetValue, as setManufactuer, as setModelNo, as setSerialNo, as setLocation, as setAddress, assetState, assetZIPcode, assetState, assetCountry, assetEmail, assetIPaddress, assetURLaccessCode, as setOwnerAccountID, subscriptionIDs, as setAuthroizationCode, assetAccessPrivileges, as setPreferences, as setRestrictions, assetAPI, assetAPIconnectionAddress, and/or the like;

A payments table 7119*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payement Restrictions, and/or the like;

An transactions table 7119*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 7119*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAcces sPrivileges, merchant Preferences, merchantRestrictions, and/or the like;

An ads table 7119*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An models table 7119*j* includes fields such as, but not limited to: modelID, modelAssociatedPlanSponsor, modelAs sociatedPlanID, modelAs sociatedLocality, modelAs sociatedProviderNetwork, modelAssociatedPlanTerm, modelAssociatedPlanMemberType, atomizedConditionsData, atomizedProceduresData, coreInsuranceCoverageData, coreInsuranceCosts, addinsInsuranceCoverageData, addinsInsuranceCosts, and/or the like;

An members table 7119*k* includes fields such as, but not limited to: memberID, memberAssociatedPlanSponsor, memberAssociatedPlanID, memberProfile, memberClinicalData, memberPlanConfiguration, memberState, and/or the like.

An plans table 7119*l* includes fields such as, but not limited to: planID, planAssociatedPlanSponsor, planCoreCoverageData, planAvailableAddinsCoverageData, planAvailableTerms, planAvailableLocalities, planAvailableProviderNetworks, and/or the like.

An ACGs table 7119*m* includes fields such as, but not limited to: ACG_ID, ACG_ConditionsData, ACG_TreatmentsData, ACG_ProvidersData, conditionTreatmentPaths, providerPracticePatterns, providerTreatmentCost, and/or the like.

In one embodiment, the UDRCD database may interact with other database systems. For example, employing a distributed database system, queries and data access by search UDRCD component may treat the combination of the UDRCD database, an integrated data security layer database as a single database entity (e.g., see Distributed UDRCD below).

In one embodiment, user programs may contain various user interface primitives, which may serve to update the UDRCD. Also, various accounts may require custom database tables depending upon the environments and the types of clients the UDRCD may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 7119*a-m*. The UDRCD may be configured to keep track of various settings, inputs, and parameters via database controllers.

The UDRCD database may communicate to and/or with other components in a component collection, including itself, and/or facilities of the like. Most frequently, the UDRCD database communicates with the UDRCD component, other program components, and/or the like. The database may contain, retain, and provide information regarding other nodes and data.

The UDRCDs

The UDRCD component 7135 is a stored program component that is executed by a CPU. In one embodiment, the UDRCD component incorporates any and/or all combinations of the aspects of the UDRCD that was discussed in the previous figures. As such, the UDRCD affects accessing, obtaining and the provision of information, services, transactions, and/or the like across various communications networks. The features and embodiments of the UDRCD discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the UDRCD's features and facilities, and in many cases reduce the costs, energy consumption/requirements, and extend the life of UDRCD's underlying infrastructure; this has the added benefit of making the UDRCD more reliable. Similarly, many of the features and mechanisms are designed to be easier for users to use and access, thereby broadening the audience that may enjoy/employ and exploit the feature sets of the UDRCD; such ease of use also helps to increase the reliability of the UDRCD. In addition, the feature sets include heightened security as noted via the Cryptographic components 7120, 7126, 7128 and throughout, making access to the features and data more reliable and secure.

The UDRCD transforms coverage enrollment request, event signal, ACGG request, search request inputs, via UDRCD components (e.g., ACM, EF, UF, ACGG, ARD, SP, AP), into coverage enrollment response, add-in recommendation, ACGG response, search response outputs.

The UDRCD component enabling access of information between nodes may be developed by employing various development tools and languages such as, but not limited to: Apache® components, Assembly, ActiveX, binary executables, (ANSI) (Objective-) C(++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the UDRCD server employs a cryptographic server to encrypt and decrypt communications. The UDRCD component may communicate to and/or with other components in a component collection, including itself, and/or facilities of the like. Most frequently, the UDRCD component communicates with the UDRCD database, operating systems, other program components, and/or the like. The UDRCD may contain, communicate, generate, obtain, and/or provide program component, system, user, and/or data communications, requests, and/or responses.

Distributed UDRCDs

The structure and/or operation of any of the UDRCD node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the UDRCD controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for UDRCD controller and/or UDRCD component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the UDRCD controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
$address='192.168.0.100';
$port=255;
//create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
//read input data from client device in 1024 byte blocks until end of message do {
    $input=" ";
    $input=socket_read($client, 1024);
    $data.=$input;
} while($input!=" ");
//parse data to extract variables
$obj=json_decode($data, true);
//store input data in a database
mysql_connect("201.408.185.132",$DBserver,$password); //access database server
mysql_select("CLIENT_DB.SQL"); //select database to append
mysql_query("INSERT INTO UserTable (transmission) VALUES ($data)"); //add data to UserTable table in a CLIENT database
mysql_close("CLIENT_DB.SQL"); //close connection to database
?>
```

Also, the following resources may be used to provide example embodiments regarding SOAP parser implementation:
  http://www.xav.com/perl/site/lib/SOAP/Parser.html
  http://publib.boulder.ibm.com/infocenter/tivihelp/v2r1/
     index.jsp?topic=/com.ibm.IBMDI.doc/
     referenceguide295.htm
and other parser implementations:
  http://publib.boulder.ibm.com/infocenter/tivihelp/v2r1/
     index.jsp?topic=/com.ibm.IBMDI.doc/
     referenceguide259.htm
all of which are hereby expressly incorporated by reference.

Additional embodiments may include:

1. A coverage enrollment facilitating apparatus, comprising:
   a memory;
   a component collection in the memory, including:
     an enrollment facilitating component;
   a processor disposed in communication with the memory, and configured to issue a plurality of processing instructions from the component collection stored in the memory,
     wherein the processor issues instructions from the enrollment facilitating component, stored in the memory, to:
       obtain, via at least one processor, a coverage enrollment request from a user;
       determine, via at least one processor, a plan sponsor associated with the user;
       retrieve, via at least one processor, plan sponsor settings associated with the plan sponsor and the user, wherein the plan sponsor settings include atomized condition classification settings, atomized procedure classification settings, and subsidization settings;
       configure, via at least one processor, available options for an enrollment user interface based on the plan sponsor settings;
       obtain, via the enrollment user interface, copay setting selections for individual core coverage services, from the available options, of the user;
       obtain, via the enrollment user interface, atomized condition add-in selections, from the available options, of the user;
       obtain, via the enrollment user interface, atomized procedure add-in selections, from the available options, of the user;
       determine, via at least one processor, associated modeling data based on the plan sponsor settings and the obtained copay setting selections, atomized condition add-in selections, and atomized procedure add-in selections;
       calculate, via at least one processor, a core coverage cost using the associated modeling data;
       calculate, via at least one processor, add-in coverage costs, for each of the selected atomized condition add-in and each of the selected atomized procedure add-in, using the associated modeling data;
       calculate, via at least one processor, a user cost for the user based on the core coverage cost, the subsidization settings for the core coverage cost, the add-in coverage costs, and the subsidization settings for the add-in coverage costs; and
       configure, via at least one processor, the enrollment user interface to display the calculated user cost for the user.

2. The apparatus of embodiment 1, further comprising:
   the processor issues instructions from the enrollment facilitating component, stored in the memory, to:
     facilitate, via at least one processor, enrollment of the user into a plan that includes the core coverage, and add-ins coverage for the selected atomized condition add-ins and the selected atomized procedure add-ins.

3. The apparatus of embodiment 2, further comprising:
the processor issues instructions from the enrollment facilitating component, stored in the memory, to:
facilitate, via at least one processor, enrollment of the user into additional add-ins at any time during a plan term associated with the plan.
4. The apparatus of embodiment 1, wherein the plan sponsor settings include available plan terms.
5. The apparatus of embodiment 4, wherein a plan term is any of: days, weeks, months, yearly, multi-yearly.
6. The apparatus of embodiment 4, wherein the associated modeling data is determined based on a plan term selected by the user from the available plan terms.
7. The apparatus of embodiment 1, wherein the plan sponsor settings include available provider networks.
8. The apparatus of embodiment 7, wherein the associated modeling data is determined based on a set of provider networks selected by the user from the available provider networks.
9. The apparatus of embodiment 1, wherein the subsidization settings specify a first subsidization amount or percentage for the core coverage and a second subsidization amount or percentage for add-ins coverage.
10. The apparatus of embodiment 1, wherein the subsidization settings specify an individual subsidization amount or percentage for each add-in.
11. The apparatus of embodiment 1, wherein the available options associated with an atomized condition add-in include a plurality of available procedure options.
12. The apparatus of embodiment 1, wherein the available options associated with an atomized procedure add-in include a plurality of available provider options.
13. The apparatus of embodiment 12, wherein the available provider options are determined based on proximity of providers to the user's location.
14. The apparatus of embodiment 1, wherein a coverage cost associated with an atomized condition add-in is calculated based on disease progression probabilities associated with a corresponding atomized condition.
15. The apparatus of embodiment 1, wherein the user cost is a pay period deduction.
16. A processor-readable coverage enrollment facilitating non-transient physical medium storing processor-executable components, the components, comprising:
a component collection stored in the medium, including:
an enrollment facilitating component;
wherein the enrollment facilitating component, stored in the medium, includes processor-issuable instructions to:
obtain, via at least one processor, a coverage enrollment request from a user;
determine, via at least one processor, a plan sponsor associated with the user;
retrieve, via at least one processor, plan sponsor settings associated with the plan sponsor and the user, wherein the plan sponsor settings include atomized condition classification settings, atomized procedure classification settings, and subsidization settings;
configure, via at least one processor, available options for an enrollment user interface based on the plan sponsor settings;
obtain, via the enrollment user interface, copay setting selections for individual core coverage services, from the available options, of the user;
obtain, via the enrollment user interface, atomized condition add-in selections, from the available options, of the user;
obtain, via the enrollment user interface, atomized procedure add-in selections, from the available options, of the user;
determine, via at least one processor, associated modeling data based on the plan sponsor settings and the obtained copay setting selections, atomized condition add-in selections, and atomized procedure add-in selections;
calculate, via at least one processor, a core coverage cost using the associated modeling data;
calculate, via at least one processor, add-in coverage costs, for each of the selected atomized condition add-in and each of the selected atomized procedure add-in, using the associated modeling data;
calculate, via at least one processor, a user cost for the user based on the core coverage cost, the subsidization settings for the core coverage cost, the add-in coverage costs, and the subsidization settings for the add-in coverage costs; and
configure, via at least one processor, the enrollment user interface to display the calculated user cost for the user.
17. The medium of embodiment 16, further comprising:
the enrollment facilitating component, stored in the medium, includes processor-issuable instructions to:
facilitate, via at least one processor, enrollment of the user into a plan that includes the core coverage, and add-ins coverage for the selected atomized condition add-ins and the selected atomized procedure add-ins.
18. The medium of embodiment 17, further comprising:
the enrollment facilitating component, stored in the medium, includes processor-issuable instructions to:
facilitate, via at least one processor, enrollment of the user into additional add-ins at any time during a plan term associated with the plan.
19. The medium of embodiment 16, wherein the plan sponsor settings include available plan terms.
20. The medium of embodiment 19, wherein a plan term is any of: days, weeks, months, yearly, multi-yearly.
21. The medium of embodiment 19, wherein the associated modeling data is determined based on a plan term selected by the user from the available plan terms.
22. The medium of embodiment 16, wherein the plan sponsor settings include available provider networks.
23. The medium of embodiment 22, wherein the associated modeling data is determined based on a set of provider networks selected by the user from the available provider networks.
24. The medium of embodiment 16, wherein the subsidization settings specify a first subsidization amount or percentage for the core coverage and a second subsidization amount or percentage for add-ins coverage.
25. The medium of embodiment 16, wherein the subsidization settings specify an individual subsidization amount or percentage for each add-in.
26. The medium of embodiment 16, wherein the available options associated with an atomized condition add-in include a plurality of available procedure options.
27. The medium of embodiment 16, wherein the available options associated with an atomized procedure add-in include a plurality of available provider options.
28. The medium of embodiment 27, wherein the available provider options are determined based on proximity of providers to the user's location.
29. The medium of embodiment 16, wherein a coverage cost associated with an atomized condition add-in is calculated based on disease progression probabilities associated with a corresponding atomized condition.

30. The medium of embodiment 16, wherein the user cost is a pay period deduction.

31. A processor-implemented coverage enrollment facilitating system, comprising:
an enrollment facilitating component means, to:
obtain, via at least one processor, a coverage enrollment request from a user;
determine, via at least one processor, a plan sponsor associated with the user;
retrieve, via at least one processor, plan sponsor settings associated with the plan sponsor and the user, wherein the plan sponsor settings include atomized condition classification settings, atomized procedure classification settings, and subsidization settings;
configure, via at least one processor, available options for an enrollment user interface based on the plan sponsor settings;
obtain, via the enrollment user interface, copay setting selections for individual core coverage services, from the available options, of the user;
obtain, via the enrollment user interface, atomized condition add-in selections, from the available options, of the user;
obtain, via the enrollment user interface, atomized procedure add-in selections, from the available options, of the user;
determine, via at least one processor, associated modeling data based on the plan sponsor settings and the obtained copay setting selections, atomized condition add-in selections, and atomized procedure add-in selections;
calculate, via at least one processor, a core coverage cost using the associated modeling data;
calculate, via at least one processor, add-in coverage costs, for each of the selected atomized condition add-in and each of the selected atomized procedure add-in, using the associated modeling data;
calculate, via at least one processor, a user cost for the user based on the core coverage cost, the subsidization settings for the core coverage cost, the add-in coverage costs, and the subsidization settings for the add-in coverage costs; and
configure, via at least one processor, the enrollment user interface to display the calculated user cost for the user.

32. The system of embodiment 31, further comprising:
the enrollment facilitating component means, to:
facilitate, via at least one processor, enrollment of the user into a plan that includes the core coverage, and add-ins coverage for the selected atomized condition add-ins and the selected atomized procedure add-ins.

33. The system of embodiment 32, further comprising:
the enrollment facilitating component means, to:
facilitate, via at least one processor, enrollment of the user into additional add-ins at any time during a plan term associated with the plan.

34. The system of embodiment 31, wherein the plan sponsor settings include available plan terms.

35. The system of embodiment 34, wherein a plan term is any of: days, weeks, months, yearly, multi-yearly.

36. The system of embodiment 34, wherein the associated modeling data is determined based on a plan term selected by the user from the available plan terms.

37. The system of embodiment 31, wherein the plan sponsor settings include available provider networks.

38. The system of embodiment 37, wherein the associated modeling data is determined based on a set of provider networks selected by the user from the available provider networks.

39. The system of embodiment 31, wherein the subsidization settings specify a first subsidization amount or percentage for the core coverage and a second subsidization amount or percentage for add-ins coverage.

40. The system of embodiment 31, wherein the subsidization settings specify an individual subsidization amount or percentage for each add-in.

41. The system of embodiment 31, wherein the available options associated with an atomized condition add-in include a plurality of available procedure options.

42. The system of embodiment 31, wherein the available options associated with an atomized procedure add-in include a plurality of available provider options.

43. The system of embodiment 42, wherein the available provider options are determined based on proximity of providers to the user's location.

44. The system of embodiment 31, wherein a coverage cost associated with an atomized condition add-in is calculated based on disease progression probabilities associated with a corresponding atomized condition.

45. The system of embodiment 31, wherein the user cost is a pay period deduction.

46. A processor-implemented coverage enrollment facilitating method, comprising:
executing processor-implemented enrollment facilitating component instructions to:
obtain, via at least one processor, a coverage enrollment request from a user;
determine, via at least one processor, a plan sponsor associated with the user;
retrieve, via at least one processor, plan sponsor settings associated with the plan sponsor and the user, wherein the plan sponsor settings include atomized condition classification settings, atomized procedure classification settings, and subsidization settings;
configure, via at least one processor, available options for an enrollment user interface based on the plan sponsor settings;
obtain, via the enrollment user interface, copay setting selections for individual core coverage services, from the available options, of the user;
obtain, via the enrollment user interface, atomized condition add-in selections, from the available options, of the user;
obtain, via the enrollment user interface, atomized procedure add-in selections, from the available options, of the user;
determine, via at least one processor, associated modeling data based on the plan sponsor settings and the obtained copay setting selections, atomized condition add-in selections, and atomized procedure add-in selections;
calculate, via at least one processor, a core coverage cost using the associated modeling data;
calculate, via at least one processor, add-in coverage costs, for each of the selected atomized condition add-in and each of the selected atomized procedure add-in, using the associated modeling data;
calculate, via at least one processor, a user cost for the user based on the core coverage cost, the subsidization settings for the core coverage cost, the add-in coverage costs, and the subsidization settings for the add-in coverage costs; and configure, via at least one processor, the enrollment user interface to display the calculated user cost for the user.
47. The method of embodiment 46, further comprising:
executing processor-implemented enrollment facilitating component instructions to:
facilitate, via at least one processor, enrollment of the user into a plan that includes the core coverage, and add-ins coverage for the selected atomized condition add-ins and the selected atomized procedure add-ins.
48. The method of embodiment 47, further comprising:
executing processor-implemented enrollment facilitating component instructions to:
facilitate, via at least one processor, enrollment of the user into additional add-ins at any time during a plan term associated with the plan.
49. The method of embodiment 46, wherein the plan sponsor settings include available plan terms.
50. The method of embodiment 49, wherein a plan term is any of: days, weeks, months, yearly, multi-yearly.
51. The method of embodiment 49, wherein the associated modeling data is determined based on a plan term selected by the user from the available plan terms.
52. The method of embodiment 46, wherein the plan sponsor settings include available provider networks.
53. The method of embodiment 52, wherein the associated modeling data is determined based on a set of provider networks selected by the user from the available provider networks.
54. The method of embodiment 46, wherein the subsidization settings specify a first subsidization amount or percentage for the core coverage and a second subsidization amount or percentage for add-ins coverage.
55. The method of embodiment 46, wherein the subsidization settings specify an individual subsidization amount or percentage for each add-in.
56. The method of embodiment 46, wherein the available options associated with an atomized condition add-in include a plurality of available procedure options.
57. The method of embodiment 46, wherein the available options associated with an atomized procedure add-in include a plurality of available provider options.
58. The method of embodiment 57, wherein the available provider options are determined based on proximity of providers to the user's location.
59. The method of embodiment 46, wherein a coverage cost associated with an atomized condition add-in is calculated based on disease progression probabilities associated with a corresponding atomized condition.
60. The method of embodiment 46, wherein the user cost is a pay period deduction.
101. An add-in upgrade enrollment facilitating apparatus, comprising:
a memory;
a component collection in the memory, including:
an upgrade facilitating component;
a processor disposed in communication with the memory, and configured to issue a plurality of processing instructions from the component collection stored in the memory,
wherein the processor issues instructions from the upgrade facilitating component, stored in the memory, to:
obtain, via at least one processor, an event signal associated with a plan member enrolled into a plan that includes a core coverage component and an add-ins coverage component;
retrieve, via at least one processor, plan member data associated with the plan member;
determine, via at least one processor, a condition or procedure associated with the event signal based on event signal data associated with the event signal;
determine, via at least one processor, that an atomized add-in upgrade that provides coverage for the determined condition or procedure is available to the plan member;
determine, via at least one processor, an atomized add-in recommendation for the plan member, wherein the atomized add-in recommendation includes a set of atomized add-in options;
provide, via an enrollment user interface, the atomized add-in recommendation to the plan member;
obtain, via the enrollment user interface, a selection of an atomized add-in from the plan member; and
facilitate, via at least one processor, addition of the selected atomized add-in to the add-ins coverage component of the plan.
102. The apparatus of embodiment 101, further comprising:
the processor issues instructions from the upgrade facilitating component, stored in the memory, to:
determine, via at least one processor, that here is an outstanding claim associated with the plan member that benefits from the addition of the selected atomized add-in to the add-ins coverage component; and
facilitate, via at least one processor, processing the outstanding claim based on coverage provided by the selected atomized add-in.
103. The apparatus of embodiment 101, wherein the event signal is one of: a coverage search by the plan member, a health care electronic data interchange transaction associated with the plan member, an electronic health information message associated with the plan member.
104. The apparatus of embodiment 101, wherein the event signal comprises a plurality of event signals, and wherein the condition or procedure associated with the event signal is determined based on a combination of event signal data from the plurality of event signals.
105. The apparatus of embodiment 101, wherein the plan member data includes at least one of: profile data associated with the plan member, clinical data associated with the plan member, plan configuration of the plan.
106. The apparatus of embodiment 105, wherein the condition or procedure associated with the event signal is determined also based on the clinical data associated with the plan member.
107. The apparatus of embodiment 105, wherein the atomized add-in recommendation is determined also based on the plan configuration of the plan.
108. The apparatus of embodiment 105, wherein the determination that the atomized add-in upgrade is available is determined also based on the profile data associated with the plan member.
109. The apparatus of embodiment 101, wherein the determination that the atomized add-in upgrade is available is made based on the determination that the core coverage component does not provide coverage for the determined condition or procedure, and that the add-ins coverage component does not provide coverage for the determined condition or procedure.
110. The apparatus of embodiment 101, wherein the determination that the atomized add-in upgrade is available is made based on the determination that a chronic condition add-in upgrade is beneficial for the plan member.

111. The apparatus of embodiment 101, wherein the set of atomized add-in options includes a plurality of available procedure add-in options.
112. The apparatus of embodiment 111, wherein the available procedure add-in options are determined based on care efficacy of procedures.
113. The apparatus of embodiment 101, wherein the set of atomized add-in options include a plurality of available provider add-in options.
114. The apparatus of embodiment 113, wherein the available provider add-in options are determined based on proximity of providers to the plan member's location.
115. The apparatus of embodiment 101, wherein the selected atomized add-in is associated with a payroll deduction cost and with a copay cost.
116. A processor-readable add-in upgrade enrollment facilitating non-transient physical medium storing processor-executable components, the components, comprising:
a component collection stored in the medium, including:
an upgrade facilitating component;
wherein the upgrade facilitating component, stored in the medium, includes processor-issuable instructions to:
obtain, via at least one processor, an event signal associated with a plan member enrolled into a plan that includes a core coverage component and an add-ins coverage component;
retrieve, via at least one processor, plan member data associated with the plan member;
determine, via at least one processor, a condition or procedure associated with the event signal based on event signal data associated with the event signal;
determine, via at least one processor, that an atomized add-in upgrade that provides coverage for the determined condition or procedure is available to the plan member;
determine, via at least one processor, an atomized add-in recommendation for the plan member, wherein the atomized add-in recommendation includes a set of atomized add-in options;
provide, via an enrollment user interface, the atomized add-in recommendation to the plan member;
obtain, via the enrollment user interface, a selection of an atomized add-in from the plan member; and
facilitate, via at least one processor, addition of the selected atomized add-in to the add-ins coverage component of the plan.
117. The medium of embodiment 116, further comprising:
the upgrade facilitating component, stored in the medium, includes processor-issuable instructions to:
determine, via at least one processor, that here is an outstanding claim associated with the plan member that benefits from the addition of the selected atomized add-in to the add-ins coverage component; and
facilitate, via at least one processor, processing the outstanding claim based on coverage provided by the selected atomized add-in.
118. The medium of embodiment 116, wherein the event signal is one of: a coverage search by the plan member, a health care electronic data interchange transaction associated with the plan member, an electronic health information message associated with the plan member.
119. The medium of embodiment 116, wherein the event signal comprises a plurality of event signals, and wherein the condition or procedure associated with the event signal is determined based on a combination of event signal data from the plurality of event signals.
120. The medium of embodiment 116, wherein the plan member data includes at least one of: profile data associated with the plan member, clinical data associated with the plan member, plan configuration of the plan.
121. The medium of embodiment 120, wherein the condition or procedure associated with the event signal is determined also based on the clinical data associated with the plan member.
122. The medium of embodiment 120, wherein the atomized add-in recommendation is determined also based on the plan configuration of the plan.
123. The medium of embodiment 120, wherein the determination that the atomized add-in upgrade is available is determined also based on the profile data associated with the plan member.
124. The medium of embodiment 116, wherein the determination that the atomized add-in upgrade is available is made based on the determination that the core coverage component does not provide coverage for the determined condition or procedure, and that the add-ins coverage component does not provide coverage for the determined condition or procedure.
125. The medium of embodiment 116, wherein the determination that the atomized add-in upgrade is available is made based on the determination that a chronic condition add-in upgrade is beneficial for the plan member.
126. The medium of embodiment 116, wherein the set of atomized add-in options includes a plurality of available procedure add-in options.
127. The medium of embodiment 126, wherein the available procedure add-in options are determined based on care efficacy of procedures.
128. The medium of embodiment 116, wherein the set of atomized add-in options include a plurality of available provider add-in options.
129. The medium of embodiment 128, wherein the available provider add-in options are determined based on proximity of providers to the plan member's location.
130. The medium of embodiment 116, wherein the selected atomized add-in is associated with a payroll deduction cost and with a copay cost.
131. A processor-implemented add-in upgrade enrollment facilitating system, comprising:
an upgrade facilitating component means, to:
obtain, via at least one processor, an event signal associated with a plan member enrolled into a plan that includes a core coverage component and an add-ins coverage component;
retrieve, via at least one processor, plan member data associated with the plan member;
determine, via at least one processor, a condition or procedure associated with the event signal based on event signal data associated with the event signal;
determine, via at least one processor, that an atomized add-in upgrade that provides coverage for the determined condition or procedure is available to the plan member;
determine, via at least one processor, an atomized add-in recommendation for the plan member, wherein the atomized add-in recommendation includes a set of atomized add-in options;
provide, via an enrollment user interface, the atomized add-in recommendation to the plan member;
obtain, via the enrollment user interface, a selection of an atomized add-in from the plan member; and facilitate, via at least one processor, addition of the selected atomized add-in to the add-ins coverage component of the plan.

132. The system of embodiment 131, further comprising:
the upgrade facilitating component means, to:
determine, via at least one processor, that here is an outstanding claim associated with the plan member that benefits from the addition of the selected atomized add-in to the add-ins coverage component; and
facilitate, via at least one processor, processing the outstanding claim based on coverage provided by the selected atomized add-in.

133. The system of embodiment 131, wherein the event signal is one of: a coverage search by the plan member, a health care electronic data interchange transaction associated with the plan member, an electronic health information message associated with the plan member.

134. The system of embodiment 131, wherein the event signal comprises a plurality of event signals, and wherein the condition or procedure associated with the event signal is determined based on a combination of event signal data from the plurality of event signals.

135. The system of embodiment 131, wherein the plan member data includes at least one of: profile data associated with the plan member, clinical data associated with the plan member, plan configuration of the plan.

136. The system of embodiment 135, wherein the condition or procedure associated with the event signal is determined also based on the clinical data associated with the plan member.

137. The system of embodiment 135, wherein the atomized add-in recommendation is determined also based on the plan configuration of the plan.

138. The system of embodiment 135, wherein the determination that the atomized add-in upgrade is available is determined also based on the profile data associated with the plan member.

139. The system of embodiment 131, wherein the determination that the atomized add-in upgrade is available is made based on the determination that the core coverage component does not provide coverage for the determined condition or procedure, and that the add-ins coverage component does not provide coverage for the determined condition or procedure.

140. The system of embodiment 131, wherein the determination that the atomized add-in upgrade is available is made based on the determination that a chronic condition add-in upgrade is beneficial for the plan member.

141. The system of embodiment 131, wherein the set of atomized add-in options includes a plurality of available procedure add-in options.

142. The system of embodiment 141, wherein the available procedure add-in options are determined based on care efficacy of procedures.

143. The system of embodiment 131, wherein the set of atomized add-in options include a plurality of available provider add-in options.

144. The system of embodiment 143, wherein the available provider add-in options are determined based on proximity of providers to the plan member's location.

145. The system of embodiment 131, wherein the selected atomized add-in is associated with a payroll deduction cost and with a copay cost.

146. A processor-implemented add-in upgrade enrollment facilitating method, comprising:
executing processor-implemented upgrade facilitating component instructions to:
obtain, via at least one processor, an event signal associated with a plan member enrolled into a plan that includes a core coverage component and an add-ins coverage component;
retrieve, via at least one processor, plan member data associated with the plan member;
determine, via at least one processor, a condition or procedure associated with the event signal based on event signal data associated with the event signal;
determine, via at least one processor, that an atomized add-in upgrade that provides coverage for the determined condition or procedure is available to the plan member;
determine, via at least one processor, an atomized add-in recommendation for the plan member, wherein the atomized add-in recommendation includes a set of atomized add-in options;
provide, via an enrollment user interface, the atomized add-in recommendation to the plan member;
obtain, via the enrollment user interface, a selection of an atomized add-in from the plan member; and
facilitate, via at least one processor, addition of the selected atomized add-in to the add-ins coverage component of the plan.

147. The method of embodiment 146, further comprising:
executing processor-implemented upgrade facilitating component instructions to:
determine, via at least one processor, that here is an outstanding claim associated with the plan member that benefits from the addition of the selected atomized add-in to the add-ins coverage component; and
facilitate, via at least one processor, processing the outstanding claim based on coverage provided by the selected atomized add-in.

148. The method of embodiment 146, wherein the event signal is one of: a coverage search by the plan member, a health care electronic data interchange transaction associated with the plan member, an electronic health information message associated with the plan member.

149. The method of embodiment 146, wherein the event signal comprises a plurality of event signals, and wherein the condition or procedure associated with the event signal is determined based on a combination of event signal data from the plurality of event signals.

150. The method of embodiment 146, wherein the plan member data includes at least one of: profile data associated with the plan member, clinical data associated with the plan member, plan configuration of the plan.

151. The method of embodiment 150, wherein the condition or procedure associated with the event signal is determined also based on the clinical data associated with the plan member.

152. The method of embodiment 150, wherein the atomized add-in recommendation is determined also based on the plan configuration of the plan.

153. The method of embodiment 150, wherein the determination that the atomized add-in upgrade is available is determined also based on the profile data associated with the plan member.

154. The method of embodiment 146, wherein the determination that the atomized add-in upgrade is available is made based on the determination that the core coverage component does not provide coverage for the determined condition or procedure, and that the add-ins coverage component does not provide coverage for the determined condition or procedure.

155. The method of embodiment 146, wherein the determination that the atomized add-in upgrade is available is made based on the determination that a chronic condition add-in upgrade is beneficial for the plan member.

156. The method of embodiment 146, wherein the set of atomized add-in options includes a plurality of available procedure add-in options.

157. The method of embodiment 156, wherein the available procedure add-in options are determined based on care efficacy of procedures.

158. The method of embodiment 146, wherein the set of atomized add-in options include a plurality of available provider add-in options.

159. The method of embodiment 158, wherein the available provider add-in options are determined based on proximity of providers to the plan member's location.

160. The method of embodiment 146, wherein the selected atomized add-in is associated with a payroll deduction cost and with a copay cost.

201. An enhanced dynamic account structure apparatus, comprising:
a memory;
a component collection in the memory;
a processor disposed in communication with the memory, and configured to issue a plurality of processing instructions from the component collection stored in the memory, to:
obtain initial plan budget from a user, wherein the initial plan budget includes a temporal duration;
obtain plan option selections and values, via design user interface widgets, wherein the options include: individual co-pay options for individual events, and desired procedures,
determine upgrade options based on initial plan budget value and plan option selections and values, wherein excess amounts left over from plan option selections and values from initial plan budget are used to search for upgrade options specific to the user;
provide determined upgrade options to the user;
obtain selected upgrade options from the user;
determine schedule options for the desired procedures and provide to the user for scheduling;
generate an enhanced dynamic account structure account, wherein the enhanced dynamic structure includes: an personalized health account structure, and wherein the personalized health account structure includes a core component includes catastrophic health coverage with preventative and primary care, wherein the personalized health account includes a pointer to callable options for additional services for the determined upgrade options and on demand coverage.

202. The enhanced dynamic account structure apparatus of embodiment 201, wherein the temporal duration is any of: days, weeks, months, yearly, and multi-yearly.

203. The enhanced dynamic account structure apparatus of embodiment 201, wherein the upgrade options include at least one of chronic condition coverage upgrades, discretionary procedure coverage upgrades and service category coverage upgrades.

204. The enhanced dynamic account structure apparatus of embodiment 201, wherein the personalized health account is an HRA.

205. The enhanced dynamic account structure apparatus of embodiment 201, wherein the pointer to callable options is an unreferenced pointer.

206. The enhanced dynamic account structure apparatus of embodiment 201, wherein the pointer to callable options is an untyped pointer.

207. The enhanced dynamic account structure apparatus of embodiment 201, wherein the pointer to callable options is an void types pointer that may late bind to different data types on-demand.

301. An atomized coverage graph generating apparatus, comprising:
a memory;
a component collection in the memory, including:
an atomized coverage graph generating component;
a processor disposed in communication with the memory, and configured to issue a plurality of processing instructions from the component collection stored in the memory,
wherein the processor issues instructions from the atomized coverage graph generating component, stored in the memory, to:
obtain, via at least one processor, an atomized coverage graph generating request;
determine, via at least one processor, a set of clinical conditions associated with the atomized coverage graph generating request;
determine, via at least one processor, for each clinical condition in the set of clinical conditions, a set of treatments associated with the respective clinical condition;
determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;
determine, via at least one processor, for each treatment, a set of providers associated with the respective treatment;
determine, via at least one processor, practice patterns data that specifies, for each clinical condition treated by each provider, how likely the respective provider is to utilize each of the treatment paths in the set of treatment paths associated with the respective clinical condition; and
generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider.

302. The apparatus of embodiment 301, wherein the set of clinical conditions associated with the atomized coverage graph generating request is determined by grouping diagnosis codes for related ailments into clinical conditions.

303. The apparatus of embodiment 301, wherein a set of treatments associated with a clinical condition is determined by analyzing historical claims data associated with the clinical condition.

304. The apparatus of embodiment 301, wherein treatment paths data is filtered to include only high frequency treatment paths.

305. The apparatus of embodiment 304, wherein a high frequency treatment path is a treatment path utilized by at least a minimum percentage of members.

306. The apparatus of embodiment 304, wherein a high frequency treatment path is one of a plurality of high frequency treatment paths that in aggregate are utilized by at least a minimum percentage of members.

307. The apparatus of embodiment 301, wherein treatment paths data further specifies a ranking for each treatment path.

308. The apparatus of embodiment 301, wherein treatment paths data further specifies key pathway nodes for each treatment path.

309. The apparatus of embodiment 301, wherein practice patterns data of a provider object further specifies the corresponding provider's treatment cost associated with each linked treatment object.

310. The apparatus of embodiment 301, wherein at least some of the objects in the atomized coverage graph data structure are dynamic nodes configured to be generated dynamically using associated engageable code.

311. The apparatus of embodiment 310, wherein the engageable code is a SQL query.

312. The apparatus of embodiment 310, further, comprising:
the processor issues instructions from the atomized coverage graph generating component, stored in the memory, to:
determine that frequency of utilization of a dynamic node exceeds a specified threshold; and
convert the dynamic node in the atomized coverage graph data structure to a static node.

313. The apparatus of embodiment 312, wherein the frequency of utilization is measured based on one of: a counter of utilization, a percentage of utilization.

314. The apparatus of embodiment 301, further, comprising:
the processor issues instructions from the atomized coverage graph generating component, stored in the memory, to:
determine that an importance quotient of a subset of objects in the atomized coverage graph data structure exceeds a specified threshold; and
split off the subset of objects into new nodes in the atomized coverage graph data structure.

315. The apparatus of embodiment 314, wherein the importance quotient is determined using one of:
a frequency of utilization measure, a machine learning structure.

316. A processor-readable atomized coverage graph generating non-transient physical medium storing processor-executable components, the components, comprising:
a component collection stored in the medium, including:
an atomized coverage graph generating component;
wherein the atomized coverage graph generating component, stored in the medium, includes processor-issuable instructions to:
obtain, via at least one processor, an atomized coverage graph generating request;
determine, via at least one processor, a set of clinical conditions associated with the atomized coverage graph generating request;
determine, via at least one processor, for each clinical condition in the set of clinical conditions, a set of treatments associated with the respective clinical condition;
determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;
determine, via at least one processor, for each treatment, a set of providers associated with the respective treatment;
determine, via at least one processor, practice patterns data that specifies, for each clinical condition treated by each provider, how likely the respective provider is to utilize each of the treatment paths in the set of treatment paths associated with the respective clinical condition; and
generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider.

317. The medium of embodiment 316, wherein the set of clinical conditions associated with the atomized coverage graph generating request is determined by grouping diagnosis codes for related ailments into clinical conditions.

318. The medium of embodiment 316, wherein a set of treatments associated with a clinical condition is determined by analyzing historical claims data associated with the clinical condition.

319. The medium of embodiment 316, wherein treatment paths data is filtered to include only high frequency treatment paths.

320. The medium of embodiment 319, wherein a high frequency treatment path is a treatment path utilized by at least a minimum percentage of members.

321. The medium of embodiment 319, wherein a high frequency treatment path is one of a plurality of high frequency treatment paths that in aggregate are utilized by at least a minimum percentage of members.

322. The medium of embodiment 316, wherein treatment paths data further specifies a ranking for each treatment path.

323. The medium of embodiment 316, wherein treatment paths data further specifies key pathway nodes for each treatment path.

324. The medium of embodiment 316, wherein practice patterns data of a provider object further specifies the corresponding provider's treatment cost associated with each linked treatment object.

325. The medium of embodiment 316, wherein at least some of the objects in the atomized coverage graph data structure are dynamic nodes configured to be generated dynamically using associated engageable code.

326. The medium of embodiment 325, wherein the engageable code is a SQL query.

327. The medium of embodiment 325, further, comprising:
the atomized coverage graph generating component, stored in the medium, includes processor-issuable instructions to:

determine that frequency of utilization of a dynamic node exceeds a specified threshold; and
convert the dynamic node in the atomized coverage graph data structure to a static node.
328. The medium of embodiment 327, wherein the frequency of utilization is measured based on one of: a counter of utilization, a percentage of utilization.
329. The medium of embodiment 316, further, comprising:
the atomized coverage graph generating component, stored in the medium, includes processor-issuable instructions to:
determine that an importance quotient of a subset of objects in the atomized coverage graph data structure exceeds a specified threshold; and
split off the subset of objects into new nodes in the atomized coverage graph data structure.
330. The medium of embodiment 329, wherein the importance quotient is determined using one of:
a frequency of utilization measure, a machine learning structure.
331. A processor-implemented atomized coverage graph generating system, comprising:
an atomized coverage graph generating component means, to:
obtain, via at least one processor, an atomized coverage graph generating request;
determine, via at least one processor, a set of clinical conditions associated with the atomized coverage graph generating request;
determine, via at least one processor, for each clinical condition in the set of clinical conditions, a set of treatments associated with the respective clinical condition;
determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;
determine, via at least one processor, for each treatment, a set of providers associated with the respective treatment;
determine, via at least one processor, practice patterns data that specifies, for each clinical condition treated by each provider, how likely the respective provider is to utilize each of the treatment paths in the set of treatment paths associated with the respective clinical condition; and
generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider.
332. The system of embodiment 331, wherein the set of clinical conditions associated with the atomized coverage graph generating request is determined by grouping diagnosis codes for related ailments into clinical conditions.
333. The system of embodiment 331, wherein a set of treatments associated with a clinical condition is determined by analyzing historical claims data associated with the clinical condition.
334. The system of embodiment 331, wherein treatment paths data is filtered to include only high frequency treatment paths.
335. The system of embodiment 334, wherein a high frequency treatment path is a treatment path utilized by at least a minimum percentage of members.
336. The system of embodiment 334, wherein a high frequency treatment path is one of a plurality of high frequency treatment paths that in aggregate are utilized by at least a minimum percentage of members.
337. The system of embodiment 331, wherein treatment paths data further specifies a ranking for each treatment path.
338. The system of embodiment 331, wherein treatment paths data further specifies key pathway nodes for each treatment path.
339. The system of embodiment 331, wherein practice patterns data of a provider object further specifies the corresponding provider's treatment cost associated with each linked treatment object.
340. The system of embodiment 331, wherein at least some of the objects in the atomized coverage graph data structure are dynamic nodes configured to be generated dynamically using associated engageable code.
341. The system of embodiment 340, wherein the engageable code is a SQL query.
342. The system of embodiment 340, further, comprising:
the atomized coverage graph generating component means, to:
determine that frequency of utilization of a dynamic node exceeds a specified threshold; and
convert the dynamic node in the atomized coverage graph data structure to a static node.
343. The system of embodiment 342, wherein the frequency of utilization is measured based on one of: a counter of utilization, a percentage of utilization.
344. The system of embodiment 331, further, comprising:
the atomized coverage graph generating component means, to:
determine that an importance quotient of a subset of objects in the atomized coverage graph data structure exceeds a specified threshold; and
split off the subset of objects into new nodes in the atomized coverage graph data structure.
345. The system of embodiment 344, wherein the importance quotient is determined using one of: a
frequency of utilization measure, a machine learning structure.
346. A processor-implemented atomized coverage graph generating method, comprising:
executing processor-implemented atomized coverage graph generating component instructions to:
obtain, via at least one processor, an atomized coverage graph generating request;
determine, via at least one processor, a set of clinical conditions associated with the atomized coverage graph generating request;
determine, via at least one processor, for each clinical condition in the set of clinical conditions, a set of treatments associated with the respective clinical condition;
determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;

determine, via at least one processor, for each treatment, a set of providers associated with the respective treatment;

determine, via at least one processor, practice patterns data that specifies, for each clinical condition treated by each provider, how likely the respective provider is to utilize each of the treatment paths in the set of treatment paths associated with the respective clinical condition; and generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider.

347. The method of embodiment 346, wherein the set of clinical conditions associated with the atomized coverage graph generating request is determined by grouping diagnosis codes for related ailments into clinical conditions.

348. The method of embodiment 346, wherein a set of treatments associated with a clinical condition is determined by analyzing historical claims data associated with the clinical condition.

349. The method of embodiment 346, wherein treatment paths data is filtered to include only high frequency treatment paths.

350. The method of embodiment 349, wherein a high frequency treatment path is a treatment path utilized by at least a minimum percentage of members.

351. The method of embodiment 349, wherein a high frequency treatment path is one of a plurality of high frequency treatment paths that in aggregate are utilized by at least a minimum percentage of members.

352. The method of embodiment 346, wherein treatment paths data further specifies a ranking for each treatment path.

353. The method of embodiment 346, wherein treatment paths data further specifies key pathway nodes for each treatment path.

354. The method of embodiment 346, wherein practice patterns data of a provider object further specifies the corresponding provider's treatment cost associated with each linked treatment object.

355. The method of embodiment 346, wherein at least some of the objects in the atomized coverage graph data structure are dynamic nodes configured to be generated dynamically using associated engageable code.

356. The method of embodiment 355, wherein the engageable code is a SQL query.

357. The method of embodiment 355, further, comprising: executing processor-implemented atomized coverage graph generating component instructions to:
determine that frequency of utilization of a dynamic node exceeds a specified threshold; and
convert the dynamic node in the atomized coverage graph data structure to a static node.

358. The method of embodiment 357, wherein the frequency of utilization is measured based on one of: a counter of utilization, a percentage of utilization.

359. The method of embodiment 346, further, comprising: executing processor-implemented atomized coverage graph generating component instructions to:
determine that an importance quotient of a subset of objects in the atomized coverage graph data structure exceeds a specified threshold; and
split off the subset of objects into new nodes in the atomized coverage graph data structure.

360. The method of embodiment 359, wherein the importance quotient is determined using one of: a frequency of utilization measure, a machine learning structure.

401. An add-in upgrade recommendation apparatus, comprising:
a memory;
a component collection in the memory, including:
an add-in recommendation determining component;
a processor disposed in communication with the memory, and configured to issue a plurality of processing instructions from the component collection stored in the memory,
wherein the processor issues instructions from the add-in recommendation determining component, stored in the memory, to:
obtain, via at least one processor, an add-in recommendation request generated based on an event signal associated with a plan member enrolled into a plan that includes a core coverage component and an add-ins coverage component;
determine, via at least one processor, a condition associated with the add-in recommendation request based on event signal data associated with the event signal;
determine, via at least one processor, a set of treatment paths associated with the condition, wherein each treatment path is associated with a clinical value, and wherein each treatment path comprises a set of treatment pathway nodes;
obtain, via at least one processor, a member state associated with the plan member, wherein the member state includes clinical data;
determine, via at least one processor, the plan member's treatment path location with regard to the set of treatment paths based on analysis of the clinical data associated with the plan member;
determine, via at least one processor, available treatment paths that the plan member can take from the plan member's treatment path location from the set of treatment paths;
select, via at least one processor, a treatment path with a high clinical value from the available treatment paths;
determine, via at least one processor, an atomized add-in that provides coverage for the selected treatment path;
determine, via at least one processor, a set of providers available for the atomized add-in;
calculate, via at least one processor, for each provider in the set of providers, (a) an expected longitudinal treatment value and (b) a copay for the atomized add-in;

determine, via at least one processor, a best provider from the set of providers, wherein the best provider is associated with the lowest expected longitudinal treatment value; and provide, via at least one processor, an atomized add-in recommendation for the plan member, wherein the atomized add-in recommendation is associated with the atomized add-in and with the best provider.

402. The apparatus of embodiment 401, wherein the event signal is one of: a coverage search by the plan member, a health care electronic data interchange transaction associated with the plan member, an electronic health information message associated with the plan member.

403. The apparatus of embodiment 401, wherein the condition associated with the add-in recommendation request is determined based on a coverage search query specified by the plan member.

404. The apparatus of embodiment 401, wherein the condition associated with the add-in recommendation request is determined also based on clinical data associated with the plan member.

405. The apparatus of embodiment 401, wherein the instructions to determine the set of treatment paths associated with the condition further comprise instructions to:

retrieve, via at least one processor, an atomized coverage graph data structure associated with the plan;

determine, via at least one processor, a clinical condition object in the atomized coverage graph data structure corresponding to the condition associated with the add-in recommendation request; and determine, via at least one processor, a treatment paths object in the atomized coverage graph data structure associated with the clinical condition object.

406. The apparatus of embodiment 401, wherein the plan member's treatment path location is determined also based on a treatment path move sequence associated with the plan member.

407. The apparatus of embodiment 401, wherein the treatment path with a high clinical value is determined based on a determination that the plan member is located at a key treatment pathway node.

408. The apparatus of embodiment 401, wherein the atomized add-in is determined as a treatment add-in that provides coverage for the next treatment that the plan member must utilize to follow the selected treatment path from the plan member's treatment path location.

409. The apparatus of embodiment 401, wherein the atomized add-in is determined as a condition add-in that provides coverage for the condition.

410. The apparatus of embodiment 401, wherein the instructions to calculate, for each provider in the set of providers, an expected longitudinal treatment value further comprise instructions to:

retrieve, via at least one processor, an atomized coverage graph data structure associated with the plan;

determine, via at least one processor, a provider object in the atomized coverage graph data structure corresponding to the respective provider;

calculate, via at least one processor, a propensity ranking based on practice patterns data associated with the provider object;

determine, via at least one processor, a propensity weight based on the plan member's treatment path location;

calculate, via at least one processor, an expected episodic cost for a next expected treatment for the condition based on treatment cost data associated with the provider object;

determine, via at least one processor, an episodic cost weight based on the plan member's treatment path location; and calculate, via at least one processor, an expected longitudinal treatment value for the respective provider as a weighted average of the respective provider's propensity ranking and the expected episodic cost for the next expected treatment weighted by their respective weights.

411. The apparatus of embodiment 401, wherein the instructions to calculate, for each provider in the set of providers, a copay for the atomized add-in further comprise instructions to:

determine, via at least one processor, a base copay for the atomized add-in based on an average longitudinal treatment value for providers in the set of providers;

calculate, via at least one processor, a price factor for the respective provider, wherein the price factor indicates relative expense of the expected longitudinal treatment value for the respective provider as compared with the average longitudinal treatment value for providers in the set of providers; and calculate, via at least one processor, a copay for the atomized add-in for the respective provider as the base copay for the respective provider adjusted by the price factor for the respective provider.

412. The apparatus of embodiment 411, wherein providers in the set of providers are restricted to providers in the region associated with the plan member.

413. The apparatus of embodiment 401, wherein a copay for the atomized add-in is further adjusted based on a treatment path move sequence associated with the plan member.

414. The apparatus of embodiment 401, further, comprising: the processor issues instructions from the add-in recommendation determining component, stored in the memory, to:

generate, via an enrollment user interface, a notification with the atomized add-in recommendation for the plan member;

obtain, via the enrollment user interface, a selection of the atomized add-in from the plan member; and provide, via the enrollment user interface, information regarding the set of providers available for the atomized add-in, wherein the best provider is highlighted for the plan member.

415. The apparatus of embodiment 414, wherein the information regarding the set of providers available for the atomized add-in is provided via a map component that shows the location of each provider and the copay associated with each provider on a map.

416. A processor-readable add-in upgrade recommendation non-transient physical medium storing processor-executable components, the components, comprising:

a component collection stored in the medium, including:
an add-in recommendation determining component;
wherein the add-in recommendation determining component, stored in the medium, includes processor-issuable instructions to:

obtain, via at least one processor, an add-in recommendation request generated based on an event signal associated with a plan member enrolled into a plan that includes a core coverage component and an add-ins coverage component;

determine, via at least one processor, a condition associated with the add-in recommendation request based on event signal data associated with the event signal;

determine, via at least one processor, a set of treatment paths associated with the condition, wherein each treatment path is associated with a clinical value, and wherein each treatment path comprises a set of treatment pathway nodes;

obtain, via at least one processor, a member state associated with the plan member, wherein the member state includes clinical data;

determine, via at least one processor, the plan member's treatment path location with regard to the set of treatment paths based on analysis of the clinical data associated with the plan member;

determine, via at least one processor, available treatment paths that the plan member can take from the plan member's treatment path location from the set of treatment paths;

select, via at least one processor, a treatment path with a high clinical value from the available treatment paths;

determine, via at least one processor, an atomized add-in that provides coverage for the selected treatment path;

determine, via at least one processor, a set of providers available for the atomized add-in;

calculate, via at least one processor, for each provider in the set of providers, (a) an expected longitudinal treatment value and (b) a copay for the atomized add-in;

determine, via at least one processor, a best provider from the set of providers, wherein the best provider is associated with the lowest expected longitudinal treatment value; and provide, via at least one processor, an atomized add-in recommendation for the plan member, wherein the atomized add-in recommendation is associated with the atomized add-in and with the best provider.

417. The medium of embodiment 416, wherein the event signal is one of: a coverage search by the plan member, a health care electronic data interchange transaction associated with the plan member, an electronic health information message associated with the plan member.

418. The medium of embodiment 416, wherein the condition associated with the add-in recommendation request is determined based on a coverage search query specified by the plan member.

419. The medium of embodiment 416, wherein the condition associated with the add-in recommendation request is determined also based on clinical data associated with the plan member.

420. The medium of embodiment 416, wherein the instructions to determine the set of treatment paths associated with the condition further comprise instructions to:
retrieve, via at least one processor, an atomized coverage graph data structure associated with the plan;
determine, via at least one processor, a clinical condition object in the atomized coverage graph data structure corresponding to the condition associated with the add-in recommendation request; and
determine, via at least one processor, a treatment paths object in the atomized coverage graph data structure associated with the clinical condition object.

421. The medium of embodiment 416, wherein the plan member's treatment path location is determined also based on a treatment path move sequence associated with the plan member.

422. The medium of embodiment 416, wherein the treatment path with a high clinical value is determined based on a determination that the plan member is located at a key treatment pathway node.

423. The medium of embodiment 416, wherein the atomized add-in is determined as a treatment add-in that provides coverage for the next treatment that the plan member must utilize to follow the selected treatment path from the plan member's treatment path location.

424. The medium of embodiment 416, wherein the atomized add-in is determined as a condition add-in that provides coverage for the condition.

425. The medium of embodiment 416, wherein the instructions to calculate, for each provider in the set of providers, an expected longitudinal treatment value further comprise instructions to:
retrieve, via at least one processor, an atomized coverage graph data structure associated with the plan;
determine, via at least one processor, a provider object in the atomized coverage graph data structure corresponding to the respective provider;
calculate, via at least one processor, a propensity ranking based on practice patterns data associated with the provider object;
determine, via at least one processor, a propensity weight based on the plan member's treatment path location;
calculate, via at least one processor, an expected episodic cost for a next expected treatment for the condition based on treatment cost data associated with the provider object;
determine, via at least one processor, an episodic cost weight based on the plan member's treatment path location; and
calculate, via at least one processor, an expected longitudinal treatment value for the respective provider as a weighted average of the respective provider's propensity ranking and the expected episodic cost for the next expected treatment weighted by their respective weights.

426. The medium of embodiment 416, wherein the instructions to calculate, for each provider in the set of providers, a copay for the atomized add-in further comprise instructions to:
determine, via at least one processor, a base copay for the atomized add-in based on an average longitudinal treatment value for providers in the set of providers;
calculate, via at least one processor, a price factor for the respective provider, wherein the price factor indicates relative expense of the expected longitudinal treatment value for the respective provider as compared with the average longitudinal treatment value for providers in the set of providers; and
calculate, via at least one processor, a copay for the atomized add-in for the respective provider as the base copay for the respective provider adjusted by the price factor for the respective provider.

427. The medium of embodiment 426, wherein providers in the set of providers are restricted to providers in the region associated with the plan member.

428. The medium of embodiment 416, wherein a copay for the atomized add-in is further adjusted based on a treatment path move sequence associated with the plan member.

429. The medium of embodiment 416, further, comprising:
the add-in recommendation determining component, stored in the medium, includes processor-issuable instructions to:
generate, via an enrollment user interface, a notification with the atomized add-in recommendation for the plan member;

obtain, via the enrollment user interface, a selection of the atomized add-in from the plan member; and provide, via the enrollment user interface, information regarding the set of providers available for the atomized add-in, wherein the best provider is highlighted for the plan member.

430. The medium of embodiment 429, wherein the information regarding the set of providers available for the atomized add-in is provided via a map component that shows the location of each provider and the copay associated with each provider on a map.

431. A processor-implemented add-in upgrade recommendation system, comprising:

an add-in recommendation determining component means, to:

obtain, via at least one processor, an add-in recommendation request generated based on an event signal associated with a plan member enrolled into a plan that includes a core coverage component and an add-ins coverage component;

determine, via at least one processor, a condition associated with the add-in recommendation request based on event signal data associated with the event signal;

determine, via at least one processor, a set of treatment paths associated with the condition, wherein each treatment path is associated with a clinical value, and wherein each treatment path comprises a set of treatment pathway nodes;

obtain, via at least one processor, a member state associated with the plan member, wherein the member state includes clinical data;

determine, via at least one processor, the plan member's treatment path location with regard to the set of treatment paths based on analysis of the clinical data associated with the plan member;

determine, via at least one processor, available treatment paths that the plan member can take from the plan member's treatment path location from the set of treatment paths;

select, via at least one processor, a treatment path with a high clinical value from the available treatment paths;

determine, via at least one processor, an atomized add-in that provides coverage for the selected treatment path;

determine, via at least one processor, a set of providers available for the atomized add-in;

calculate, via at least one processor, for each provider in the set of providers, (a) an expected longitudinal treatment value and (b) a copay for the atomized add-in;

determine, via at least one processor, a best provider from the set of providers, wherein the best provider is associated with the lowest expected longitudinal treatment value; and provide, via at least one processor, an atomized add-in recommendation for the plan member, wherein the atomized add-in recommendation is associated with the atomized add-in and with the best provider.

432. The system of embodiment 431, wherein the event signal is one of: a coverage search by the plan member, a health care electronic data interchange transaction associated with the plan member, an electronic health information message associated with the plan member.

433. The system of embodiment 431, wherein the condition associated with the add-in recommendation request is determined based on a coverage search query specified by the plan member.

434. The system of embodiment 431, wherein the condition associated with the add-in recommendation request is determined also based on clinical data associated with the plan member.

435. The system of embodiment 431, wherein the means to determine the set of treatment paths associated with the condition further comprise means to:

retrieve, via at least one processor, an atomized coverage graph data structure associated with the plan;

determine, via at least one processor, a clinical condition object in the atomized coverage graph data structure corresponding to the condition associated with the add-in recommendation request; and determine, via at least one processor, a treatment paths object in the atomized coverage graph data structure associated with the clinical condition object.

436. The system of embodiment 431, wherein the plan member's treatment path location is determined also based on a treatment path move sequence associated with the plan member.

437. The system of embodiment 431, wherein the treatment path with a high clinical value is determined based on a determination that the plan member is located at a key treatment pathway node.

438. The system of embodiment 431, wherein the atomized add-in is determined as a treatment add-in that provides coverage for the next treatment that the plan member must utilize to follow the selected treatment path from the plan member's treatment path location.

439. The system of embodiment 431, wherein the atomized add-in is determined as a condition add-in that provides coverage for the condition.

440. The system of embodiment 431, wherein the means to calculate, for each provider in the set of providers, an expected longitudinal treatment value further comprise means to:

retrieve, via at least one processor, an atomized coverage graph data structure associated with the plan;

determine, via at least one processor, a provider object in the atomized coverage graph data structure corresponding to the respective provider;

calculate, via at least one processor, a propensity ranking based on practice patterns data associated with the provider object;

determine, via at least one processor, a propensity weight based on the plan member's treatment path location;

calculate, via at least one processor, an expected episodic cost for a next expected treatment for the condition based on treatment cost data associated with the provider object;

determine, via at least one processor, an episodic cost weight based on the plan member's treatment path location; and calculate, via at least one processor, an expected longitudinal treatment value for the respective provider as a weighted average of the respective provider's propensity ranking and the expected episodic cost for the next expected treatment weighted by their respective weights.

441. The system of embodiment 431, wherein the means to calculate, for each provider in the set of providers, a copay for the atomized add-in further comprise means to:

determine, via at least one processor, a base copay for the atomized add-in based on an average longitudinal treatment value for providers in the set of providers;

calculate, via at least one processor, a price factor for the respective provider, wherein the price factor indicates relative expense of the expected longitudinal treatment value for the respective provider as compared with the average longitudinal treatment value for providers in the set of providers; and calculate, via at least one processor, a copay for the atomized add-in for the respective provider as the base copay for the respective provider adjusted by the price factor for the respective provider.

442. The system of embodiment 441, wherein providers in the set of providers are restricted to providers in the region associated with the plan member.

443. The system of embodiment 431, wherein a copay for the atomized add-in is further adjusted based on a treatment path move sequence associated with the plan member.

444. The system of embodiment 431, further, comprising:
the add-in recommendation determining component means, to:
generate, via an enrollment user interface, a notification with the atomized add-in recommendation for the plan member;
obtain, via the enrollment user interface, a selection of the atomized add-in from the plan member; and
provide, via the enrollment user interface, information regarding the set of providers available for the atomized add-in, wherein the best provider is highlighted for the plan member.

445. The system of embodiment 444, wherein the information regarding the set of providers available for the atomized add-in is provided via a map component that shows the location of each provider and the copay associated with each provider on a map.

446. A processor-implemented add-in upgrade recommendation method, comprising:
executing processor-implemented add-in recommendation determining component instructions to:
obtain, via at least one processor, an add-in recommendation request generated based on an event signal associated with a plan member enrolled into a plan that includes a core coverage component and an add-ins coverage component;
determine, via at least one processor, a condition associated with the add-in recommendation request based on event signal data associated with the event signal;
determine, via at least one processor, a set of treatment paths associated with the condition, wherein each treatment path is associated with a clinical value, and wherein each treatment path comprises a set of treatment pathway nodes;
obtain, via at least one processor, a member state associated with the plan member, wherein the member state includes clinical data;
determine, via at least one processor, the plan member's treatment path location with regard to the set of treatment paths based on analysis of the clinical data associated with the plan member;
determine, via at least one processor, available treatment paths that the plan member can take from the plan member's treatment path location from the set of treatment paths;
select, via at least one processor, a treatment path with a high clinical value from the available treatment paths;
determine, via at least one processor, an atomized add-in that provides coverage for the selected treatment path;
determine, via at least one processor, a set of providers available for the atomized add-in;
calculate, via at least one processor, for each provider in the set of providers, (a) an expected longitudinal treatment value and (b) a copay for the atomized add-in;
determine, via at least one processor, a best provider from the set of providers, wherein the best provider is associated with the lowest expected longitudinal treatment value; and
provide, via at least one processor, an atomized add-in recommendation for the plan member, wherein the atomized add-in recommendation is associated with the atomized add-in and with the best provider.

447. The method of embodiment 446, wherein the event signal is one of: a coverage search by the plan member, a health care electronic data interchange transaction associated with the plan member, an electronic health information message associated with the plan member.

448. The method of embodiment 446, wherein the condition associated with the add-in recommendation request is determined based on a coverage search query specified by the plan member.

449. The method of embodiment 446, wherein the condition associated with the add-in recommendation request is determined also based on clinical data associated with the plan member.

450. The method of embodiment 446, wherein the instructions to determine the set of treatment paths associated with the condition further comprise instructions to:
retrieve, via at least one processor, an atomized coverage graph data structure associated with the plan;
determine, via at least one processor, a clinical condition object in the atomized coverage graph data structure corresponding to the condition associated with the add-in recommendation request; and
determine, via at least one processor, a treatment paths object in the atomized coverage graph data structure associated with the clinical condition object.

451. The method of embodiment 446, wherein the plan member's treatment path location is determined also based on a treatment path move sequence associated with the plan member.

452. The method of embodiment 446, wherein the treatment path with a high clinical value is determined based on a determination that the plan member is located at a key treatment pathway node.

453. The method of embodiment 446, wherein the atomized add-in is determined as a treatment add-in that provides coverage for the next treatment that the plan member must utilize to follow the selected treatment path from the plan member's treatment path location.

454. The method of embodiment 446, wherein the atomized add-in is determined as a condition add-in that provides coverage for the condition.

455. The method of embodiment 446, wherein the instructions to calculate, for each provider in the set of providers, an expected longitudinal treatment value further comprise instructions to:

retrieve, via at least one processor, an atomized coverage graph data structure associated with the plan;

determine, via at least one processor, a provider object in the atomized coverage graph data structure corresponding to the respective provider;

calculate, via at least one processor, a propensity ranking based on practice patterns data associated with the provider object;

determine, via at least one processor, a propensity weight based on the plan member's treatment path location;

calculate, via at least one processor, an expected episodic cost for a next expected treatment for the condition based on treatment cost data associated with the provider object;

determine, via at least one processor, an episodic cost weight based on the plan member's treatment path location; and calculate, via at least one processor, an expected longitudinal treatment value for the respective provider as a weighted average of the respective provider's propensity ranking and the expected episodic cost for the next expected treatment weighted by their respective weights.

456. The method of embodiment 446, wherein the instructions to calculate, for each provider in the set of providers, a copay for the atomized add-in further comprise instructions to:

determine, via at least one processor, a base copay for the atomized add-in based on an average longitudinal treatment value for providers in the set of providers;

calculate, via at least one processor, a price factor for the respective provider, wherein the price factor indicates relative expense of the expected longitudinal treatment value for the respective provider as compared with the average longitudinal treatment value for providers in the set of providers; and calculate, via at least one processor, a copay for the atomized add-in for the respective provider as the base copay for the respective provider adjusted by the price factor for the respective provider.

457. The method of embodiment 456, wherein providers in the set of providers are restricted to providers in the region associated with the plan member.

458. The method of embodiment 446, wherein a copay for the atomized add-in is further adjusted based on a treatment path move sequence associated with the plan member.

459. The method of embodiment 446, further, comprising:

executing processor-implemented add-in recommendation determining component instructions to:

generate, via an enrollment user interface, a notification with the atomized add-in recommendation for the plan member;

obtain, via the enrollment user interface, a selection of the atomized add-in from the plan member; and provide, via the enrollment user interface, information regarding the set of providers available for the atomized add-in, wherein the best provider is highlighted for the plan member.

460. The method of embodiment 459, wherein the information regarding the set of providers available for the atomized add-in is provided via a map component that shows the location of each provider and the copay associated with each provider on a map.

501. A coverage search processing apparatus, comprising:
a memory;
a component collection in the memory, including:
a search processing component;
a processor disposed in communication with the memory, and configured to issue a plurality of processing instructions from the component collection stored in the memory,
wherein the processor issues instructions from the search processing component, stored in the memory, to:

obtain, via at least one processor, a coverage search request from a member enrolled into a plan, wherein the coverage search request includes a coverage search query specified by the member;

determine, via at least one processor, a condition associated with the coverage search request based on the coverage search query;

determine, via at least one processor, a set of treatment paths associated with the condition, wherein each treatment path is associated with a clinical value, and wherein each treatment path comprises a set of treatment pathway nodes;

obtain, via at least one processor, a member state associated with the member, wherein the member state includes clinical data;

determine, via at least one processor, the member's treatment path location with regard to the set of treatment paths based on analysis of the clinical data associated with the member;

determine, via at least one processor, a high value treatment path that the member can take from the member's treatment path location;

identify, via at least one processor, a next treatment on the high value treatment path;

determine, via at least one processor, a set of providers available for the next treatment;

calculate, via at least one processor, for each provider in the set of providers, (a) an expected longitudinal treatment value and (b) a copay for the next treatment;

determine, via at least one processor, a best provider from the set of providers, wherein the best provider is associated with the lowest expected longitudinal treatment value; and provide, via a least one processor, coverage information for the member, wherein the coverage information includes coverage information for the next treatment for the best provider.

502. The apparatus of embodiment 501, wherein the instructions to determine the condition associated with the coverage search request further comprise instructions to:

retrieve, via at least one processor, an atomized coverage graph data structure associated with the plan; and search, via at least one processor, through clinical condition objects in the atomized coverage graph data structure to determine a clinical condition object corresponding to the coverage search query.

503. The apparatus of embodiment 501, wherein the instructions to determine the condition associated with the coverage search request further comprise instructions to:

retrieve, via at least one processor, an atomized coverage graph data structure associated with the plan;

search, via at least one processor, through treatment objects in the atomized coverage graph data structure to determine a treatment object corresponding to the coverage search query; and determine, via at least one processor, a clinical condition object linked to the treatment object.

504. The apparatus of embodiment 501, wherein the condition associated with the coverage search request is determined also based on clinical data associated with the member.
505. The apparatus of embodiment 502, wherein the instructions to determine the set of treatment paths associated with the condition further comprise instructions to determine a treatment paths object in the atomized coverage graph data structure associated with the clinical condition object.
506. The apparatus of embodiment 503, wherein the instructions to determine the set of providers available for the next treatment further comprise instructions to:
   determine, via at least one processor, provider objects in the atomized coverage graph data structure linked to the treatment object; and
   filter, via at least one processor, the determined provider objects to discard provider objects that are not in the region associated with the member.
507. The apparatus of embodiment 506, wherein the instructions to calculate, for each provider in the set of providers, an expected longitudinal treatment value further comprise instructions to:
   determine, via at least one processor, a provider object in the set of providers available for the next treatment corresponding to the respective provider;
   calculate, via at least one processor, a propensity ranking based on practice patterns data associated with the provider object;
   determine, via at least one processor, a propensity weight based on the member's treatment path location;
   calculate, via at least one processor, an expected episodic cost for the next treatment based on treatment cost data associated with the provider object;
   determine, via at least one processor, an episodic cost weight based on the member's treatment path location; and
   calculate, via at least one processor, an expected longitudinal treatment value for the respective provider as a weighted average of the respective provider's propensity ranking and the expected episodic cost for the next treatment weighted by their respective weights.
508. The apparatus of embodiment 507, wherein the instructions to calculate, for each provider in the set of providers, a copay for the next treatment further comprise instructions to:
   determine, via at least one processor, a base copay for the next treatment based on an average longitudinal treatment value for providers in the set of providers;
   calculate, via at least one processor, a price factor for the respective provider, wherein the price factor indicates relative expense of the expected longitudinal treatment value for the respective provider as compared with the average longitudinal treatment value for providers in the set of providers; and
   calculate, via at least one processor, a copay for the next treatment for the respective provider as the base copay for the respective provider adjusted by the price factor for the respective provider.
509. The apparatus of embodiment 501, wherein a copay for the next treatment is further adjusted based on a treatment path move sequence associated with the member.
510. The apparatus of embodiment 501, wherein a copay for the next treatment is further adjusted based on a determination that the member state associated with the member indicates that the member has been diagnosed with the condition.
511. The apparatus of embodiment 501, further, comprising: the processor issues instructions from the search processing component, stored in the memory, to:
   determine, via at least one processor, that the best provider does not match a member requested provider in the coverage search query; and
   wherein the coverage information provided for the member also includes coverage information for the next treatment for the member requested provider.
512. The apparatus of embodiment 501, further, comprising: the processor issues instructions from the search processing component, stored in the memory, to:
   determine, via at least one processor, that the next treatment on the high value treatment path does not match a member specified treatment in the coverage search query;
   determine, via at least one processor, a set of providers available for the member specified treatment;
   calculate, via at least one processor, for each provider in the set of providers available for the member specified treatment, (a) an expected longitudinal treatment value assuming that the member utilizes the member specified treatment next and (b) a copay for the member specified treatment;
   determine, via at least one processor, a best provider from the second set of providers, wherein the best provider from the second set of providers is associated with the lowest expected longitudinal treatment value assuming that the member utilizes the member specified treatment next; and
   wherein the coverage information provided for the member also includes coverage information for the member specified treatment for the best provider from the second set of providers.
513. The apparatus of embodiment 501, wherein the instructions to obtain the coverage search request further comprise instructions to:
   generate, via a coverage search user interface, a GUI widget configured to obtain a member specified treatment; and
   generate, via the coverage search user interface, a GUI widget configured to obtain a member requested provider.
514. The apparatus of embodiment 513, wherein the instructions to provide the coverage information for the member further comprise instructions to:
   generate, via the coverage search user interface, a GUI widget configured to provide coverage information for an atomized add-in that that provides coverage for the member specified treatment;
   generate, via the coverage search user interface, a GUI widget configured to provide coverage information for an atomized add-in that that provides coverage for the next treatment;
   obtain, via the coverage search user interface, an atomized add-in selection from the member; and
   generate, via the coverage search user interface, a GUI widget configured to provide coverage information regarding providers available for the member selected atomized add-in, wherein the best provider is highlighted for the member.
515. The apparatus of embodiment 514, wherein the member requested provider is highlighted for the plan member using at least one of: positioning, header, color, border, font.

516. A processor-readable coverage search processing non-transient physical medium storing processor-executable components, the components, comprising:
a component collection stored in the medium, including:
a search processing component;
wherein the search processing component, stored in the medium, includes processor-issuable instructions to:
obtain, via at least one processor, a coverage search request from a member enrolled into a plan, wherein the coverage search request includes a coverage search query specified by the member;
determine, via at least one processor, a condition associated with the coverage search request based on the coverage search query;
determine, via at least one processor, a set of treatment paths associated with the condition, wherein each treatment path is associated with a clinical value, and wherein each treatment path comprises a set of treatment pathway nodes;
obtain, via at least one processor, a member state associated with the member, wherein the member state includes clinical data;
determine, via at least one processor, the member's treatment path location with regard to the set of treatment paths based on analysis of the clinical data associated with the member;
determine, via at least one processor, a high value treatment path that the member can take from the member's treatment path location;
identify, via at least one processor, a next treatment on the high value treatment path;
determine, via at least one processor, a set of providers available for the next treatment;
calculate, via at least one processor, for each provider in the set of providers, (a) an expected longitudinal treatment value and (b) a copay for the next treatment;
determine, via at least one processor, a best provider from the set of providers, wherein the best provider is associated with the lowest expected longitudinal treatment value; and
provide, via a least one processor, coverage information for the member, wherein the coverage information includes coverage information for the next treatment for the best provider.

517. The medium of embodiment 516, wherein the instructions to determine the condition associated with the coverage search request further comprise instructions to:
retrieve, via at least one processor, an atomized coverage graph data structure associated with the plan; and
search, via at least one processor, through clinical condition objects in the atomized coverage graph data structure to determine a clinical condition object corresponding to the coverage search query.

518. The medium of embodiment 516, wherein the instructions to determine the condition associated with the coverage search request further comprise instructions to:
retrieve, via at least one processor, an atomized coverage graph data structure associated with the plan;
search, via at least one processor, through treatment objects in the atomized coverage graph data structure to determine a treatment object corresponding to the coverage search query; and
determine, via at least one processor, a clinical condition object linked to the treatment object.

519. The medium of embodiment 516, wherein the condition associated with the coverage search request is determined also based on clinical data associated with the member.

520. The medium of embodiment 517, wherein the instructions to determine the set of treatment paths associated with the condition further comprise instructions to determine a treatment paths object in the atomized coverage graph data structure associated with the clinical condition object.

521. The medium of embodiment 518, wherein the instructions to determine the set of providers available for the next treatment further comprise instructions to:
determine, via at least one processor, provider objects in the atomized coverage graph data structure linked to the treatment object; and
filter, via at least one processor, the determined provider objects to discard provider objects that are not in the region associated with the member.

522. The medium of embodiment 521, wherein the instructions to calculate, for each provider in the set of providers, an expected longitudinal treatment value further comprise instructions to:
determine, via at least one processor, a provider object in the set of providers available for the next treatment corresponding to the respective provider;
calculate, via at least one processor, a propensity ranking based on practice patterns data associated with the provider object;
determine, via at least one processor, a propensity weight based on the member's treatment path location;
calculate, via at least one processor, an expected episodic cost for the next treatment based on treatment cost data associated with the provider object;
determine, via at least one processor, an episodic cost weight based on the member's treatment path location; and
calculate, via at least one processor, an expected longitudinal treatment value for the respective provider as a weighted average of the respective provider's propensity ranking and the expected episodic cost for the next treatment weighted by their respective weights.

523. The medium of embodiment 522, wherein the instructions to calculate, for each provider in the set of providers, a copay for the next treatment further comprise instructions to:
determine, via at least one processor, a base copay for the next treatment based on an average longitudinal treatment value for providers in the set of providers;
calculate, via at least one processor, a price factor for the respective provider, wherein the price factor indicates relative expense of the expected longitudinal treatment value for the respective provider as compared with the average longitudinal treatment value for providers in the set of providers; and
calculate, via at least one processor, a copay for the next treatment for the respective provider as the base copay for the respective provider adjusted by the price factor for the respective provider.

524. The medium of embodiment 516, wherein a copay for the next treatment is further adjusted based on a treatment path move sequence associated with the member.

525. The medium of embodiment 516, wherein a copay for the next treatment is further adjusted based on a determination that the member state associated with the member indicates that the member has been diagnosed with the condition.

526. The medium of embodiment 516, further, comprising:
the search processing component, stored in the medium, includes processor-issuable instructions to:
determine, via at least one processor, that the best provider does not match a member requested provider in the coverage search query; and
wherein the coverage information provided for the member also includes coverage information for the next treatment for the member requested provider.

527. The medium of embodiment 516, further, comprising:
the search processing component, stored in the medium, includes processor-issuable instructions to:
determine, via at least one processor, that the next treatment on the high value treatment path does not match a member specified treatment in the coverage search query;
determine, via at least one processor, a set of providers available for the member specified treatment;
calculate, via at least one processor, for each provider in the set of providers available for the member specified treatment, (a) an expected longitudinal treatment value assuming that the member utilizes the member specified treatment next and (b) a copay for the member specified treatment;
determine, via at least one processor, a best provider from the second set of providers, wherein the best provider from the second set of providers is associated with the lowest expected longitudinal treatment value assuming that the member utilizes the member specified treatment next; and
wherein the coverage information provided for the member also includes coverage information for the member specified treatment for the best provider from the second set of providers.

528. The medium of embodiment 516, wherein the instructions to obtain the coverage search request further comprise instructions to:
generate, via a coverage search user interface, a GUI widget configured to obtain a member specified treatment; and
generate, via the coverage search user interface, a GUI widget configured to obtain a member requested provider.

529. The medium of embodiment 528, wherein the instructions to provide the coverage information for the member further comprise instructions to:
generate, via the coverage search user interface, a GUI widget configured to provide coverage information for an atomized add-in that that provides coverage for the member specified treatment;
generate, via the coverage search user interface, a GUI widget configured to provide coverage information for an atomized add-in that that provides coverage for the next treatment;
obtain, via the coverage search user interface, an atomized add-in selection from the member; and
generate, via the coverage search user interface, a GUI widget configured to provide coverage information regarding providers available for the member selected atomized add-in, wherein the best provider is highlighted for the member.

530. The medium of embodiment 529, wherein the member requested provider is highlighted for the plan member using at least one of: positioning, header, color, border, font.

531. A processor-implemented coverage search processing system, comprising:
a search processing component means, to:
obtain, via at least one processor, a coverage search request from a member enrolled into a plan, wherein the coverage search request includes a coverage search query specified by the member;
determine, via at least one processor, a condition associated with the coverage search request based on the coverage search query;
determine, via at least one processor, a set of treatment paths associated with the condition, wherein each treatment path is associated with a clinical value, and wherein each treatment path comprises a set of treatment pathway nodes;
obtain, via at least one processor, a member state associated with the member, wherein the member state includes clinical data;
determine, via at least one processor, the member's treatment path location with regard to the set of treatment paths based on analysis of the clinical data associated with the member;
determine, via at least one processor, a high value treatment path that the member can take from the member's treatment path location;
identify, via at least one processor, a next treatment on the high value treatment path;
determine, via at least one processor, a set of providers available for the next treatment;
calculate, via at least one processor, for each provider in the set of providers, (a) an expected longitudinal treatment value and (b) a copay for the next treatment;
determine, via at least one processor, a best provider from the set of providers, wherein the best provider is associated with the lowest expected longitudinal treatment value; and
provide, via a least one processor, coverage information for the member, wherein the coverage information includes coverage information for the next treatment for the best provider.

532. The system of embodiment 531, wherein the means to determine the condition associated with the coverage search request further comprise means to:
retrieve, via at least one processor, an atomized coverage graph data structure associated with the plan; and
search, via at least one processor, through clinical condition objects in the atomized coverage graph data structure to determine a clinical condition object corresponding to the coverage search query.

533. The system of embodiment 531, wherein the means to determine the condition associated with the coverage search request further comprise means to:
retrieve, via at least one processor, an atomized coverage graph data structure associated with the plan;
search, via at least one processor, through treatment objects in the atomized coverage graph data structure to determine a treatment object corresponding to the coverage search query; and
determine, via at least one processor, a clinical condition object linked to the treatment object.

534. The system of embodiment 531, wherein the condition associated with the coverage search request is determined also based on clinical data associated with the member.

535. The system of embodiment 532, wherein the means to determine the set of treatment paths associated with the condition further comprise means to determine a treatment paths object in the atomized coverage graph data structure associated with the clinical condition object.

536. The system of embodiment 533, wherein the means to determine the set of providers available for the next treatment further comprise means to:
  determine, via at least one processor, provider objects in the atomized coverage graph data structure linked to the treatment object; and
  filter, via at least one processor, the determined provider objects to discard provider objects that are not in the region associated with the member.

537. The system of embodiment 536, wherein the means to calculate, for each provider in the set of providers, an expected longitudinal treatment value further comprise means to:
  determine, via at least one processor, a provider object in the set of providers available for the next treatment corresponding to the respective provider;
  calculate, via at least one processor, a propensity ranking based on practice patterns data associated with the provider object;
  determine, via at least one processor, a propensity weight based on the member's treatment path location;
  calculate, via at least one processor, an expected episodic cost for the next treatment based on treatment cost data associated with the provider object;
  determine, via at least one processor, an episodic cost weight based on the member's treatment path location; and
  calculate, via at least one processor, an expected longitudinal treatment value for the respective provider as a weighted average of the respective provider's propensity ranking and the expected episodic cost for the next treatment weighted by their respective weights.

538. The system of embodiment 537, wherein the means to calculate, for each provider in the set of providers, a copay for the next treatment further comprise means to:
  determine, via at least one processor, a base copay for the next treatment based on an average longitudinal treatment value for providers in the set of providers;
  calculate, via at least one processor, a price factor for the respective provider, wherein the price factor indicates relative expense of the expected longitudinal treatment value for the respective provider as compared with the average longitudinal treatment value for providers in the set of providers; and
  calculate, via at least one processor, a copay for the next treatment for the respective provider as the base copay for the respective provider adjusted by the price factor for the respective provider.

539. The system of embodiment 531, wherein a copay for the next treatment is further adjusted based on a treatment path move sequence associated with the member.

540. The system of embodiment 531, wherein a copay for the next treatment is further adjusted based on a determination that the member state associated with the member indicates that the member has been diagnosed with the condition.

541. The system of embodiment 531, further, comprising: the search processing component means, to:
  determine, via at least one processor, that the best provider does not match a member requested provider in the coverage search query; and
  wherein the coverage information provided for the member also includes coverage information for the next treatment for the member requested provider.

542. The system of embodiment 531, further, comprising: the search processing component means, to:
  determine, via at least one processor, that the next treatment on the high value treatment path does not match a member specified treatment in the coverage search query;
  determine, via at least one processor, a set of providers available for the member specified treatment;
  calculate, via at least one processor, for each provider in the set of providers available for the member specified treatment, (a) an expected longitudinal treatment value assuming that the member utilizes the member specified treatment next and (b) a copay for the member specified treatment;
  determine, via at least one processor, a best provider from the second set of providers, wherein the best provider from the second set of providers is associated with the lowest expected longitudinal treatment value assuming that the member utilizes the member specified treatment next; and
  wherein the coverage information provided for the member also includes coverage information for the member specified treatment for the best provider from the second set of providers.

543. The system of embodiment 531, wherein the means to obtain the coverage search request further comprise means to:
  generate, via a coverage search user interface, a GUI widget configured to obtain a member specified treatment; and
  generate, via the coverage search user interface, a GUI widget configured to obtain a member requested provider.

544. The system of embodiment 543, wherein the means to provide the coverage information for the member further comprise means to:
  generate, via the coverage search user interface, a GUI widget configured to provide coverage information for an atomized add-in that that provides coverage for the member specified treatment;
  generate, via the coverage search user interface, a GUI widget configured to provide coverage information for an atomized add-in that that provides coverage for the next treatment;
  obtain, via the coverage search user interface, an atomized add-in selection from the member; and
  generate, via the coverage search user interface, a GUI widget configured to provide coverage information regarding providers available for the member selected atomized add-in, wherein the best provider is highlighted for the member.

545. The system of embodiment 544, wherein the member requested provider is highlighted for the plan member using at least one of: positioning, header, color, border, font.

546. A processor-implemented coverage search processing method, comprising:
  executing processor-implemented search processing component instructions to:
    obtain, via at least one processor, a coverage search request from a member enrolled into a plan, wherein the coverage search request includes a coverage search query specified by the member;
    determine, via at least one processor, a condition associated with the coverage search request based on the coverage search query;

determine, via at least one processor, a set of treatment paths associated with the condition, wherein each treatment path is associated with a clinical value, and wherein each treatment path comprises a set of treatment pathway nodes;

obtain, via at least one processor, a member state associated with the member, wherein the member state includes clinical data;

determine, via at least one processor, the member's treatment path location with regard to the set of treatment paths based on analysis of the clinical data associated with the member;

determine, via at least one processor, a high value treatment path that the member can take from the member's treatment path location;

identify, via at least one processor, a next treatment on the high value treatment path;

determine, via at least one processor, a set of providers available for the next treatment;

calculate, via at least one processor, for each provider in the set of providers, (a) an expected longitudinal treatment value and (b) a copay for the next treatment;

determine, via at least one processor, a best provider from the set of providers, wherein the best provider is associated with the lowest expected longitudinal treatment value; and provide, via a least one processor, coverage information for the member, wherein the coverage information includes coverage information for the next treatment for the best provider.

547. The method of embodiment 546, wherein the instructions to determine the condition associated with the coverage search request further comprise instructions to:
retrieve, via at least one processor, an atomized coverage graph data structure associated with the plan; and
search, via at least one processor, through clinical condition objects in the atomized coverage graph data structure to determine a clinical condition object corresponding to the coverage search query.

548. The method of embodiment 546, wherein the instructions to determine the condition associated with the coverage search request further comprise instructions to:
retrieve, via at least one processor, an atomized coverage graph data structure associated with the plan;
search, via at least one processor, through treatment objects in the atomized coverage graph data structure to determine a treatment object corresponding to the coverage search query; and
determine, via at least one processor, a clinical condition object linked to the treatment object.

549. The method of embodiment 546, wherein the condition associated with the coverage search request is determined also based on clinical data associated with the member.

550. The method of embodiment 547, wherein the instructions to determine the set of treatment paths associated with the condition further comprise instructions to determine a treatment paths object in the atomized coverage graph data structure associated with the clinical condition object.

551. The method of embodiment 548, wherein the instructions to determine the set of providers available for the next treatment further comprise instructions to:
determine, via at least one processor, provider objects in the atomized coverage graph data structure linked to the treatment object; and filter, via at least one processor, the determined provider objects to discard provider objects that are not in the region associated with the member.

552. The method of embodiment 551, wherein the instructions to calculate, for each provider in the set of providers, an expected longitudinal treatment value further comprise instructions to:
determine, via at least one processor, a provider object in the set of providers available for the next treatment corresponding to the respective provider;
calculate, via at least one processor, a propensity ranking based on practice patterns data associated with the provider object;
determine, via at least one processor, a propensity weight based on the member's treatment path location;
calculate, via at least one processor, an expected episodic cost for the next treatment based on treatment cost data associated with the provider object;
determine, via at least one processor, an episodic cost weight based on the member's treatment path location; and
calculate, via at least one processor, an expected longitudinal treatment value for the respective provider as a weighted average of the respective provider's propensity ranking and the expected episodic cost for the next treatment weighted by their respective weights.

553. The method of embodiment 552, wherein the instructions to calculate, for each provider in the set of providers, a copay for the next treatment further comprise instructions to:
determine, via at least one processor, a base copay for the next treatment based on an average longitudinal treatment value for providers in the set of providers;
calculate, via at least one processor, a price factor for the respective provider, wherein the price factor indicates relative expense of the expected longitudinal treatment value for the respective provider as compared with the average longitudinal treatment value for providers in the set of providers; and
calculate, via at least one processor, a copay for the next treatment for the respective provider as the base copay for the respective provider adjusted by the price factor for the respective provider.

554. The method of embodiment 546, wherein a copay for the next treatment is further adjusted based on a treatment path move sequence associated with the member.

555. The method of embodiment 546, wherein a copay for the next treatment is further adjusted based on a determination that the member state associated with the member indicates that the member has been diagnosed with the condition.

556. The method of embodiment 546, further, comprising:
executing processor-implemented search processing component instructions to:
determine, via at least one processor, that the best provider does not match a member requested provider in the coverage search query; and
wherein the coverage information provided for the member also includes coverage information for the next treatment for the member requested provider.

557. The method of embodiment 546, further, comprising:
executing processor-implemented search processing component instructions to:
determine, via at least one processor, that the next treatment on the high value treatment path does not match a member specified treatment in the coverage search query;

determine, via at least one processor, a set of providers available for the member specified treatment;

calculate, via at least one processor, for each provider in the set of providers available for the member specified treatment, (a) an expected longitudinal treatment value assuming that the member utilizes the member specified treatment next and (b) a copay for the member specified treatment;

determine, via at least one processor, a best provider from the second set of providers, wherein the best provider from the second set of providers is associated with the lowest expected longitudinal treatment value assuming that the member utilizes the member specified treatment next; and wherein the coverage information provided for the member also includes coverage information for the member specified treatment for the best provider from the second set of providers.

558. The method of embodiment 546, wherein the instructions to obtain the coverage search request further comprise instructions to:

generate, via a coverage search user interface, a GUI widget configured to obtain a member specified treatment; and generate, via the coverage search user interface, a GUI widget configured to obtain a member requested provider.

559. The method of embodiment 558, wherein the instructions to provide the coverage information for the member further comprise instructions to:

generate, via the coverage search user interface, a GUI widget configured to provide coverage information for an atomized add-in that that provides coverage for the member specified treatment;

generate, via the coverage search user interface, a GUI widget configured to provide coverage information for an atomized add-in that that provides coverage for the next treatment;

obtain, via the coverage search user interface, an atomized add-in selection from the member; and generate, via the coverage search user interface, a GUI widget configured to provide coverage information regarding providers available for the member selected atomized add-in, wherein the best provider is highlighted for the member.

560. The method of embodiment 559, wherein the member requested provider is highlighted for the plan member using at least one of: positioning, header, color, border, font.

In order to address various issues and advance the art, the entirety of this application for Use Determination Risk Coverage Datastructure for On-Demand and Increased Efficiency Coverage Detection and Rebalancing Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a UDRCD individual and/or enterprise user, database configuration and/or relational model, data type, data transmission and/or network framework, syntax structure, and/or the like, various embodiments of the UDRCD, may be implemented that allow a great deal of flexibility and customization. For example, aspects of the UDRCD may be adapted for service packages that are traditionally static and difficult to change. While various embodiments and discussions of the UDRCD have included information technology analytics and processing for risk coverage, however, it is to be understood that the embodiments described herein may be readily configured and/or customized for a wide variety of other applications and/or implementations.

What is claimed is:

1. An atomized coverage graph generating apparatus, comprising:
    a memory;
    a component collection in the memory, including:
        an atomized coverage graph generating component;
        a processor disposed in communication with the memory, and configured to issue a plurality of processing instructions from the component collection stored in the memory,
        wherein the processor issues instructions from the atomized coverage graph generating component, stored in the memory, to:
            obtain, via at least one processor, an atomized coverage graph generating request;
            determine, via at least one processor, a set of clinical conditions associated with the atomized coverage graph generating request, wherein the set of clinical conditions is obtained from a treatment characteristics pathway, wherein the treatment characteristics pathway includes a clinical outcome pathway;
            determine, via at least one processor, for each clinical condition in the set of clinical conditions, a set of treatments associated with the respective clinical condition;
            determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;
            determine, via at least one processor, for each treatment, a set of providers associated with the respective treatment;
            determine, via at least one processor, practice patterns data that specifies, for each clinical condition treated by each provider, how likely the respective provider is to utilize each of the treatment paths in the set of treatment paths associated with the respective clinical condition; and
            generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider, and wherein at least some of the objects in the atomized coverage graph data structure are dynamic nodes configured to be generated dynamically using associated engageable code;
        issue, via at least one processor, issues instructions from the atomized coverage graph generating component, stored in the memory, to:
            determine that frequency of utilization of a dynamic node exceeds a specified threshold; and
            convert the dynamic node in the atomized coverage graph data structure to a static node.

2. The apparatus of claim 1, wherein the set of clinical conditions associated with the atomized coverage graph generating request is determined by grouping diagnosis codes for related ailments into clinical conditions.

3. The apparatus of claim 1, wherein a set of treatments associated with a clinical condition is determined by analyzing historical claims data associated with the clinical condition.

4. The apparatus of claim 1, wherein treatment paths data is filtered to include only high frequency treatment paths.

5. The apparatus of claim 4, wherein a high frequency treatment path is a treatment path utilized by at least a minimum percentage of members.

6. The apparatus of claim 4, wherein a high frequency treatment path is one of a plurality of high frequency treatment paths that in aggregate are utilized by at least a minimum percentage of members.

7. The apparatus of claim 1, wherein treatment paths data further specifies a ranking for each treatment path.

8. The apparatus of claim 1, wherein treatment paths data further specifies key pathway nodes for each treatment path.

9. The apparatus of claim 1, wherein practice patterns data of a provider object further specifies the corresponding provider's treatment cost associated with each linked treatment object.

10. The apparatus of claim 1, wherein the engageable code 1s a SQL query.

11. The apparatus of claim 1, wherein the frequency of utilization is measured based on one of: a counter of utilization, a percentage of utilization.

12. The apparatus of claim 1, further, comprising:
    the processor issues instructions from the atomized coverage graph generating component, stored in the memory, to:
        determine that an importance quotient of a subset of objects in the atomized coverage graph data structure exceeds a specified threshold; and
        split off the subset of objects into new nodes in the atomized coverage graph data structure.

13. The apparatus of claim 12, wherein the importance quotient is determined using one of: a frequency of utilization measure, a machine learning structure.

14. A processor-readable atomized coverage graph generating non-transient physical medium storing processor-executable components, the components, comprising:
    a component collection stored in the medium, including:
        an atomized coverage graph generating component;
    wherein the atomized coverage graph generating component, stored in the medium, includes processor-issuable instructions to:
        obtain, via at least one processor, an atomized coverage graph generating request;

determine, via at least one processor, a set of clinical conditions associated with the atomized coverage graph generating request, wherein the set of clinical conditions is obtained from a treatment characteristics pathway, wherein the treatment characteristics pathway includes a clinical outcome pathway;

determine, via at least one processor, for each clinical condition in the set of clinical conditions, a set of treatments associated with the respective clinical condition;

determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;

determine, via at least one processor, for each treatment, a set of providers associated with the respective treatment;

determine, via at least one processor, practice patterns data that specifies, for each clinical condition treated by each provider, how likely the respective provider is to utilize each of the treatment paths in the set of treatment paths associated with the respective clinical condition; and generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider, and wherein at least some of the objects in the atomized coverage graph data structure are dynamic nodes configured to be generated dynamically using associated engageable code;

issue, via at least one processor, issues instructions from the atomized coverage graph generating component, stored in the memory, to:
  determine that frequency of utilization of a dynamic node exceeds a specified threshold; and
  convert the dynamic node in the atomized coverage graph data structure to a static node.

15. A processor-implemented atomized coverage graph generating system, comprising: an atomized coverage graph generating component means, to:

obtain, via at least one processor, an atomized coverage graph generating request;

determine, via at least one processor, a set of clinical conditions associated with the atomized coverage graph generating request, wherein the set of clinical conditions is obtained from a treatment characteristics pathway, wherein the treatment characteristics pathway includes a clinical outcome pathway;

determine, via at least one processor, for each clinical condition in the set of clinical conditions, a set of treatments associated with the respective clinical condition;

determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;

determine, via at least one processor, for each treatment, a set of providers associated with the respective treatment;

determine, via at least one processor, practice patterns data that specifies, for each clinical condition treated by each provider, how likely the respective provider is to utilize each of the treatment paths in the set of treatment paths associated with the respective clinical condition; and generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider, and wherein at least some of the objects in the atomized coverage graph data structure are dynamic nodes configured to be generated dynamically using associated engageable code;

issue, via at least one processor, issues instructions from the atomized coverage graph generating component, stored in the memory, to:
  determine that frequency of utilization of a dynamic node exceeds a specified threshold; and
  convert the dynamic node in the atomized coverage graph data structure to a static node.

16. A processor-implemented atomized coverage graph generating method, comprising: executing processor-implemented atomized coverage graph generating component instructions to:

obtain, via at least one processor, an atomized coverage graph generating request;

determine, via at least one processor, a set of clinical conditions associated with the atomized coverage graph generating request, wherein the set of clinical conditions is obtained from a treatment characteristics pathway, wherein the treatment characteristics pathway includes a clinical outcome pathway;

determine, via at least one processor, for each clinical condition in the set of clinical conditions, a set of treatments associated with the respective clinical condition;

determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;

determine, via at least one processor, for each treatment, a set of providers associated with the respective treatment;

determine, via at least one processor, practice patterns data that specifies, for each clinical condition treated by each provider, how likely the respective provider 1s to utilize each of the treatment paths in the set of treatment paths associated with the respective clinical condition; and generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider, and wherein at least some of the objects in the atomized coverage graph data structure are dynamic nodes configured to be generated dynamically using associated engageable code;

issue, via at least one processor, issues instructions from the atomized coverage graph generating component, stored in the memory, to:
  determine that frequency of utilization of a dynamic node exceeds a specified threshold; and
  convert the dynamic node in the atomized coverage graph data structure to a static node.

* * * * *

UNITED STATES PATENT AND TRADEMARK OFFICE
CERTIFICATE OF CORRECTION

| | | |
|---|---|---|
| PATENT NO. | : 11,790,454 B1 | |
| APPLICATION NO. | : 16/659429 | |
| DATED | : October 17, 2023 | |
| INVENTOR(S) | : Anthony Miller et al. | |

It is certified that error appears in the above-identified patent and that said Letters Patent is hereby corrected as shown below:

On the Title Page

(72) Inventors should read: Anthony Miller, Minneapolis, MN (US);
Henning Chiv, Castro Valley, CA (US);
Matthew Chock, Apple Valley, MN (US);
Glen Eiden, Forest Lake, MN (US);
Trevor Fast, San Francisco, CA (US);
Charley Hastings, Lindstrom, MN (US);
Jason Haupt, Zimmerman, MN (US);
Shawn Wagoner, Edina, MN (US);
Matthew Wiandt, Edina, MN (US);
David Dickey, Minneapolis, MN (US)
Jessica Zeaske, Minneapolis, MN (US);
Nels Marcus Thygeson, San Rafael, CA (US)

Signed and Sealed this
Thirteenth Day of February, 2024

*Katherine Kelly Vidal*

Katherine Kelly Vidal
*Director of the United States Patent and Trademark Office*